US012038994B2

(12) United States Patent
Sidman

(10) Patent No.: US 12,038,994 B2
(45) Date of Patent: Jul. 16, 2024

(54) INTEGRATED, INFORMATION-ENGINEERED AND SELF-IMPROVING ADVERTISING, E-COMMERCE AND ONLINE CUSTOMER INTERACTIONS APPARATUSES, PROCESSES AND SYSTEM

(71) Applicant: Content Directions, Inc., New York, NY (US)

(72) Inventor: David Anthony Sidman, Brooklyn, NY (US)

(73) Assignee: Content Directions, Inc., New York, NY (US)

( * ) Notice: Subject to any disclaimer, the term of this patent is extended or adjusted under 35 U.S.C. 154(b) by 0 days.

(21) Appl. No.: 17/126,019

(22) Filed: Dec. 17, 2020

(65) Prior Publication Data

US 2021/0216599 A1 Jul. 15, 2021

Related U.S. Application Data

(63) Continuation-in-part of application No. 17/087,434, filed on Nov. 2, 2020, which is a continuation of
(Continued)

(51) Int. Cl.
*G06Q 30/02* (2023.01)
*G06F 16/957* (2019.01)
(Continued)

(52) U.S. Cl.
CPC ....... *G06F 16/957* (2019.01); *G06Q 30/0269* (2013.01); *G06Q 30/0273* (2013.01)

(58) Field of Classification Search
CPC .............. G06F 16/957; G06Q 30/0273; G06Q 30/0269
See application file for complete search history.

(56) References Cited

U.S. PATENT DOCUMENTS 6,233,571 B1 * 5/2001 Egger .................. G06F 16/248 715/207
6,266,060 B1 * 7/2001 Roth .................... G06F 3/0482 715/810
(Continued)

FOREIGN PATENT DOCUMENTS

CN 103883491 6/2016
EP 2213768 8/2010
(Continued)

OTHER PUBLICATIONS

Peter Balesis, "Using Classes", http://www.hiermenuscentral.com/samples/ : Dec. 12, 2004 from a search on the URL of (http://www.HierMenus.com:); archived at Wayback Machine (https://web.archive.org/); citing a capture dated Mar. 7, 2022. (Year: 2004).*
(Continued)

*Primary Examiner* — Waseem Ashraf
*Assistant Examiner* — Christopher Stroud
(74) *Attorney, Agent, or Firm* — Hanchuk Kheit LLP.; Walter G. Hanchuk

(57) ABSTRACT

The Integrated, Information-Engineered and Self-Improving Advertising, E-Commerce and Online Customer Interactions Apparatuses, Processes and Systems ("ISICI") transforms menu identifier, menu target identifier, menu content hierarchy items, menu specification, indicia of usage inputs via ISICI components into menu/user interface, user interface updates, transactions, metrics outputs. In one embodiment, the ISICI is comprised of three components: 1) a creation and maintenance of MultiLink menus component; 2) a registration and updating of the underlying multilink records component; and 3) a distribution/syndication of the MultiLink menus component. The ISICI allows for the creation of MultiLink menus. These menus may appear over any links, ads, ecommerce, etc. The ISICI provides a mechanism to track how users use the MultiLink menu. This
(Continued)

tracking information is fed back to the ISICI, which allows it to further refine the menu structure in response to actual usage tracking. As such, the ISICI manages to compress the purchasing cycle from months down to moments, and/or to service a wider range of customer prospects who are already in various stages of the purchasing cycle.

30 Claims, 62 Drawing Sheets

Related U.S. Application Data application No. 16/752,370, filed on Jan. 24, 2020, now abandoned, which is a continuation of application No. 16/591,504, filed on Oct. 2, 2019, now abandoned, which is a continuation of application No. 16/506,615, filed on Jul. 9, 2019, now abandoned, which is a continuation of application No. 16/394,928, filed on Apr. 25, 2019, now abandoned, which is a continuation of application No. 16/268,374, filed on Feb. 5, 2019, now abandoned, which is a continuation of application No. 16/011,465, filed on Jun. 18, 2018, now abandoned, which is a continuation of application No. 15/786,554, filed on Oct. 17, 2017, now abandoned, which is a continuation of application No. 15/453,791, filed on Mar. 8, 2017, now abandoned, which is a continuation of application No. 14/207,442, filed on Mar. 12, 2014, now abandoned, which is a continuation of application No. 13/935,709, filed on Jul. 5, 2013, now abandoned, which is a continuation of application No. 13/657,809, filed on Oct. 22, 2012, now abandoned, which is a continuation-in-part of application No. 13/415,731, filed on Mar. 8, 2012, now abandoned, which is a continuation of application No. 11/813,671, filed as application No. PCT/US2006/000965 on Jan. 11, 2006, now abandoned.

(60) Provisional application No. 60/642,809, filed on Jan. 11, 2005, provisional application No. 60/726,689, filed on Oct. 14, 2005.

(51) Int. Cl.
*G06Q 30/0251* (2023.01)
*G06Q 30/0273* (2023.01)

(56) References Cited

U.S. PATENT DOCUMENTS 6,411,999 B1 * 6/2002 Tinkler ............... G06F 16/9558 709/224
6,732,332 B1 * 5/2004 Borysewicz .......... G06F 40/117 707/999.102
6,792,475 B1 * 9/2004 Arcuri ....................... H04L 9/40 715/239
6,948,135 B1 * 9/2005 Ruthfield ............ G06F 16/9558 715/854
6,961,897 B1 * 11/2005 Peel, Jr. ................ G06F 40/166 707/E17.116
8,354,010 B2 1/2013 Pless
8,409,422 B2 4/2013 Vancina
8,608,936 B2 12/2013 Skomsvold
9,797,521 B1 10/2017 Davis
2002/0059272 A1 * 5/2002 Porter ..................... G06F 16/30
2002/0099605 A1 * 7/2002 Weitzman ............. G06Q 30/02 705/14.35
2002/0165849 A1 * 11/2002 Singh ..................... G06Q 30/02
2003/0065706 A1 * 4/2003 Smyth ................ G06F 16/9535 707/999.005
2003/0204449 A1 * 10/2003 Kotas ..................... G06Q 30/02 707/781
2004/0015500 A1 * 1/2004 Pugliese ............... G06F 3/0482
2004/0036779 A1 * 2/2004 Cazier ................ H04N 1/00437 348/231.2
2004/0095705 A1 5/2004 Mayo
2004/0107267 A1 * 6/2004 Donker ............... G06F 16/9566 709/227
2005/0029120 A1 2/2005 Bar-Gadda
2005/0149512 A1 * 7/2005 Ruthfield ............. G06F 3/0481
2005/0223023 A1 * 10/2005 King ..................... G06F 16/958 707/999.102
2005/0262428 A1 * 11/2005 Little .................. G06F 16/9535 715/201
2006/0004892 A1 * 1/2006 Lunt ..................... G06F 16/338
2006/0085766 A1 * 4/2006 Dominowska ........ G06F 16/954 715/854
2006/0095343 A1 * 5/2006 Clarke ............... G06Q 30/0641 705/14.1
2006/0131008 A1 6/2006 Ogawa
2007/0163877 A1 7/2007 Brown
2007/0178338 A1 8/2007 McElroy
2008/0241614 A1 10/2008 McCanny
2009/0038958 A1 2/2009 Coyle
2009/0328063 A1 12/2009 Corvera et al.
2010/0133029 A1 6/2010 Moran
2010/0230272 A1 9/2010 Gonzalez
2010/0239943 A1 9/2010 Kobayashi
2011/0262313 A1 10/2011 Hitz
2012/0084641 A1 4/2012 Chung
2013/0084474 A1 4/2013 Mills
2014/0072836 A1 3/2014 Mills
2015/0171455 A1 6/2015 Mills
2016/0195269 A1 7/2016 Yoshikawa
2017/0152840 A1 6/2017 Yamazaki
2017/0324303 A1 11/2017 Stoltenberg

FOREIGN PATENT DOCUMENTS

EP 2533250 12/2012
WO 2009009496 1/2009
WO 2012138576 10/2012

OTHER PUBLICATIONS

Dan Livingston. 2002. Advanced Javascript. Prentice Hall PTR, USA pp. 263 and 264. (Year: 2002).*

S. Flesca, G. Greco, S. Greco and E. Zumpano, "A lightweight tool for easy Web site navigation," Proceedings of the Fourth International Conference on Web Information Systems Engineering, 2003. WISE 2003., 2003, pp. 134-143, doi: 10.1109/WISE.2003.1254477. (Year: 2003).*

International Search Report and Written Option of the International Search Authority mailed on Jan. 4, 2018 for PCT application No. PCT/US2017/052260 filed on Sep. 19, 2017.

European Search Report issued on Jun. 25, 2020 for EP application No. EP17847543.

* cited by examiner

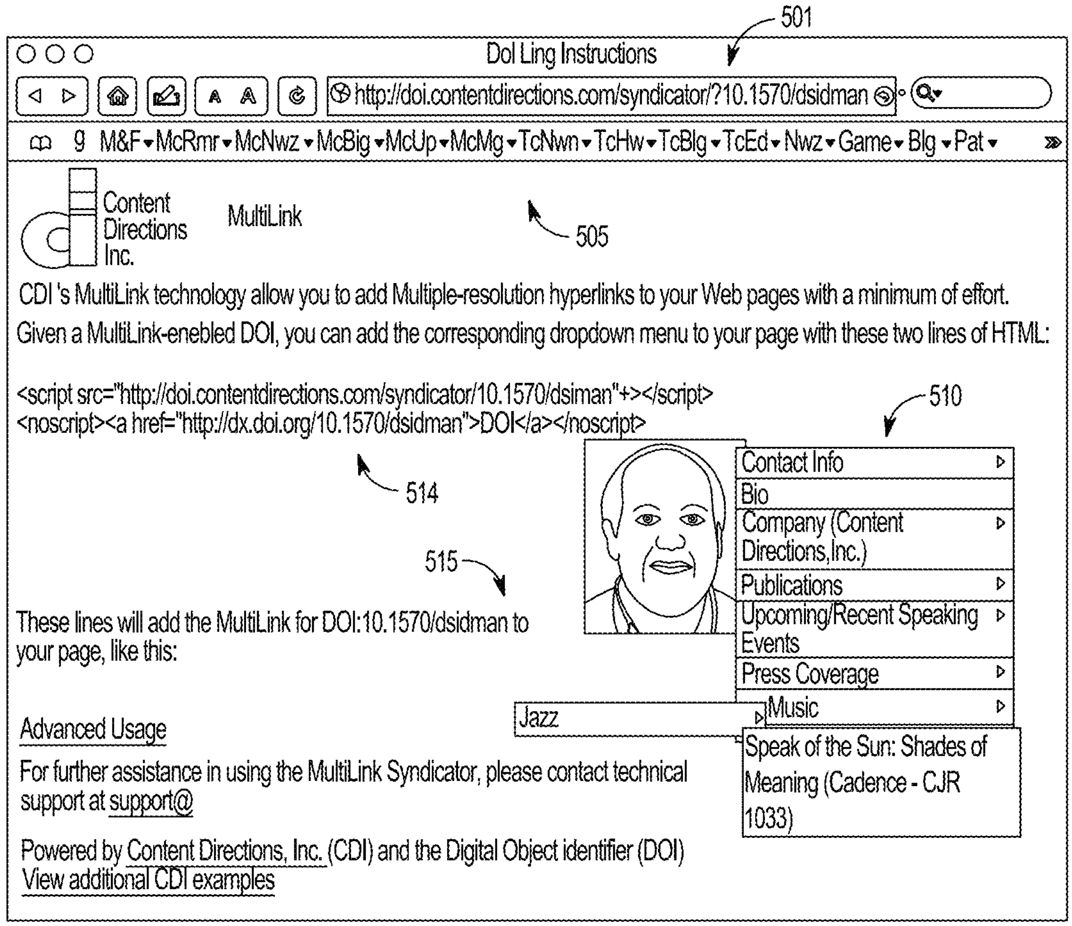
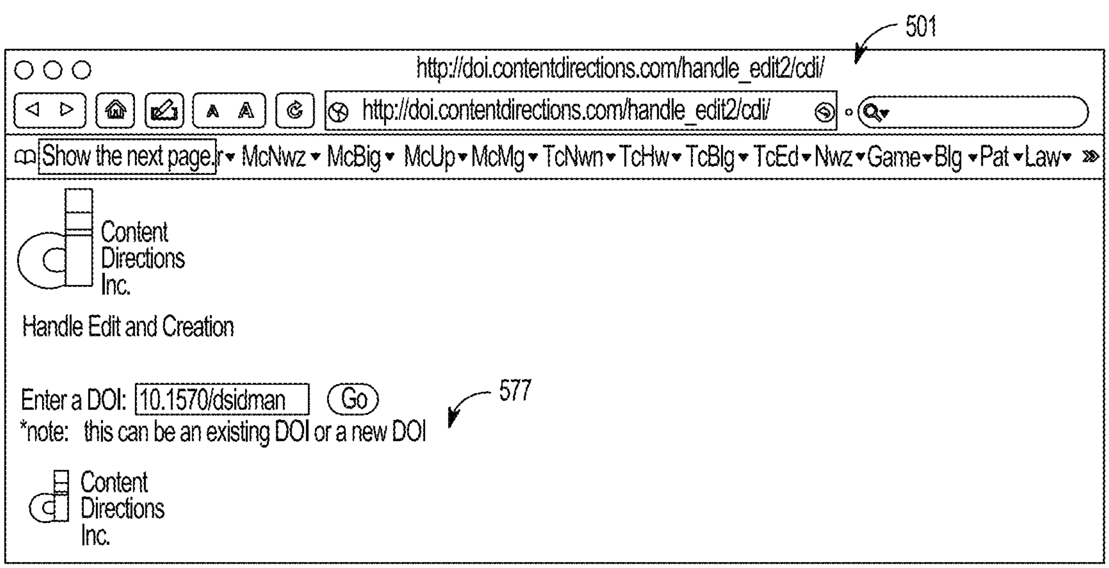
FIG. 5A

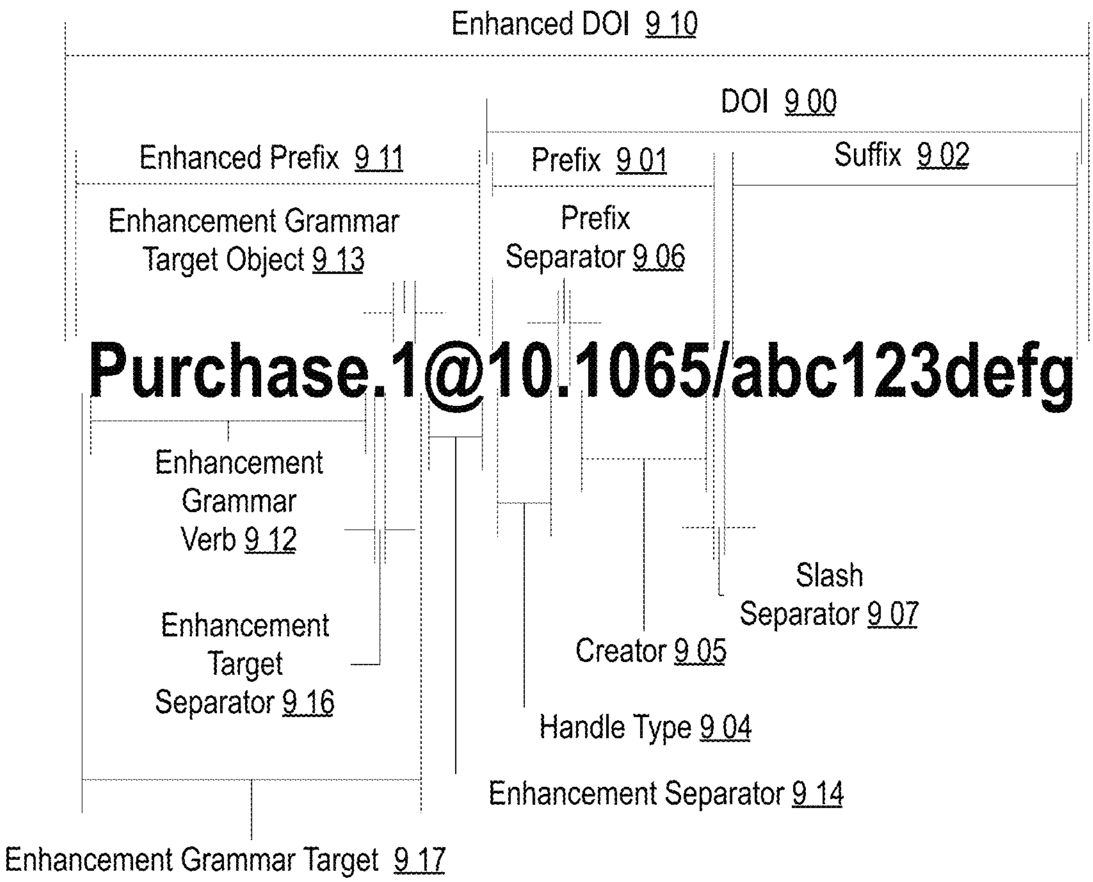
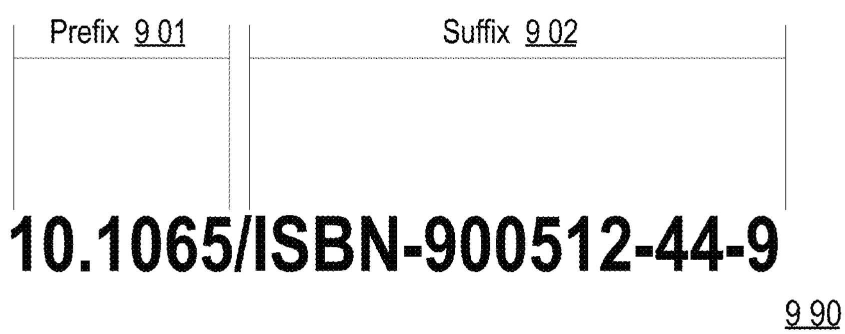
FIG 9

View The Handle Record http://doi.contentdirections.com/MRDemo/viewH g M&F McRmr McNwz McBlg McUp McMg TcNwz TcHw TcBlg TcEd Nwz Content Directions Inc.

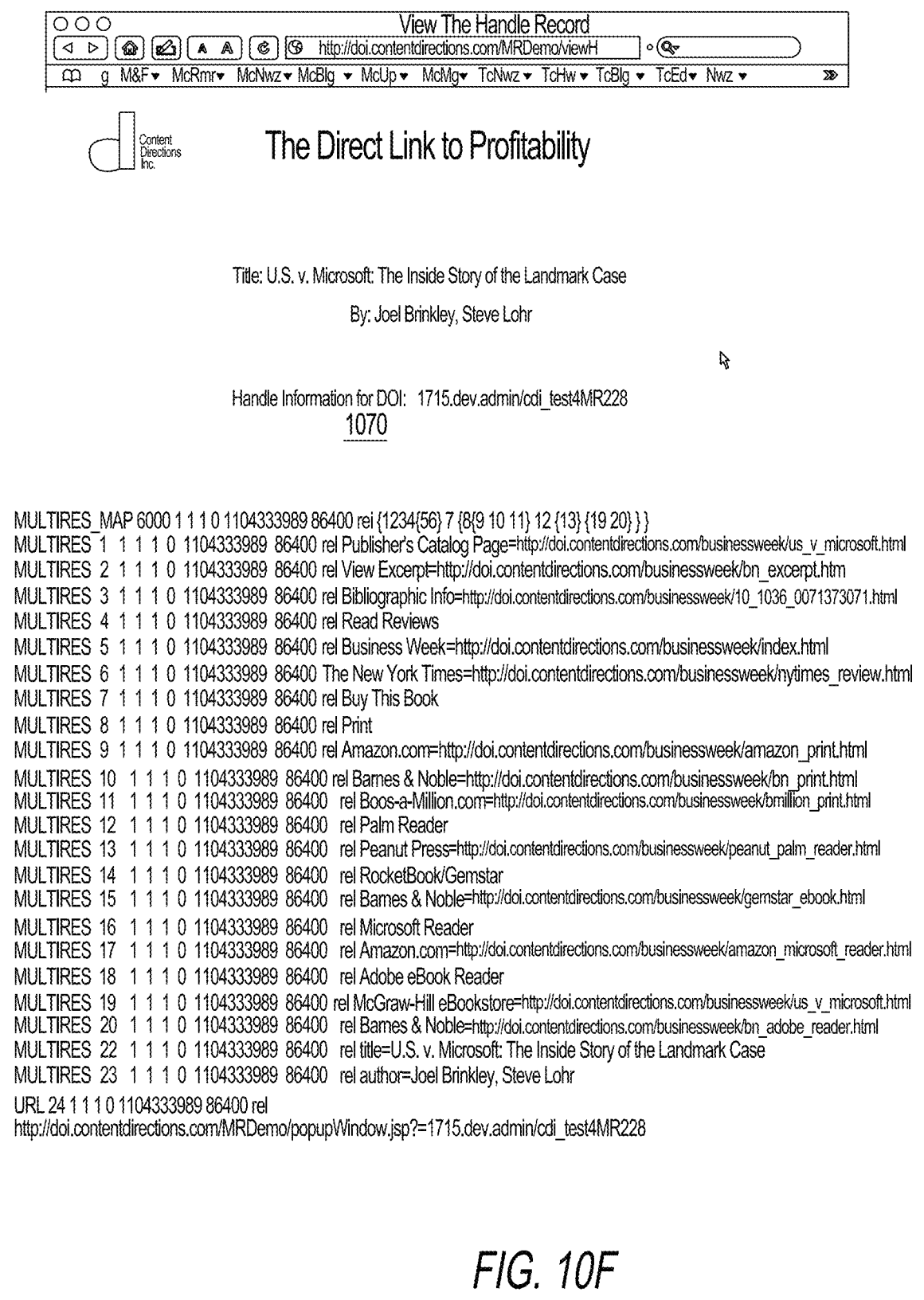

The Direct Link to Profitability

Title: U.S. v. Microsoft: The Inside Story of the Landmark Case

By: Joel Brinkley, Steve Lohr

Handle Information for DOI: 1715.dev.admin/cdi_test4MR228

1070

MULTIRES_MAP 6000 1 1 1 0 1104333989 86400 rei {1234{56} 7 {8{9 10 11} 12 {13} {19 20} } }
MULTIRES 1 1 1 1 0 1104333989 86400 rel Publisher's Catalog Page=http://doi.contentdirections.com/businessweek/us_v_microsoft.html
MULTIRES 2 1 1 1 0 1104333989 86400 rel View Excerpt=http://doi.contentdirections.com/businessweek/bn_excerpt.htm
MULTIRES 3 1 1 1 0 1104333989 86400 rel Bibliographic Info=http://doi.contentdirections.com/businessweek/10_1036_0071373071.html
MULTIRES 4 1 1 1 0 1104333989 86400 rel Read Reviews
MULTIRES 5 1 1 1 0 1104333989 86400 rel Business Week=http://doi.contentdirections.com/businessweek/index.html
MULTIRES 6 1 1 1 0 1104333989 86400 The New York Times=http://doi.contentdirections.com/businessweek/nytimes_review.html
MULTIRES 7 1 1 1 0 1104333989 86400 rel Buy This Book
MULTIRES 8 1 1 1 0 1104333989 86400 rel Print
MULTIRES 9 1 1 1 0 1104333989 86400 rel Amazon.com=http://doi.contentdirections.com/businessweek/amazon_print.html
MULTIRES 10 1 1 1 0 1104333989 86400 rel Barnes & Noble=http://doi.contentdirections.com/businessweek/bn_print.html
MULTIRES 11 1 1 1 0 1104333989 86400 rel Boos-a-Million.com=http://doi.contentdirections.com/businessweek/bmillion_print.html
MULTIRES 12 1 1 1 0 1104333989 86400 rel Palm Reader
MULTIRES 13 1 1 1 0 1104333989 86400 rel Peanut Press=http://doi.contentdirections.com/businessweek/peanut_palm_reader.html
MULTIRES 14 1 1 1 0 1104333989 86400 rel RocketBook/Gemstar
MULTIRES 15 1 1 1 0 1104333989 86400 rel Barnes & Noble=http://doi.contentdirections.com/businessweek/gemstar_ebook.html
MULTIRES 16 1 1 1 0 1104333989 86400 rel Microsoft Reader
MULTIRES 17 1 1 1 0 1104333989 86400 rel Amazon.com=http://doi.contentdirections.com/businessweek/amazon_microsoft_reader.html
MULTIRES 18 1 1 1 0 1104333989 86400 rel Adobe eBook Reader
MULTIRES 19 1 1 1 0 1104333989 86400 rel McGraw-Hill eBookstore=http://doi.contentdirections.com/businessweek/us_v_microsoft.html
MULTIRES 20 1 1 1 0 1104333989 86400 rel Barnes & Noble=http://doi.contentdirections.com/businessweek/bn_adobe_reader.html
MULTIRES 22 1 1 1 0 1104333989 86400 rel title=U.S. v. Microsoft: The Inside Story of the Landmark Case
MULTIRES 23 1 1 1 0 1104333989 86400 rel author=Joel Brinkley, Steve Lohr
URL 24 1 1 1 0 1104333989 86400 rel
http://doi.contentdirections.com/MRDemo/popupWindow.jsp?=1715.dev.admin/cdi_test4MR228

FIG. 10F

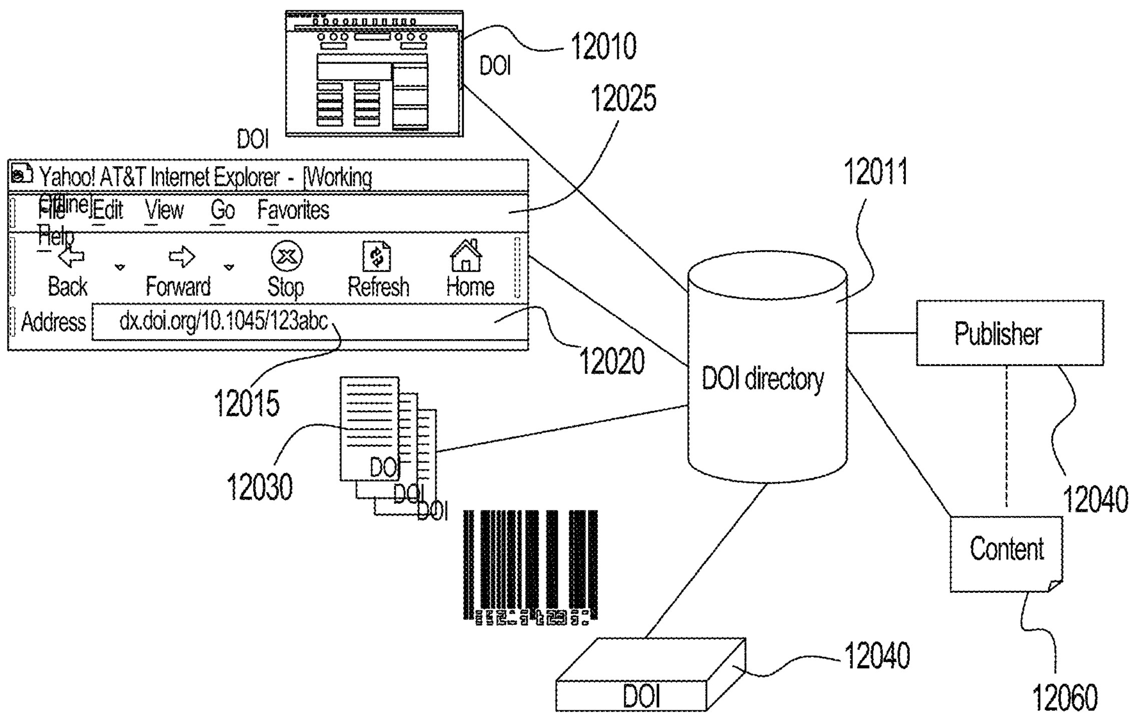
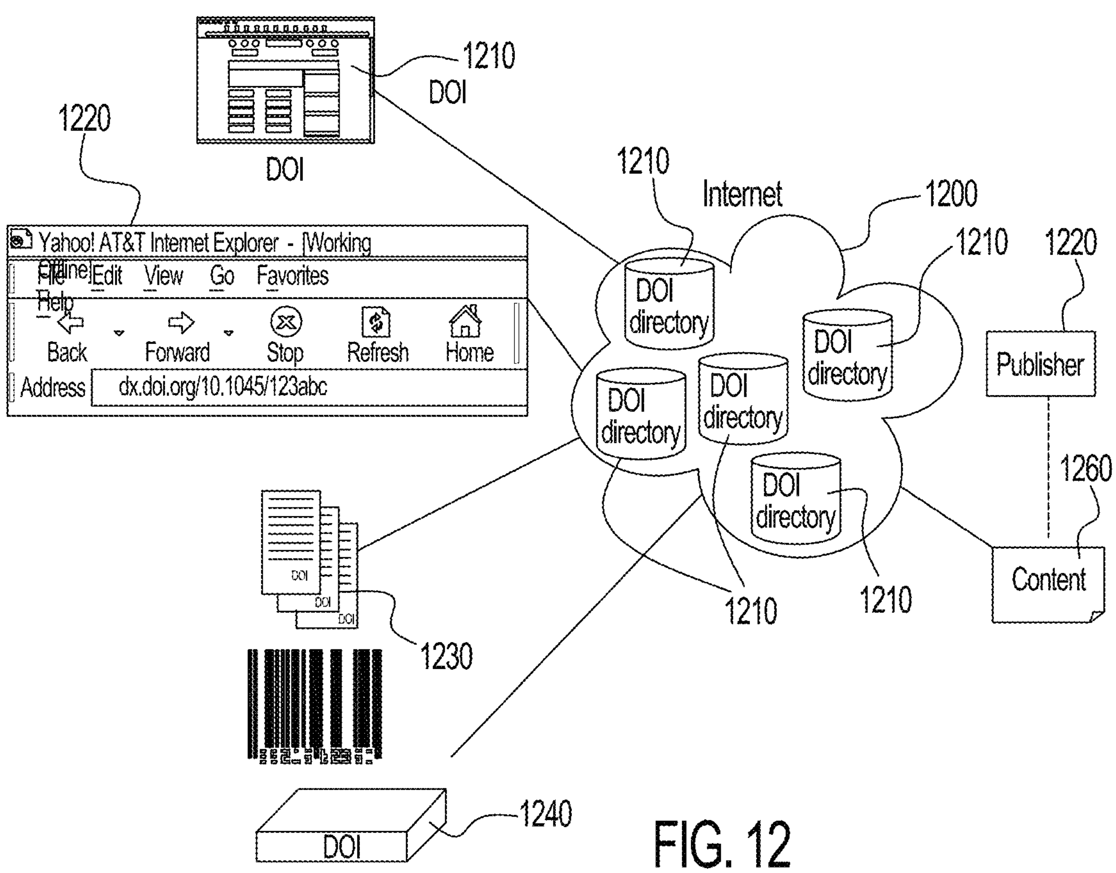
FIG. 12

Figure 15D:
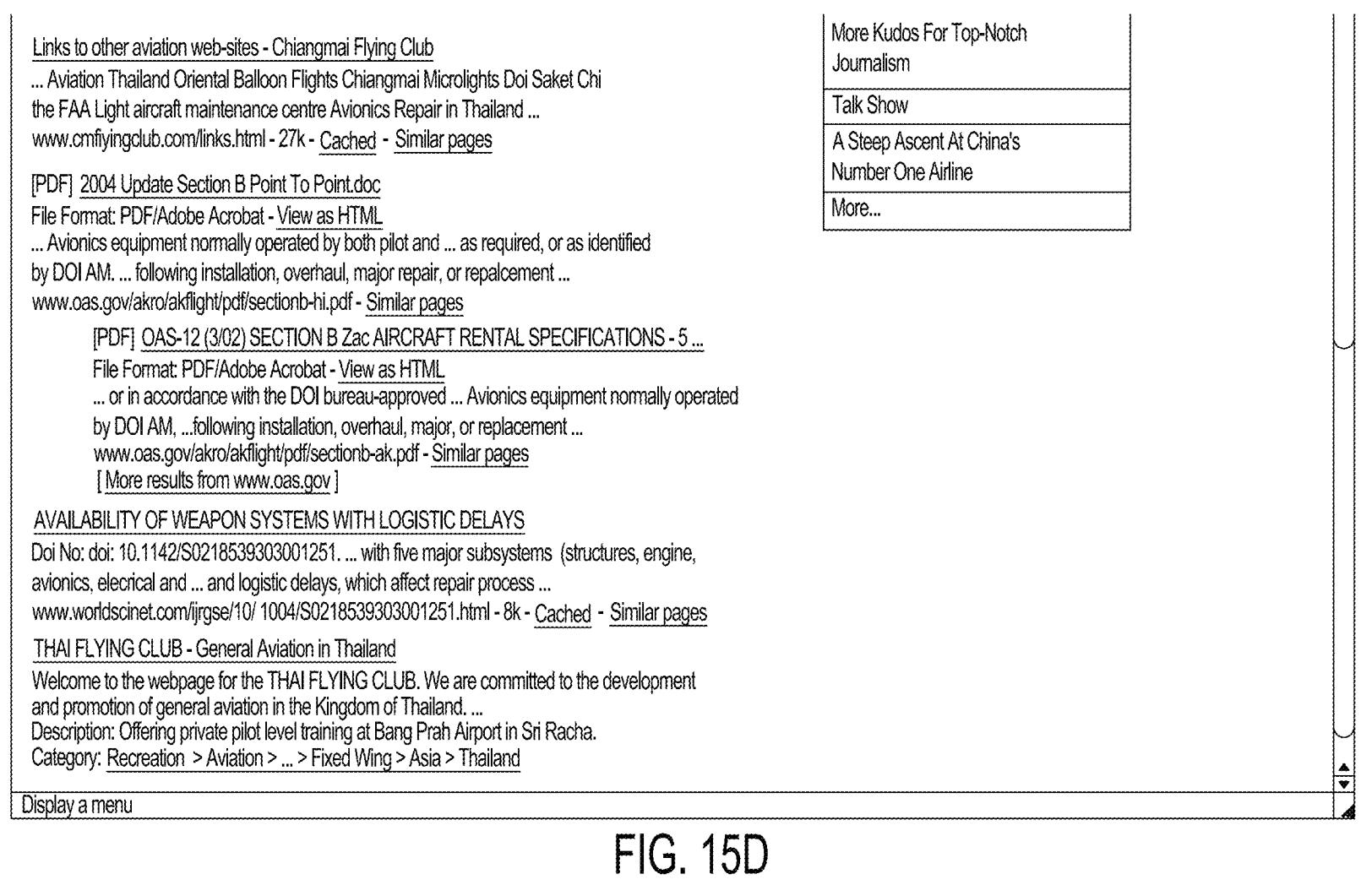

Links to other aviation web-sites - Chiangmai Flying Club
... Aviation Thailand Oriental Balloon Flights Chiangmai Microlights Doi Saket Chi
the FAA Light aircraft maintenance centre Avionics Repair in Thailand ...
www.cmflyingclub.com/links.html - 27k - Cached - Similar pages

[PDF] 2004 Update Section B Point To Point.doc
File Format: PDF/Adobe Acrobat - View as HTML
... Avionics equipment normally operated by both pilot and ... as required, or as identified
by DOI AM. ... following installation, overhaul, major repair, or repalcement ...
www.oas.gov/akro/akflight/pdf/sectionb-hi.pdf - Similar pages

[PDF] OAS-12 (3/02) SECTION B Zac AIRCRAFT RENTAL SPECIFICATIONS - 5 ...
File Format: PDF/Adobe Acrobat - View as HTML
... or in accordance with the DOI bureau-approved ... Avionics equipment normally operated
by DOI AM, ...following installation, overhaul, major, or replacement ...
www.oas.gov/akro/akflight/pdf/sectionb-ak.pdf - Similar pages
[ More results from www.oas.gov ]

AVAILABILITY OF WEAPON SYSTEMS WITH LOGISTIC DELAYS
Doi No: doi: 10.1142/S0218539303001251. ... with five major subsystems (structures, engine,
avionics, elecrical and ... and logistic delays, which affect repair process ...
www.worldscinet.com/ijrgse/10/ 1004/S0218539303001251.html - 8k - Cached - Similar pages THAI FLYING CLUB - General Aviation in Thailand
Welcome to the webpage for the THAI FLYING CLUB. We are committed to the development
and promotion of general aviation in the Kingdom of Thailand. ...
Description: Offering private pilot level training at Bang Prah Airport in Sri Racha.
Category: Recreation > Aviation > ... > Fixed Wing > Asia > Thailand

| |
|---|
| More Kudos For Top-Notch Journalism |
| Talk Show |
| A Steep Ascent At China's Number One Airline |
| More... |

Display a menu

| | | | |
|---|---|---|---|
| HITS PER DOI FOR | | | |
| AUG 2005 | | | |
| Total distinct DOIs visited this month: 6090 | | | |
| Total users hits for all DOIs this month: 21887 | | | |
| Total spider hits for all | | | |
| DOIs this month: 20133 | | | |
| DOI | User Hits | Spiider Hits | Title |
| 10.1009/0395960789 | 148 | 41 | The Enduring Vision |
| 10.1009/0618224246 | 144 | 3 | American Pagent Complete Twelfth Edition and Guide Complete |
| 10.1009/0618355588 | 129 | 9 | The American Pageant and Guide Complete |
| 10.1009/0618103570 | 117 | 1 | American Pageant Guidebook with Answers |
| 10.1009/0618665196 | 80 | 2 | American Pageant Complete Plus Guide Book Complete 13th Edition Plus Student |
| 10.1009/0618523731 | 78 | 3 | Precalculus with Limits |
| 10.1009/0618522751 | 77 | 13 | A History of Western Society |
| 10.1009/0618247327 | 75 | 5 | American Pageant |
| 10.1009/0618103562 | 75 | 1 | American Pageant Guidebook with Answers |
| 10.1009/0395960770 | 74 | 59 | American Pageant Vision |
| 10.1009/0618680195 | 74 | 1 | American Pageant Complete 13th Edition Plus Student Resource Companion Plus |
| 10.1009/0395960835 | 72 | 49 | The Enduring Vision |
| 10.1009/061817236X | 72 | 5 | The American Pageant, Volume 1, Twelfth Edition and American Spirit, Volume 1 |
| 10.1009/0618658912 | 72 | 1 | Como Se Dice with Intext Cd Plus CD-ROM 8th Edition Plus Treacy Campo Abie |
| 10.1009/061830195X | 71 | 24 | A History of World Societies |
| 10.1009/061842766X | 69 | 1 | The Earth and Its Peoples |

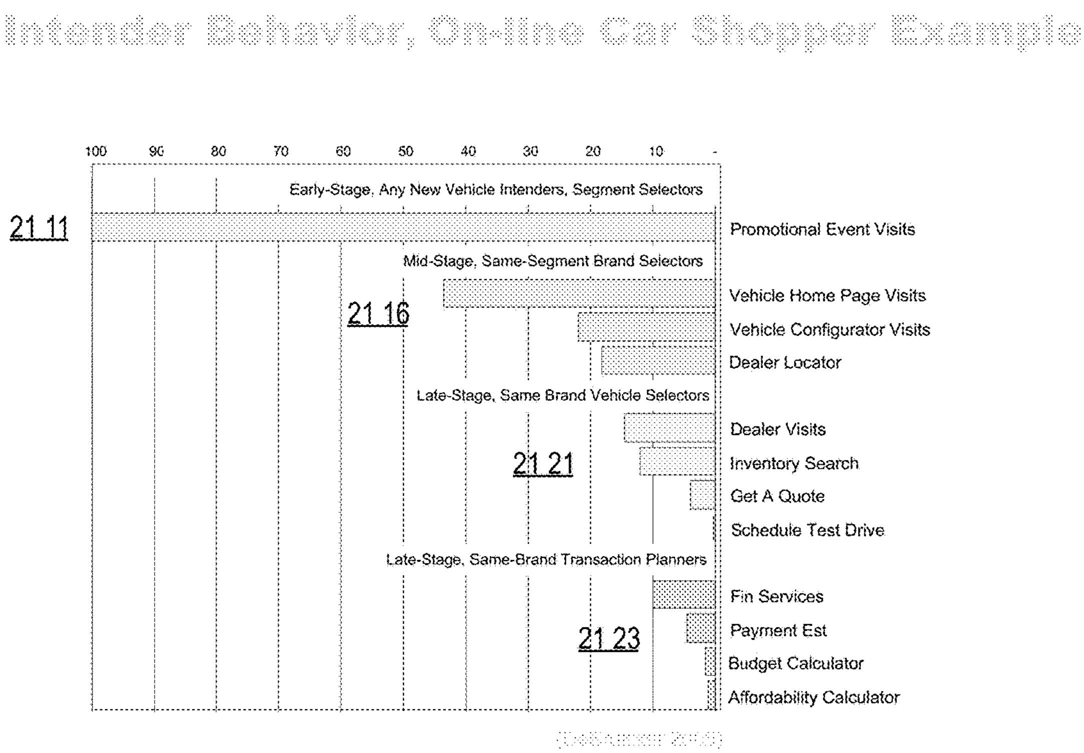
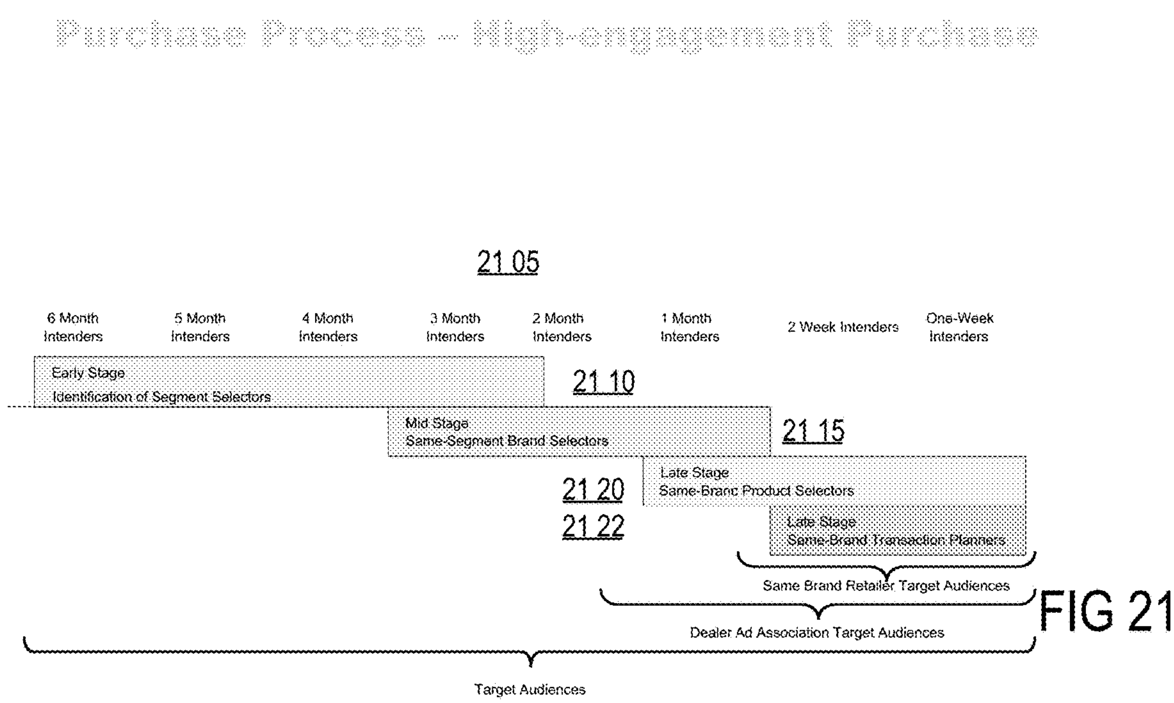
FIG 21

INTEGRATED, INFORMATION-ENGINEERED AND SELF-IMPROVING ADVERTISING, E-COMMERCE AND ONLINE CUSTOMER INTERACTIONS APPARATUSES, PROCESSES AND SYSTEM

PRIORITY CLAIM

Applicant hereby claims benefit to priority under 35 USC § 120 as a continuation-in-part of: U.S. patent application Ser. No. 17/087,434, filed Nov. 2, 2020, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 16/752,370, filed Jan. 24, 2020, entitled "MULTIPLE-RESOLUTION, INFORMATION-ENGINEERED, SELF-IMPROVING ADVERTISING AND INFORMATION ACCESS APPARATUSES, METHODS AND SYSTEMS APPARATUSES, METHODS AND SYSTEMS";

and which in turn claims benefit to priority under 35 USC § 120 as a continuation of: U.S. patent application Ser. No. 16/591,504, filed Oct. 2, 2019, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 16/506,615, filed Jul. 19, 2019, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 16/394,928, filed Apr. 25, 2019, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 16/268,374, filed Feb. 5, 2019, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 16/011,465, filed Jun. 18, 2018, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 15/786,554, filed Oct. 17, 2017, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 15/453,791, filed Mar. 8, 2017, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 14/207,442, filed Mar. 12, 2014, entitled "MULTIPLE-RESOLUTION, INFORMATION-ENGINEERED, SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 13/935,709, filed Jul. 5, 2013, entitled "MULTIPLE-RESOLUTION, INFORMATION-ENGINEERED SELF-IMPROVING ADVERTISING AND INFORMATION ACCESS APPARATUSES, METHODS AND SYSTEMS";

and which in turn claims benefit to priority under 35 USC § 120 as a continuation of: U.S. patent application Ser. No. 13/657,809, filed Oct. 22, 2012, entitled "MULTIPLE-RESOLUTION, INFORMATION-ENGINEERED SELF-IMPROVING ADVERTISING AND INFORMATION ACCESS APPARATUSES, METHODS AND SYSTEMS";

and which in turn claims benefit to priority under 35 USC § 120 as a continuation-in-part of: U.S. patent application Ser. No. 13/415,731, filed Mar. 8, 2012, entitled "APPARATUSES, METHODS AND SYSTEMS FOR INTEGRATED, INFORMATION-ENGINEERED AND SELF-IMPROVING ADVERTISING, E-COMMERCE AND ONLINE CUSTOMER INTERACTIONS";

and which in turn claims benefit to priority under 35 USC § 120 as a continuation of: U.S. patent application Ser. No. 11/813,671, filed Jul. 10, 2007 (371(c) date of Aug. 13, 2009), entitled "Apparatuses, Methods And Systems For Integrated, Information-Engineered And Self-Improving Advertising, E-Commerce And Online Customer Interactions";

and which in turn claims benefit to priority under 35 USC §§ 119, 371 as a national stage entry of: Patent Cooperation Treaty application serial no. PCT/US2006/000965, filed Jan. 11, 2006, entitled "APPARATUSES, METHODS AND SYSTEMS FOR INTEGRATED, INFORMATION-ENGINEERED AND SELF-IMPROVING ADVERTISING, E-COMMERCE AND ONLINE CUSTOMER INTERACTIONS";

and which in turn claims benefit to priority under 35 USC § 119 as a non-provisional conversion of: U.S. provisional patent application, Ser. No. 60/642,809, filed Jan. 11, 2005, entitled "APPARATUSES, METHOD AND SYSTEM TO GENERATE, EDIT, DEPLOY AND MAINTAIN INTERRELATED UNIQUE PERSISTENT UNIVERSAL RESOURCE IDENTIFIERS, MENUS AND INFORMATION";

and which in turn claims benefit to priority under 35 USC § 119 as a non-provisional conversion of: U.S. provisional patent application Ser. No. 60/726,689, filed Oct. 14, 2005, entitled "APPARATUSES, METHODS AND SYSTEMS FOR INTEGRATED, INFORMATION-ENGINEERED AND SELF-IMPROVING ADVERTISING, E-COMMERCE AND ONLINE CUSTOMER INTERACTIONS";

The entire contents of the aforementioned applications are herein expressly incorporated by reference.

OTHER APPLICATIONS

This application also hereby incorporates by reference the provisional application for letters patent, No. 60/268,766, titled "APPARATUS, METHOD AND SYSTEM FOR MULTIPLE RESOLUTION AFFECTING INFORMATION ACCESS," and filed in the United States Patent and Trademark Office on Feb. 14, 2001.

This application also hereby incorporates by reference the application for letters patent, Ser. No. 10/470,206, titled "APPARATUS METHOD AND SYSTEM FOR INFORMATION ACCESS IN A PEER ENVIRONMENT" and filed in the United States Patent and Trademark Office on Jul. 24, 2003.

This application also hereby incorporates by reference the application for letters patent, Ser. No. 10/470,207, titled "APPARATUS, METHOD AND SYSTEM FOR DIRECTORY QUALITY ASSURANCE," and filed in the United States Patent and Trademark Office on Jul. 24, 2003.

This application also hereby incorporates by reference the application for letters patent, Ser. No. 10/470,258, titled "APPARATUS, METHOD AND SYSTEM FOR ACCESSING DIGITAL MANAGEMENT INFORMATION," and filed in the United States Patent and Trademark Office on Jul. 24, 2003.

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information access across a communications network, and more particularly, include Integrated, Information-Engineered and Self-Improving Advertising, E-Commerce and Online Customer Interactions Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Traditional media advertising exists in print magazine ads and television. Advertising technologies have been developed in an effort to capitalize on the Internet. Google's AdSense provides the ability to place ads in a webpage.

BRIEF DESCRIPTION OF THE DRAWINGS

Appendices and/or drawings illustrating various, non-limiting, example, innovative aspects of the Integrated, Information-Engineered and Self-Improving Advertising, E-Commerce and Online Customer Interactions Apparatuses, Processes and Systems (hereinafter "ISICI") disclosure, include:

FIG. 9 provides a schematic view of a Handle and an enhanced DOI grammar;

FIG. 12 provides an overview of some of the exemplary mechanisms for accessing information over a communications network by resolving a DOI to obtain the URL;

FIG. 21 shows a purchase cycle;

Figure 1A:
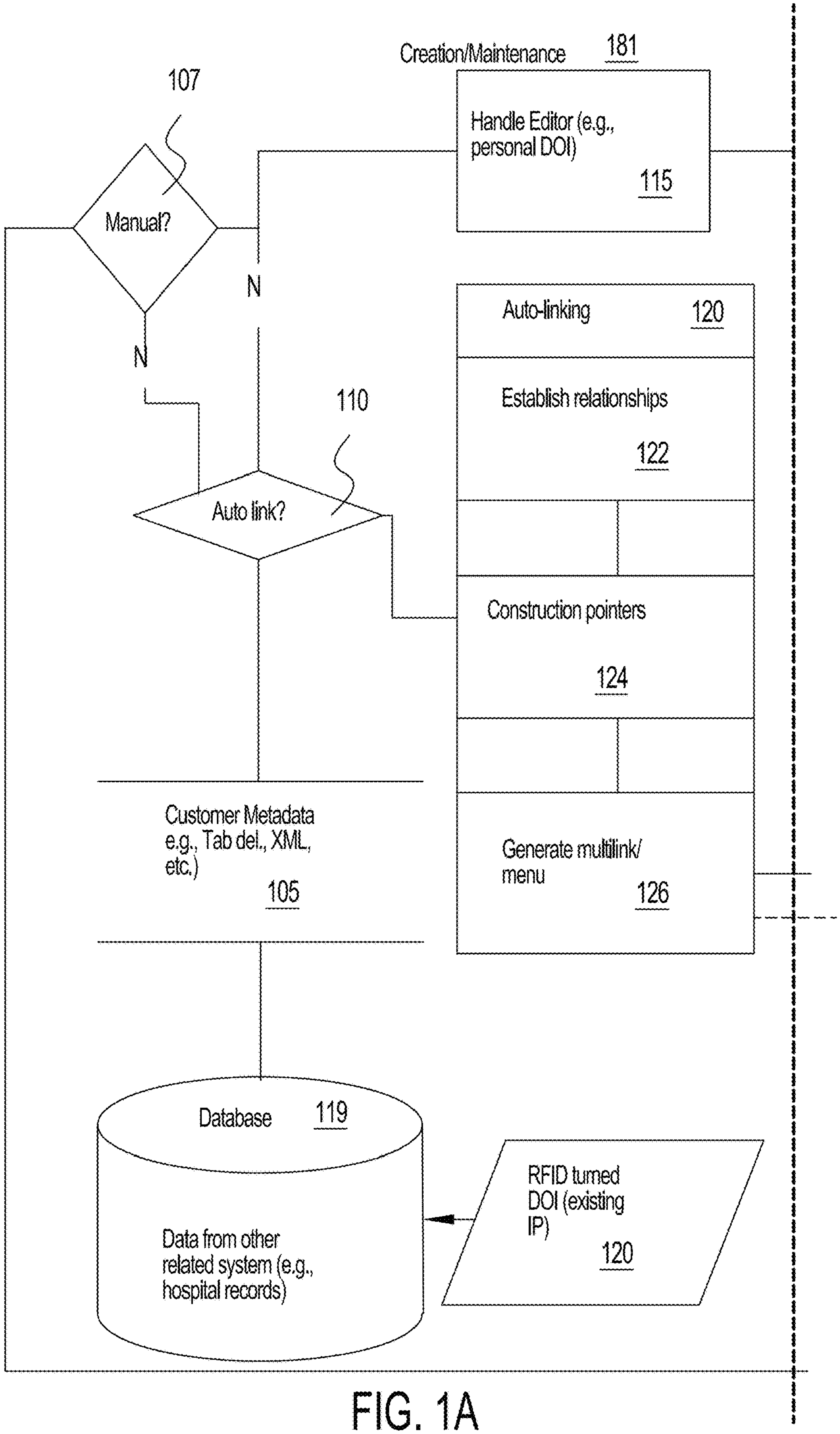
FIG. 1 is of a mixed data and logic flow diagram illustrating embodiments of a Integrated information-engineered and Self-Improving facility for advertising, e-commerce and online Customer Interactions (ISICI)

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Integrated, Information-Engineered and Self-Improving Advertising, E-Commerce and Online Customer Interactions Apparatuses, Processes and Systems (hereinafter "ISICI") transforms menu identifier, menu target identifier, menu content hierarchy items, menu specification, indicia of usage inputs, via ISICI components (e.g., syndicator, information access/multiple resolution/server, etc. components), into menu/user interface, user interface updates, transactions, metrics outputs. The ISICI components, in various embodiments, implement advantageous features as set forth below.

Introduction

The ISICI provides unconventional features (e.g., creating an initial hierarchy of menu items where each menu item has a reference target identifier (including composite media), distributing the initial hierarchy for consideration by menu viewers, effecting tracking of the menu viewers' usage of the initial hierarchy, modifying the menu item in the initial hierarchy based on the tracking of usage) that were never before available in information access across a communications network (e.g., including tracking a number of impressions made by menu items, tracking a number of times a menu item is selected, etc.).

Internet

As Internet usage increases, the amount of information available on the Internet also increases. The information that exists on the Internet is of many different types, including documents in many formats such as: computer software, databases, discussion lists, electronic journals, library catalogues, online information services, mailing lists, news groups, streaming media, and the like. Fortunately, much of the information on the Internet can be accessed through the World-Wide Web using a Web browser to interact with the network in a user-friendly way.

Network

Networks are commonly thought to consist of the interconnection and interoperation of clients, servers, and intermediary nodes in a graph topology. It should be noted that the term "server" as used herein refers generally to a computer, other device, software, and/or combination thereof that processes and responds to the requests of clients, often from across a communications network. The term "client," in turn, generally refers to a computer, other device, software, user, and/or combination thereof that generates requests for service. Generally, the term "client" and "user" are interchangeable, and are used as such throughout. As such, servers serve their information to requesting clients. A computer, other device, software, or combination thereof that facilitates, processes information and requests, and/or furthers the passage of information from a source user to a destination user is commonly referred to as a "node." Networks are generally thought to facilitate the transfer of information from source points to destinations.

Transmission Control Protocol-Internet Protocol (TCP/IP)

The proliferation and expansion of computer systems, databases, and networks of computers has been facilitated by an interconnection of such systems and networks in an extraterritorial communications network commonly referred to as the Internet. The Internet has developed and largely employs the Transmission Control Protocol-Internet Protocol (TCP/IP). TCP/IP was developed by a Department of Defense (DoD) research project to interconnect networks made by various and varying network vendors as a foundation for a network of networks, i.e., the Internet. The development of TCP/IP was in part driven by a requirement by the DoD to have a network that will continue to operate even if damaged during battle, thus allowing for information to be routed around damaged portions of the communications network to destination addresses. Of course, if the source or destination address location itself is rendered inoperable, such delivery will not be possible.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet. Upon arrival at the destination, the packets are reassembled to form the original message, and any missing packets are requested again.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP).

World Wide Web

The proliferation and expansion of the Internet, and particularly the World Wide Web (the Web), have resulted in a vast and diverse collection of information. Various user interfaces that facilitate the interaction of users with information technology systems (i.e., people using computers) are currently in use. An information navigation interface called WorldWideWeb.app (the Web) was developed in late 1990. Subsequently, information navigation interfaces such as Web browsers have become widely available on almost every computer operating system platform.

Generally, the Web is the manifestation and result of a synergetic interoperation between user interfaces (e.g., Web browsers), servers, distributed information, protocols, and specifications. Web browsers were designed to facilitate navigation and access to information, while information servers were designed to facilitate provision of information. Typically, Web browsers and information servers are disposed in communication with one another through a communications network. Information Servers function to serve information to users that typically access the information by way of Web browsers. As such, information servers typically provide information to users employing Web browsers for navigating and accessing information on the Web. Microsoft's Internet Explorer and Netscape Navigator are examples of Web browsers. In addition, navigation user interface devices such as WebTV have also been implemented to facilitate Internet navigation. Many other navigation interfaces and devices also exist for navigating the Internet such as File Transmission Protocol (FTP), email interfaces (e.g., mailto), search queries, database queries, scripts, Web Services (such as Microsoft's .NET or Sun Microsystems' SunONE), and the like. Some of these interfaces are intended for use by human beings, and some are intended for use directly by machines, devices, software programs, and the like. Microsoft's Information Server and Apache are examples of information servers.

Universal Resource Locator (URL)

The expansion of the Web has resulted in an enormous quantity of information, which is accessible through the use of Universal Resource Locators (URLs) and other address-based or location-based methods. An URL is an address that is typically embodied as a hyperlink in a Web page or is typed into a Web browser. URLs for a given resource (most commonly a file located on a remote computer) refer only to a location for that resource. Typically, the reference to the location is achieved through the use of an unresolved IP address in conjunction with a directory path and file name; e.g., "http://www.aWebSite.com/aFolder/aFile.html". In this example, the URL directs the browser to connect to the computer named "www" in the domain "aWebSite.com," and to request the file named "aFile.html" stored in directory "aFolder" at that computer.

Universal Resource Identifier (URI)

The Corporation for National Research Initiatives has created and implemented a new means of naming and locating information, called the Handle System. The Handle System is designed to improve upon or replace the current use of URLs.

The Handle System introduces a level of indirection to locating and distributing information over the Internet. The Handle System is a general-purpose system for naming resources. Instead of being assigned a URL based on a particular resource's current network location, a resource may be assigned a Universal Name Identifier (UNI). A UNI is a form of Universal Resource Identifier (URI). URIs include both UNIs and URLs. A UNI, unlike a URL, serves and shall be regarded henceforth as a name for the resource that is persistent regardless of changes in the resource's location or other attributes. In turn, a Universal Resource Name (URN) is a type of UNI (i.e., a UNI subsumes the concept of a URN). Furthermore, a Handle is a type of URN. And a Digital Object Identifier (DOI) is a type of Handle. Thus, various forms of UNIs include Handles, URNs, DOIs, and/or the like. The various terms and/or forms of URIs will be used interchangeably throughout this document, and may be assumed to be interchangeable unless stated otherwise. A Handle is a unique name, which is registered with the Handle System along with the current network location of the named resource. This location information commonly takes the form of a URL. One common type of Handle is known as a Digital Object Identifier (DOI). Handles may be then distributed to users in lieu of a URL, and superficially appear to function similarly to a hyperlink. When a user encounters a Handle, the user may select or enter the Handle much like a URL hyperlink, so long as the user's Web browser is capable of making Handle requests. Such an encounter triggers an automated process to look up a resource's current location. The current location of the resource is associated with the resource's Handle in a directory made available by the Handle System, which in turn directs the user to the resource's current location. Unlike with a URL, if the resource moves, the Handle System directory entry can be updated, thereby assuring a persistent association between a Handle and the resource it identifies. An analogy can be made to the physical world: knowing only a URL for a given resource is akin to knowing only a person's street address, and not her name. If she were to move across town, it would be very difficult to locate her without knowing her name. The Handle System allows resources to be permanently named by way of a Handle, and it allows the current network location of resources to be looked up based on that name in a Handle System directory.

Online Advertising

Advertising technologies have been developed in an effort to capitalize on the Internet's ability to track end user behavior in ways not possible with traditional media: e.g., with television or print magazine ads, where there is no mechanism by which to measure the end user's actual interaction, or even to verify that the end user has seen the ad at all. Companies have created "contextual ads" (such as Google's AdSense) which "read" the content of a Web page and then place certain ads on that page in response to the page's context (e.g., Google "Sponsored Links," which are selected and placed in a Web page in response to the particular subject-matter of the page).

ISICI

Digital Object Identifiers (DOIs) overcome many of the shortcomings of IP addresses and other location-based addressing schemes. DOIs enable access to information over a communications network by providing a persistent identifier for information that may be regularly relocated. DOIs overcome the limitations of network addressing schemes limited to addressing locations by providing a mechanism to associate identifiers with information through an added level of indirection instead of associating identifiers with locations.

Although DOIs provide a mechanism that allows for the association of an identifier with information instead of a location, DOIs in and of themselves do not provide for the access of multiple and/or varying instances of a piece of information in various locations, formats, or the access and/or tracking of various services associated with a given piece of information, based on various contexts of use.

In one embodiment of the present invention, a method is taught for using at least one computer to generate a reference menu. The method comprises receiving a request for a unique persistent universal name identifier (UPUNI) from a requesting client accessing content and generating an UPUNI menu from the UPUNI menu specification, wherein the UPUNI menu specification is used to specify values from UPUNI record information with which to populate the UPUNI menu.

Furthermore, the disclosure details apparatuses, methods, and systems to Integrated information-engineered and Self-Improving facility for advertising, e-commerce and online Customer Interactions (ISICI). Aspects of the ISICI have already been detailed in the application for letters patent, No. 60/642,809 titled "APPARATUSES, METHOD AND SYSTEM TO GENERATE, EDIT, DEPLOY AND MAINTAIN INTERRELATED UNIQUE PERSISTENT UNIVERSAL RESOURCE IDENTIFIERS, MENUS AND INFORMATION," and filed in the United States Patent and Trademark Office on Jan. 11, 2005; the ISICI employs various aspects of the Autolinker, Syndicator and Customizer of Unique Persistent Universal Resource Identifiers (ASCUPURI) as described therein and throughout this disclosure. The ISICI includes a feedback loop enabling improvement of itself as driven by the actual interaction of end-users with the ISICI. Based on the tracking of actual end-user interaction with these menus, a feedback loop can be created such that the menus can be revised and improved based on the empirical tracking data that is fed back into a creation/maintenance cycle. The disclosure of the ISICI provides numerous embodiments on how such tracked information may be fed back into the creation/maintenance cycle. For example, information may be fed back manually (i.e., based on human review of the tracking results and human judgment as to the most appropriate revisions to the menu and which revisions in turn may be implemented manually via the MultiLink editor), through an automated "assembly line" to revise/create a menu (i.e., so that on a going-forward basis, this system will automatically create and maintain different menus), fully automatically (for example, where the order of menu choices may be rearranged based on the relative popularity of the different menu choices, as captured by measuring actual user behavior in interacting with the menu), and/or the like.

These measurements of behavior may include tracking the click-through rates associated with various menu choices, tracking the subsequent behavior (e.g. post click-through) in terms purchasing or other transactions, tracking the measurements of the time spent by the user hovering over various menu choices, tracking the measurements of the frequency with which various menu choices are rolled over, and/or the like.

This feedback to the menu creation/maintenance cycle may also come from other sources besides the end user's behavior in interacting with the menus. Such sources may include: independent metrics of the user's purchasing behavior (either subsequent to the user's click-through of the menus or entirely unrelated); independently-recorded user preference information (either individually or in aggregate); independently-recorded user information that is associated with a category of user (e.g., anonymized metrics analyzing/profiling a type of user by income, interests, demographics, preferences, and/or the like-such an embodiment would not associate profiled information with any individual); metrics recorded by the site hosting the menu (e.g., analyzing based on time of day, geographical location of site visitors, etc.), and/or the like.

The menu improvements driven by this feedback loop may include changes in the order of links on the menu, selective inclusion or suppression of different links (e.g., either centrally in the master control record controlling the menu universally, or solely in a locally-customized version of the menu on a particular web site), selective retrieval of data from back-end systems in order to populate the menus differently, the inclusion or suppression of graphics or video or other multimedia effects, and/or the like.

Figure 1B:
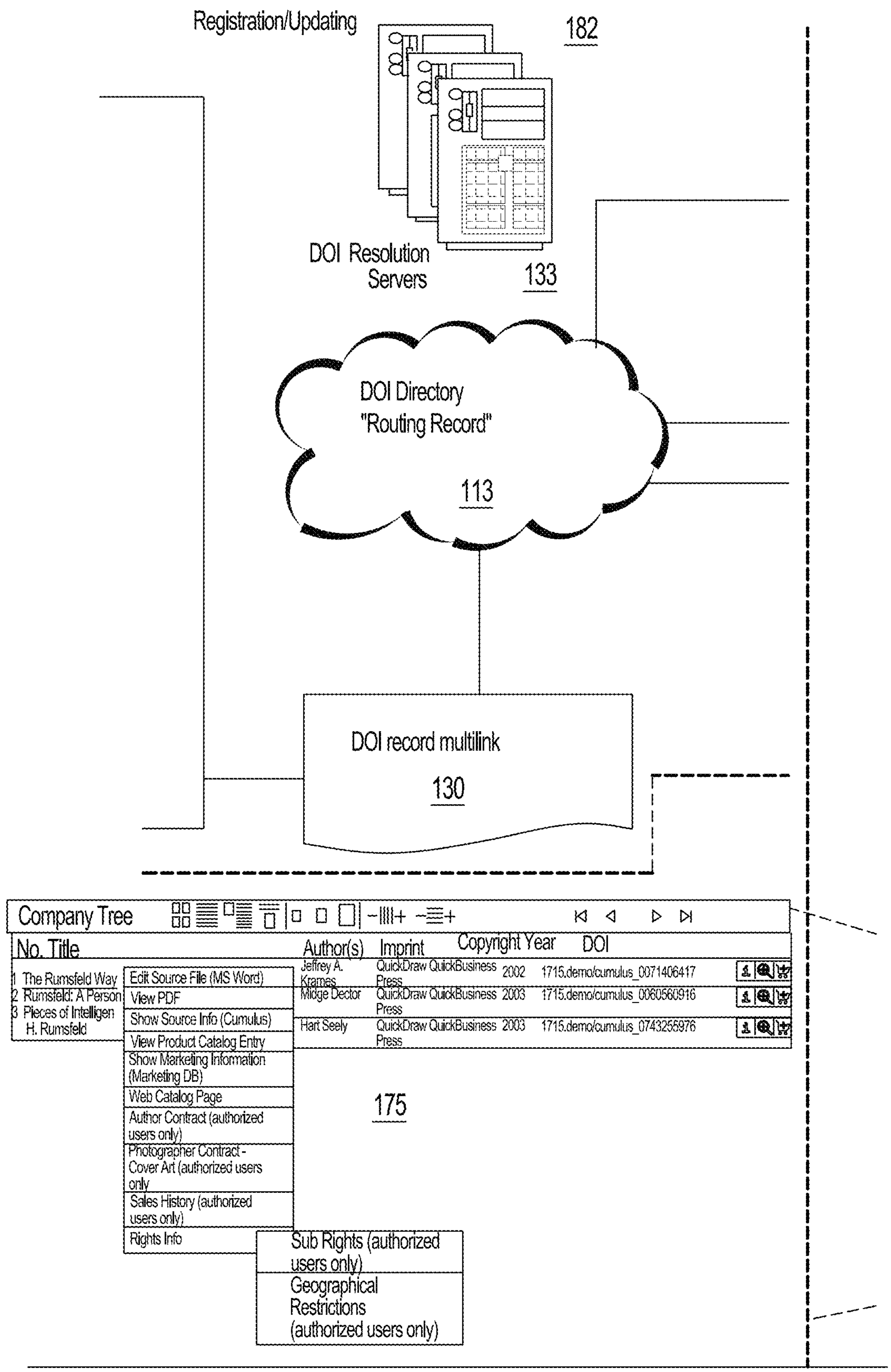
Figure 1C:
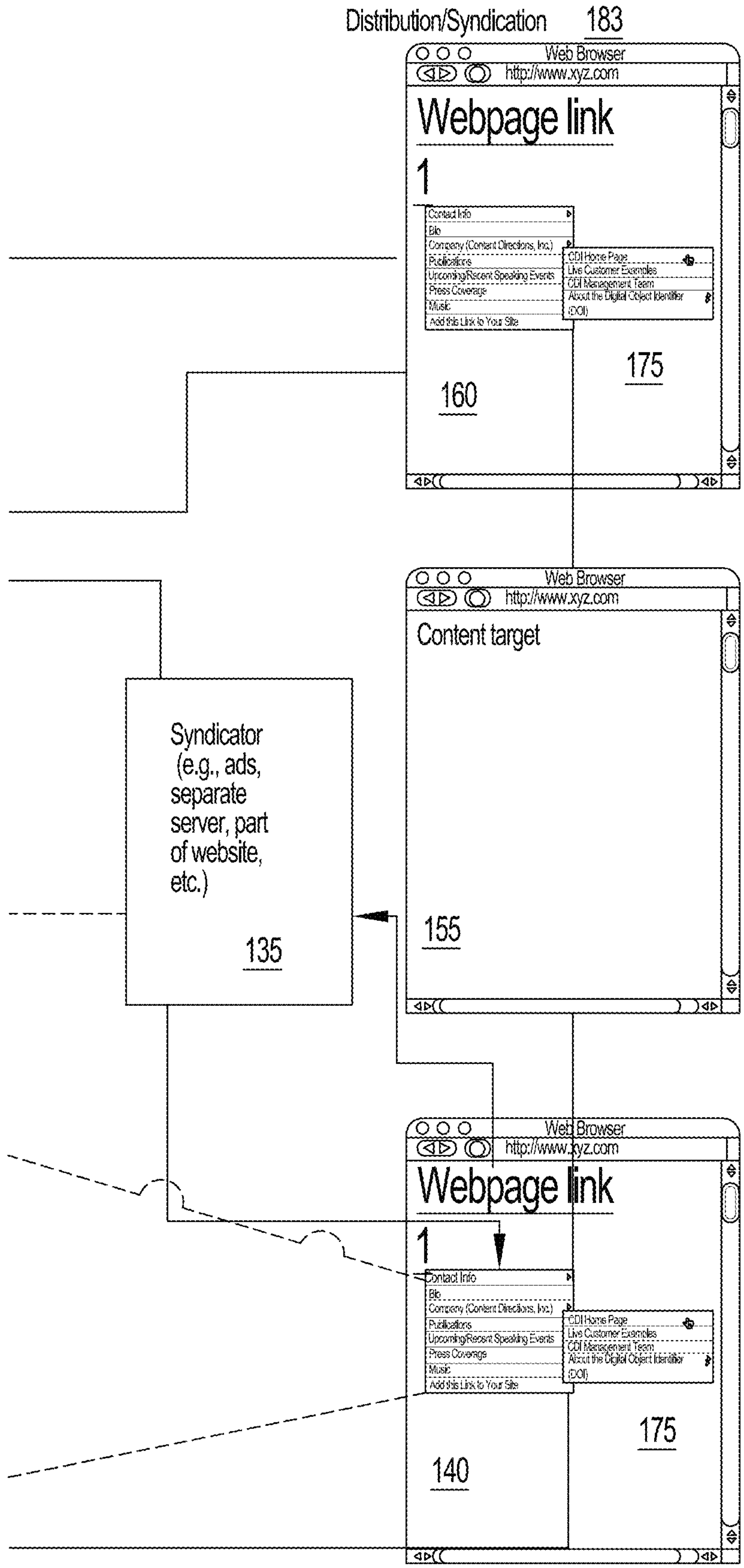

The menu improvements need not be limited to improvements to encourage purchasing behavior; nor does the system need to be limited to advertising-oriented applications at all. Any system that serves up information or otherwise services end users or even computer programs can utilize the present invention. An information system by which a city, state or federal government provides information to its citizens can utilize the present invention to continuously improve the menus based on measuring what kinds of information most citizens actually want in a given context In one embodiment, a military system that serves up intelligence information or military logistics information could utilize the present invention to offer the most useful information and links based on external factors such as the elevation of a certain suspected terrorist onto a high-priority watch list, the elevation of a building or other physical asset onto a similar high-risk watch list due to intelligence gathered about a possible terrorist strike, sensor data monitoring enemy troop movements, and/or the like. In another embodiment, in order to improve the menu choices on a dynamic basis, a bank or insurance company that wishes to help its customers or even its internal staff to navigate through complex and information-intensive processes can use source data ranging from user behavior to internal prioritizations of services it wishes to market ISICI FIG. 1 is of a mixed data and logic flow diagram illustrating embodiments of apparatuses, methods and systems to Integrated information-engineered and Self-Improving facility for advertising, e-commerce and online Customer Interactions (ISICI). Generally, the ISICI is comprised of three components: 1) creation and maintenance of MultiLink menus 181; 2) registration and updating of the underlying multilink records 182; and 3) distribution/syndication of the MultiLink menus 183. These three components can be seen in FIG. 1, each occupying approximately a third of the figure as transversed by the thick dashed lines. The ISICI also features the tracking of syndicated MultiLink menus, which are fed back 140, 175 from the distribution/syndication component 183 to the creation/maintenance component 181 so that MultiLink menus may be optimized over time. The Autolinker creates MultiLink DOIs in the first instance 120. Then these DOIs get deposited (i.e., registered) 130 into the global directory (e.g., the Handle System) 113. Then the MultiLink DOIs are ready to be invoked by links or other "requestors" out on the communications network (e.g., the Internet). The Syndicator 135 is a mechanism for getting those links or requestors distributed out onto Web pages and other places. The Syndicator can provide filtering, modifying and/or otherwise customizing MultiLink Menus and data that are retrieved from those DOI records 113.

One component of the ISICI, the Autolinker, enables autolinking. The Autolinker automatically creates inter-linked MultiLink menus of a user's (e.g., client's) information, services, transactions, etc. in connection with any target object or content. The MultiLink menu comprises two components: a MultiLink DOI and, optionally, a menu specification describing the layout and items from the MultiLink DOI to be displayed in the menu. If no menu specification is provided, the full DOI MultiLink may be used as the specification for generating the menu. These MultiLinks may point to a customer's site, or anywhere else. For example, the MultiLinks may point to various retailers for purchasing, to related information at other companies' sites, in other companies' systems, and/or the like.

In one embodiment, customer metadata is employed by the Autolinker 105. The customer metadata may further target various objects, i.e., the metadata itself may contain DOIs. The metadata may be obtained from a number for sources. Commonly, the metadata may be exported from a customer's database 119. The database may be queried for products, or other target objects for which the customer would like to create MultiLinked DOIs. For example, a publishing customer may query their own database selecting top selling books and accompanying information (e.g., title, author, year, best seller ranking, etc.) 175.

This may be achieved with an SQL select command targeting a database table of books, and selecting for such fields. In another example embodiment, a hospital may query its own patient records and generate MultiLinks for each patient. By creating MultiLinked DOIs for hospital records, the ease of data interchange as between various medical facilities and agents is greatly enhanced. The costs for medical administration can be significantly lowered by having persistent and universally accessible references to patient and administrative records. Similar economies would apply to ancillary companies such insurance companies. In fact, by providing a singular reference by way of a MultiLink, healthcare providers, insurers and patients can all access electronic medical records and related account and insurance information all with a single reference. This will greatly cut down on clerical errors, administrative overhead costs in maintaining numerous duplicate and often inaccurate record copies. In another embodiment, a retailer may track Radio Frequency Identification (RFIDs) device activity. In such an embodiment, each RFID is provided with a unique identifier and registered with the Handle system, thus, each RFID has its own DOI. In one embodiment, a retailer may register a block of DOIs and embed each of the RFIDs with any of the registered DOIs at the time of RFID manufacture. Alternatively, the RFID numbers could be registered as DOIs at the time of RFID manufacture but not actually embedded into the RFIDs themselves; then when an RFID number is read by a reader device, the reader device could access the Handle System by formulating its Handle request using the RFID number which would have been registered previously as a DOI. As such, any system scanning for an RFID would obtain a DOI and access the Handle system. In this manner, the MultiLinks associated with the Handle System's DOI record could link the user or the reader device to any information relating to that RFID in a permanent, persistent and comprehensive manner. In such a system, each time an item with an RFID is accessed, i.e., the point of access, the system at the point of access may modify the DOI MultiLink record in a transaction's sub-component of the RFID's DOI record that is modifiable by that party (e.g., the party has appropriate access control rights to make such edits); as such, a DOI record can provide full transactional tracking related to the item with the RFID. Alternatively, the retailer may track DOI enabled RFIDs via its own system database 119; as such, the retailer may select RFID related fields for exporting; those fields may then be exported as metadata 105 for use by the Autolinker 120. In one embodiment, GPS information regarding RFID's transaction and/or whereabouts may be saved with each transaction. This transaction and location based information may constitute a transaction and location history for the DOI enabled RFID. The utility here is that a single identifier would be able to provide a total transaction and movement history regarding a particular item.

A number of formats may be used to encode the customer metadata such as Microsoft Excel, tab delineated fields and values, XML, and/or the like. Upon obtaining the results for a database select, various databases allow for the export of selected database records into the various export formats as a metadata submission to the Autolinker 110. A user may opt 110 to employ autolinking 120 or to generate MultiLinks manually with the Handle Editor 115. The Handle Editor will be described in greater detail in FIGS. 5-6. Autolinking 120 will be described in greater detail in FIG. 2, but generally comprises establishing relationships between the MultiLink DOI and menu 122, constructing pointers for the MultiLink DOI record 124 and ultimately generating the MultiLink menu 126. Once the metadata is put in the form of a DOI MultiLink record 130, it may be registered in a DOI directory 113 and thereafter identified and resolved and accessed via DOI resolution servers 133. It should be noted that the DOI resolution servers may be global servers accessible to the public at large, or they may be local servers on an intranet, and thus, only accessible to users and systems on the intranet In the intranet embodiment, local intranet administrators may modify and/or customize the local "master" DOI record, if they are the owner of that master record. If the local intranet administrator is not the owner of that "master" DOI record, then the local administrator still has the ability to modify, or cause local programs or systems to modify, the data or menus that are returned from the master DOI record, so that in the local environment it points to local resources or locally-specified resources instead of or in addition to the original creator's resources. Alternatively, local intranet administrators may keep their locally-originating DOI requests from resolving to the global Handle Servers, and instead direct resolution to a local resolver. Optionally, a menu specification that may have been generated 126 by the Autolinker 126 would be supplied to the Syndicator 135 where it may be saved in the ISICI database. In one embodiment, such a database may be used to hold specific information necessary to drive customization of syndicated DOI MultiLinks. In an alternative embodiment, the Autolinker 120 requests that the Syndicator 135 generate a MultiLink menu and the Autolinker then saves the menu as part of the DOI record MultiLink 130.

In one embodiment, the Syndicator 135 enables MultiLink menus and navigation to references targeted by the menus. An example MultiLink menu is illustrated 175, in this case the MultiLink menu is for a MultiLink DOI of a book. In this example, the MultiLink menu has already been generated. The MultiLink's DOI record has already been stored in the DOI directory 113. A menu specification for the MultiLink menu has been stored in the ISICI's database. In one embodiment, a reference to the MultiLink menu is embedded into a Web page 140. When a user traverses to the Web page 140, the reference code, e.g., HTML code calling for a Javascript representation of the MultiLink menu, is activated to retrieve the appropriate MultiLink menu from the Syndicator 135. An example embedded reference code may have the following form:

```
(Link to Syndicator providing script)
<script src="http://doi.contentdirections.com/syndicator/10.1570/dsidman"></script>
(identifier for desired MultiLink)
<noscript><a href="http://dx.doi.org/10.1570/dsidman">DOI</a></noscript>
```

In this example, the Web page expects to obtain Javascript and the source is supplied with a reference to the Syndicator along with an associated DOI MultiLink. The request for the script is provided to the Syndicator 135, e.g., by way of a I-ITP post request. The Syndicator interprets the request for the MultiLink menu by parsing for the DOI MultiLink and the source of the request. The Syndicator may then obtain the DOI MultiLink record 130 from the DOI directory 113. Next, the Syndicator may query its own internal database for a MultiLink menu specification for the MultiLink. The MultiLink menu specification may be keyed on the DOI itself as it is a unique value. If no menu specification exists, then the Syndicator may generate its own menu specification. Syndicator operations will be described in greater detail in FIG. 4.

In one embodiment, the ISICI may then use the MultiLink DOI record and/or the MultiLink menu specification to generate the MultiLink menu for the MultiLink DOI, e.g., generating Javascript code. It should be noted that numerous user interface platforms other than Javascript and Web browsers may be employed to generate the MultiLink menu. Upon generating the MultiLink menu, the Syndicator 135 provides the MultiLink menu back to the requesting user's Web browser 140 where the menu is displayed 175. Once the menu is displayed by the user's Web browser, the user may traverse the menu with a cursor and engage selections. Any selections will result in a request for resolution from a respective DOI MultiLink reference to the references content target 155. Throughout an end-user's interaction with the MultiLink menu, the user's interaction with the menu may be tracked. The tracked information may be saved in a number of locations including the Web server hosting the web page 140, the Syndicator, the DOI resolution server, central tracking servers, and/or the like. This tracked information may then be used to affect and modify the creation/maintenance of MultiLink menus 107. The information is fed back, and there is an option to manually edit 107 the MultiLink menu using the Handle Editor 115, or, employ the auto-linking feature 110 as have already been discussed. Details regarding tracking end-user information and how such information may be used to affect the creation and maintenance of MultiLink menus will be discussed in greater detail in FIGS. 16-20. This feedback to the menu creation/maintenance cycle may also come from other sources besides the end user's behavior in interacting with the menus. Such sources may include: independent metrics of the user's purchasing behavior (either subsequent to the user's click-through of the menus or entirely unrelated); independently-recorded user preference information (either individually or in aggregate); independently-recorded user information that is associated with a category of user (e.g., anonymized metrics analyzing a type of user by income, interests, demographics, preferences, and/or the like-such an embodiment would not associate profiled information with any individual); metrics recorded by the site hosting the menu (e.g., analyzing based on time of day, geographical location of site visitors, etc.), and/or the like.

In one embodiment, Javascript is used to generate a menu for each item in the menu specification. This may be achieved by creating rectangular primitives and labeling each with text from the specification, the rectangular primitives being displayed in the form of a drop-down menu 175. The rectangular primitives having coordinate bounding boxes which may be highlighted when a cursor enters within any particular rectangular label's perimeter. If a cursor's selection mechanism, e.g., a mouse button, is engaged within the boundaries of a particular rectangular label, the respective DOI MultiLink is understood to have been selected by the user, and the users Web browser is instructed, e.g., with Javascript, to access the target content 156. Numerous other menu format embodiments may be used. MultiLink information may be displayed in any conceivable menu format, or not via a menu format at all. Instead, the menu may be displayed as individual links on a page. In such an embodiment, by employing "NoScript" tags within a Web page allows non-Javascript enabled browsers to display the links as individual links on the Web page instead of as a drop-down menu. In another embodiment, menu items may be represented as separate windows reflecting the destinations of all the MultiLink menu choices. In yet another embodiment, menu items may be channeled as input to a non-visible user interface such as a program intended to produce an audio rendering of the menu choices (e.g. to be used by a blind person), or to produce a rendering intended for use by a person with any other form of handicap. In yet another embodiment, the MultiLink menu information may not be displayed at all, or rendered in any way intended for a human being, but may be read as input by a local program, which in turn may then execute certain functions as a result of the provided information, e.g., to execute a transaction, verify identity, verify access rights, accept payment, or store or process the information for any other purpose.

In another embodiment, the Syndicator is integrated into a content provider's server. This embodiment is similar to the previous example where the Syndicator was a separate server 135 from the content provider of the Web page 140. However, in this integrated embodiment, the Syndicator is running on the content provider's server, and to the user the transaction appears to be a simple request for a DOI MultiLink record from the DOI directory 113. However, in such an example, a Syndicator component is running at the content provider's server. This embodiment has several advantages. First, it can be faster as there is no need to access remote data. Second, it allows for local customization directly controlled by the content provider of the Web page 140, instead of having to be customized on its behalf by a third party (e.g., by the original content provider) because the Syndicator software is only running remotely. Third, in the intranet embodiment, it allows for intranet controls so that the public may be allowed or prohibited from accessing DOI MultiLinks and/or in order to point to local resources or locally-specified resources instead of or in addition to the original creator's resources.

It should be noted that there may be numerous Syndicators and each may have its own menu specification for a given DOI MultiLink. For example, a search engine may have a menu specification for a book that has an option of targeting "other places to buy," which may list Retailer A, Retailer A Subsidiary, and Retailer B. In that vein, Retailer A may have its own Syndicator at their Web server, and its menu specification will only have Retailer A and Retailer A Subsidiary under the "other places to buy" menu option. As such, it is possible to have multiple Syndicators with each having multiple menu specifications all of which can provide a myriad of different and tailored views on the same DOI MultiLink record. As such, a Syndicator may provide separate "customizations" or "renditions" of the same DOI MultiLink. In one embodiment, a Syndicator is provided as MultiLink server software, which both renders MultiLink menus via this drop-down menu presentation and permits customization of the menu beyond the default that is present in the master DOI record. It should be noted, if the MultiLink server software is right on the same server as is serving up the Web page that the DOI is on, then that Syndicator is local. If, instead, that MultiLink server software is being invoked from a separate server, then the "Syndicator" the server is remotely serving may provide the MultiLink menu and any customization out to the Web page server from where the DOI originated.

As such, another embodiment has a single Syndicator servicing multiple entities with varying viewing or processing needs. One example of such an embodiment, which will be discussed in greater detail in FIG. 14, a ISICI may be used by an advertising provider.

In one embodiment, when the Syndicator receives a request, the Syndicator also determines from where the request originated. Then when the Syndicator looks up a menu specification, it further refines that query by retrieving a specific menu specification for the entity making the request. This allows for greater tailoring of MultiLink DOIs for a particular audience. For example, an advertising provider may get paid to advertise, promote and sell the works of a particular book author. When a user engages a MultiLink in the form of a banner ad, e.g., for an author's works, a MultiLink menu may be displayed showing the author's name, and "Books you can buy," which would provide a sub-menu listing the author's books. In this tailored embodiment, if the user was viewing the ad at a kids Web site like Nickelodeon.com, the "Books you can buy" sub-menu would be pruned to only list children's books by the author. However, at a Web site for thriller movie enthusiasts, the "Books you can buy" sub-menu would only have that author's thriller titles. Determination of the requesting entity may be achieved in several ways. In one embodiment, the address from where the request originated is used as a basis for determining which menu specification is to be used. In such an embodiment, the query for a menu specification is made with the DOI and the Web address from the requesting site. In another embodiment, the embedded code may specify the identity of the requesting content provider. The code itself may be a DOI identifying the requesting content provider and also may be used as part of a query for the menu specification.

It should be noted that although the above embodiments have the Syndicator's database storing the MultiLink menu specification and code to generate the menu, the database storing that information, however, may be located elsewhere. In one alternative embodiment, the DOI MultiLink record has an entry for the MultiLink menu specification. In yet another embodiment, the DOI MultiLink record has an entry for the Javascript code to generate the MultiLink menu.

Autolinker

Figure 2:
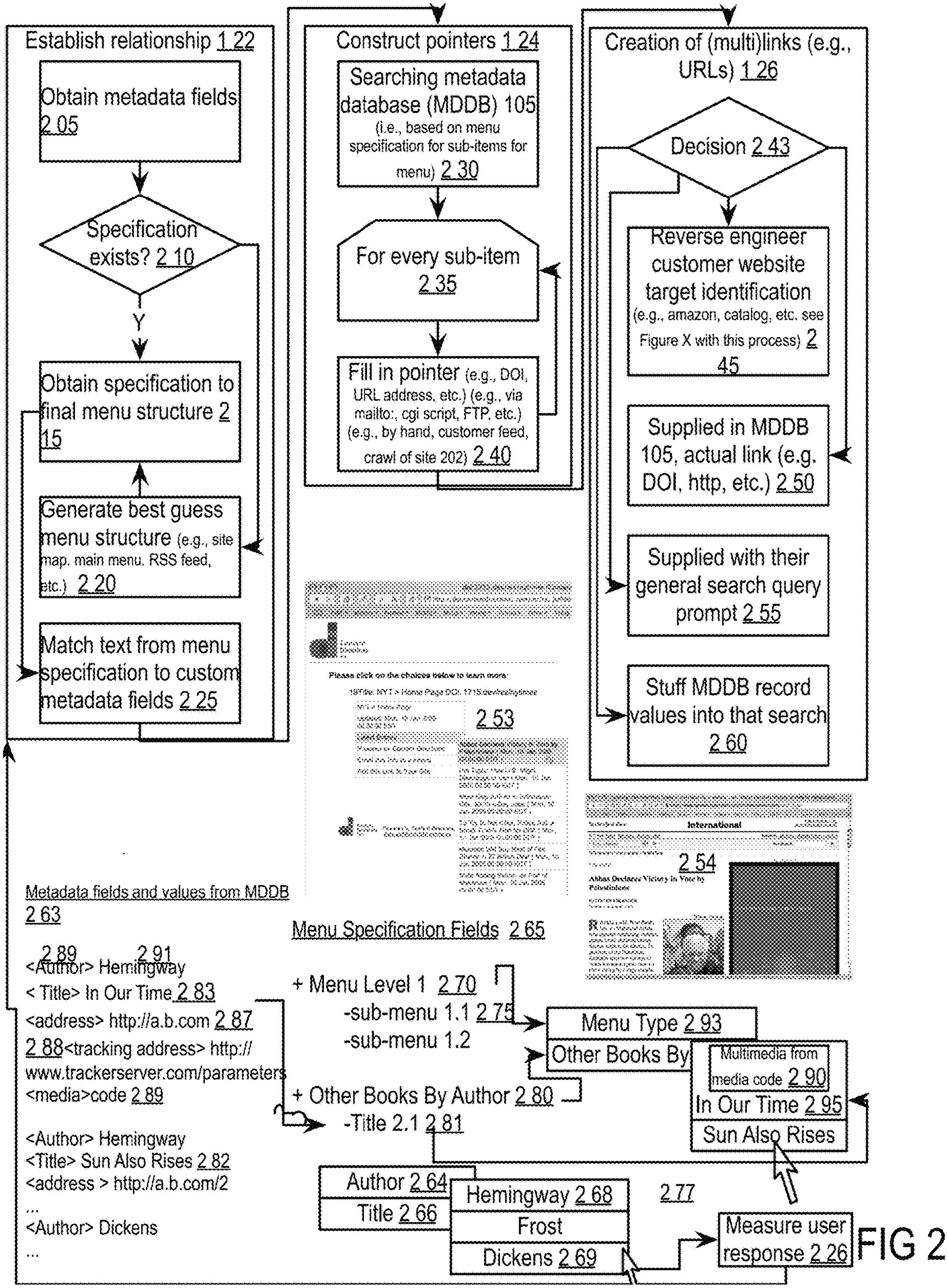
FIG. 2 is of a mixed data and logic flow diagram illustrating embodiments of an Autolinker.

FIG. 2 is of a mixed data and logic flow diagram illustrating embodiments of an Autolinker. As has already been discussed in FIG. 1, autolinking 120 generally is comprised of establishing relationships between the MultiLink DOI and menu 122, constructing pointers for the MultiLink DOI record 124 and ultimately generating the MultiLink menu 126.

Figure 5B:
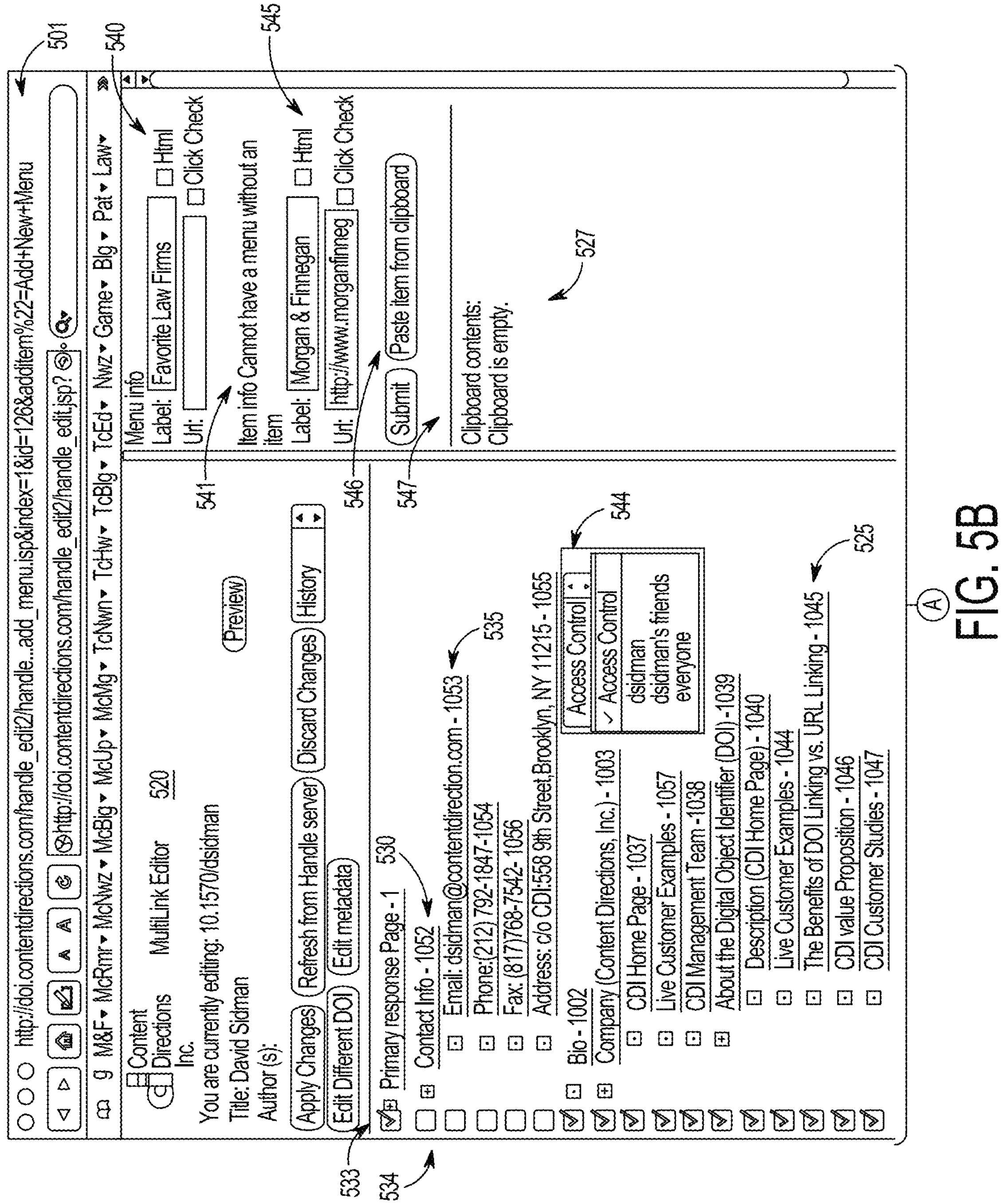
FIGS. 5-6 are of diagrams illustrating embodiments of a MultiLink menu editor and personal DOI.
Figure 5C:
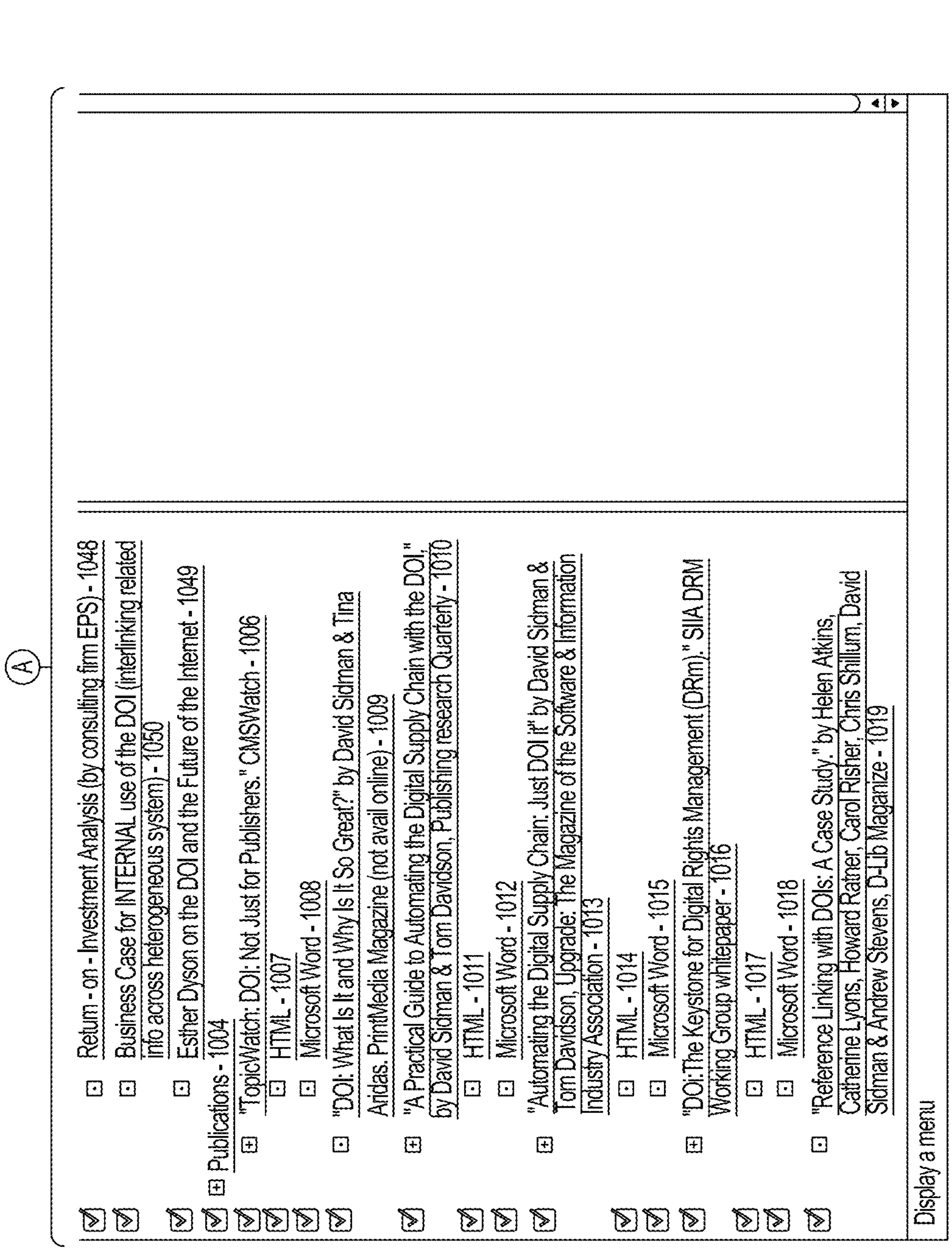
Figure 6A:
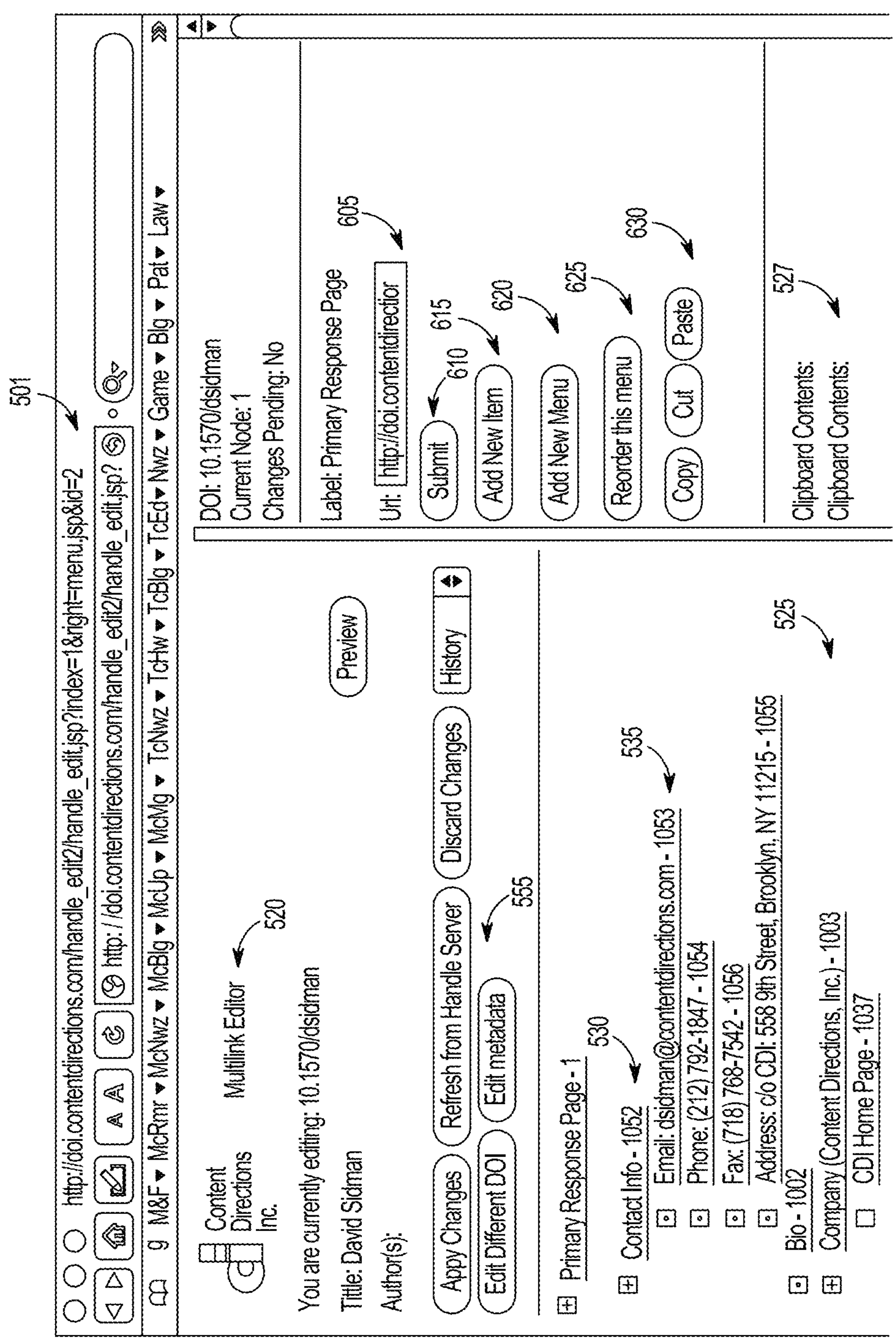
Figure 6B:
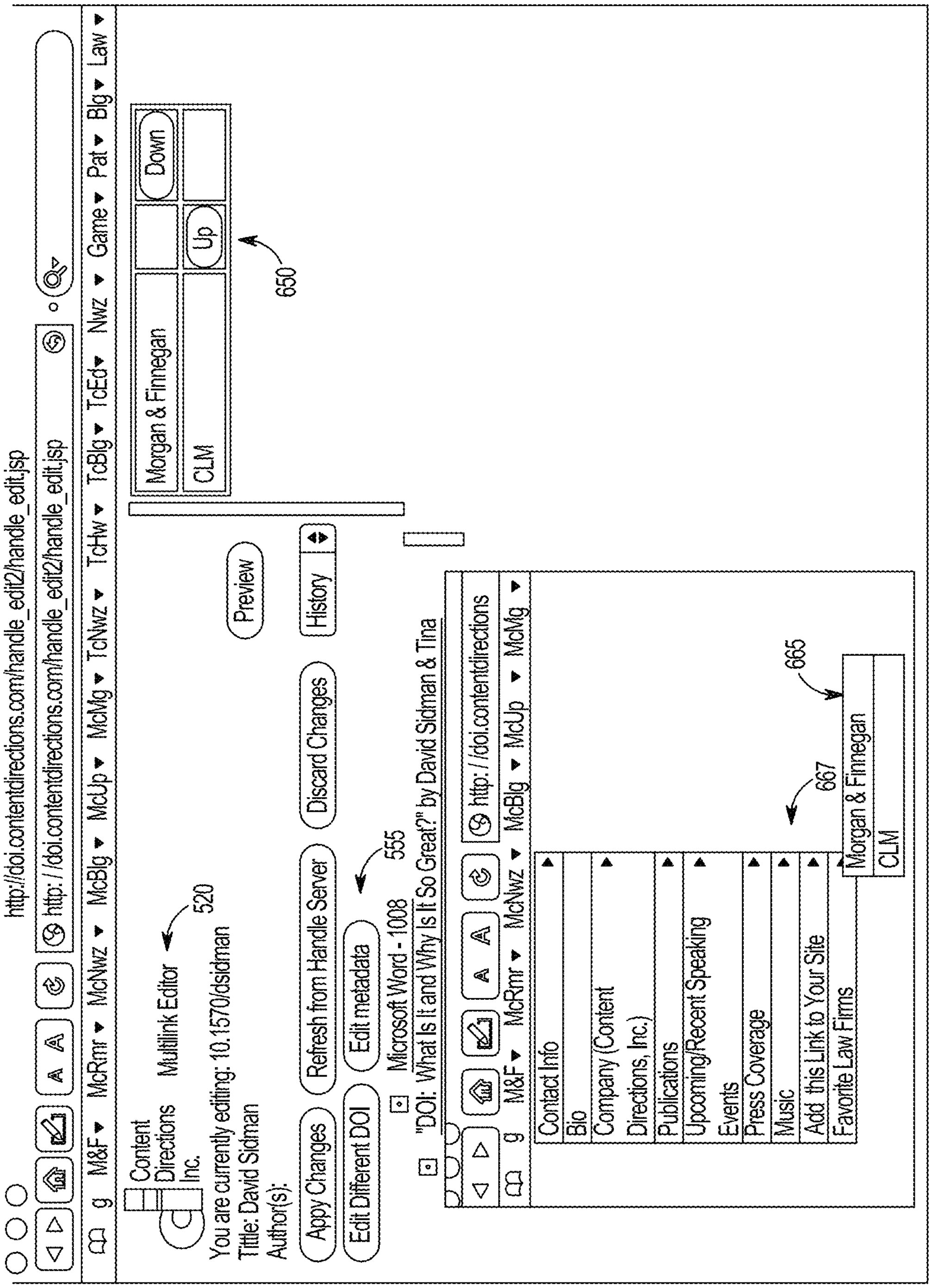
Figure 6C:
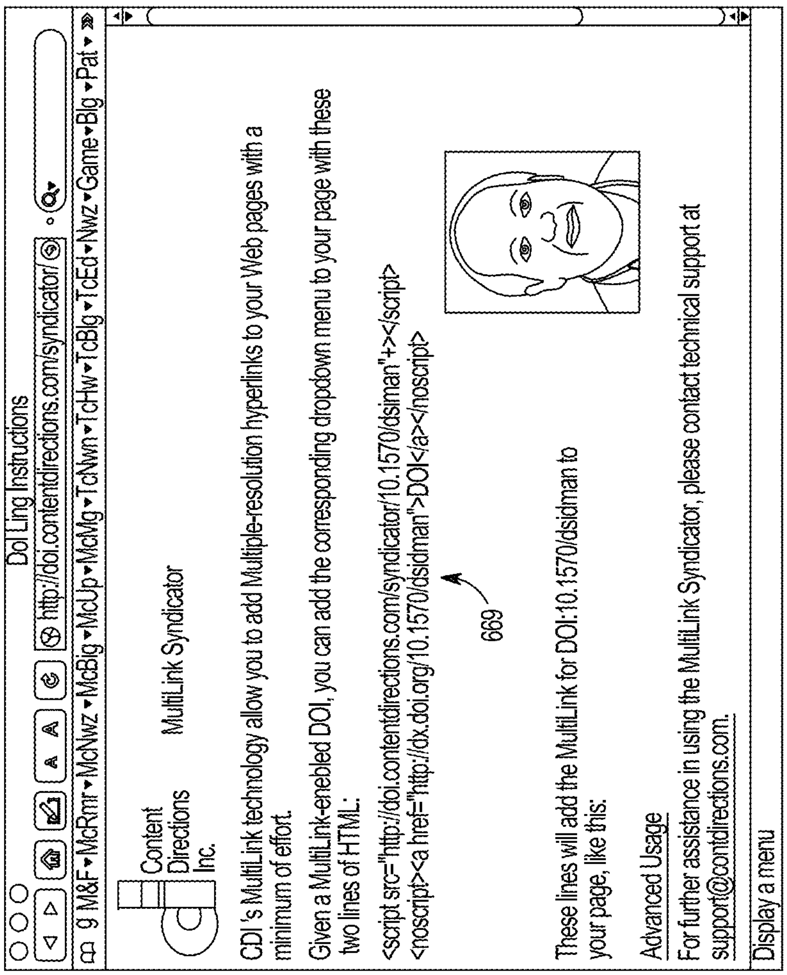
Figure 6D:
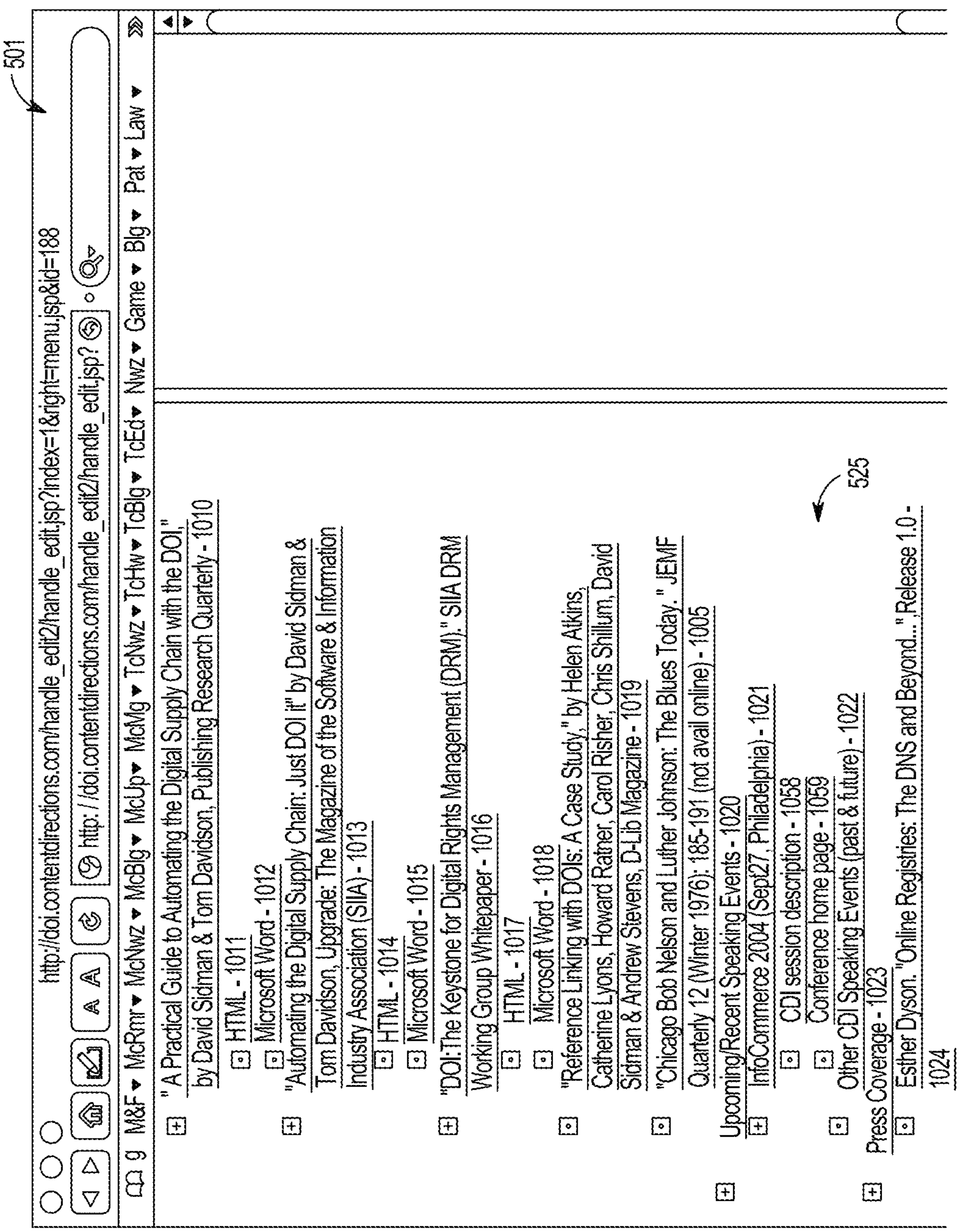
Figure 6E:
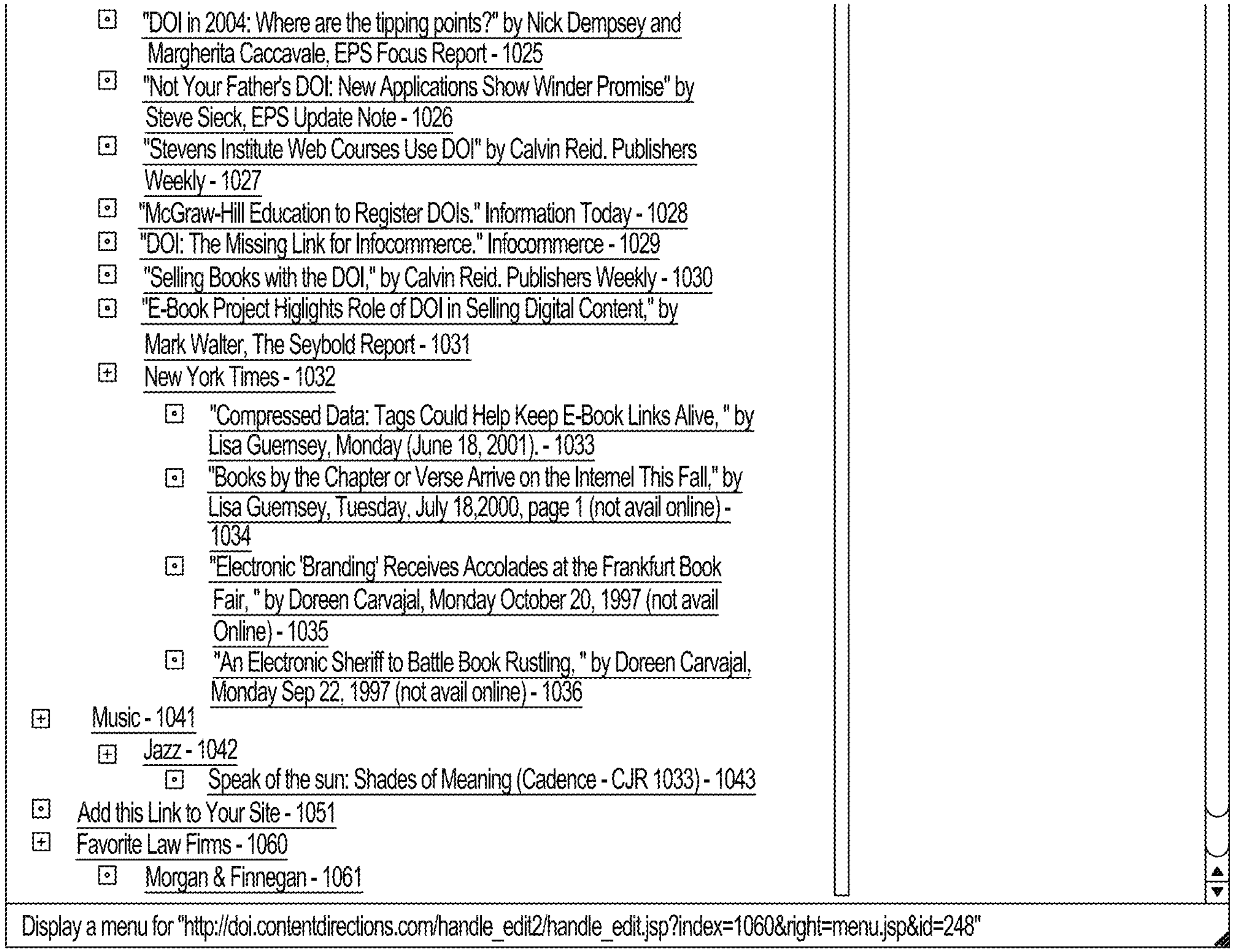

The Autolinker may obtain metadata fields and values 205 from a variety of sources as has already been discussed 105 in FIG. 1. At this point, the Autolinker checks to see if a menu specification was provided and/or exists. In one embodiment, the user supplying the data provides their own menu specification. The menu specification may also be in Microsoft Excel, tab delineated format, XML, and/or the like. Any format that can represent an outline hierarchy of specification field labels 270, 280, 275 and associated record field labels 289, values 291, and references 287 like what is illustrated in FIG. 5 525 will suffice. In many cases, such a menu specification will be hand tuned. If a menu structure is available, the Autolinker obtains it 215. If a menu specification has not been provided, the Autolinker will attempt to generate a best guess menu structure 220.

In one embodiment 220, when the Autolinker has nothing more than metadata fields and values 263, it will generate the menu specification from the metadata record field labels 289. In such an embodiment, the Autolinker would take each metadata record field label 289 (e.g., Author, Title) and specify them as being at level one 270 of the menu structure specification fields 265. Then level two of the menu structure specification fields 265 would come from the values 291 associated with the record field labels 289. Thus, by way of example, the field labels 289 from the metadata 263 are used to construct the level one menus 264, 266 of the MultiLink menu, and the metadata record values 291 are used to construct the level two menus 268, 269 and those sub menus 268, 269 will be associated with their respective record references 287. As such, if a user selects one of the references 269, the user will be taken to the reference target. These end-user selections and actions may be measured 226 and the metrics may be fed back 122 into the creation/maintenance of MultiLink menus, as will be described in greater detail in FIGS. 16-20. In another embodiment 220, the Autolinker may obtain the Web site map, the main menu at a Web site, Really Simple Syndication (RSS) feed, and/or the like structure from a user's Web page server. For example, the Autolinker may examine the metadata for the most frequently accessed Web site address 287 and download the Web site information. In one embodiment, the Autolinker searches for HTML and/or XML tags in the Web page provided by the site for text matching "menu," "site map," and/or the like. Often Web sites have a menu structure as an overall theme of their Web site and this structure may be suitable for menu specification structure 265. For example, a Web site may have a menu comprising "Home, Products, Support, Help." Each of those menus may have submenus as well, e.g., "Support" may have a "Contacts" menu item hierarchically subordinate to the "Support" menu. In such an embodiment, the Autolinker would compare such Web site menus and submenus to all of its metadata fields 289. The Autolinker would then create a specification 265 based on menu items from the Web site that match the metadata fields 289. In one embodiment, if Web site submenus match metadata fields 289, then the menu specification will adopt the hierarchy of the Web site map structure and the menu specification 265 generated will have those matched fields as being a submenu; they will be a submenu either to a matching parent menu.

Moving from the flow diagrams for a moment, it may be useful to describe an example application to illustrate such automated Web site link construction. With regard to such an application, the Autolinker is given an RSS feed identifier. Such an identifier may be supplied by crawling Web sites for RSS links. Upon obtaining the RSS link, the feed components are retrieved. The components of the RSS feed are parsed. In one example embodiment, retrieval and parsing may be obtained by using a scripting language such as PERL as such:

```
/* PRIMARY RESPONSE PAGE
  */
  h.initNewHandle( );
  try {
  DocumentBuilderFactory factory = DocumentBuilderFactory.newInstance( );
  DocumentBuilder builder = factory.newDocumentBuilder( );
  //Document document = builder.parse("http://www.thirdstation.com/blog/?flav=rss");
  Document document = builder.parse(blog.openStream( ));
  org.w3c.dom.Element feed = document.getDocumentElement( );
  org.w3c.dom.NodeList channels = feed.getElementsByTagName("channel");
  if(channels.getLength( ) > 0){
```

-continued

```
org.w3c.dom.Element channel = (org.w3c.dom.Element)channels.item(0);
org.w3c.dom.Element blogTitle = (org.w3c.dom.Element)
(channel.getElementsByTagName("title")).item(0);
org.w3c.dom.Element blogLink = (org.w3c.dom.Element)
(channel.getElementsByTagName("link")).item(0);
org.w3c.dom.Element pubDate = (org.w3c.dom.Element)
(channel.getElementsByTagName("pubDate")).item(0);
org.w3c.dom.NodeList items = channel.getElementsByTagName("item");
```

Upon parsing the RSS feed into its constituent components, the components are identified and the component values are obtained based on specified values required by the Autolinker. In one embodiment, a menu specification may be used to establish which components and values are to be obtained. In one embodiment, this may be achieved with a script as such:

```
if(blogLink != null){
  h.addValue(1, "URL", blogLink.getFirstChild( ).getNodeValue( ));
  Log.debug("Added primary response page for doi="+doi);
  }
  if( blogTitle != null && blogLink != null){
  h.addValue(indexCount, "MULTIRES", blogTitle.getFirstChild( ).getNodeValue( ).trim( ) +
  "=" + blogLink.getFirstChild( ).getNodeValue( ).trim( ));
  h.addMapEntry(0, indexCount++);
  }
  if(pubDate != null){
  h.addValue(indexCount, "MULTIRES", "Updated: " +
pubDate.getFirstChild( ).getNodeValue( ) + "=#");
  h.addMapEntry(0, indexCount++);
  }
  int postsIdx = indexCount;
  h.addValue(indexCount, "MULTIRES", "Latest Entries=#");
  h.addMapEntry(0, indexCount++);
  for(int k = 0; k < items.getLength( ); k++){
  // Only take last ten entries
  if(k == 10){ break; }
  org.w3c.dom.Element currElement = (org.w3c.dom.Element) items.item(k);
  org.w3c.dom.Element titleEl = (org.w3c.dom.Element)
  (currElement.getElementsByTagName("title")).item(0);
  org.w3c.dom.Element linkEl = (org.w3c.dom.Element)
  (currElement.getElementsByTagName("link")).item(0);
  org.w3c.dom.Element descEl = (org.w3c.dom.Element)
  (currElement.getElementsByTagName("description")).item(0);
  String title = null;
  String link = null;
  String desc = null;
  try{
  title = titleEl.getFirstChild( ).getNodeValue( ).trim( );
  }catch(NullPointerException npe){
  title = null;
  }
  try{
  link = linkEl.getFirstChild( ).getNodeValue( ).trim( );
  }catch(NullPointerException npe){
  link = null;
  }
  try{
  desc = descEl.getFirstChild( ).getNodeValue( ).trim( );
  }catch(NullPointerException npe){
  desc = null;
  }
```

Once the components and values are obtained, those values may be added to form the basis of a MultiLink menu. In one embodiment, this may be achieved with a script as such:

```
if(title != null && link != null){
  h.addValue(indexCount, "MULTIRES", title + "=" + link);
  h.addMapEntry(postsIdx, indexCount++);
  }
```

-continued

```
if( title == null && link != null && desc != null){
h.addValue(indexCount, "MULTIRES", desc + "=" + link);
h.addMapEntry(postsIdx, indexCount++);
}
}
}
}
catch (FactoryConfigurationError e) {
Log.debug("Unable to get a factory instance.");
}catch (ParserConfigurationException e) {
Log.debug("Unable to get a parser.");
}catch (SAXException e) {
Log.debug("Error parsing feed");
}catch (IOException e) {
Log.debug("I/O exception");
}catch(Exception e){
Log.debug("ERROR: " + e.getMessage( ));
}
} // blog != null
// CDI HOME PAGE
h.addValue(indexCount, "MULTIRES", "Powered by Content
Directions=http://doi.contentdirections.com/?doi=" + CDI_REF_ID);
h.addMapEntry(0, indexCount++);
// EMAIL
h.addValue(indexCount, "MULTIRES","Email this Info to a Friend=mailto:?subject=Thought
you might be interested...&body=I thought you might be interested in this blog:
http://dx.doi.org/"+doi);
h.addMapEntry(0,indexCount++);
Log.debug("Setting index count to " + indexCount);
// LINK
h.addValue(indexCount, "MULTIRES", "Add this Link to Your
Site=http://doi.contentdirections.com/syndicator/?"+doi);
h.addMapEntry(0,indexCount++);
Log.debug("Setting index count to " + indexCount);
```

The FIG. 253 goes on to show the Autolinker having constructed a MultiLink menu from the live feed from a Web site, e.g., the New York Times. Should the user make a selection of one of the entries 253, they would be taken to the target of such a live feed 254. Similarly, the above RSS embodiment may also be applied to blogs, Web site root-level menus, and/or the like.

Moving away from the above RSS example embodiment and back to the discussion of Autolinker relationship generation 122, once the Autolinker generates a best guess menu specification 220, it obtains the specification of the menu structure 215. Having the menu specification 215 and the metadata fields 205, the Autolinker performs a match as between the two 225. Once the Autolinker identifies which metadata fields 205, 263 match 225 the menu specification fields 215, 265, then the Autolinker may begin pointer construction 124.

Based on the matching fields 126, the Autolinker then searches the metadata database for field values 230. For example, in constructing a menu for the author 264, a match will occur based on the author field as the Autolinker is interlinking all the books by the same author; thereafter, the Autolinker will find each title by the author to populate the menu 266. The actual fields chosen for matching may depend on the menu specification and may comprise any number of metadata fields. As such, the Autolinker is searching based on the menu specification to populate menu submenus with metadata. For example, the metadata 105, 263, which may be stored in a database by the Autolinker, is searched by the Autolinker by using the matched menu specification fields 225. For example, the only common field as between the menu specification fields 265 and the metadata fields 263 are the "Title" fields 283, 281. The menu specification 265 would define a menu with a root menu "Menu Type" that was provided as part of the specification and submenus 275, which are not shown in the graphical menu. Another root menu is "Other Books By Author" 280, which contains the matching "Title" field 281. Based on this matched field 225, the Autolinker searches all records for all values and the result is the search returned values are shown as submenus 295.

As such, for each of the matching fields 235, the Autolinker obtains an associated reference pointer 287 which will form the basis of the MultiLink 240. Now that the Autolinker has pointers 240 for all the matched 225 field values 230, the Autolinker may commence with MultiLink creation 126. At this point a menu structure is populated 293, 295 based on the menu specification 265 and the matching field 289 values 291 from the metadata 263, however, the reference links for each menu item may not exist. The case where reference pointers are provided 287 as part of the metadata 263 and used by the Autolinker to supply pointers 240 for the MultiLink menu has already been discussed. However, in many cases, such references will have to be created and/or supplied to further the creation of MultiLinks as they will not be supplied by the customer 105.

In one embodiment, every menu item would be supplied with a tracking pointer 288 in addition to the target reference pointer. The tracking pointer would be accessed to register how various MultiLink menus are accessed. For example, when a MultiLink menu is selected, the Web browser will be instructed to send usage parameters 288 (e.g., the end-user's IP address, the item being selected (e.g., DOI, menu item ID, sub menu item ID, etc.), passed over menu items, and/or the like) to the tracking server via I-TTP post command, while the end-user's Web browser receives the target reference address 287 and allows the end-user to navigate and view the material at the target reference address 287. In one embodiment, the tracking links create parameters that are appended onto the tracking address 288. These parameters may be used to assist in the tracking of end-user activities. In one embodiment, the Autolinker will generate parameters that include a DOI, a menu specification ID, and a hierarchical tag for each menu item. For example:

```
http://www.trackerserver.com/postvalues?doi://10.1009/0395960789?menuID:12345?hover:4:
menuTier:1:2?hover:2:menuTierClick:1:3
```

Here the tracking server is “www.trackerserver.com,” the DOI being tracked is X, the DOI’s menu specification has an ID of Y, and the last tag refers to a menu selection. In the above example, the menu’s first tier’s menu selection “Author” 264 was selected and then its second menu item in the second tier “Dickens” 269 was selected, which resulted in the posting of the “,Ä¶?menuTierClick:1:3” parameters to the tracking server. In this example, the “1” represents the MultiLink menu’s first selection item in the first tier of the menu hierarchy, and the “3” represents the menu’s third selection item in the second tier of the menu hierarchy. The “hover:2” portion of the parameter may indicate that the user hovered two seconds prior to clicking on the third menu selection. Similarly, the “hover:4” portion of the parameter may indicate that the end-user hovered over the second menu item in the second menu tier for four seconds. As such, every single menu item will be given a code relative to its order in a given tier and any menu item in the hierarchy may be identified. In one embodiment, these menu selection IDs are stored as part of the menu specification. The tracking links 288 will be discussed in greater detail in FIGS. 16-20.

In one embodiment, media code 289 may be used where the supplied link 287 and any tracking links 288 are embedded within multimedia objects that displayed 290 within menu items 295. For example, Flash, animated gifs, video files, etc. may be used and displayed 290 within menu items thereby making the menu items more engaging 295.

In one embodiment, a Flash animation may be embedded in a menu as such (see 1605 of FIG. 16 for the accompanying example):

```
<object classid=\"clsid:D27CDB6E-AE6D-11cf-96B8-444553540000\"
codebase=\"http://download.macromedia.com/pub/shockwave/cabs/flash/
swflash.cab#version=6,0,0,0\" width=\"185\" height=\"32\"
ID=\"Shockwaveflash1\" VIEWASTEXT><param name=\"movie\"
value=\"images/CrossFireAnimation2.swf\"><param name=\"quality\"
value=\"high\"><param name=\"bgcolor\" value=\"#FFFFFF\"><embed
name=\"CrossFireAnimation\" src=\"CrossFireAnimation.swf\"
width=\"165\" height=\"32\" quality=\"high\" bgcolor=\"#FFFFFF\"
type=\"application/x-shockwave-flash\"
pluginspage=\"http://www.macromedia.com/go/getflashplayer\"></object>
```

In one embodiment, a video may be embedded in a menu as such (see 1610 of FIG. 16 for the accompanying example):

```
<div id=\"divMovie\"><OBJECT id=\"movie1\"
onmouseover=\"javascript:PlayIt( );\"
onmouseout=\"javascript:StopIt( );\"
codeBase=\"http://www.apple.com/qtactivex/qtplugin.cab\"
height=\"120\"
  width=\"180\"
classid=\"clsid:02BF25D5-8C17-4B23-BC80-D3488ABDDC6B\"
```

-continued

```
VIEWASTEXT><PARAM NAME=\"src\"
VALUE=\"http://www.darnellworks.com/a52/media/crosfire.mov\"><embed
width=\"180\" height=\"120\" target=\"myself\" bgcolor=\ "#000000\"
border=\"0\" controller=\"true\" EnableJavaSript=\"true\"
autoplay=\"false\" kioskmode=\"true\"
src=\"http://www.darnellworks.com/a52/media/crosfire.mov\"
pluginspage=\"http://www.apple.com/quicktime/download\"> </embed>
</OBJECT></div>
```

In one embodiment, a menu item may assemble a composite of media and information as such (see 1615 of FIG. 16 for the accompanying example):

```
<div align=\"center\" style=\"width: 180px; background-color:
#ffffff;\"><IMG height=\"48\" width=\"77\"
SRC=\"images/crossfire1.jpg\"><br><font size=\"1\"
color=\"black\">2005
Crossfire Coupe Limited<BR></font><font size=\"2\"
color=\"black\"><B>$34,620.00</b></font><br><font size=\"1\"
color=\"gray\">VIN: 1C3AN69L15X035266</font></div>
```

At this point the Autolinker has at least four ways of furthering the creation of MultiLinks, one of which 250 was already discussed 240. In the instances where the customer supplied reference links 287 with the metadata 263, the Autolinker may simply choose to use those supplied links to generate the DOI MultiLink record with appropriate references 250.

There are several other ways to obtain references to content related to the metadata records 263. In one embodiment, a customer’s Web site and/or database structure is reverse engineered 245. This embodiment, generally, requires human analysis. In this embodiment, a Website’s product querying format is discerned and used to find products. For example, the United States Patent and Trademark Office (USPTO) government Web site, e.g., www.uspto.gov, has a syntax that may be employed to find object targets. For example, if a reference is needed for a target patent based on a patent application title, e.g., “Registration effecting information access” and the inventor’s name, e.g., “Sidman,” then the following reference may be used to obtain the appropriate reference from the USPTO:

```
http://appft1.uspto.gov/netacgi/nph-
Parser?Sect1=PTO2&Sect2=HITOFF&u=%2Fnetahtml%2FPTO%2Fsearch-
adv.html&r=1&p=1&f=G&l=50&d=PG01&S1=%28sidman.IN.+AND+%28%22registration+effecting+info
rmation+access%22.TTL.%29%29&OS=in/sidman+and+ttl/%22registration+effecting+information
+access%22&RS=(IN/sidman+AND+TTL/%22registration+effecting+information+access%22)
```

The underlined portions show where metadata field values 291 are inserted so as to reference the proper patent application. In the above case, the USPTO’s query structure was reverse engineered so that when a value for the title and inventor fields are supplied from the metadata record field values 291, the proper patent application reference is obtained; in this case, the reference link for Patent Application No. 20040163020. Numerous Web sites and database have such discernable query formats, e.g., Amazon.com.

In another embodiment, a customer may simply provide a query Web page and/or query prompt into which metadata field values may be provided 255. The query fields may be populated in a number of ways. In one embodiment, they are populated manually. In another embodiment, a Web browser's auto-fill functionality is filled through an API, and is engaged upon the Web page form being loaded. In another embodiment, the prompt and/or Web form is filled through interapplication communication via APIs. In another embodiment, a macro playback utility (e.g., Quickeys) may pull values from a file and repeatedly feed values into query fields and effect the forwarding and/or saving of reference links. In still another embodiment, a scripting environment as provided via PHP, Javascript, Python, TCL, and/or the like may be employed to pull field values from a file and repeatedly feed the values into query fields and effect the forwarding and/or saving of reference links.

In yet another embodiment, all of the field values for a given metadata record are put into a search prompt to generate a response 260. In such an embodiment, the metadata values would be logically-OR'd so as to rank results with greater weight when more terms are encountered in the search. In one example, the metadata values may be fed into a search engine, e.g., Goole.com, and the top link can be selected as a reference link 260.

InterConnector

Figure 3A:
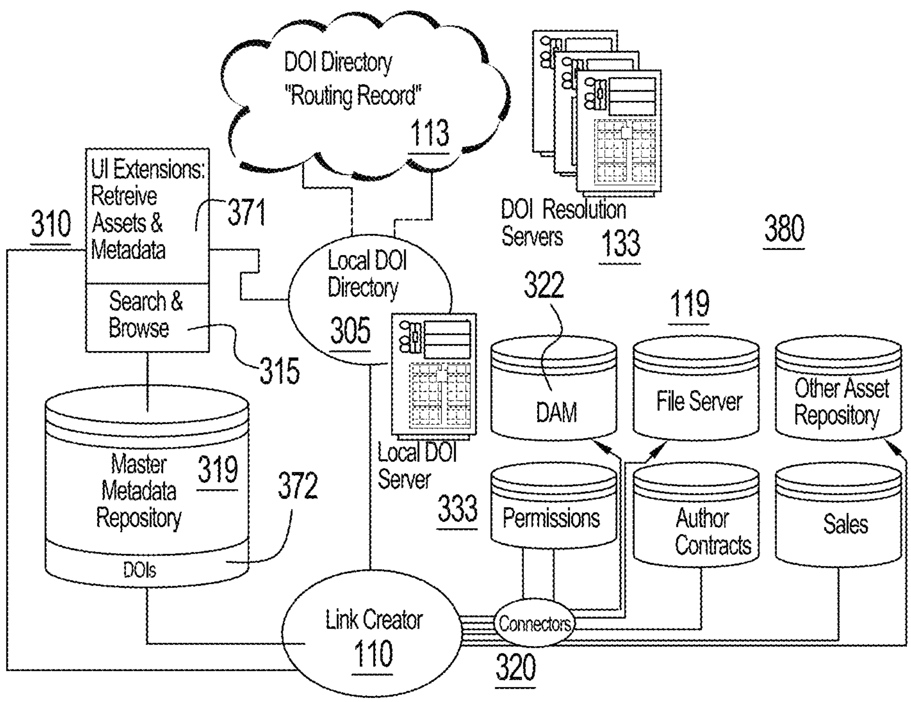
FIG. 3 is of a mixed data and logic flow diagram illustrating embodiments of an IntraConnector.
Figure 3B:
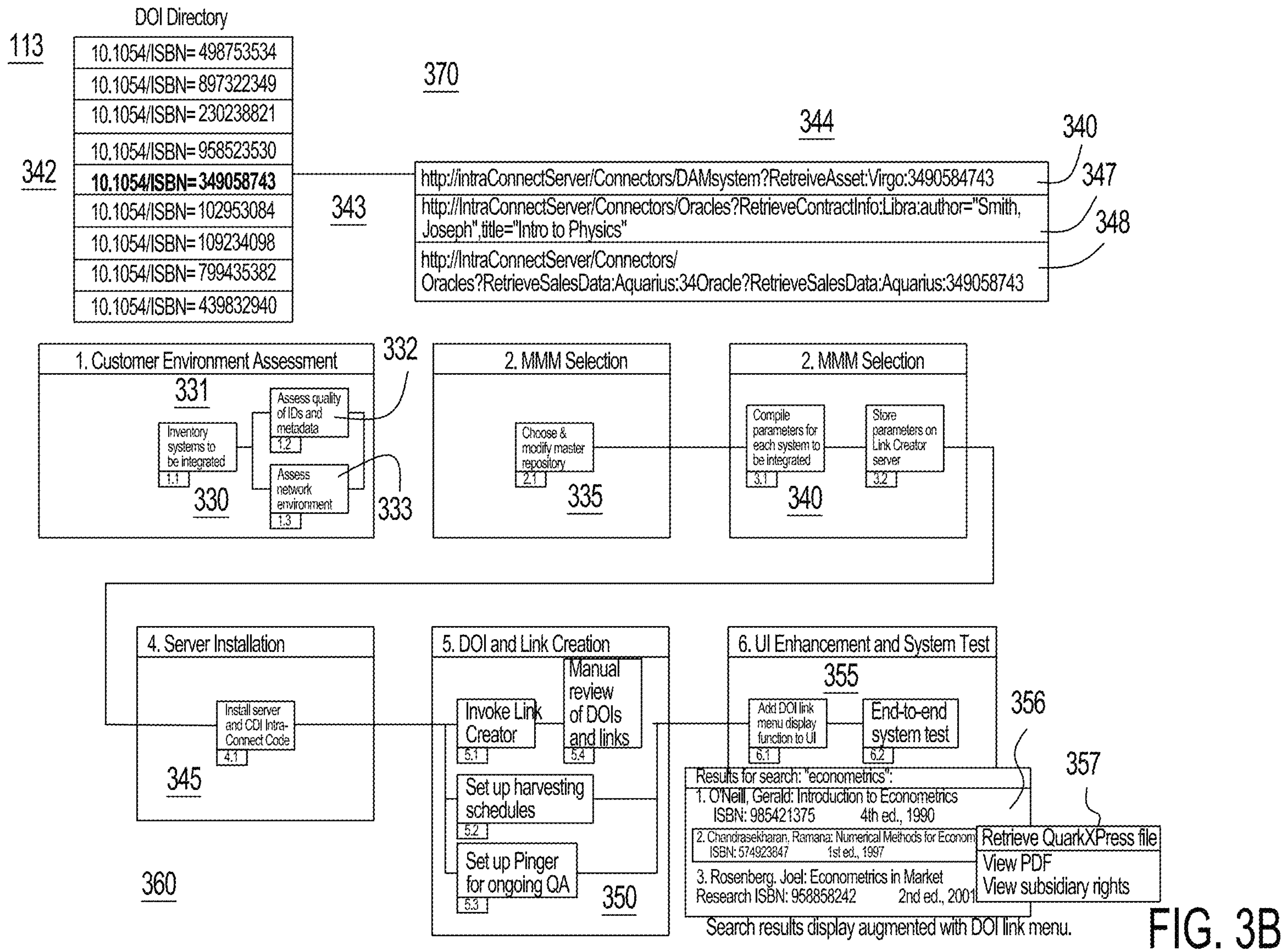

FIG. 3 is of a mixed data and logic flow diagram illustrating embodiments of an IntraConnector. A portion 380 of FIG. 3 shows a more localized variant of the system described in FIG. 2. In this embodiment, the global DOI directory 113 is still available and distributed over numerous DOI resolution servers available from across a communications network; it serving to resolve DOIs from any requesting entity. More specifically, an intranet embodiment where a customer may have their own local DOI directory 305 running on local DOI server(s) 333 is shown. In one embodiment, the Local DOI server also acts and/or is connected to a communications gateway out providing access to a larger communications network, e.g., the Internet. Here, we see that link creation 110 as provided by an Autolinker and/or Handle editor supplies DOIs to the local DOI directory 305 and not to the global directory 113. As such, although the local DOI directory may make requests for DOI resolution from the larger global directory 113, and that larger global directory may provide results for that resolution request, nevertheless, should the global DOI directory 113 or any other entity make requests of the local DOI directory 305, the local DOI directory would not provide any resolution information. In an alternative embodiment, users may wish to provide access to their intranet to the outside world and may enable outgoing resolution, either globally and/or by password and access control.

A component in the architecture is a master metadata repository 319. In one embodiment the master metadata repository may be an enterprise content catalog. It should be noted that although publishers and content catalogues and the publishing field are used herein for purposes of illustration, the IntraConnector may be employed in any number of contexts and is not limited to the publishing field. For example, the IntraConnector may be used in any kind of company with any kind of information, including: product companies with product catalogs; healthcare companies (e.g., hospitals with patient-related information, case-related medication-related information, etc.); service companies with customer records; government agencies with any kinds of records; and/or the like. The IntraConnector may also be deployed in situations where the information being interrelated spans multiple independent departments, divisions, companies, organizations, systems, technology platforms, or other interlinking targets. Organizations may use the IntraConnector to interrelate internal information and yet combine in with external information that it wishes to associate with its internal information, or to otherwise make accessible to its users or programs. Examples include internal knowledge management applications, where an organization may want to interrelate internal information (e.g. documents used in the R&D process) and/or external information (such as external news and research relevant to this R&D activity, and/or competitor information). A content catalog contains at least two types of information: unique identifiers for each content item in the catalog and metadata that describes each content item. The IntraConnect architecture may utilize an existing system that a content publisher already has in some form, e.g. a content catalog, and which the content publisher may wish to use it as the basis for the publisher's enterprise content integration (ECI) deployment. In another embodiment, the master metadata repository may be based on an existing vendor-supplied system such as Canto Cumulus 175, Documentum, Vignette, Artesia TEAMS, etc. This system may be hosted and operated within the customer's own control, or it may be provided on an Application Service Provider (ASP) basis. This gives publishers the advantage of using an existing system, with which users are already comfortable, and the development of which has already been funded, instead of the usual document asset management (DAM)-based approach which requires implementing a new user interface. For example, book publishers typically have product catalogs, title databases, or even systems that use ISBNs as the unique identifiers and contain various types of metadata about books. Users can search and browse these systems. As we will see, such systems can be extended into use as master metadata repositories in an IntraConnect implementation. If no content catalog exists, or if it exists but only as an unstructured repository of information (such as individual files distributed on multiple computers) and not as a structured database, then it may be created for the purpose of serving as the master metadata repository. Although discussions herein use books/publishing as an example, the principles apply equally to other types of businesses, many of which have standard identification schemes, such as ISSNs for serials, ISRCs for music products, CUSIPs for securities, UPCs for physical products. Other businesses or organizations may use non-standard, proprietary identification schemes that may only have meaning internally within the organization, within the technology system, database and/or other internal systems. Other businesses or organizations may also require an IntraConnector to interlink related information or objects that do not comprise content, but instead include database records, personnel records, sales records, commerce transactions, authentications, identity verifications, sensors, or any other kind of systems, information and/or objects.

An example publisher has an array of database systems 119. The product catalog may be built on a multi-user database and may have a Web browser-based user interface. In addition to the product catalog, publishers might have one or more types of systems that store actual content, not just descriptions of it, such as departmental DAM systems, file servers, image libraries, and so on. They will also have back-office systems that track business aspects of content, such as author contracts, rights and permissions, royalties, sales, and marketing information.

The IntraConnector includes components that turn the publisher's product catalog into a Master Metadata Repository 319 for an ECI implementation, the components including: UI extensions to retrieve assets and metadata 371, DOIs stored in the master metadata repository 372, and the link creator 110 and connectors to their database systems 320 provide the interconnections. To that end, the IntraConnector adds DOIs to the entries in the publisher's content catalog and to create links from each DOI to all of the systems that store information about the asset that the DOI references. In this manner, the Autolinker may be supplied with actual links 250. Links can be simple URLs, or they can be invocations of complex scripts that make calls to a system's programming interface in order to retrieve information. The IntraConnector includes a connector component 320 that implements the latter types of interfaces to commonly-available systems, such as relational databases, file servers, DAM systems, etc. The Link Creator 110 component builds all of these links and stores them in a Local DOI Directory. In one embodiment, the link creator 110 may be either the Autolinker 120 and/or Handle editor 115; in addition, the link creator may employ DOI link creation for unique content. As an example, a book publisher may have a title database that contains ISBNs. The publisher may store the actual book content in a DAM system and has separate systems for author contracts and sales tracking. A DOI can be created from any type of pre-existing identifier, and it can point to several different links in a DOI Directory.

In one embodiment, the publisher could create a DOI from each ISBN in the title database. For each of those DOIs, it could have one link to the content in the DAM system, another to author contract info in the contract system, and a third to sales info in the sales tracking system. Examples of such DOIs are generally shown 370 in tabular form in FIG. 3. The DOI 342 is associated 343 with its three links 344 stored in a DOI directory 113. Once all of the links have been created, then users can go through an extended user interface to follow the links to information in whichever systems they need, as has already been shown 175, 293, 295 in FIGS. 1-2 and will be discussed in greater detail in FIGS. 5-6. The IntraConnector User Interface Extensions 371 enable the product catalog to go well beyond providing simple metadata search and browse functionality: by incorporating DOI MultiLink menus, they enable users to actually retrieve the assets and other types of metadata for a given content item by going through the links in the DOI directory 113, 305. This provides some of the functionality to turns a publisher's content catalog into an Enterprise Content Integration application, thereby dramatically increasing its functionality. Other components of the IntraConnector include connectors 320. These are the "glue" that turn a DOI link into a working interface to a given system. For example, a connector 320 to a DAM system 322 would take as input the identifier that the DAM system uses to identify a content item internally and invoke the DAM system's API calls to retrieve that asset. FIG. 3 shows two different connectors used to implement the three links. The first link uses a connector 343 for a DAM system (e.g., Artesia TEAMS, Documentum, QuarkDMS, Canto Cumulus 175 and/or the like) called "Virgo" that stores book content and identifies it by ISBN 346. The argument RetrieveAsset to the connector tells it to retrieve the actual content identified by the given ISBN. The second link invokes a connector for the Oracle relational database 347, which is presumed to be the platform on which the publisher has built its contract management system, which the publisher has named "Libra." The connector's argument RetrieveContractInfo, presumably developed specifically for this publisher's contract system, invokes the appropriate SQL queries to retrieve info about the contract for the author whose name is given for the book whose name is given. Note that the contract system doesn't store contracts by ISBN but rather by author and title, because a contract for a given author and title can cover multiple ISBNs. The third link also invokes the Oracle connector 348, this time on the publisher's sales tracking system, which is called "Aquarius." The sales tracking system uses ISBNs to identify products.

An IntraConnector may be implement some of the following mechanisms for a publisher. In one embodiment, a user may search and browse metadata in a master metadata repository 113 through its user interface 371. The user may invoke the search and browse interface of the publisher's existing product catalog or other metadata repository. When the user identifies some content of interest and wants to retrieve it: the user can select/click on the asset's name or identifier to view a menu of options, which are DOI MultiLinks. One of the options might be "Retrieve Asset." If the user selects that option, then the DOI link associated with the "Retrieve Asset" function contains a call to the connector 320 for the publisher's DAM system (which is described in greater detail throughout FIG. 3 360), along with the ID that the DAM system uses internally to identify the asset. The asset's MIME type determines which application should be invoked on the user's machine to view, play, or edit the asset once it is retrieved. The user may then identify some content of interest and want to look at a preview or thumbnail of it. To do so, the user clicks on the asset's name or identifier to view a menu of options, which are DOI MultiLinks. One of the options may be "View Thumbnail/Preview." If the user selects that option, then the DOI link associated with the "View Thumbnail/Preview" function contains a call to the connector 320 for the publisher's DAM system, which stores preview or thumbnail renditions of assets, along with the ID that the DAM system uses internally to identify the asset. The preview or thumbnail's MIME type determines which application should be invoked on the user's machine to view the preview or thumbnail. For example, if it's a GIF image thumbnail, then the user's browser could open a new small window displaying the thumbnail. If the publisher's DAM system does not store thumbnails, then the link could be set up to invoke a "read-only" application on the user's machine instead of an editing application. Then, should a user care to identify some content of interest and wish to view the author's contract information, then the user may select/click on the asset's name or identifier to view a menu of options, which are DOI MultiLinks. One of the options may be "View Contract Info." If the user selects that option, then the DOI link associated with the "View Contract Info" function contains a call to the connector 320 for the publisher's contract system, along with the ID that the contract system uses internally to identify the work. The connector 320 implementation invokes the user interface 371 of the contract system, passing it the ID of the contract to be viewed. In an alternative embodiment, the connector implementation may read information from the contract system and display it in the user's Web browser.

IntraConnector Integration

An example deployment 360 is generally shown comprising: customer environment assessment 330, Master Metadata Repository (MMR) selection 335, content integration setup 340, server installation 345, DOI and link creation 110, 350, and UI enhancement and system testing 355.

With regard to customer environment assessment 330, the publisher's data and network infrastructure 119 are examined to determine levels of effort and feasibility in implementing the IntraConnector. In one embodiment, this may comprise of the following: inventory of the systems to be integrated 331, determining the feasibility of integration 332, and assessing the network environment 333. Inventorying the systems 331 may include identifying the content catalog to be used as the Master Metadata Repository 319, asset repositories 119, including DAM systems 322, file servers, etc. Other systems to be inventoried may include ancillary information systems, e.g., rights, permissions, contracts, sales, and marketing. With regard to determining the feasibility of integration, the level of manual link creation that will be required is determined by assessing the quality of the publisher's identifiers and metadata according to these criteria 332: quantity (i.e., is there enough metadata to identify assets and other product information on all relevant systems?); consistency (i.e., are the same terms used for the same purposes across systems?); and identity uniformity (i.e., do common identifiers or metadata keys identify the same things on different systems?). Assess the publisher's network environment according to such criteria as 333: (i.e., are all of the systems to be integrated accessible from all of the relevant users' desktops); (i.e., are there any network performance issues that would hamper movement of assets across subnets?)

In choosing and modifying the Master Metadata Repository (MMR) 335, the publisher is assisted in identifying a system to be used as the MMR. In one embodiment, this is an existing system that the publisher uses to store and maintain key content and product information, such as a title database, product catalog, Web product catalog, or even an ERP system that stores product data. Conforming to a set of architectural elements facilitates in the making of the MMR. Some of the architectural elements and considerations include: employing a relational or other multi-user database; employing a Web browser-based user interface; and having entries for most or all of the relevant content. The MMR should be modified to store DOIs for each content item. If it is not possible to actually modify the system (i.e., add a field to the database schema), then it is possible to create "virtual" DOIs that are based on an existing ID scheme (e.g., ISBNs). In such a circumstance, the Local DOI directory 305 may be built to understand a convention that turns ISBNs into DOIs in a fixed, predetermined way. For example, in one embodiment, the customer's organization is assigned a pool if DOIs for use. The customer would then create a numerical association table of ISBNs to the individual DOIs in the pool. In one embodiment, ISBNs would be sorted numerically and associated to the sorted pool of DOIs numerically. In this manner, the IntraConnector can help to modify a publisher's product catalog into an MMR. If the publisher does not have a satisfactory product catalog system, then one may be created based on a third party's Metadata Database (e.g., a DOI registration agency like Content Directions Inc., which it uses for registering its customers' DOIs in the Global DOI Directory).

With regard to content integration setup 340, connectors 320 are created for linking DOIs with the publisher's asset repositories and ancillary information systems 119. To this end, several parameters for each system to be integrated are compiled. These parameters include: type of system (e.g., relational database, DAM system, file server, etc.); type of software (e.g., Oracle, Artesia, FTP server, etc.); server platform (e.g., local system name, operating system); conventions that the system uses to identify entries; and the action to be taken when the user invokes the link, such as retrieve data from specific fields. Once this information is compiled for each system in the ECI implementation, it will be stored in a table in the Link Creator 110. In one embodiment, this information is automatically compiled by employing a standard connector for an Oracle database. This connector can query for the overall topology of a customer's database system resulting in a complete entity-relationship topology including all tables, field names, and key fields. In one embodiment, the system observes where the greatest number of records exist through a record count and then employs the key field for that type of record for association with DOIs. In such an embodiment, DOIs may be generated for each such key field. In one embodiment, a DOI field is added to the database table and associated DOIs are added directly to the database and thus may be found through database queries. In another embodiment, an intermediary table is created with the key field and a DOI field, and may be used to join and select records in the table responsible for the greatest number of records on the customer's database. Such information may then be used to instantiate connector code for each system.

With regard to server setup 345, in one embodiment, any machine that can run Java applications will work. However, any number of development frameworks may be used. In one embodiment, the server is loaded with a Local DOI Directory 305; connector code, instantiated for the publisher's specific systems according to the above parameters 320; Link Creator 110; and administrative tools.

DOI and Link Creation has been discussed already in FIG. 2 and throughout. However, the IntraConnector also may participate in link creation for asset repositories and ancillary information systems. As has been discussed, the Autolinker automates as much of the link creation as possible by finding correspondences between an entry in the Master Metadata Repository and entries in other systems—by matching pre-existing ID numbers or other keys (such as title and author). After the Link Creator runs, the IntraConnector can assist publishers by providing results for manual review of DOIs and links for quality control purposes. Publishers with high quality, consistent metadata will find that the quality control task takes little time.

In one embodiment, the IntraConnector may establish a maintenance schedule for the links. Two regular basis maintenance activities may include: Link Harvesting (e.g., running the Link Creator periodically to search the MMR and other systems for new entries, and creating new DOIs and links accordingly); and Ping Testing (e.g., running a program periodically that tests all of the links to make sure they are still valid). Details regarding quality assurance and ping testing are described in U.S. patent application Ser. Nos. 10/470,206 and 10/470,207 and are herein incorporated by reference.

As has already been discussed in FIGS. 1-2 and elsewhere, an enhanced user interface, i.e., the MultiLink menu 175, is available and in this case used by the IntraConnector as well. As such, the user interface of the MMR may also be enhanced 355 so that it allows users to navigate through DOIs to all other linked systems. If the MMR's user interface for searching and browsing is browser-based, then the IntraConnector adds DOI link menus as JavaScript code. The code retrieves the DOI from the DOI Directory and then displays the links in a menu format.

For example, search results display 356 are modified so that when the user clicks on an entry in the results list, or mouses over it, a DOI link menu appears 357, allowing the user to navigate to the asset, to a preview or thumbnail, or to other information. This intuitive user interface enhancement a type of "glue" that ties the IntraConnect system together from the user's perspective.

In addition, after the IntraConnector is deployed, a publisher may wish to register some of the DOIs created as part of the process to the Global DOI Directory 113. For the content assets referenced by those DOIs, registration will enhance their discoverability and help the publisher implement a wide range of possible online content services—all of which would then be readily integrated into the publisher's content infrastructure.

Multilink Syndication

Figure 4:
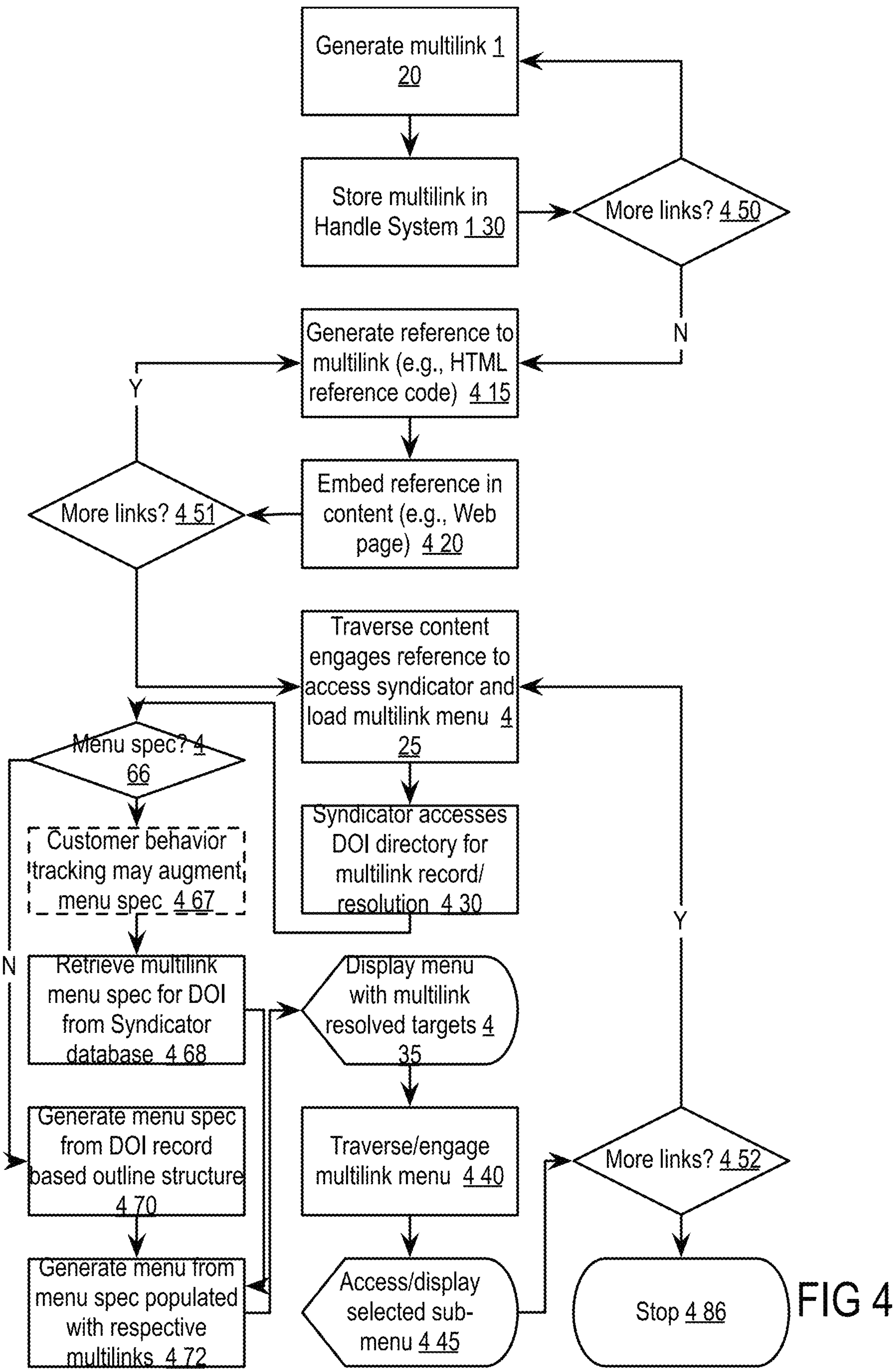
FIG. 4 is of a logic flow diagram illustrating embodiments of a MultiLink syndication.

FIG. 4 is of a logic flow diagram illustrating embodiments of a MultiLink syndication. For MultiLink syndication to proceed, MultiLinks need to be generated 120. Generation of MultiLinks has already been discussed (e.g., the Autolinker) in FIGS. 1-2 and throughout 120. Once the MultiLinks are generated, they are stored in the Handle system 130. These may be stored in either or both a global DOI directory 113 or a local one 305. In the case of a local DOI directory, syndication may spread the links widely, but only people with access to the local system will be able to reference and/or otherwise access the referenced content assets. Link generation and storage is an activity unto itself that may continue independently as long as there is a desire to generate MultiLinks for content assets; as such this may proceed 450, 120 as long as required and independent of the following components of syndication 450, 415, et seq.). If MultiLinks are stored 450, then references to the MultiLinks may be generated 415. As has already been discussed, scripts may be generated to provide a reference to the MultiLink. In one embodiment, the reference is generated by embedding a link to a Syndicator in a call for a script, e.g., Javascript. It should be noted that the Syndicator itself may be identified with a DOI. In addition to the Syndicator link calling Javascript, an identifier of the MultiLink is put into the reference. Once the MultiLink reference has been generated 415, the reference may be embedded into content; for example, it may be embedded as HTML into a Web page 420. In another embodiment, the references may be embedded into MIME and/or HTML formatted email. By embedding references to the MultiLink, propagation of the MultiLink may commence. This generation and embedding are also an activity unto itself that may continue independently 451 as long as there is a desire to spread word of the MultiLink and it is independent of the following components of syndication 451, 525, et seq. However, once the references have been embedded 420,451 or if there is no desire to reference more links 451, then traversal through MultiLinks becomes possible 425.

Once the MultiLink references are embedded in content 420, when a user and/or system traverses upon the content with the reference, the retrieval and viewing of the content engages the embedded reference and accesses the Syndicator 425. The Syndicator receives a request for the MultiLink reference and for a script to provide the MultiLink menu. In one embodiment, upon receiving the request, the Syndicator accesses the DOI directory for the referenced MultiLink 430. In so doing, the Syndicator requests the MultiLink record from the DOI directory. The Syndicator then determines if a menu specification is available for the MultiLink. In one embodiment, the Syndicator searches its own database for a MultiLink menu specification by employing the MultiLink DOI as a search query. As will be discussed in greater detail in FIGS. 16-20, the menu specification may be augmented by making use of end-user activity tracking 467. In one embodiment, tracking statistics are captured dynamically and continuously and used to automatically augment menu specifications 467. In another embodiment, augmentation of menu specifications occurs periodically, e.g., updated at specified intervals with cron jobs. If the Syndicator finds a menu specification 466, then it retrieves the menu specification for the MultiLink 468, otherwise the Syndicator will generate a menu specification for the DOI record based on its hierarchical structure 470. The menu specification and generation were already discussed in FIG. 2 220 and throughout. After the menu specification is generated it may be stored in the Syndicator's database. In one embodiment, the menu specification may be saved in the MultiLink record in the DOI directory along with the Javascript code required to render the MultiLink menu. This may be achieved by adding the entries into the MultiLink record for the menu specification and the Javascript code each, which will be shown in greater detail in FIGS. 5-6 and throughout.

Once a menu specification has been obtained 468, 470, the Syndicator will generate a MultiLink menu populated with the respective MultiLinks as specified by the MultiLink menu specification. This already has been discussed in FIG. 2 277. Further to that discussion, Javascript, Java, Python, Perl, and any number of scripting languages may be used to call upon graphics libraries to actually build and display a pop-up menu widget populated with menu items from the menu specification, responsive to user selections following the MultiLink references. Using the scripting language call to a UI widget call for a menu, the menu specification items are placed into the code calling for the widget so that the UI pop-up menu widget displays the items specified by the MultiLink menu specification. For example, HierMenus (<http://doi.contentdirections.com/mr/cdi.jsp?doi=10.1220/product1>, <http://www.hiermenuscentral.com>) by Peter Belesis may be used to generate the pop-up as specified by the menu specification.

Once the code has been generated, it is provided back to the requesting client and the client's Web browser may then interpret the code and display the MultiLink menu with resolved targets 435. Should the user traverse the MultiLink menu and engage any of the MultiLink menu items 440, then the users Web browser will be instructed to traverse to the item's corresponding MultiLink reference, thereby, resulting in the Web browser displaying the target of the MultiLink 445. Should the user encounter more embedded MultiLink references 452, then they may continue traversing content 425, otherwise syndication of the MultiLink has been successfully achieved 486.

Another aspect of the Syndicator is its ability to generate MultiLinks and menus for wide distribution. In one embodiment, a user may have an "Add this Link to Your Site" menu item, which permits viral distribution of DOI MultiLinks by enabling any end user who encounters a DOI anywhere to simply "Add this Link" (see 667 of FIG. 6) to their site by copying/pasting generated HTML (see 669 of FIG. 6) to their own Web page. As such, when a user selects the "Add this Link" menu option, they are taken to the "Syndicator" page (see 669 of FIG. 6) where they may then copy/paste the two lines of HTML (see 669 of FIG. 6) in order to place/embed the HTML on their own site so that the DOI menu will now be rendered by the Syndicator on their own site. In another embodiment an "Email this DOI to a friend" menu selection (see 1507 of FIG. 15) will provide the user with the DOI link (e.g., by placing the DOI into clipboard memory, and/or by messaging the user's email client to make a new email and pasting the DOI into the subject and/or body of the email). Details regarding viral and P2P distribution are described in U.S. patent application Ser. No. 10/470,206 and are herein incorporated by reference. For example, the content itself (and/or its DRM wrapper, if there is one) may contain a DOI MultiLink, and therefore being capable of prompting the user to "Add this Link" to their site. In one embodiment, the "Add this Link" and/or "Email this DOI to a friend" options are generated as part of the MultiLink menu specification by default, and as such, every MultiLink would offer them as menu options. In such an embodiment, there are many scenarios in which these ad-hoc features can be utilized, i.e.: embedded within content itself (and/or its DRM wrapper) as just described; finding a DOI within search engine results; seeing a DOI on a Web site; receiving a DOI via a direct-marketing email; receiving a DOI via a hospital and/or doctor's notification (see 1505 of FIG. 15); seeing a DOI within the "now playing" window of a music player or video player (see 1510 of FIG. 15); embedding it in someone's contact info (e.g., within an email or within a document such as a resume or a proposal); receiving it via a personal email.

Handle Editor

FIGS. 5-6 are of diagrams illustrating embodiments of a MultiLink menu editor and personal DOI. The figure shows a Web browser 501 viewing a Web page with an embedded MultiLink 514, 515. The embedded code 514 actually results in the image 515 responsible for generating the MultiLink menu 510. As a user moves their cursor over the image 515, the MultiLink menu 510 will manifest itself as has already been described. The makeup of the MultiLink menu is controlled in large party by the menu specification and the MultiLink's DOI record. As has already been discussed, should a menu specification not exist, one can be generated from the MultiLink DOI record. As has been discussed, an Autolinker and/or the Syndicator may generate a MultiLink menu specification as needed. Further, a MultiLink editor may also generate a menu specification and in addition, it may modify the DOI MultiLink record in the DOI directory.

FIG. 5 introduces a MultiLink editor 520 as accessed via a Web browser 501. In one embodiment, the user engages the MultiLink editor 520 by directing their Web browser 520 to the appropriate location to edit a handle 577. As will be discussed in greater detail in FIGS. 16-20, the MultiLink editor may be used to modify menu entries as driven by end-user tracking, by advertising placement, and/or the like. Allowing those responsible for the MultiLink menus to hand-edit the menus upon reflecting on tracking information will improve their efficacy. Once at the MultiLink editor, the user may specify the handle record that they wish to edit by supplying a DOI 577. Upon signing into the MultiLink editor (e.g., by supplying a username and password to gain access to DOI records in the DOI directory), the user supplies a DOI reference and the DOI directory will access the DOI MultiLink record and display it 525 in the Web browser. The editor provides various facilities to edit and access 555 and make changes to 527, 540, 545 the constituent elements 530, 535 of the DOI MultiLink record 525.

In addition, the MultiLink editor provides a mechanism, e.g., check boxes 533, to generate a MultiLink menu specification. In one embodiment, the checkboxes 533 are all enabled by default, and as such, when an Autolinker, Syndicator, or the MultiLink editor are called upon to participate in generating a MultiLink menu, and if there is no MultiLink menu specification available, all entries in the MultiLink record 525 that have enabled checkboxes 533 will be used to generate the menu specification, while all unselected checkboxes 534 will not be a part of the menu specification. As such, by adding a menu_view_specification field 533 in the MultiLink record, every MultiLink record may have a master menu specification. It should be noted, that alternative and/or added menu specifications may simply be added as additional links into the MultiLink no different than adding a "Contact Info" 530 link.

In addition, the MultiLink editor provides a facility for access control 544. MultiLink owners may limit access to certain links to certain groups. For example, certain links may only be accessed by the owner, other links accessed by groups known to the owner, and yet other links may be accessed by everyone. In one embodiment, this is achieved by providing a link entry specifying origin points that are allowed to access the link. For example, if a user wants all his friends at a particular company to have access to a link, then they might provide a domain of www.friendscompany.com as being the only origin point for which the link will be displayed. Thus when a DOI directory and/or Syndicator is participating in the resolution of a MultiLink, it may determine that the request is, or is not coming from a point of origin for which a MultiLink should be viewed; and thus the menu specification may be edited on the fly disabling the entry for points of origin not specified in an access control field entry for a link. In another embodiment, an IP address may be used as the point of origin. In yet another embodiment, a user name and password may be associated with the link, and only those that can supply the username and password will have the link shown. In yet another embodiment, points of origin will be represented by personal DOIs. Another embodiment may use digital certificates and/or keys as a basis for validation; details regarding such digital rights management (DRM) implementations are described in U.S. patent application Ser. No. 10/470,258 and are herein incorporated by reference. As is shown 525, a MultiLink record may represent a person by containing various links pointing to personal information. As such, personal DOIs may be specified as the points of origin for the access control, and users accessing the access controlled links that are known to be coming from points of origin specified in their personal DOIs may gain access. For example, this type of access control is important in the case of patient records, where patients want to control who has access to their medical information.

As may be seen, the personal DOI record 525 contains various links as supplied by the user to represent their person. The MultiLink editor 520 allows a user to edit any MultiLink record. In one embodiment, the editor 520 provides a mechanism to add new record fields 540 and field values 545. For example, should a user wish to add an entry showing their favorite law firm, they may add by specifying the new field name in the editor facility, e.g., textbox, 540. By entering a label 540 and no reference link, e.g., URL 541, the MultiLink editor will create field category with no values other than the provided label. As such, this can generate a first level menu item, under which submenus may appear. To that end, the editor 520 provides a facility to enter subfields 545 and values 546. In the figure, the user entered "Morgan & Finnegan" as a label for a type of "Favorite Law Firm" and also provided a reference link "www.morganfinnegan.com" 546 for the entry. Upon receiving these entries, 540, 545, 546, and upon the user engaging a "Submit" button, the MultiLink editor 520 sends the supplied information to the DOI directory as an instruction to add the appropriate fields to the user's DOI MultiLink record. As can be seen in FIG.

6, once the new fields and values have been submitted, they have been added to the user's DOI MultiLink record 525 and show up 540, 545, 605 as part of the MultiLink record. In one embodiment, a user may add a personal DOI to their email signature, and this would provide others with access to the person's contact and other information through a single link.

The MultiLink editor 520 may manipulate the DOI MultiLink record 525 in a number of other ways as well. As has been mentioned, the editor 520 provides various facilities 555 to edit the record and any metadata. Should a user choose to edit the record 555, a number of options are provided 605, 615, 620, 625, 630. The user may change the primary response page 605, add new items 615 and menus 620 to the record (as has already been discussed), reorder the record's values, and perform various other edits (e.g., cut, copy, paste) 630. For example, should the user wish to reorder the values in the MultiLink editor, and thus affect the ordering of any subsequent menu specifications, they may engage the option to reorder the record values 625 and will be presented with a facility to rearrange the value order 650. By selecting the "Up" or "Down" buttons next to record values, the record order and any subsequent menu specification and thus menu order will be affected. As can be seen, after the above additions and rearrangements of the DOI record values, a menu generated from the menu specification resulting from the DOI record will have the additions and proper menu item ordering 665.

Figure 18:
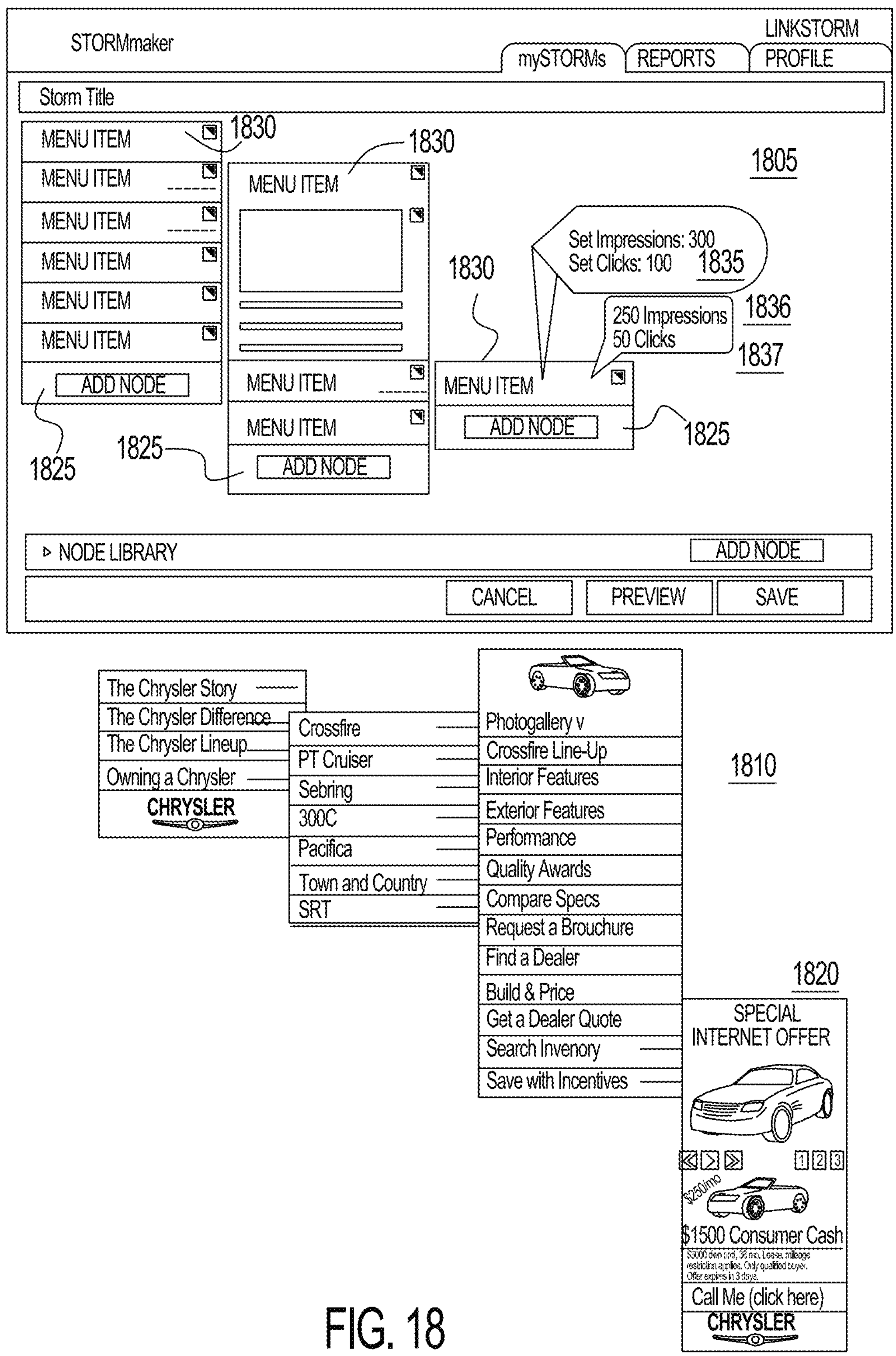
FIG. 18 is of a diagram illustrating graphical embodiments of a MultiLink menu editor.

Momentarily skipping to FIG. 18; it shows a diagram illustrating graphical embodiments of a MultiLink menu editor. This alternative embodiment shows the MultiLink menu editor 1805 and the construction of a resulting MultiLink menu 1810. The editor allows for the creation of additional menu selection items 1825 in each menu tier 1830 of the menu hierarchy. Menu items may simply be selected and the contents may be edited. In addition, usage constraints may be placed on any given menu item 1835. For example, a menu item may be placed so that it will remain in its position for a specified duration (e.g., 250 impressions, 50 clicks, 2 months, etc.) 1835. In one such an example, once the menu item is viewed by 250 end-users or clicked 50 times, it will be removed from its position and replaced. Such constraints are useful for advertising models and the rotation of advertising. In one embodiment, these constrains are added automatically in a "Constraints" field with the generation of a menu specification. In such an embodiment, the Autolinker may set limits for impressions and click-throughs based on sponsorship of menu items. For example, advertisers might bid for placement of menu item ads, ad words, multimedia commercials, and/or the like. The Autolinker will be provided with menu items based on the advertiser's payments for ads. As tracking information is maintained, usage statistics may be compared against the usage constraints, which will cause a change in menu items. Rules may be established as to what happens when usage constraints are reached. In one embodiment, when usage constraints are reached, the menu item is removed from the MultiLink menu. In another embodiment, when usage constraints are reached, the menu item is moved to a less prominent location within the MultiLink menu hierarchy (e.g., it may be moved down and/or deeper within the hierarchy).

IP Addressing

Figure 7:
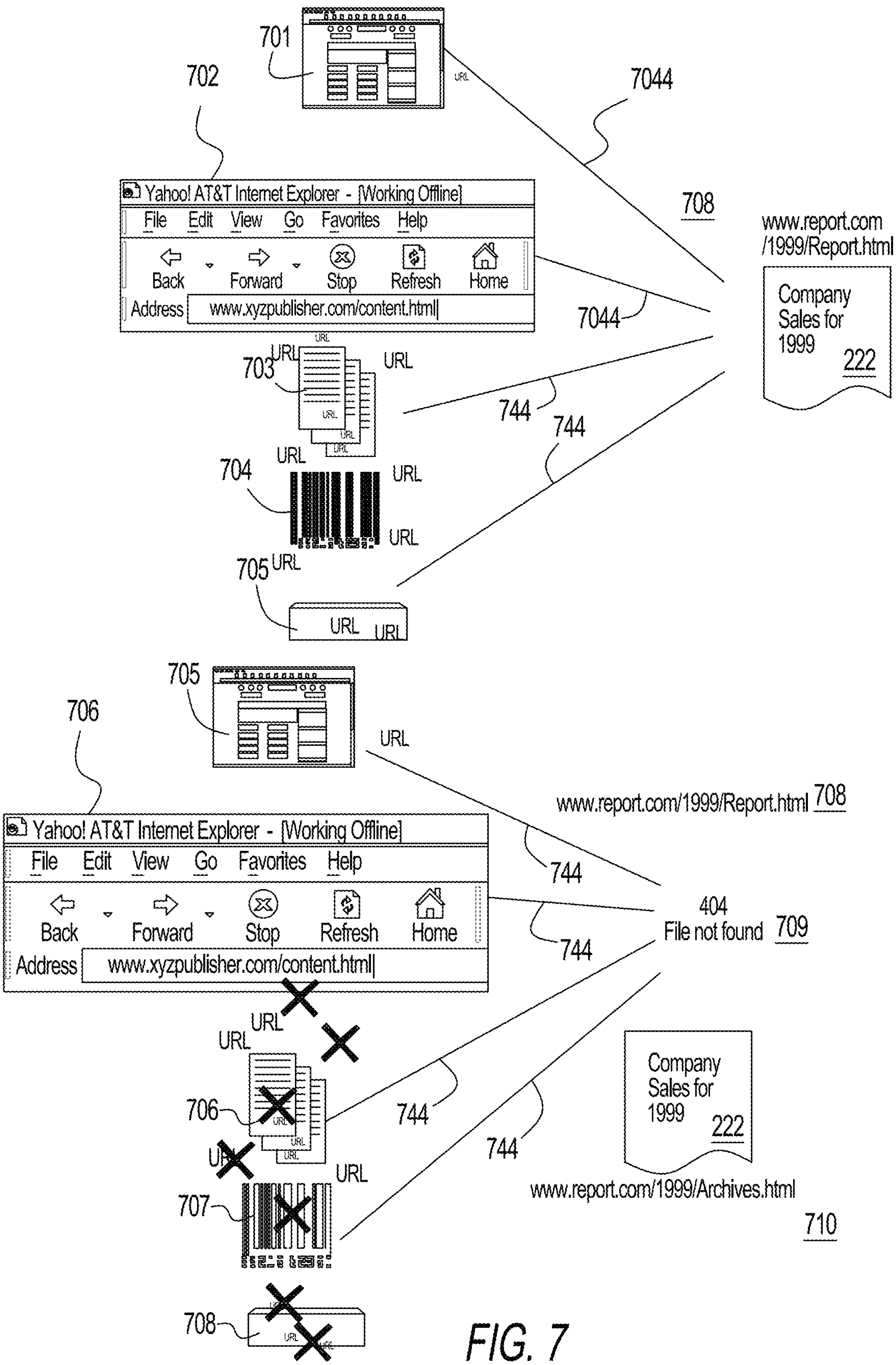
FIG. 7 illustrates IP addressing mechanisms.

Moving back from FIG. 18 to FIG. 7, users access communications networks through addresses. Addresses represent locations. Users traverse locations in a communications network hoping to find information. A communication addressing scheme employs the IP address. The IP address may be likened to the real world by analogy to a street address. The IP address itself is a sequence of numbers, e.g., 209.54.94.99, and commonly has an associated name, e.g., www.contentdirections.com. A distributed database registry maintains the associated pairs of names and IP addresses and serves to resolve associated names into corresponding IP addresses. This allows people to remember and use names, e.g., www.report.com, instead of being forced to memorize and use a series of numbers, e.g., 209.54.94.99. These distributed databases assisting in the name resolution of IP addresses are commonly referred to as Domain Name Servers (DNS).

It is common for IP addresses to be embodied as Universal Resource Locators (URLs) that append even more navigation information into an address. Users may employ software to access information stored at URLs through the use of HTTP. An example is when a user specifies "http://www.report.com/reports/1999/IncomeStatement.html" in a Web browser. This further navigation information, i.e., "/reports/1999/IncomeStatement.html," provides a specific storage location within a computer server. This further navigation location may be likened to a real world address more specific than a street address that includes information such as a company name, department, and room number. This further navigation location is typically not Handled or resolved by DNSs, but instead by an information server at the resolved IP address. For example, an information server at the resolved address of 123.123.123.123 for www.report.com would interpret and return information at a local location of "/reports/1999/IncomeStatement.html" within the server. An Information Server is a means for facilitating communications between a communication network and the computer server at a particular IP address. Commercial examples of an Information Server include Apache. An Information Server may be likened to a mail department for a business that further routes correspondence to appropriate locations within the business.

FIG. 7 illustrates IP addressing mechanisms; namely that they do not maintain an association with information as it moves across a communications network. Web page links generally employ HTTP, which in turn relies on IP addressing. Thus, URL links simply point to a location on a communication network and are not necessarily associated with any specific information. For example, a URL link referencing www.news.com will have different information associated between the URL and the information made available at the www.news.com location as information at the location is updated daily. In many instances, locations themselves may disappear as companies move information, move their operations, go out of business, etc.

For example, a report entitled "Company Sales for 1999" 722 existing at a location www.report.com/1999/Report.html 708 may be moved to www.report-archives.com/1999/Old-report.html 710, e.g., because the information was sold from one entity to another, archived, or for many other reasons. The report at www.report.com/1999/Report.html 708 may have had 5 million Web pages and URL links referencing the location 744, and when users attempt to access the information they may well receive a "404 File not found" error 709 because that location no longer exists and/or no longer contains the desired information. The error results because the DNSs were designed to always resolve users' requests to a location and because DNSs are not designed to maintain an association between URLs and a specific instantiation of information.

The top portion of FIG. 7 depicts a Web page 701, a user entered address 702, a document 703, and a memory device 704 all employing URLs and consequently IP addressing in an attempt to reference a piece of information (the report "Company Sales for 1999") 722. Then in FIG. 7, the information 722 is moved from its original location 708 (for example at www.report.com/1999/Report.html) to a new location 710 of FIG. 7 (for example www.report.com/1999/Archives.html). In FIG. 7, this results in breaking 705-708 all the URLs 244 referencing the location and produces the dreaded "404 file not found" error 709 for all users and URLs making reference to the location (www.report.com/1999/Report.htMl) 708.

Handle System

Once a piece of information has been assigned a DOI and has been made available, the DOI system needs to be able to resolve what the user of the DOI wants to access. The technology that is used to manage the resolution of DOIs is better known as the "Handle System," and will be described in more detail below. THE DOI HANDBOOK provides a general overview of basic DOIs. In a nutshell, the Handle System includes an open set of protocols, a namespace, and an implementation of the protocols. The protocols enable a distributed computer system to store Handles (such as DOIs) of digital content and resolve those Handles into the information necessary to locate and access the content, to locate and access information related to the content, or to locate and access (i.e., provide an interface to) services associated with the content. This associated information can be changed as needed to reflect the current state of the identified content without changing the DOI, thus allowing the name of the item to persist over changes of location and other state information. Combined with a centrally administered DOI registration agency, the Handle System provides a general-purpose, distributed global naming service for the reliable management of information and services on networks over long periods of time. It is important to note that throughout the present disclosure that "source," "content" and/or "information" made accessible through the DOI system may comprise any identifiable content, source, information, services, transactions, and work of authorship, including articles, books, intangible objects, music albums, people, tangible physical objects, and/or the like further including selected discrete portions and/or combinations thereof. The accessible information may be a URL to an application that initiates a service, a transaction, provides a selection mechanism, and/or the like.

In one non-limiting example, the DOI may even be associated with information identifying a human being such as a social security number, telephone number, and/or the like. In one such embodiment, metadata may be stored in a DOI record.

In one embodiment, the metadata is stored directly in the DOI record as a handle value of a specified type, e.g., DC.Title. Such an embodiment may require the disabling of caching software so that multiple requests are sure to pull the correct value. Thereafter, the metadata may be retrieved by identifying the specified type through retrieval of the handle value. In such a manner, metadata may be stored in a DOI record for any type of DOI, such as but not limited to: personal DOIs, DOI medical records, DOI RFIDs, publication metadata, digital rights management metadata, and/or the like may all use the DOI record as an actual repository of data.

By applying such DOI record storage in the context of personal DOIs, such an embodiment results in a universally available personal identifier. In one embodiment a person may have several such universal personal identifiers. For example, a physician may have a universal physician identifier. This identifier may have a physician's employee number, license number, name, contact information, descriptive specialist information, social security number, and/or the like. Similarly, a patient may have a universal patient identifier having their name, contact information, medical record reference, list of allergies, list of medical conditions, social security number, and/or the like. Such universal IDs would be very useful in allowing doctors and patients to provide a single identifier and not requiring them to repetitively fill out forms with their personal information. In another embodiment, a universal person identifier may take the form of a MultiLink with access controls. In such an embodiment, a person may have their own general information, and information for contexts in which they need to present personal information in different capacities and roles. For example, a universal person identifier can have the more general universal person identifier as one aspect of the MultiLink, and if the person is a physician, it may have the universal physician identifier information included in another aspect of the MultiLink. Further, the physician on occasion is also a patient, and as such may have the universal patient identifier included as another aspect of the MultiLink. Access controls may be used to limit access to various component aspects of the MultiLink only to authorized users; access controls are described in greater detail in FIG. 5 and throughout. For example, the physician may provide his own universal person identifier on a Web site and groups of people accessing it that are not the physician's employer will be limited in viewing only the more generalized universal personal identifier aspects of the MultiLink. However, when the physician uses the universal person identifier at work, the universal physician identifier components of the MultiLink may be accessed by such an authorized group.

In another non-limiting example, the DOI may be associated with software modules, programming "objects," or any other network-based resource. Furthermore, a DOI can be used to represent most anything including the online representation of physical products (e.g., items currently identified by UPC or bar codes). In such an example, DOIs could resolve to the manufacturer's catalog page describing or offering the product, or even, in a multiple-resolution scenario, offer all services related to the object such as where to go to get the item repaired; where to find replacement parts; what the new or replacement product is; what kinds of pricing or leasing options are available, etc. Other example embodiments implementing DOIs include: representing different modules of software that may operate in distributed fashion across a communications network; telephone numbers for Voice-over-IP technology; gene sequences; medical records and/or other permanent records (DOIs will be especially useful with permanent records protected via encryption and/or other method that might invoke a certificate or decryption key); and/or the like. Another example embodiment for a DOI is to represent the permanent location of a temporary and/or dynamic value such as, but not limited to a current stock quote; current bid and offer prices (for stocks and/or any other kind of auction and/or exchange); a company's current annual report (versus different DOIs for different prior-year annual reports); and/or the like.

Users may access information through Digital Object Identifiers (DOIs). DOIs are associated with (i.e., are names for) information itself. DOIs are instances of "Handles" and operate within the framework of the "Handle system." A DOI allows for access to persistently associated information. The DOI is a string of characters followed by a separator further followed by a string of characters, e.g., 10.1065/abc123def. It should be noted and re-emphasized that although the present disclosure may make mention of specific sub-types of UNIs such as "URNs," "DOIs" and "Handles," the present disclosure applies equally well to the more generic types of UNIs, and as such, the present disclosure should be regarded as applying to UNIs in general where any UNI sub-type is mentioned, unless stated otherwise.

Furthermore, although the Handle System, DOIs, and their supporting technologies and conventions, which are in use today, are a contemplated forum for the present invention, it should be noted that it is contemplated that the present invention may be applied to other forums based upon current and yet to be conceived conventions and systems.

DOIs

Users employing DOIs to access information know they will resolve and access only associated information. In contrast to URLs that reference locations, DOIs are names for information, which can be used to look up that information's location and other attributes, as well as related services. It is envisioned that information may be any information as well as any computer-readable files, including e-books, music files, video files, electronic journals, software, smaller portions and/or combinations of any of the aforementioned content as well. It should be noted that since the electronic content will be made available over a communications network, hereinafter this application refers to such available information as being published on a communications network.

A DOI is a permanent and persistent identifier given to a piece of information made available on a communications network and registered in an electronic form, so that even if the location (i.e., URL), format, ownership, etc. of the content or associated data changes, users will be able to access the associated data. DOIs, or Handles, may be distributed to users in lieu of a URL. A user may access information associated with a particular DOI by selecting or entering the DOI in a Handle-enabled Web browser much like a URL hyperlink. Many types of browsers may be enabled by way of browser plug-in software such as the Handle System plug-in available from www.cnri.org. Such an attempt to access DOI associated information triggers an automated process to look up a resource's current location. The current location of the resource is associated with the resource's DOI in a centrally managed directory made available by the Handle System, which in turn directs the user (i.e., the user's Web browser) to the resource's current location. This direction is often accomplished by returning a current URL associated with the selected DOI and corresponding information.

Figure 8:
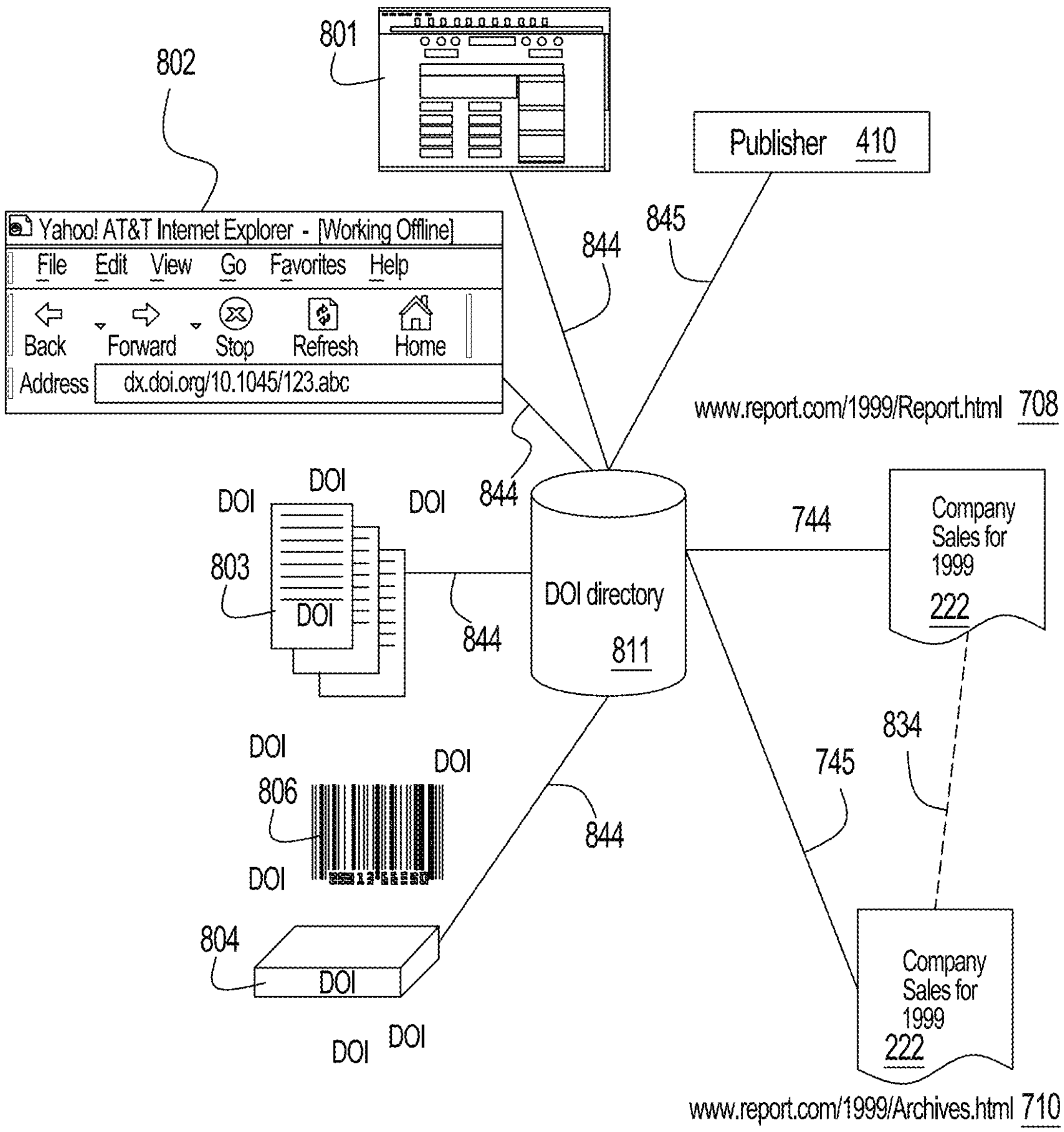
FIG. 8 illustrates the access of information through Digital Object Identifiers (DOIs)
Figure 10A:
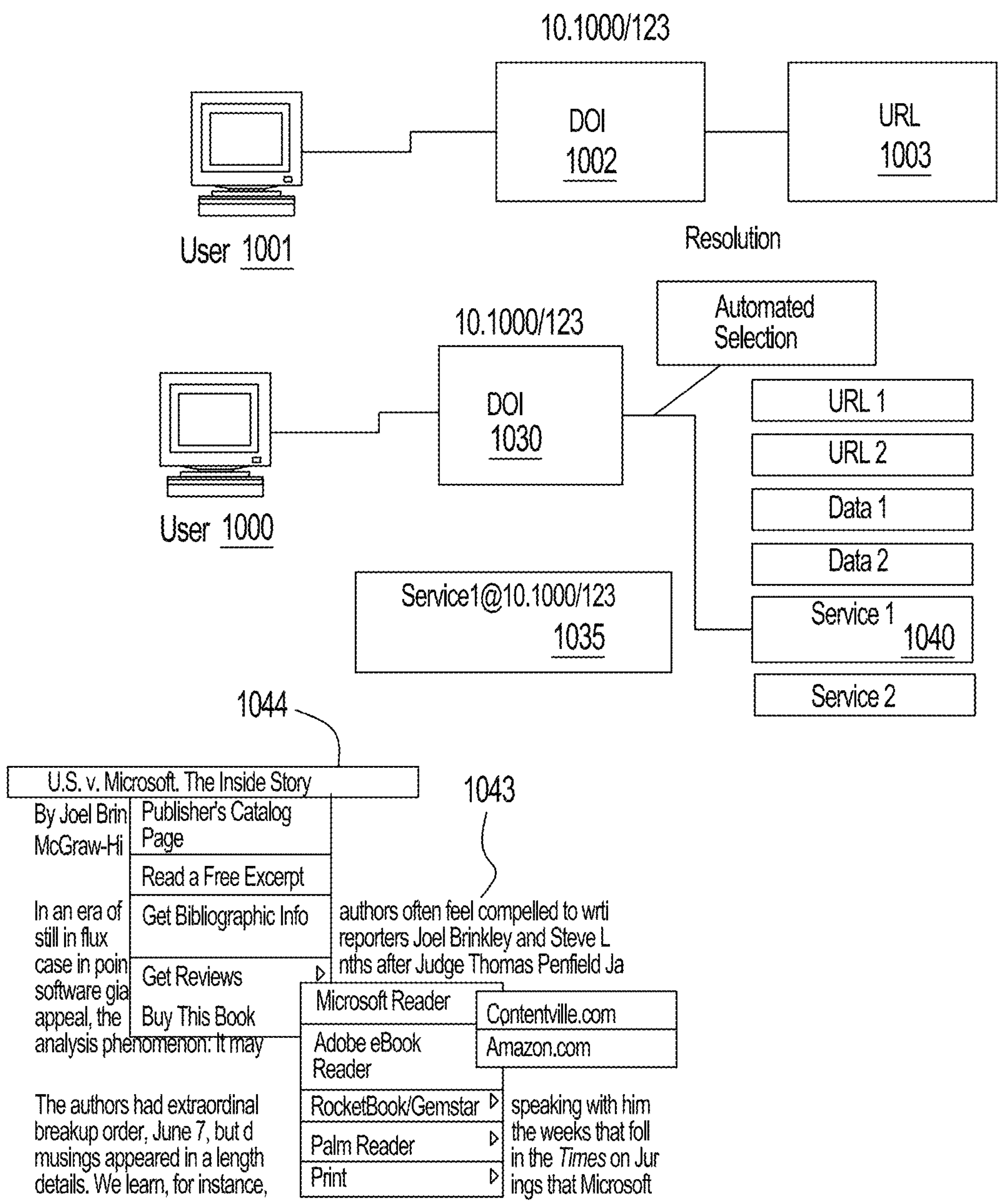
FIG. 10 provides an overview of the resolution mechanism for allowing users to access the desired information.
Figure 10B:
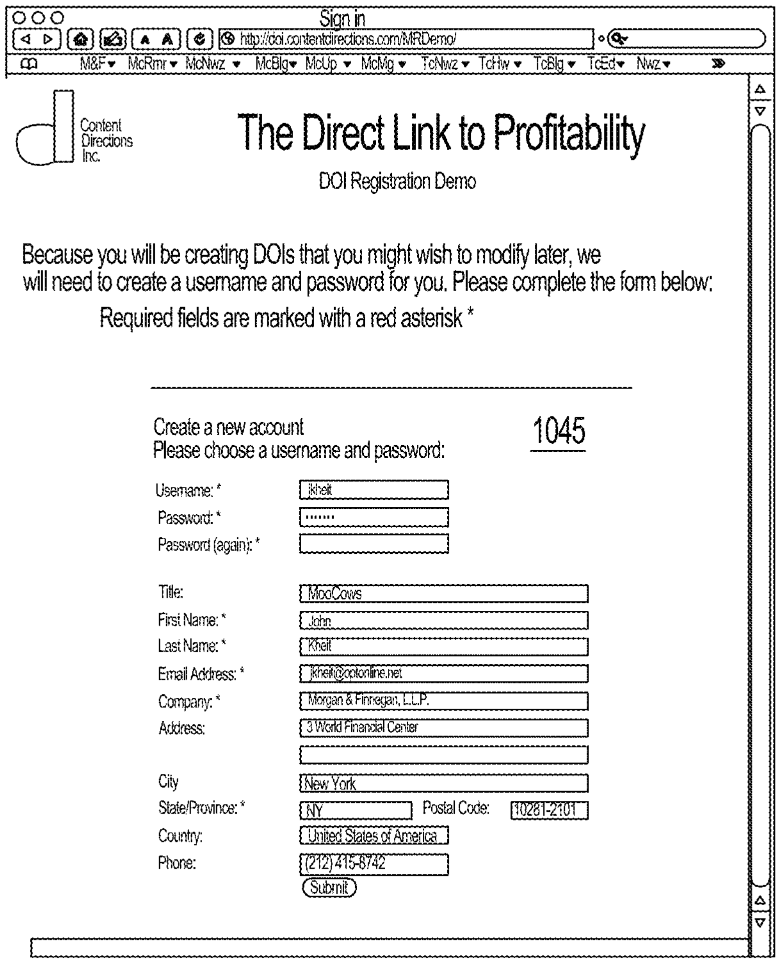
Figure 10C:
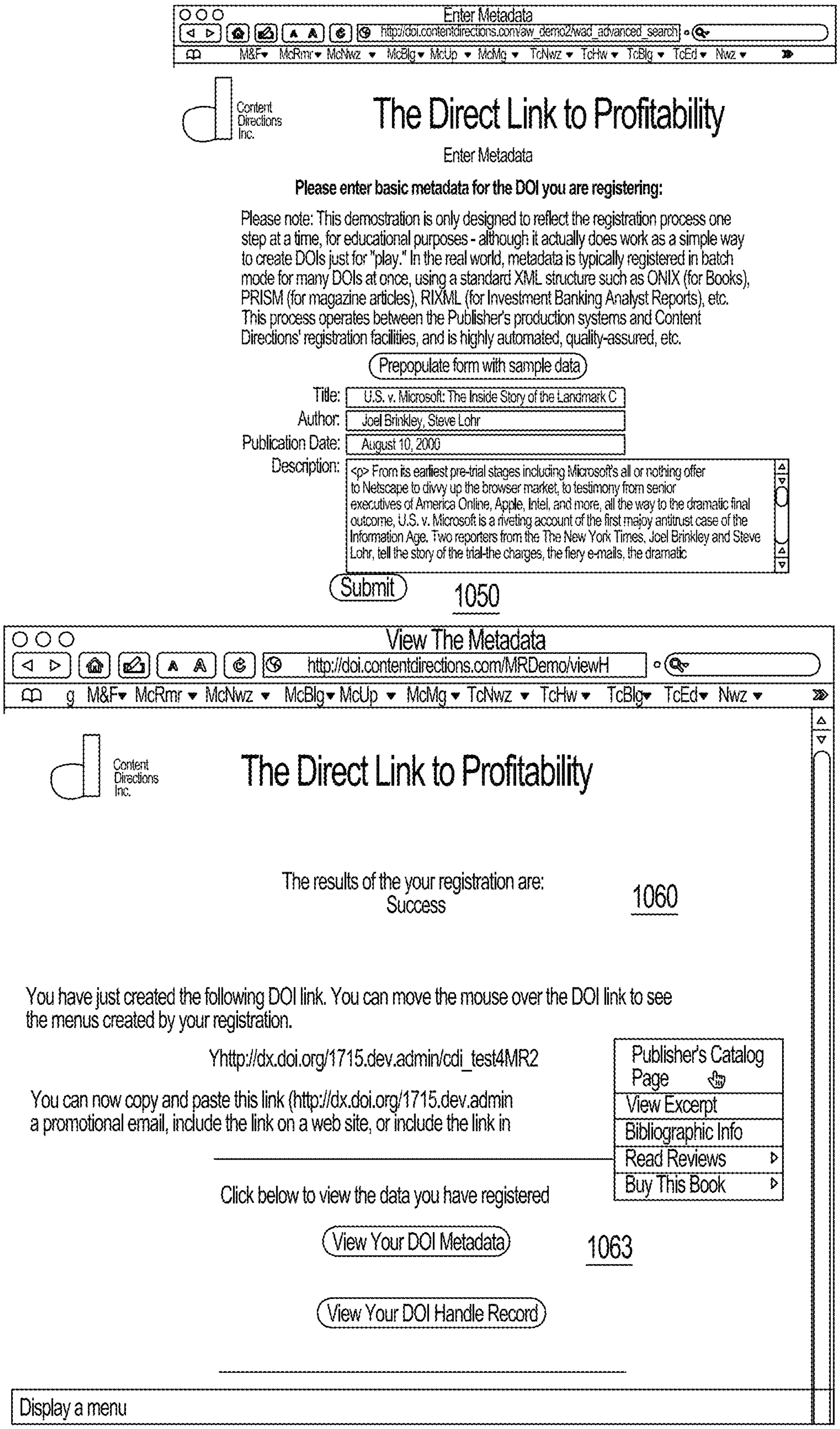
Figure 10D:
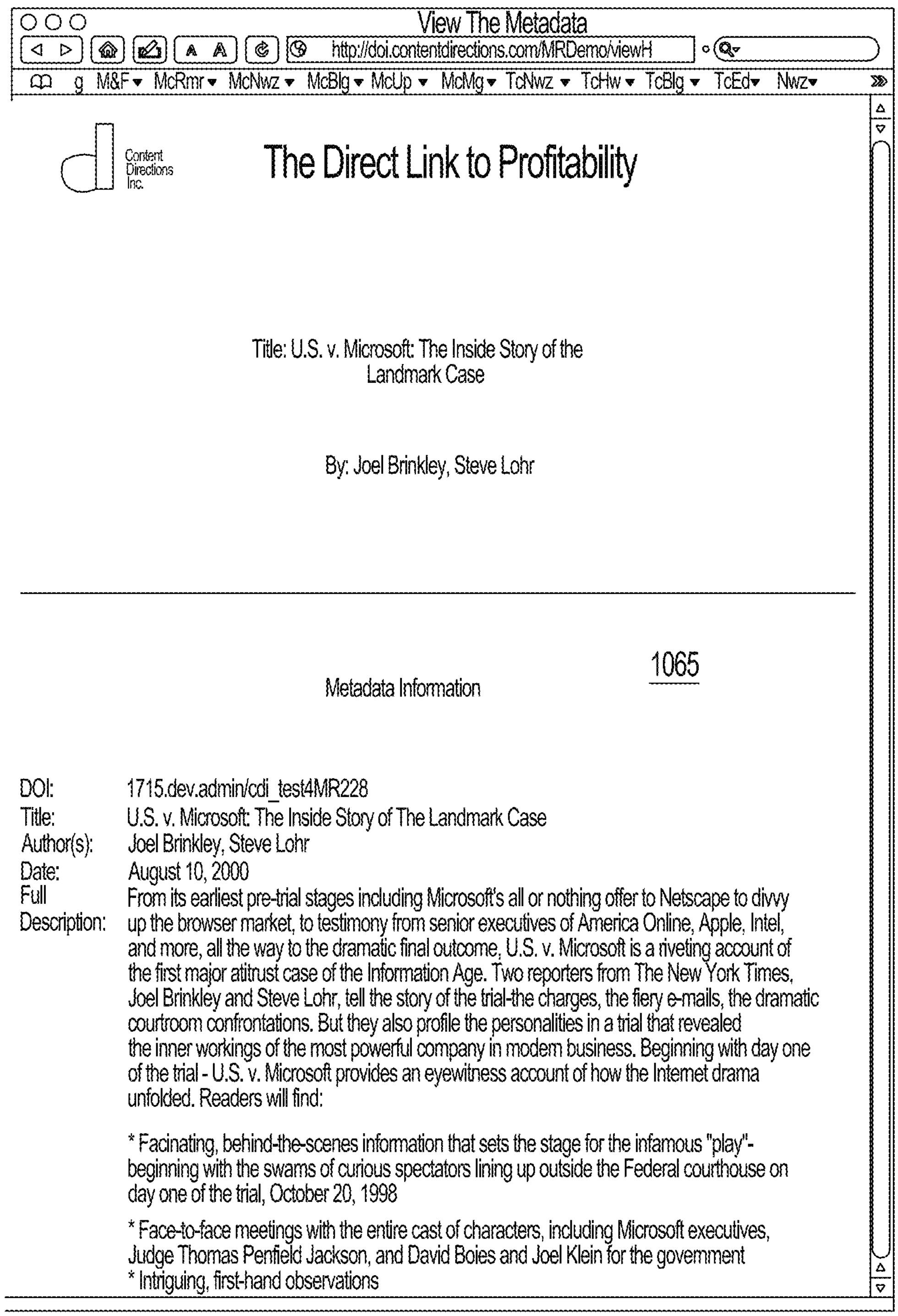
Figure 10E:
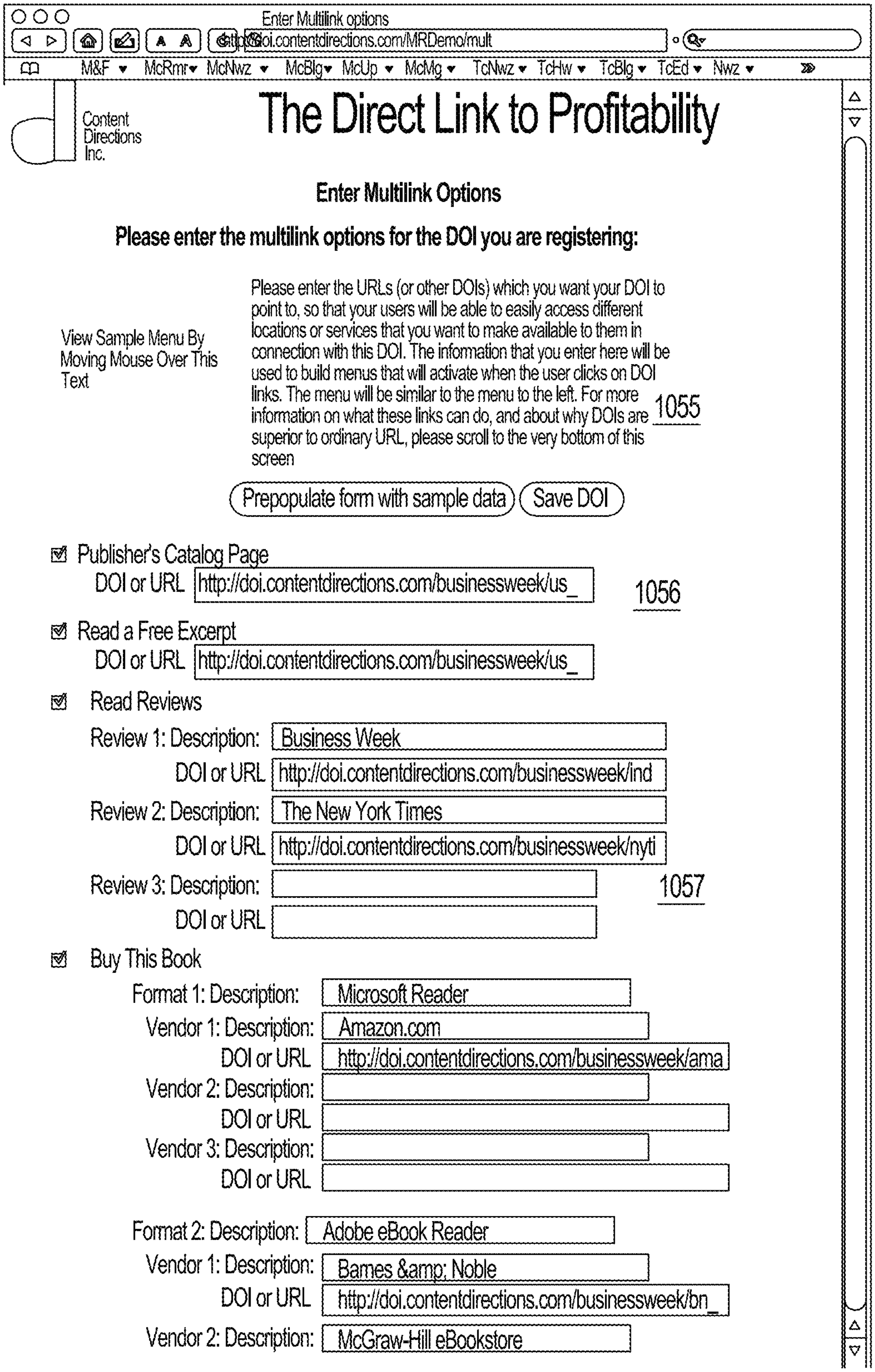

FIG. 8 illustrates the access of information through DOIs in contrast to FIG. 7 above. Initially, the information (report of "Company Sales for 1999) 222 is given a DOI through a registration process. Instead of employing URLs, users reference 844 the information using the DOI through Web pages 801, typed entry in a Web browser 802, documents 803, devices 804, barcodes 806, and/or the like. When users engage the DOI links 844, they are resolved in a centralized DOI directory 811 and the requesting users are given a URL link 744 to the information's 722 initial location (www.report.com/1999/Report.html) 708. Upon the information being moved 834 from its initial location (www.report.com/1999/Report.html) 708 to a new location (www.report.com/1999/Archives.html) 710, the publisher of the information 810 would inform the DOI centralized directory 845 of the new location for the information by sending an updated URL 245 referencing the new location. Thereafter, if users 801-804 attempt to access the information through the DOI links 844, the DOI directory will properly provide the new location 710 by way of the updated URL 745.

As noted above, DOIs may not only be used to identify information, but also smaller portions thereof. For example, according to the DOI system, it is possible for a book to have one DOI, while each of its chapters would have other unique DOIs to identify them; furthermore, each figure in the book may have yet other unique DOIs to identify them. In other words, according to the DOI system, it is possible to identify information with variable granularity as desired by the content publishers. Furthermore, it is envisioned that just as Universal Product Codes (commonly expressed as 'barcodes' on consumer products) allow, for example, a supermarket's cash registers, inventory computers, financial systems, and distributors to automate the supply chain in the physical world, the present disclosure provides a mechanism for employing DOIs to empower all kinds of agents in the world of electronic publishing to automate the sale of digital content (and the licensing of rights to that content) across the Internet in an efficient manner, since each piece of saleable content would have associated with it a globally unique DOI, which could be used as a product identification code in transactions between agents.

Handle System

The Handle System employs a pre-determined set of policies for efficient and user-friendly utilization thereof, some of which of which are listed below. The use of the Handle System for DOI resolution should ideally be free to users, with the costs of operation of the system possibly borne by the publishers (or more generally, DOI owners or registrants). All DOIs are to be registered with a global DOI registry. Registrants are responsible for the maintenance of state data and metadata relating to DOIs that they have registered. The syntax of the DOI follows a standardized syntax. In use, the DOI will be an opaque string (dumb number). DOI registration agencies will manage the assignment of DOIs, their registration and the declaration of the metadata associated with them.

FIG. 9 provides a schematic view of a Handle 900. A Handle 900 has two components, the prefix 901 and the suffix 902. The prefix 901 and the suffix 902 are separated by a forward slash 907. The Handle 900 may incorporate any printable characters from almost every major language written or used today. There is no specified limitation on the length of either the prefix 901 or the suffix 902. As a result, it is envisioned that there are an almost infinite number of Handles available. It is important to ensure that the combination of the prefix 901 and the suffix 902 is unique for supporting the integrity of the Handle System. Thus, the DOI registration agency will award a unique prefix 901 to a publisher. In one embodiment, the registration agency may put the responsibility on these publishers for ensuring that the suffix 902 assigned is unique as well. This may be achieved with a registration tool running on the user's client computer system. In another embodiment, the registration agency will ensure that the suffix 902 is unique by applying various suffix generation algorithms as discussed throughout this disclosure. The Registration Agency and the Handle System administrators will both verify uniqueness of any new Handle before depositing it in the Handle System. The Registration Agency deposits DOI records with the Handle System. The Handle System in turn services DOI resolution requests through a DOI directory.

The prefix 901 itself has two components separated by a prefix separator 906, which is a period. The first part of the Handle prefix is the Handle type 904. The second part of the Handle prefix is the Handle creator 905. The Handle type 904 identifies what type of Handle system is being used. When the Handle type 904 starts with a "10" the Handle is distinguished as being a DOI as opposed to any other implementation type of the Handle System. The next element of the prefix, separated by a period, is the Handle creator 905, which is a number (or string of characters) that is assigned to an organization that wishes to register DOIs. Together, these two elements 904 and 905 form the unique publisher prefix portion of the DOI. There is no limitation placed on the number of Handle (or specifically DOD prefixes that any organization may choose to apply for. As a result, a publishing company, for example, might have a single DOI prefix 901, or might have a different one for each of its journals, or one for each of its imprints. While generally a prefix 901 may be a simple numeric string, the scope of the Handle System is not limited thereby. Thus, a prefix 901 may also utilize alphabetical characters or any other characters.

The suffix 902 is a unique string of alphanumeric characters, which, in conjunction with a particular prefix 901, uniquely identifies a piece of information. It should be appreciated that the combination of the prefix 901 for a publisher and the unique suffix 902 provided by the publisher avoids the need for the centralized allocation of DOI numbers. The suffix 902 may be any alphanumeric string that the publisher chooses, so long as it is unique among all suffixes registered in conjunction with the publisher's prefix.

FIG. 9 also provides a view of another embodiment of the DOI 990, in which a textbook's ISBN number serves as the suffix 902. Consequently, where it is convenient, the publisher of the underlying content may choose to select as the suffix 902 any other identification code accorded to the original piece of content.

Enhanced DOI

FIG. 9 further illustrates an enhanced DOI 910 grammar. One non-limiting example embodiment of an enhancement to the DOI grammar is embodied as an enhanced prefix 911. However, it is fully contemplated that an alternative and/or complimentary enhanced suffix (not illustrated) may be similarly appended to the DOI 900. The enhanced prefix 911 is comprised of an enhancement grammar target 917 and enhancement separator 914, which is an "®" symbol, but it is understood any other character may be designated as the enhancement separator. The enhancement grammar target 917 may itself be any string of characters other than the enhancement separator 914. The enhancement grammar target 917 may be employed for the purpose of having the DOI 900 resolve to multiple versions of a specified information as will be described in greater detail throughout this disclosure. In a further enhanced embodiment, the enhancement grammar target 917 may itself be further comprised of an enhancement grammar verb 912 and enhancement grammar target object 913 separated by an enhancement target separator 916, e.g., a period. The enhancement target separator 916 may be designated as any character(s). In one example embodiment, the enhancement grammar verb 912 acts as a modifier to select amongst a plurality of multiple resolution targets for a DOI, and the enhancement grammar target object 913 is a value passed to the target object and/or a Handle system resolution server for further action.

Handle System Metadata

A DOI 900 is merely an identification number that does not necessarily convey any information about its associated information. As a result, it is desirable to supplement the DOI with additional information regarding the addressed information to enable users to perform efficient and user-friendly searches for retrieving the desired content over a communications network. To allow easy identification of information, the present invention provides for the use of metadata, which is descriptive data about the identified information. While metadata may be any data-structure that is associated with a DOI, according to one embodiment, the metadata will be comprised of a few basic fields that can accurately and succinctly identify the published information. According to this embodiment, the metadata will comprise an identifier associated with the entity from a legacy identifier scheme such as the International Standard Book Number (ISBN) for a book, title of the published content, type of content being published (such as book, music, video, etc.), whether the content is original or a derivation, a primary author of the content, the role of the primary author in creating the content, the name of the publisher, and/or the like. As different types of content may require different metadata for describing it, one aspect of the DOI system envisions the use of different metadata for different types of content.

According to one example embodiment, metadata will be made available to any user of the DOI system to enable them to find the basic description of the entity that any particular DOI identifies. This basic description will allow the user to understand some basic things about the entity that published the content or the content itself.

As a result, to find out what information the DOI identifies, it is desirable to resolve it, and then review associated metadata because the DOI links the metadata with the content it identifies and with other metadata about the same or related content. In one embodiment, the metadata allows for the recognition of the information identified by the DOI 900 as well as its unambiguous specification. The metadata will also allow for the interaction between the information and other contents in the network (and with metadata about those entities).

DOI Information Access

FIG. 10 provides an overview of the resolution mechanism for allowing users to access the desired information by merely providing the DOI to the DOI Handle system. Resolution in the present context includes the submitting of an identifier to a network service and receiving in return one or more pieces of current information related to the identifier. According to one embodiment of the DOI system, shown in FIG. 10, the user uses her Web browser 1001 client to point to content identified by a particular DOI 1002. This DOI 1002 has only one URL associated with it, and must resolve to that URL. As a result, when the user makes a request for underlying content identified by a particular DOI 1002, the user is directed to URL 1003, where the desired content lies.

As such, this mechanism allows the location of the information to be changed while maintaining the name of the entity as an actionable identifier. If the publisher changes the location of the content, the publisher must merely update the DOI's entry in the Handle System database to ensure that the existing DOI 1002 points to the new location of the content. As a result, while the location of the content has changed, the DOI remains the same and users are able to access the content from its new location by using the existing DOI.

FIG. 10 provides an overview of a DOI system where users may use a DOI for resolving a request for one piece of content, out of a plurality of available identical copies of the same piece of content that are identified by the same DOI, as well as the location of data about the piece of content, and services associated with the content (such as purchasing the content). Thus, the user uses the Web browser 1000 and provides the necessary DOI 1030. The DOI 1030 may be structured to describe the type of service desired 1035. As a result, the DOI system is able to resolve the particular piece of content 1040 that the user desires to access.

In one embodiment, the format for storing multiple resolution options for a given DOI in the Handle System may be expressed as a hierarchical dropdown menu in the browser using DHTML and JavaScript.

An example of a MultiLink menu is shown 1043. Upon clicking on a multiple resolution hyperlink 1044, the user is presented with a list of link choices which can be one or more layers deep 1043. In the example 1043, the user has traversed two submenus to choose a link to buy the Microsoft Reader version of an ebook at Amazon.com.

As shown, this menu is a widget implemented with DHTML and JavaScript. The widget is loaded with data obtained from the Handle System and converted into JavaScript data structure as is described in greater detail below. In one embodiment, the format of the Handle record is composed by the following five components:

1. Multiple resolution records are assigned two new Handle data type: MULTIRES and MULTIRES_MAP.

2. A given handle can have multiple MULTIRES values (differentiated by different index values), and can optionally have one MULTIRES_MAP.

3. Each MULTIRES value is comprised of two logical units delimited by an equal sign (ASCII 0x3D): a label and a URL. The label portion is used as the displayed text for the URL hyperlink. In the case where a URL is not relevant (e.g., a submenu name), the URL portion is omitted.

4. The MULTIRES_MAP value describes the hierarchy of the menus and submenus defined by the MULTIRES values. The MULTIRES_MAP value is comprised of recursive menu lists delimited by curly braces. The listed items are the indices of the MULTIRES values.

5. In the absence of a MULTIRES_MAP value, then a flat hierarchy is assumed (i.e., no submenus), and items are displayed in the order of their MULTIRES index values.

The following table shows an excerpt of the handle record for the multiple resolution link depicted 1043. Any DOI application should be able to obtain this Handle Record and extract the labels and URLs necessary to present the correct multiple resolution options to the user.

| Type | | Value |
|---|---|---|
| . | . | . |
| . | . | . |
| . | . | . |
| MULTIRES | 1000 | Publisher's Catalog Page = http:/ /. . . |
| MULTIRES | 1001 | Read a Free Excerpt = http:// . . . |
| . | . | . |
| . | . | . |
| . | . | . |
| MULTIRES | 1007 | Buy This Book |
| MULTIRES | 1008 | Microsoft_Reader |
| MULTIRES | 1009 | Contentville.com = http:// . . . |
| MULTIRES | 1010 | Amazon.com = http:// . . . |
| MULTIRES | 1011 | Adobe eBook Reader |
| MULTIRES | 1012 | Barnes & Noble = http:// . . . |
| . | . | . |
| . | . | . |
| . | . | . |
| MULTIRES_MAP | 1030 | { 1000 1001 1002 1003 1004 { 1005 1006 } 1007 { 1008 { 1009 1010 } 1011 { 1012 1013 } . . . } } |

In one embodiment, the creation of a MultiLink is achieved through a series of Web pages 1045-1070. As can be seen, an owner for the MultiLink must be established 1045 by first entering owner/account information, which allows for the control/creation of the MultiLink. Then the user may enter metadata regarding the MultiLink, e.g., Title, Author, publication date, descriptions, etc. 1050. Next, the user may provide multiple resolution instances in a hierarchy 1055. For example, reviews of the work may resolve to one location 1056, while the ability to purchase the book may resolve elsewhere 1057. Once the MultiLink resolutions are populated and submitted, a MultiLink 1060 and menu are generated. The user may then view 1063 the metadata information 1065 and MultiLink DOI record as stored in the handle system directory 1070.

Figure 11:
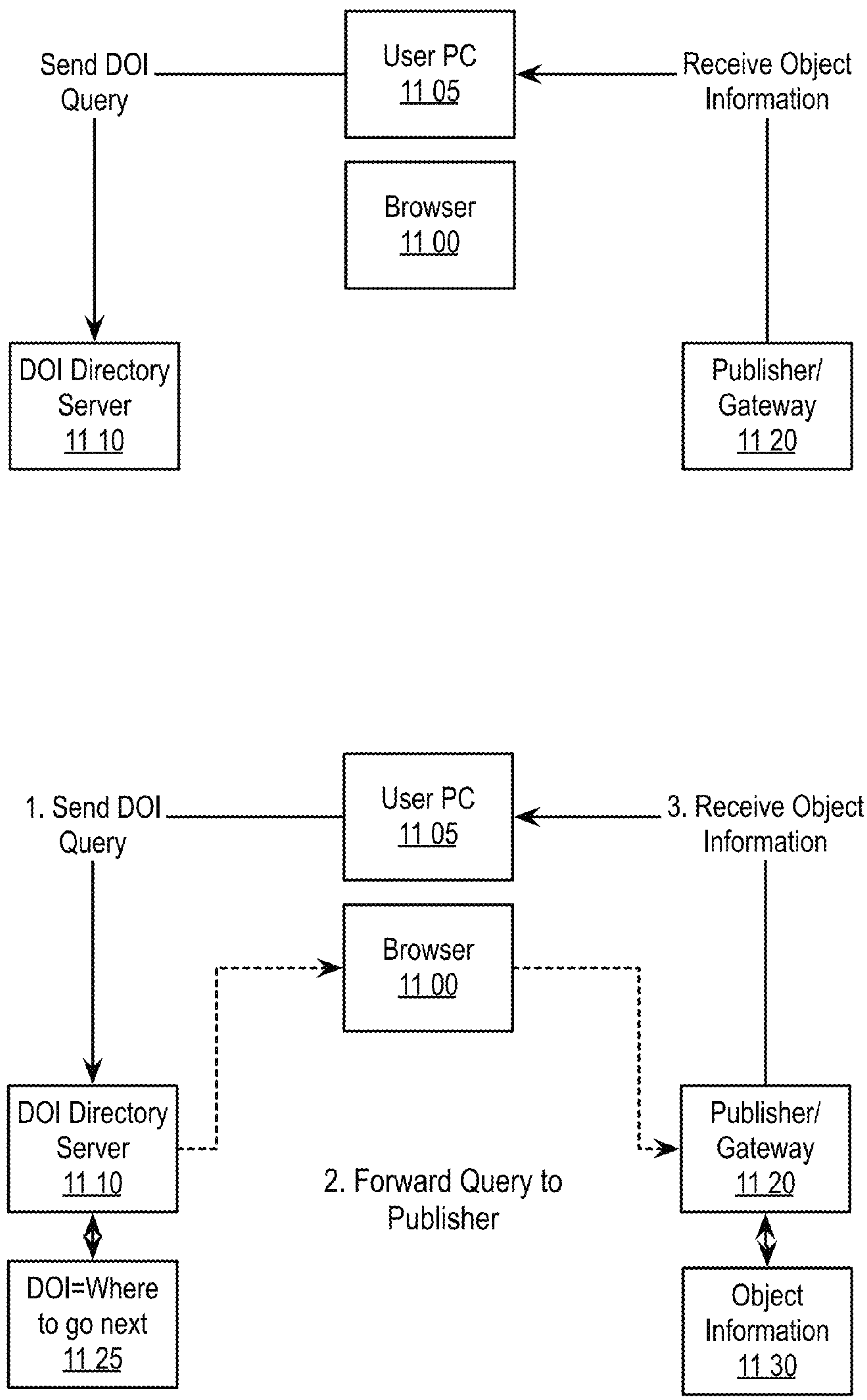
FIG. 11 provides an overview of the sequence of actions that a user performs to access information.

FIG. 11 provides an overview of the sequence of actions that a user performs to access information, in accordance with the present invention. Initially, the user launches the browser client 1100 on a computing device 1105, such as personal computer, personal digital assistant (PDA), and/or the like. The user engages the browser 1100 to make a DOI query. The DOI query is forwarded to the DOI Directory Server 1110 over a communications network. The system of the DOI Directory Server 1110 examines the DOI against the entries stored therein and forwards the appropriate URL to the browser 1100 on the user's computer 1100, in a manner that is invisible to the user. As a result, the browser is pointed to the desired content on a server with the appropriate publisher information 1120. Finally, upon receipt of the request from the user's browser, the publisher 1120 forwards the desired information to the user, which may be accessed in the browser client 1100.

FIG. 11 continues to provide a more complete view of the sequence of actions that a user performs to access content information. As noted above, the user launches the browser client 1100 on a computing device 1105. The user engages the browser 1100 to make a DOI query. The DOI query is forwarded to the DOI Directory Server 1110 over the communications network. The system of the DOI Directory Server 1110 examines the DOI against the entries stored therein. As a result of the checking of the DOI against the entries stored in the DOI Directory Server 1110, the DOI Directory Server 1110 determines where the DOI must lead the user 1125. The appropriate URL for the content is automatically forwarded to the user's browser 1100, without any intermediate intervention or action by the user. As a result, the browser 1100 is pointed to the appropriate publisher 1120 whose server is addressed by the underlying URL. The URL is used by the publisher's server 1120 to determine the exact location for content desired by the user, and the publisher's server 1120 forwards the appropriate content 1130 to the user.

FIG. 12 provides an overview of some of the exemplary mechanisms for accessing information over a communications network by resolving a DOI to obtain the URL where the desired content is located, in accordance with the present invention. According to one embodiment, the user may directly provide the DOI and the DOI system retrieves and forwards the appropriate content to the user by simply linking to the appropriate URL. According to another embodiment, the user may provide information related to some of the fields included in the metadata, whereupon a DOI lookup service identifies the appropriate DOI, which in turn may be resolved to the desired content's location. As shown in FIG. 12, according to one embodiment, a search engine 12010 may be provided to a user. In one embodiment, the search engine is offered and disposed in communication with the registration agency's DOI and metadata database. In an alternative embodiment, a search engine such as www.google.com may be adapted to submit queries to the registration agency's databases. The user searches for the appropriate DOI by providing some identifying information to the search engine 12010. The search engine 12010 uses the identifying information provided and searches a database of metadata to retrieve the DOI associated with the provided metadata information. Thus, the user conducting the search may be presented with returned DOIs from the metadata database and/or URLs resolved from said returned DOIs. The retrieved DOI is sent to the DOI directory 12011, which resolves the URL wherein the desired content is located by a publisher 12040. Finally, the user's browser is pointed to the appropriate content 12060.

According to another embodiment, the user may provide the DOI 12015 in the address window 12020 of a browser 12025. If the user's Web browser is not capable of natively processing DOIs, then the DOI 12015 may contain the address of a proxy server for the DOI directory 12011, which in FIG. 12 is "dx.doi.org." As a result, the browser is pointed to the DOI directory 12011 located at dx.doi.org, which resolves the URL at which the desired content is located by a publisher 12040 and points the user's browser thereto.

According to another embodiment, the DOI maybe embedded in a document or some form of information 12030, whereupon clicking the DOI directs the user to the appropriate DOI directory 12011, which determines the URL at which the desired content is located and points the user's browser thereto.

According to another embodiment, the DOI may be provided on a memory 12040, such as a CD-ROM or a floppy disk, whereupon the memory may automatically, or upon being activated, direct the user to the appropriate DOI directory 12011, which resolves the URL at which the desired content is located and points the user's browser thereto.

According to yet another embodiment, the DOI may be provided in printed form to a user, who enters the DOI manually as above or by way of optical and/or mechanical peripheral input device.

FIG. 12 provides an overview of another embodiment of the exemplary mechanisms for retrieving information over a communications network, whereupon the DOI system resolves a DOI to obtain the URL where the desired information is located. According to this embodiment, a plurality of DOI directories 1210 exist as a distributed DOI directory and form a Handle System 1200. In one embodiment, the distributed DOI directory acts and responds to requests as if it were a singular directory 12011. Otherwise resolutions take place similarly as in FIG. 12.

Figure 13:
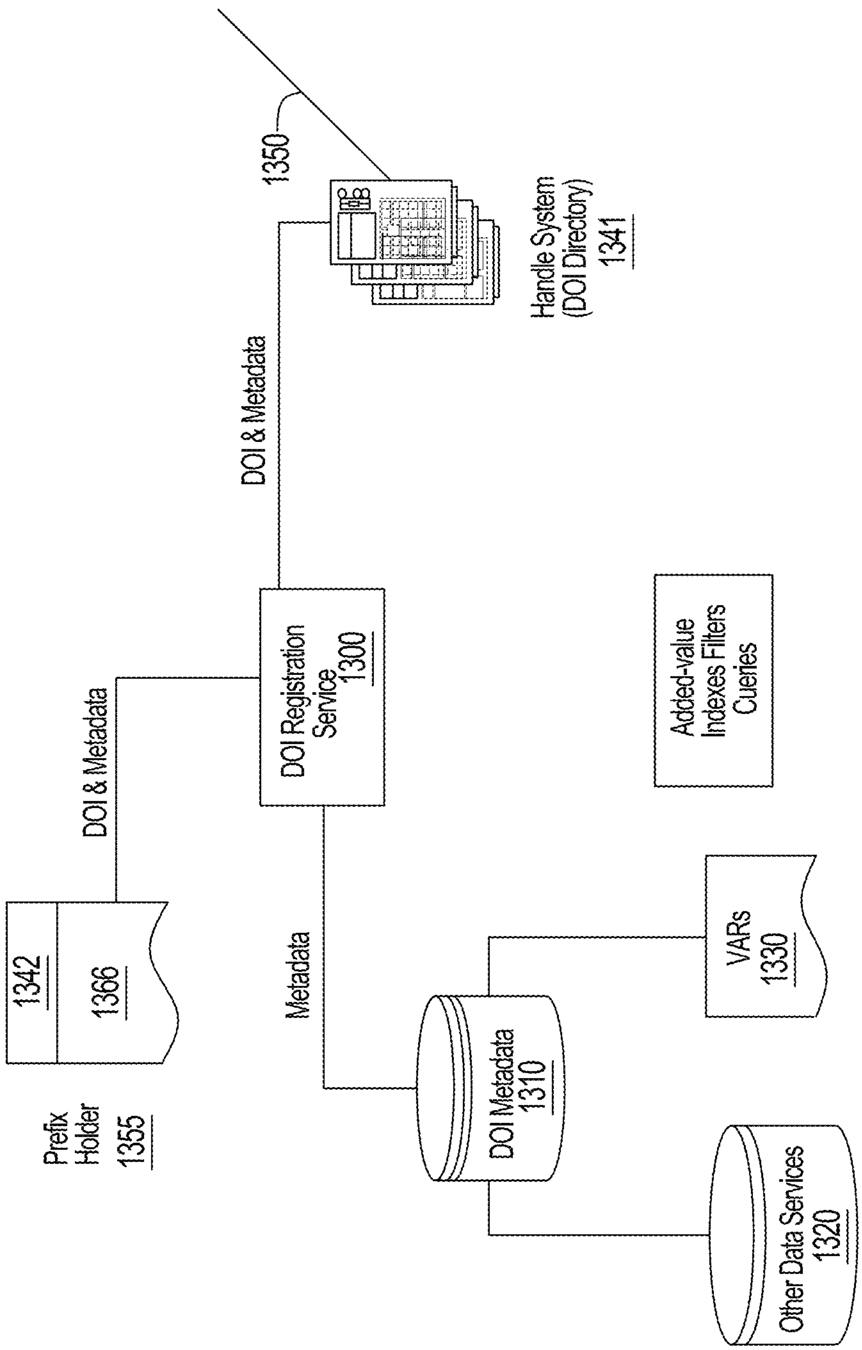
FIG. 13 provides an overview of an exemplary DOI system.
Figure 14A:
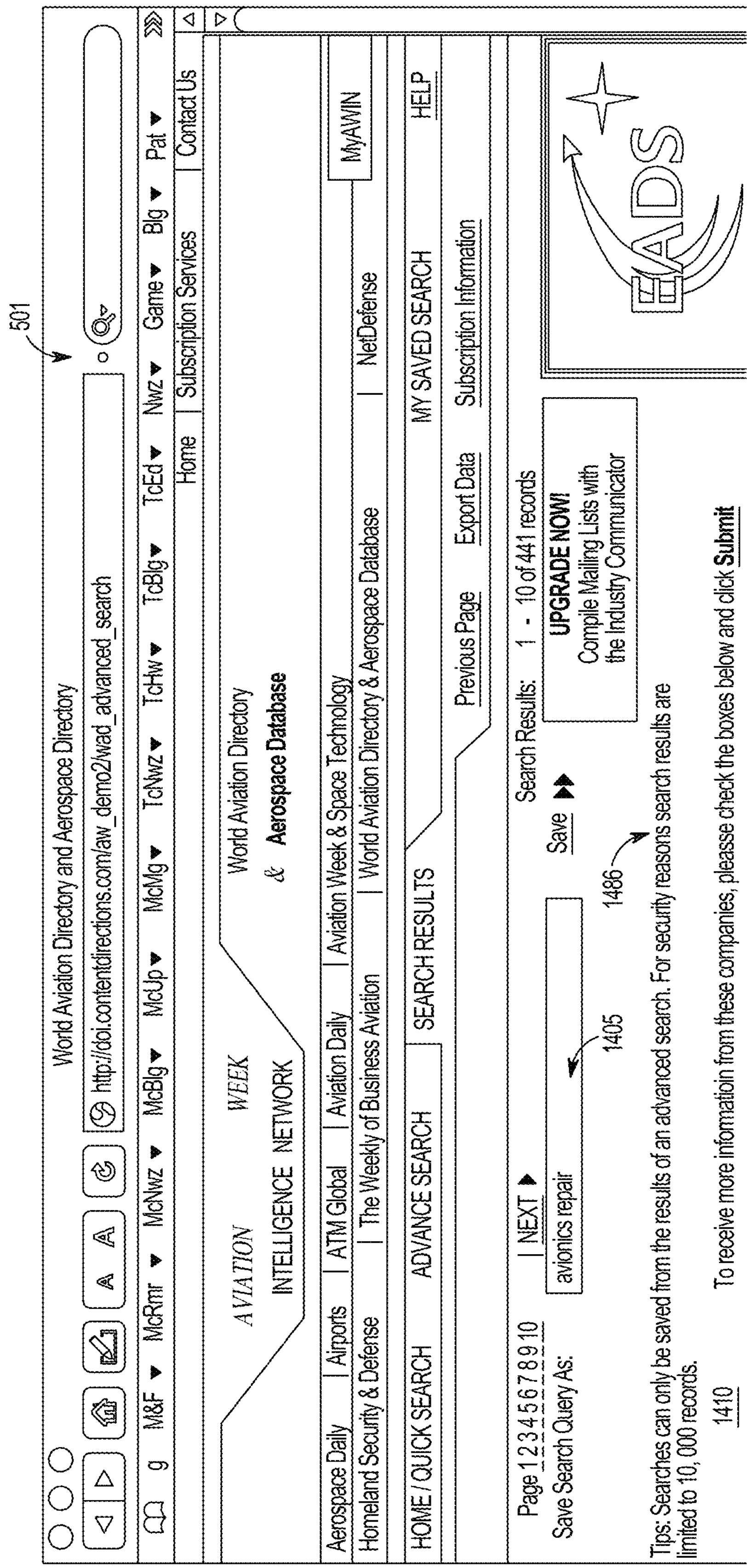
FIG. 14 illustrates example advertisements served by an advertising Syndicator.
Figure 14B:
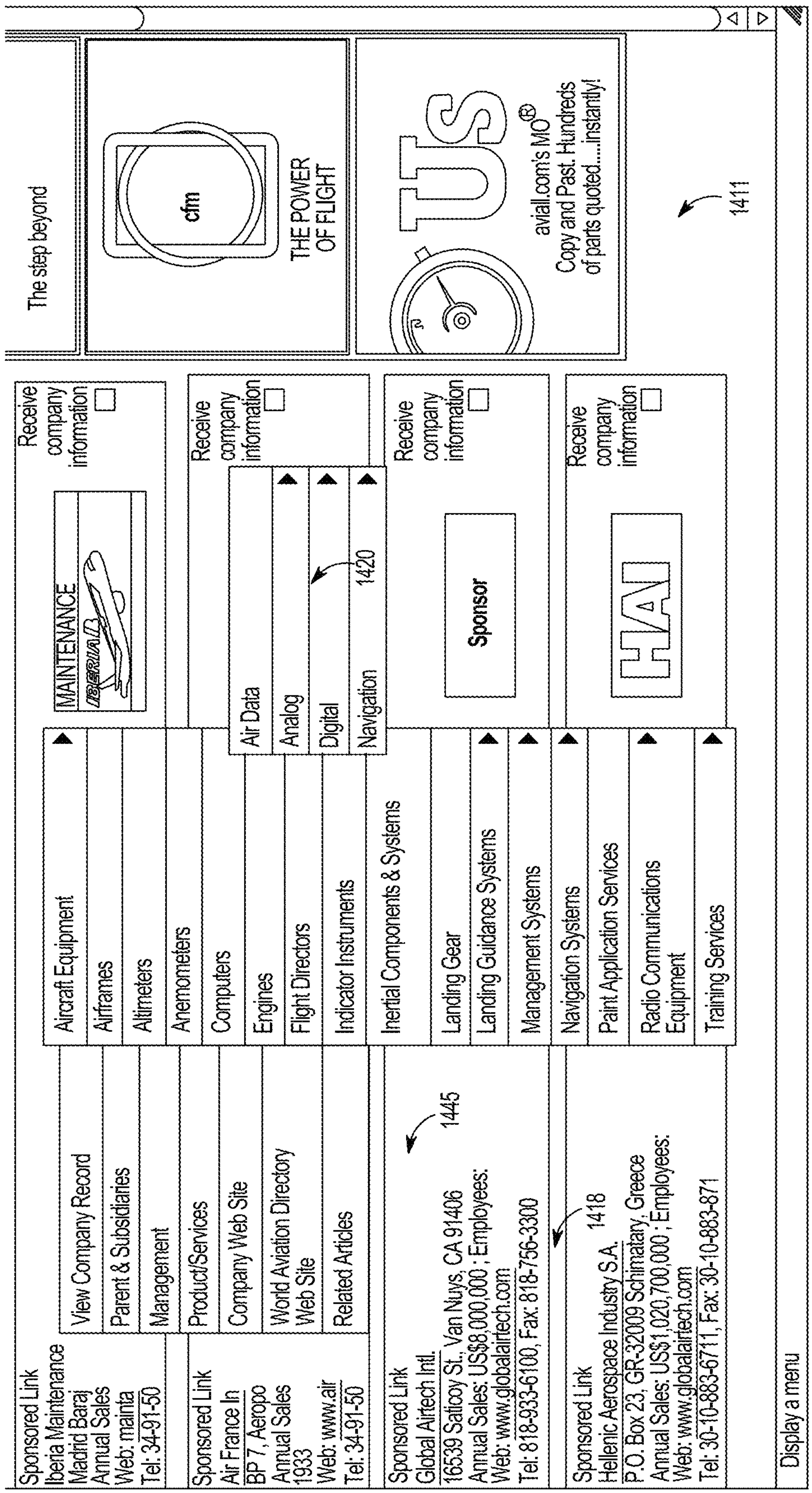
Figure 14C:
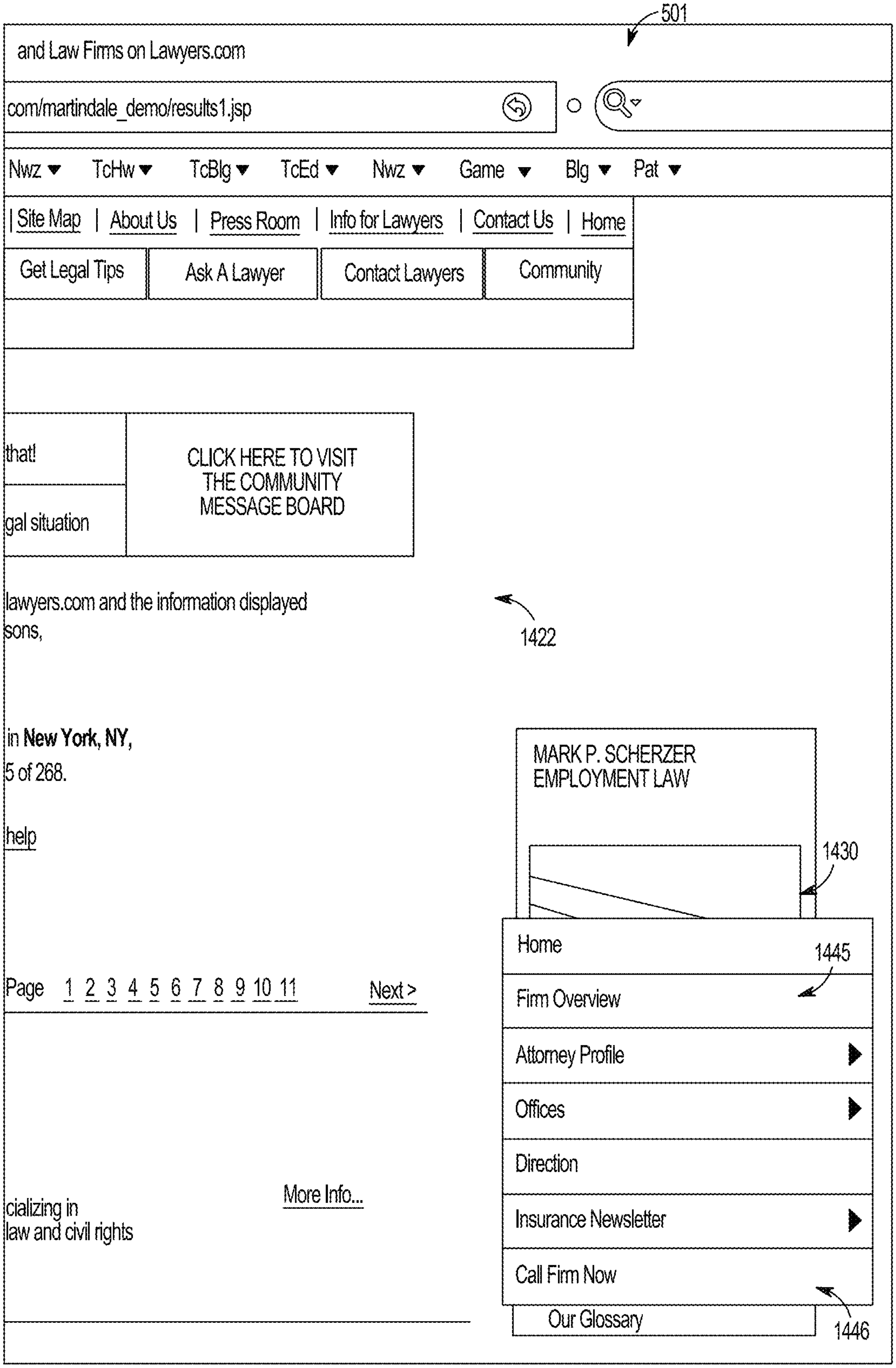
Figure 14D:
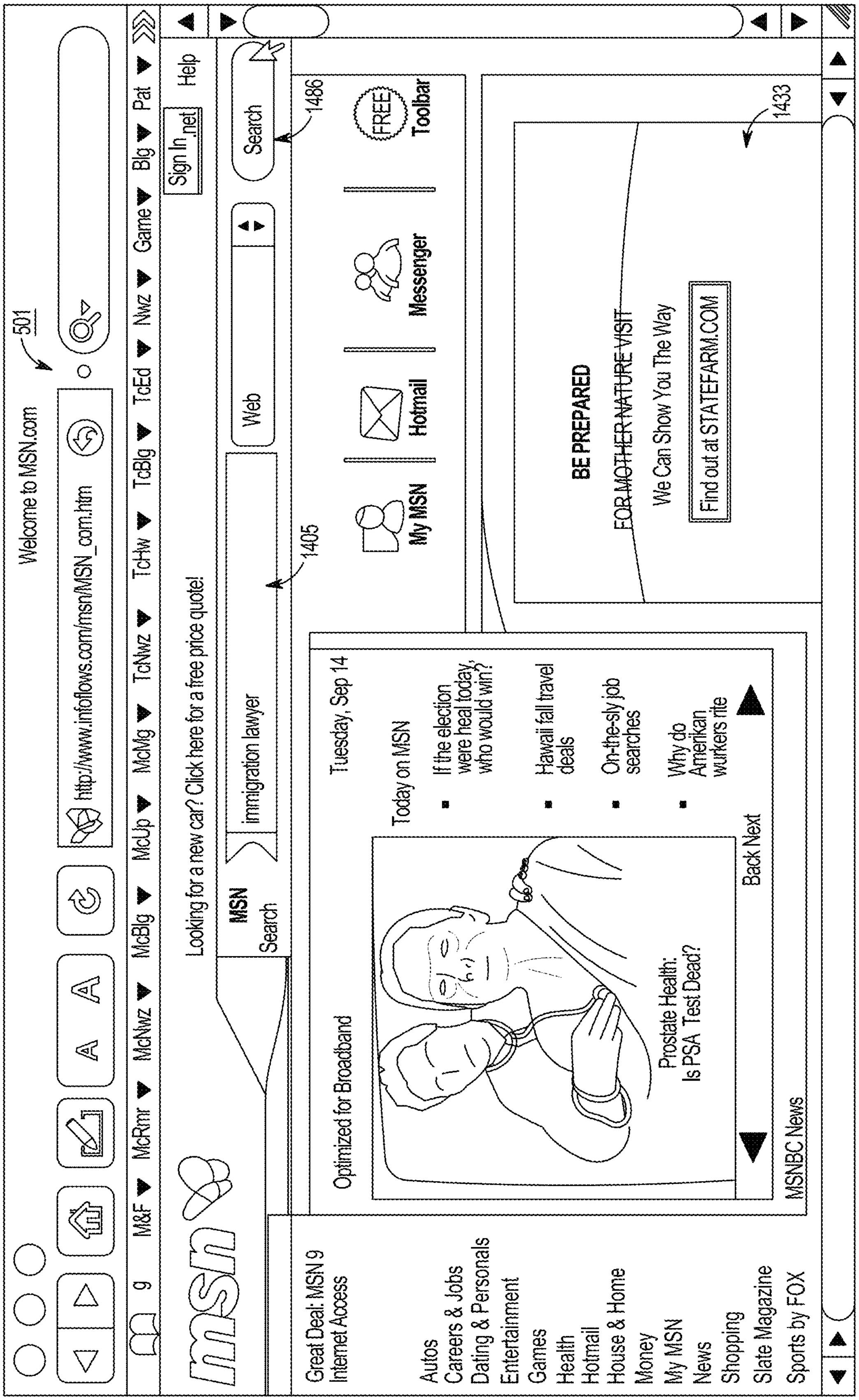
Figure 14E:
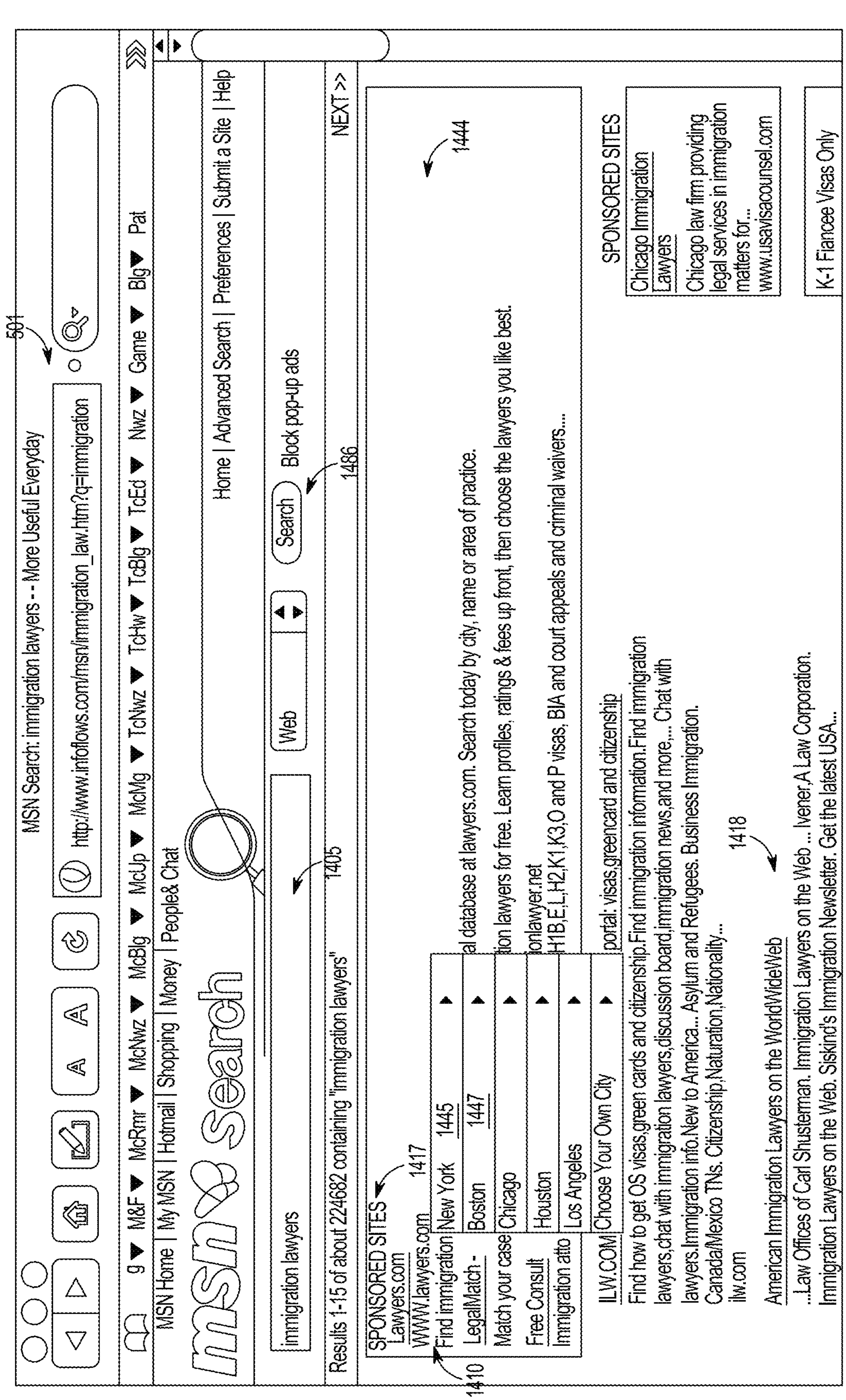
Figure 15A:
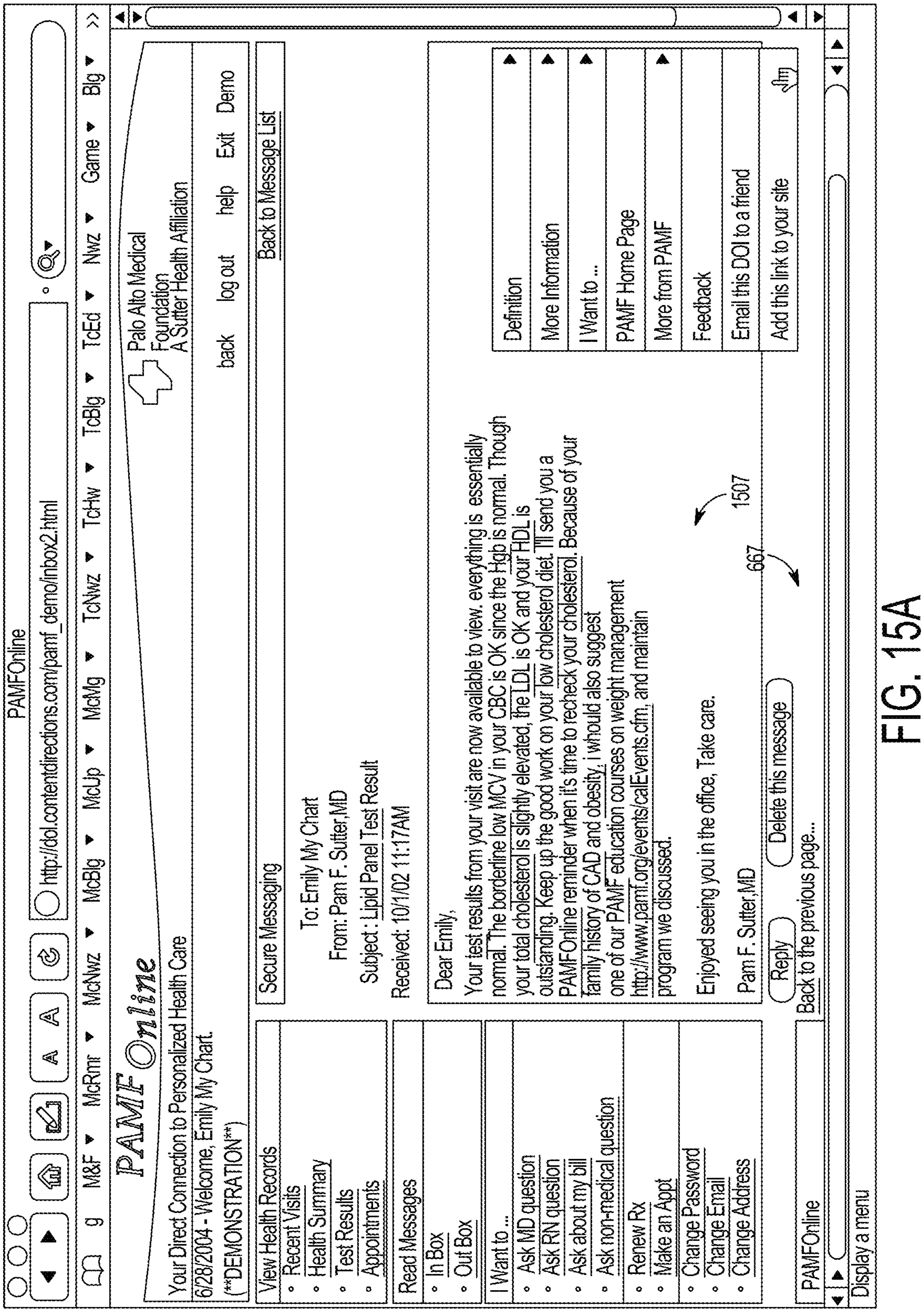
FIG. 15 illustrates example MultiLink applications.
Figure 15B:
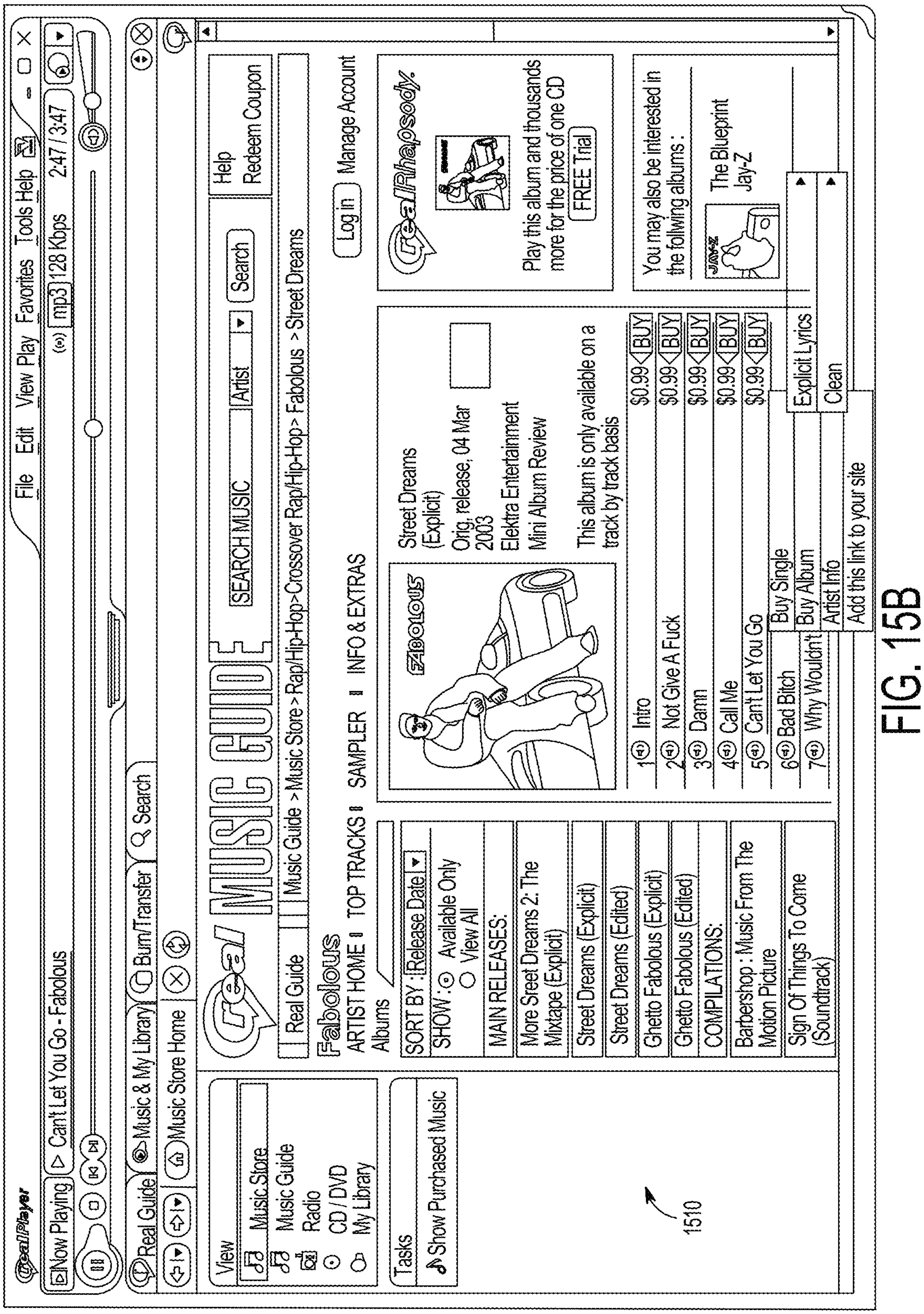
Figure 15C:
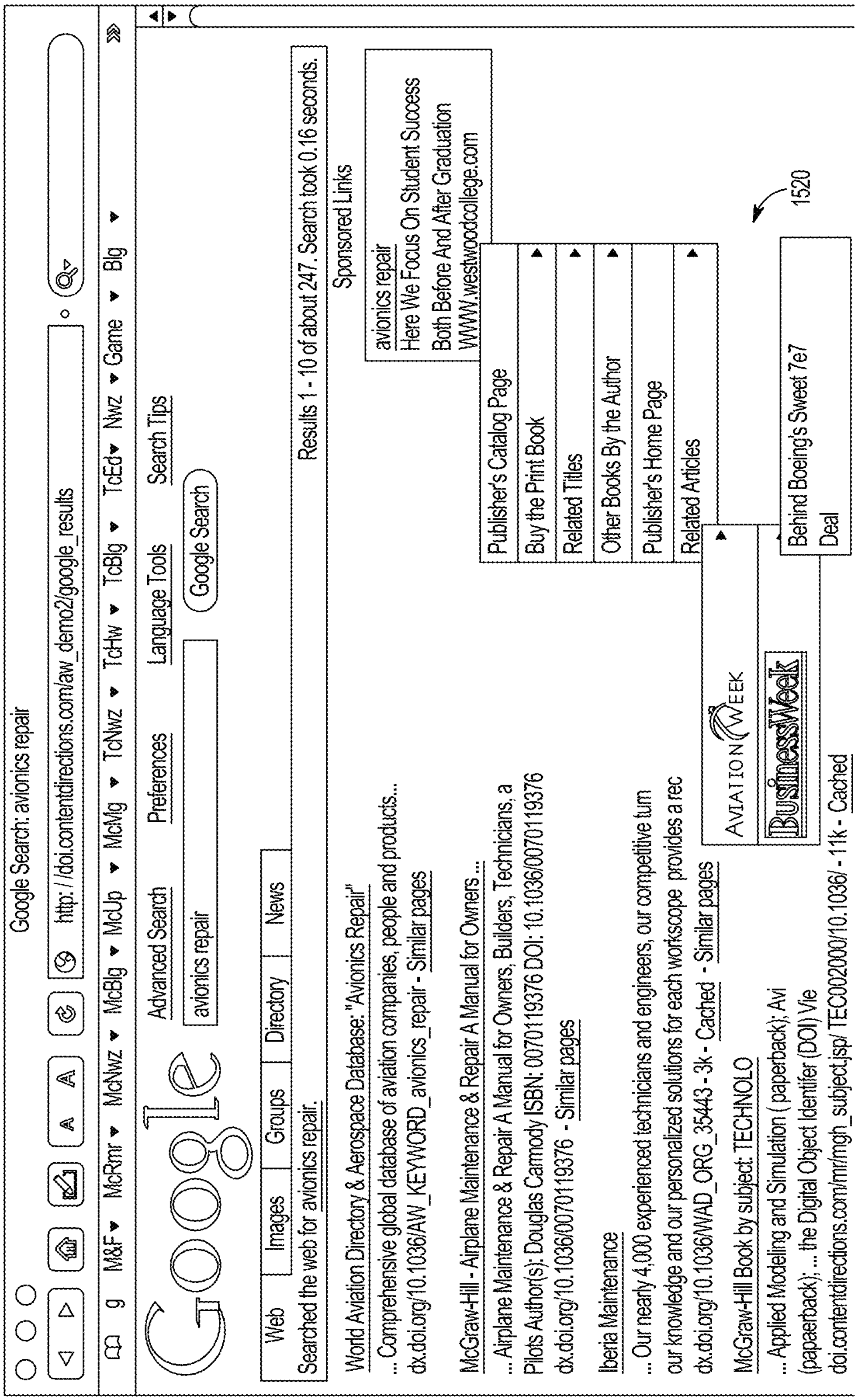
Figure 15E:
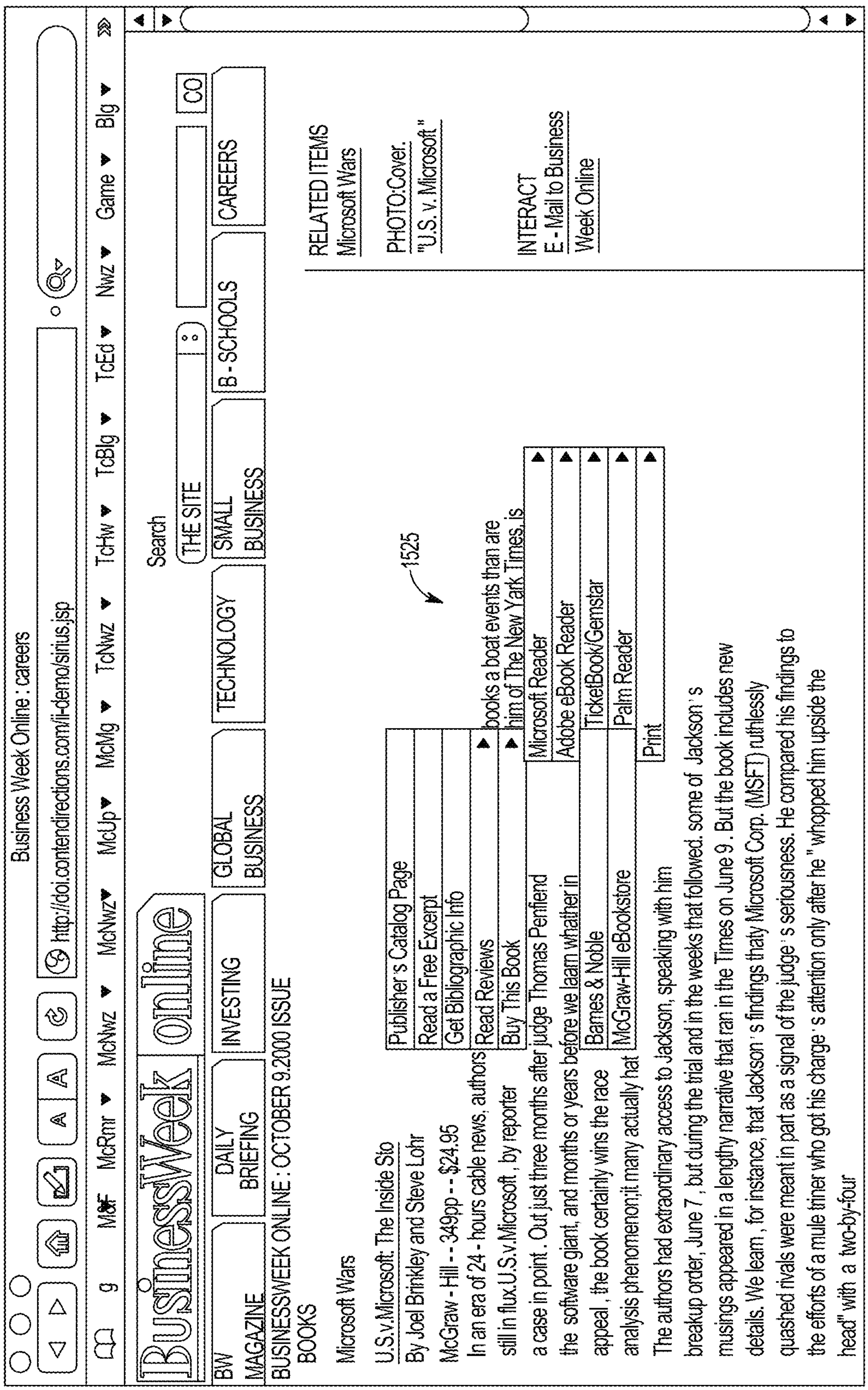
Figure 15F:
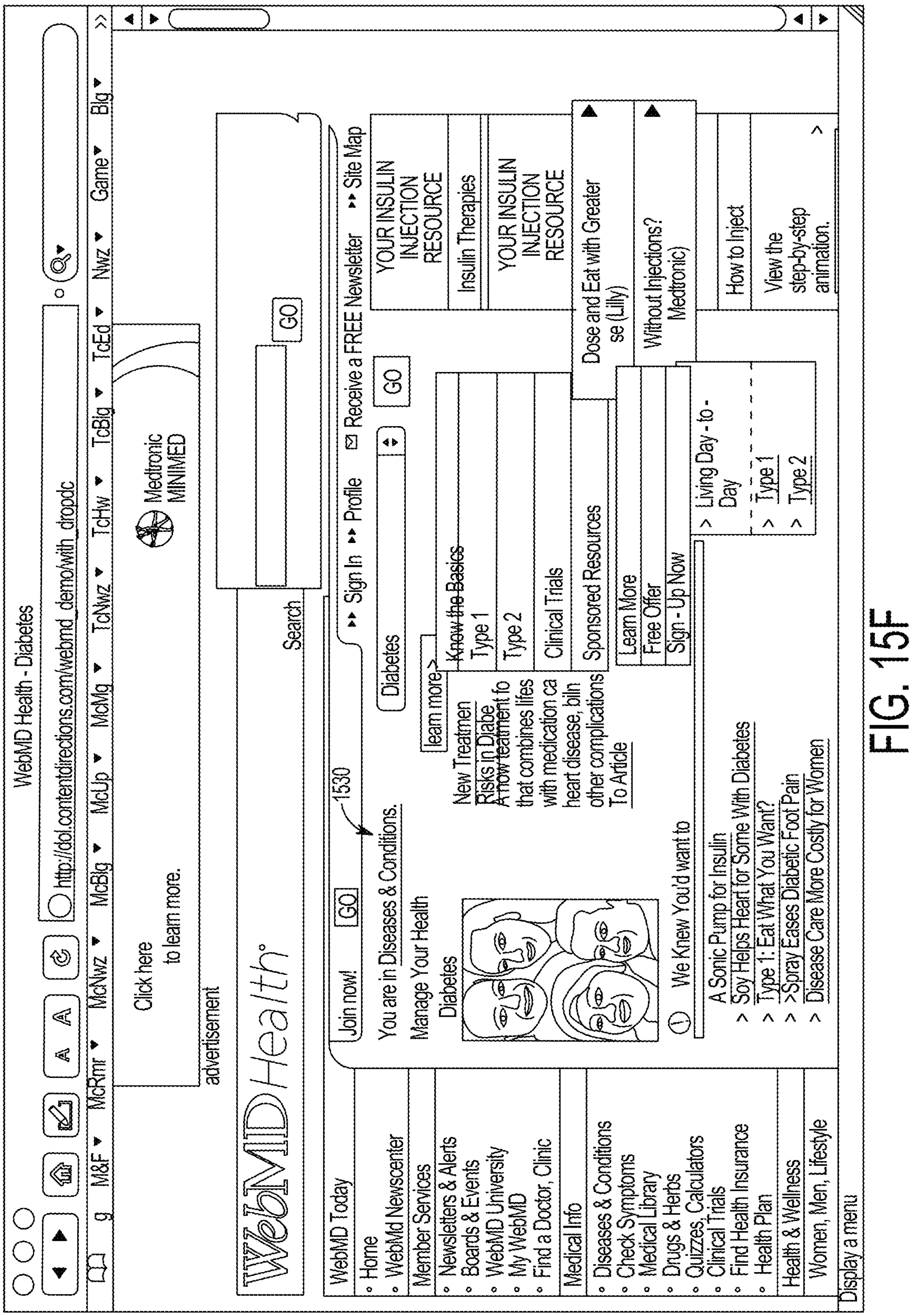
Figure 15G:
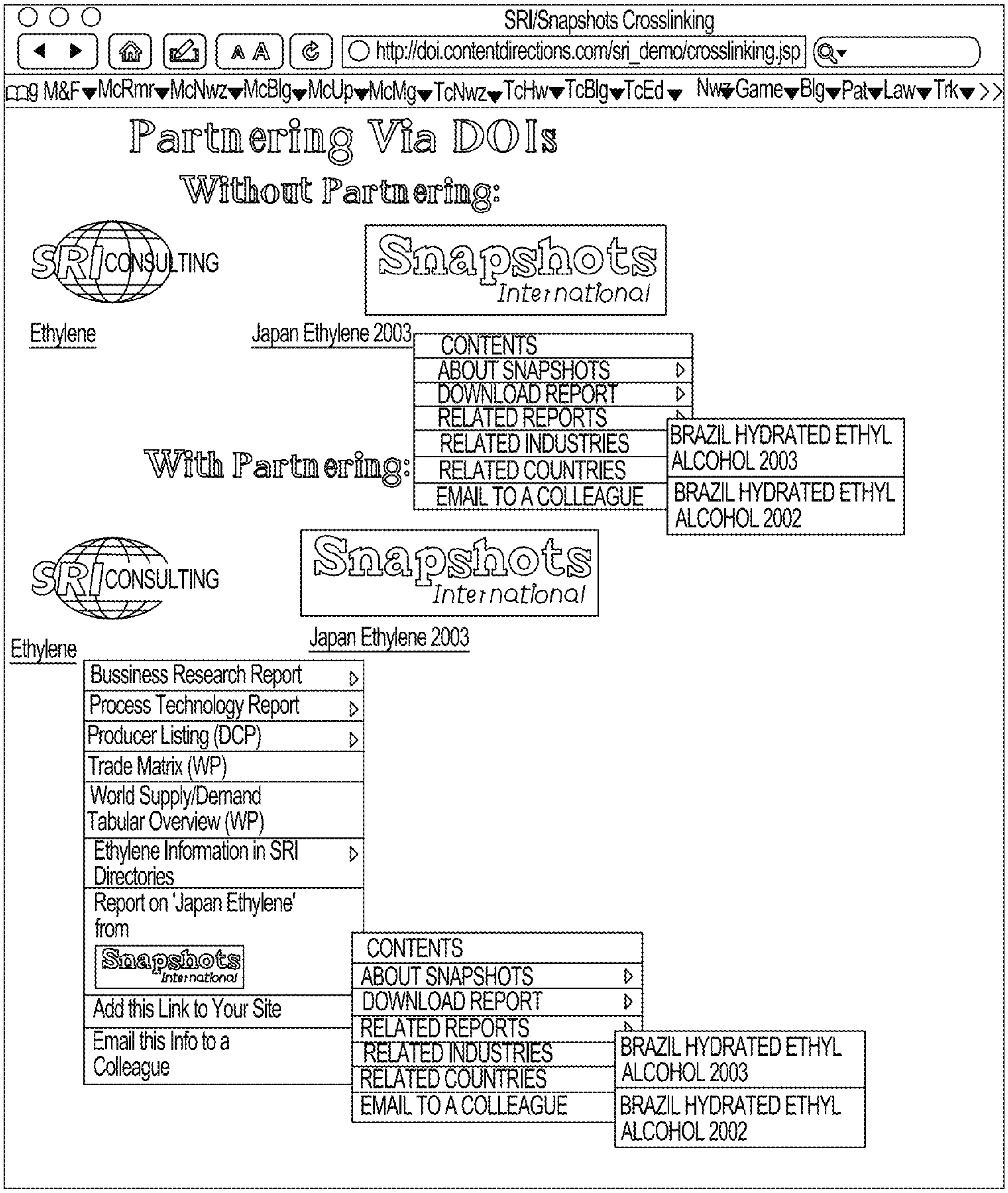
Figure 15H:
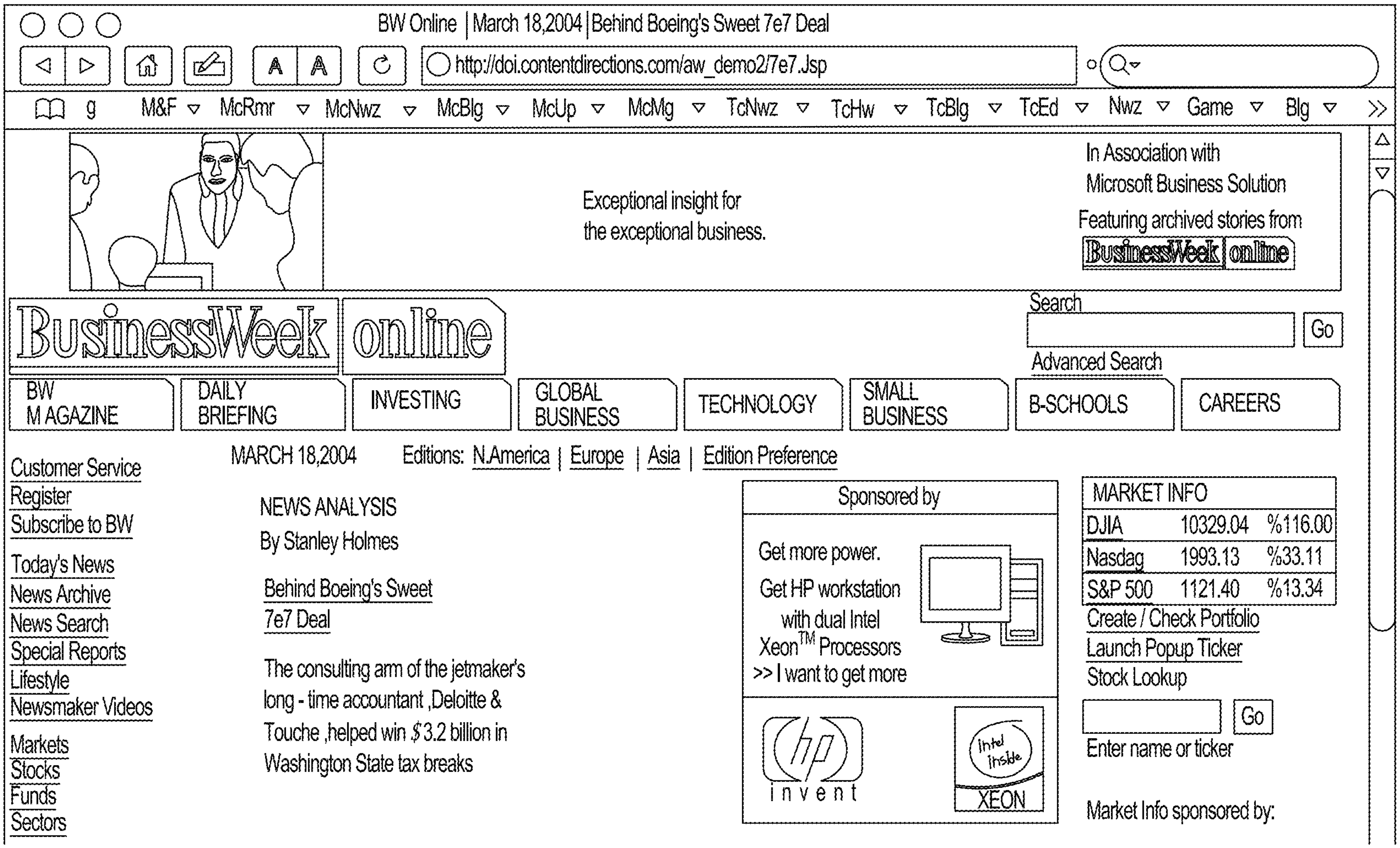
Figure 15I:
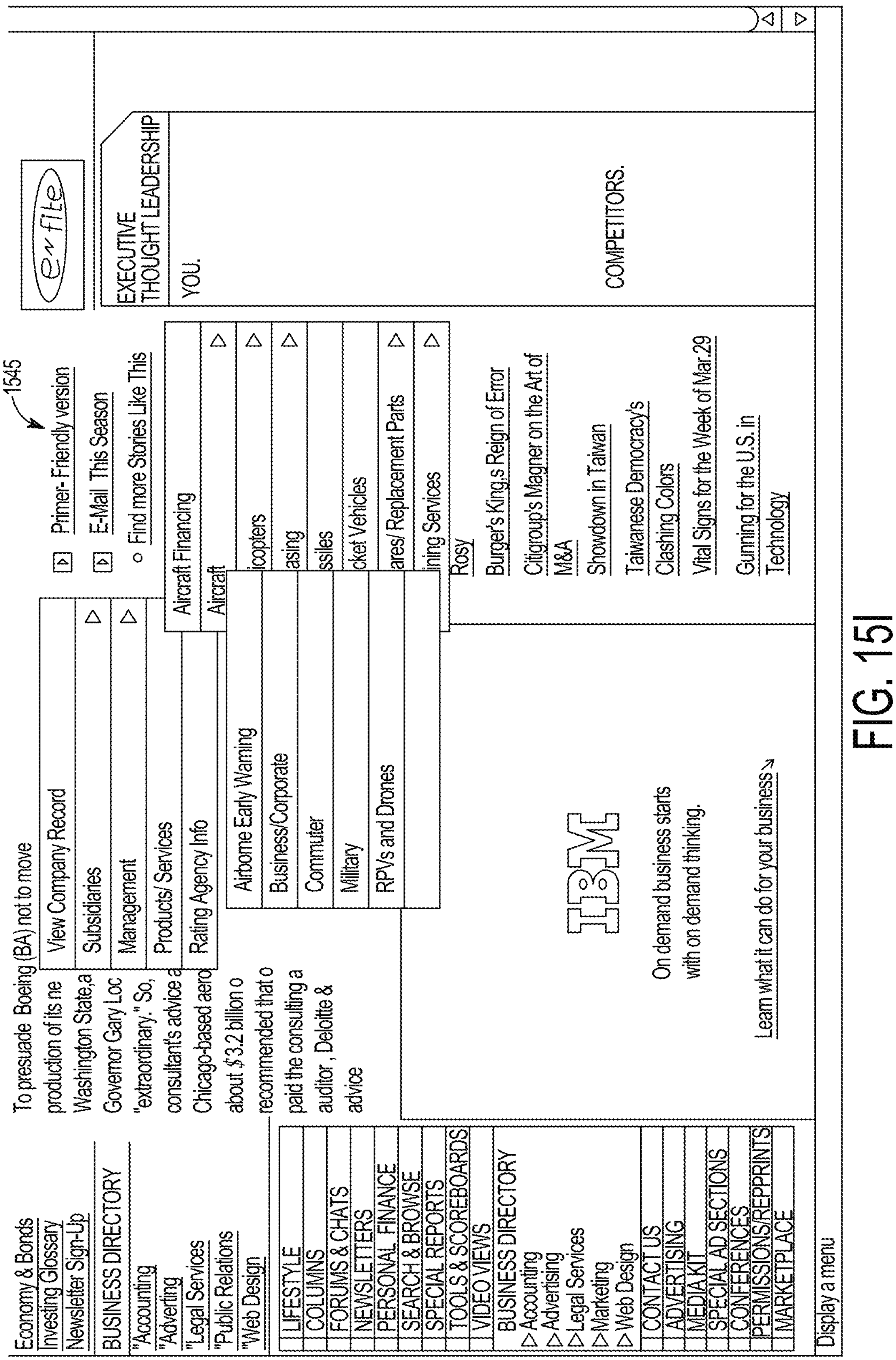
Figure 15J:
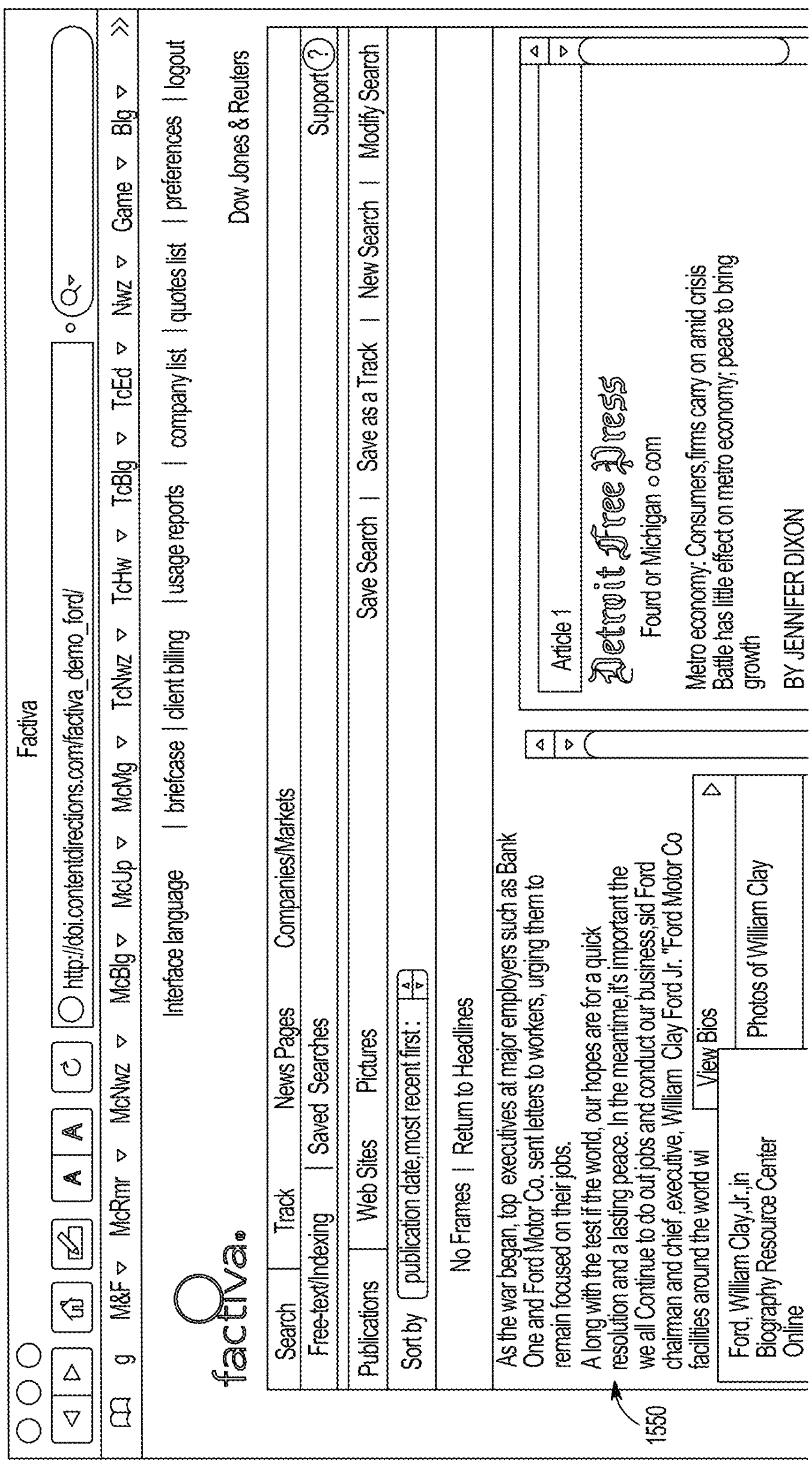
Figure 15K:
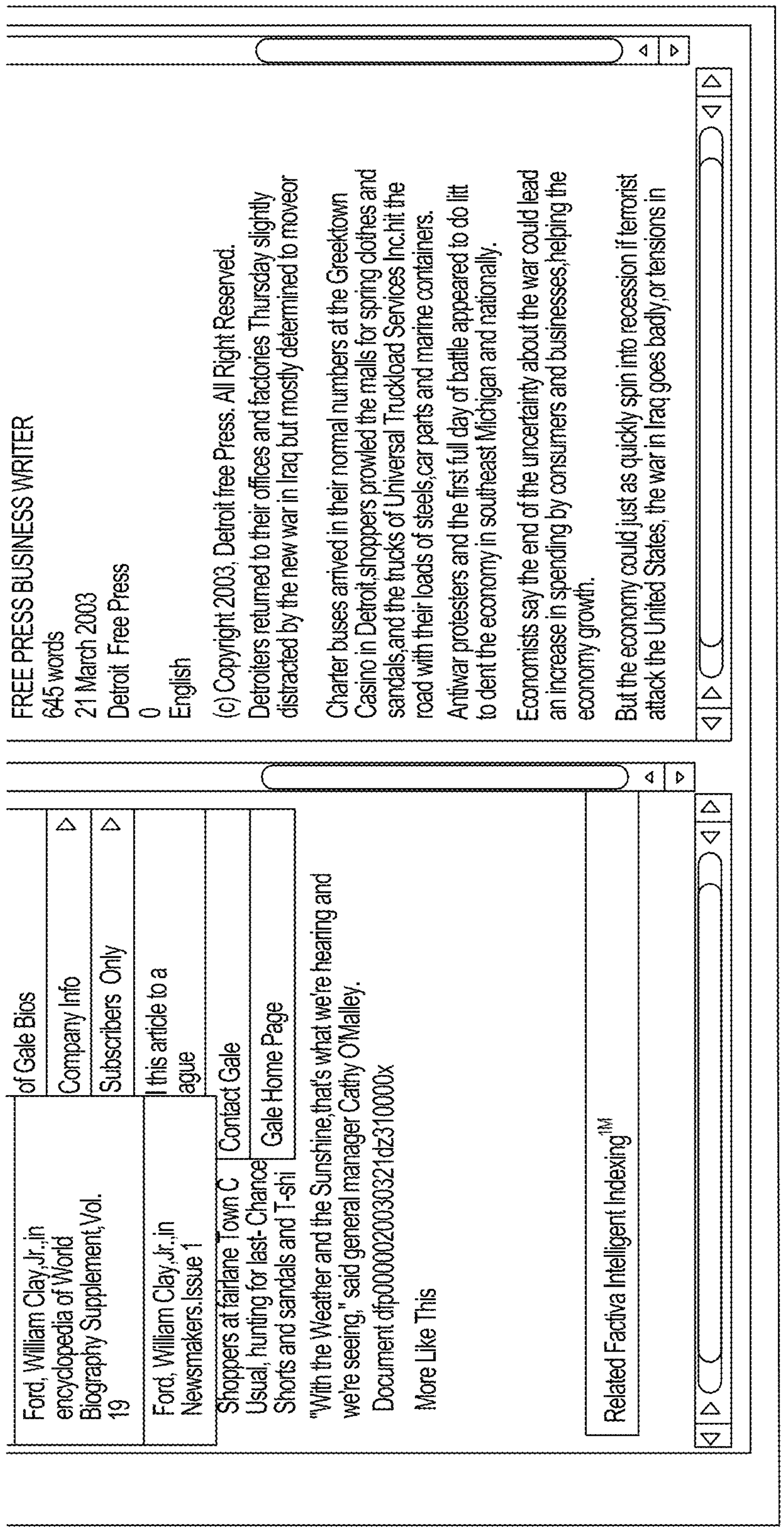
Figure 15L:
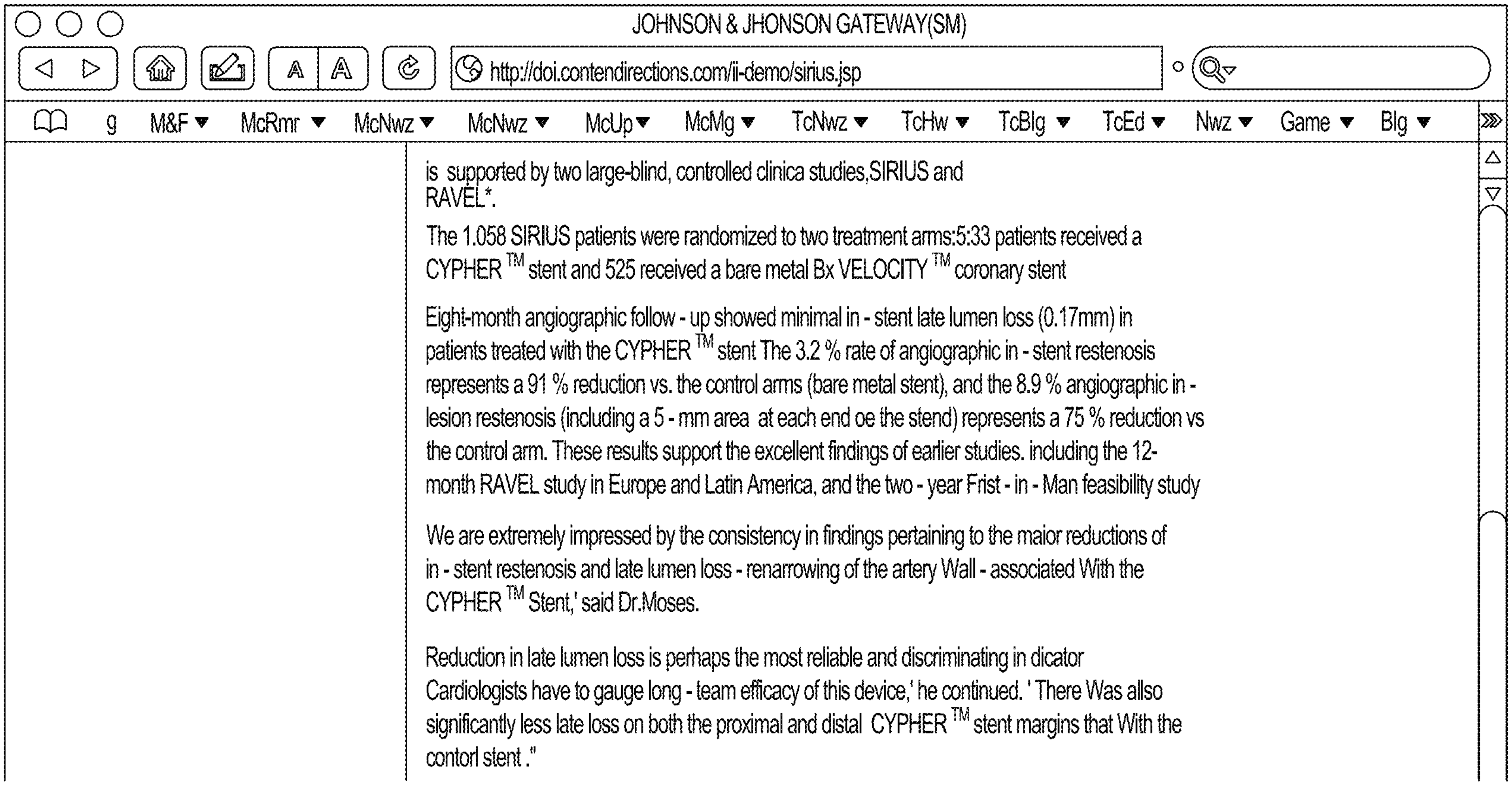
Figure 15M:
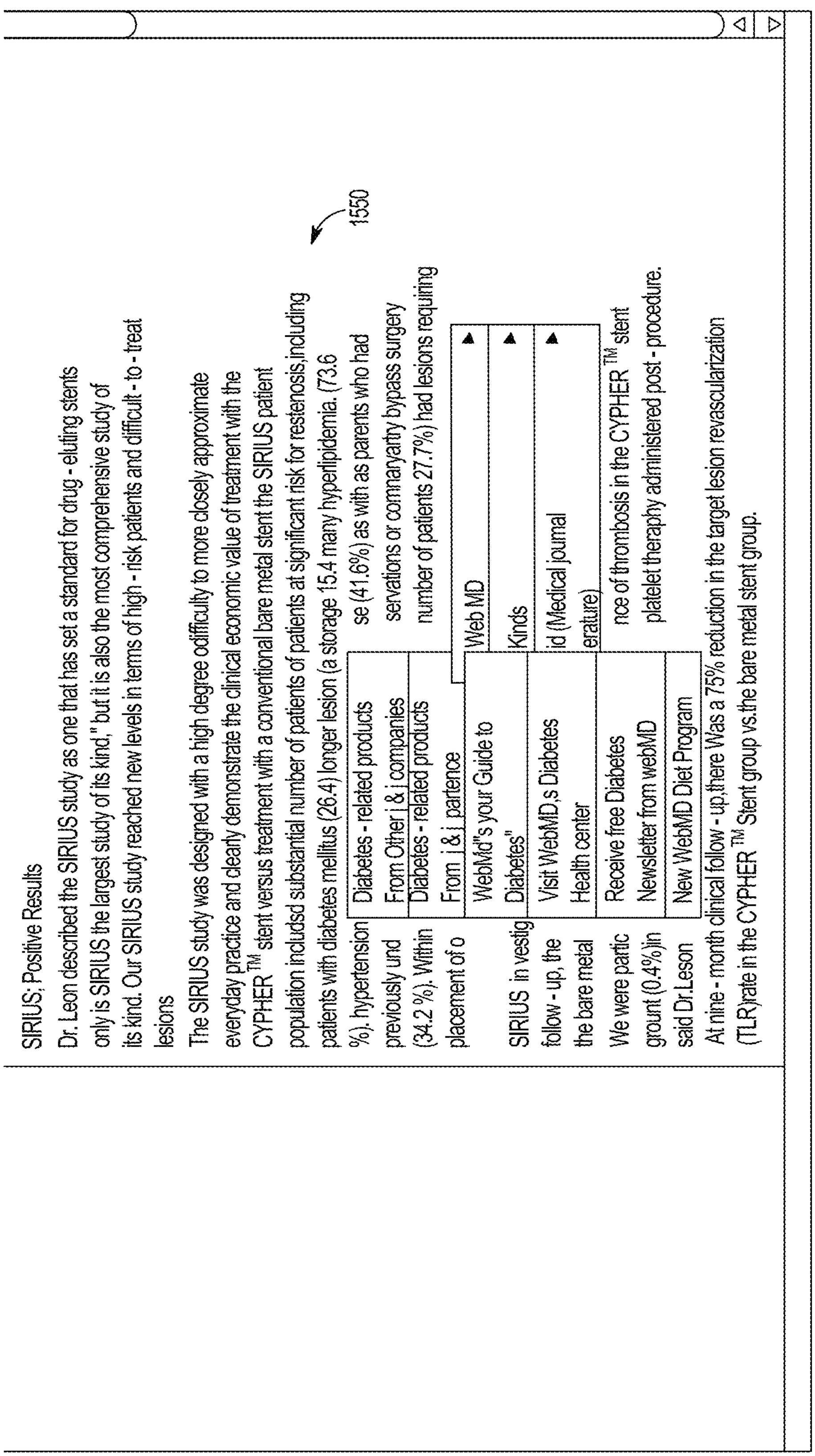
Figure 15N:
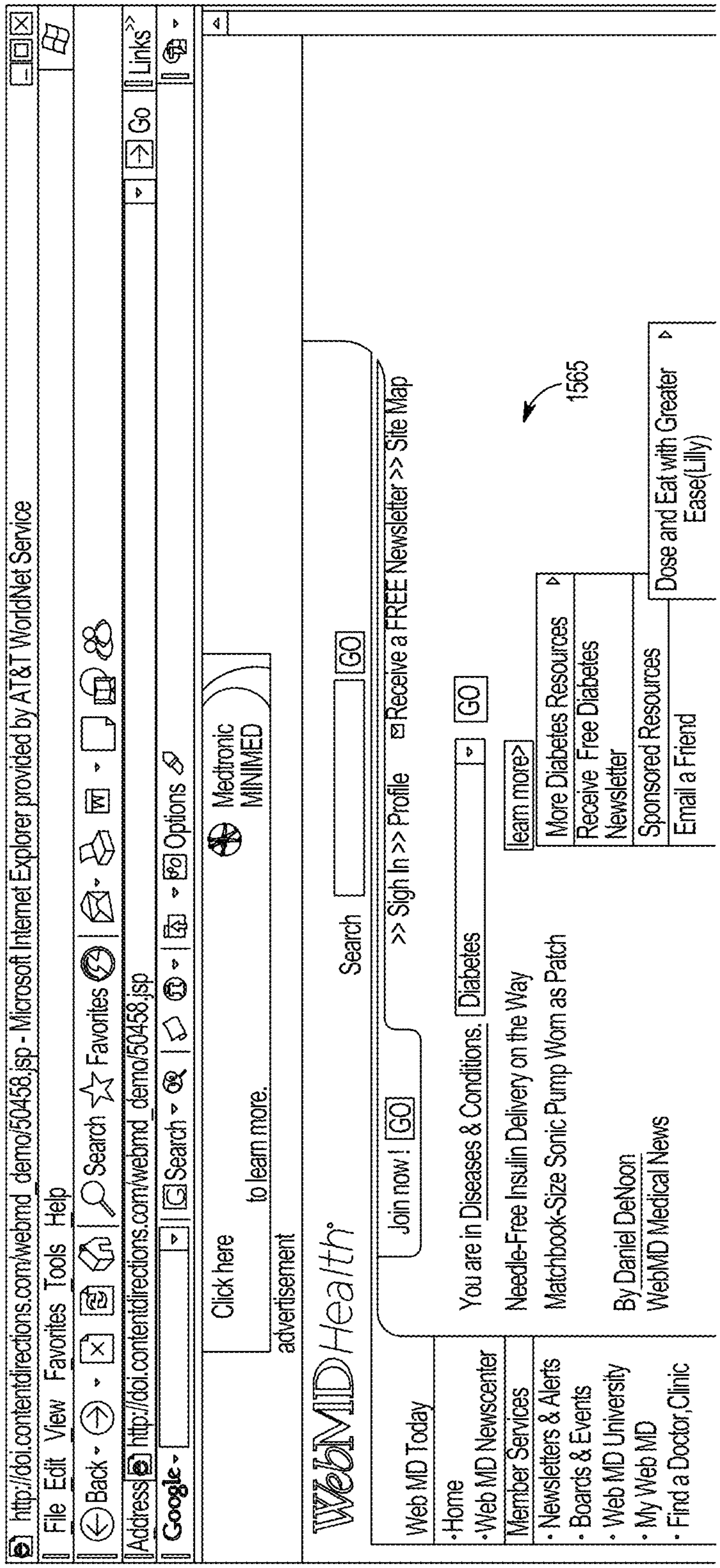
Figure 150:
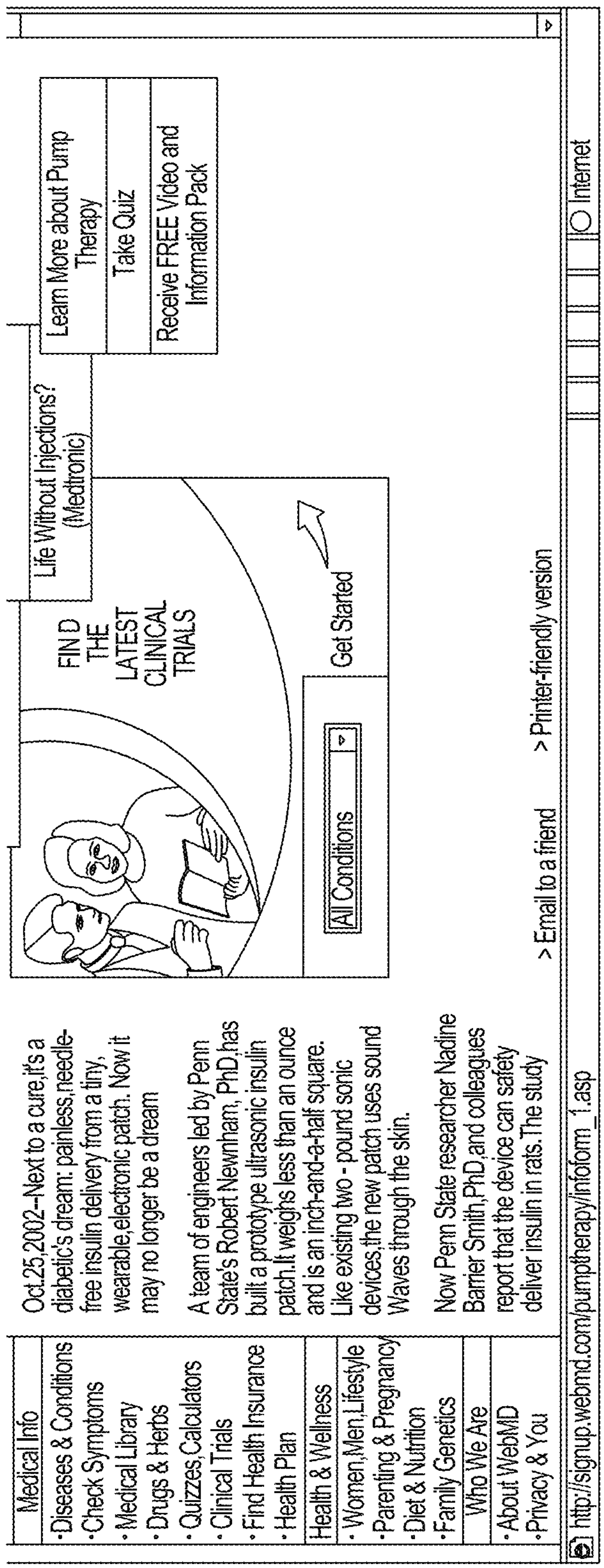
Figure 16A:
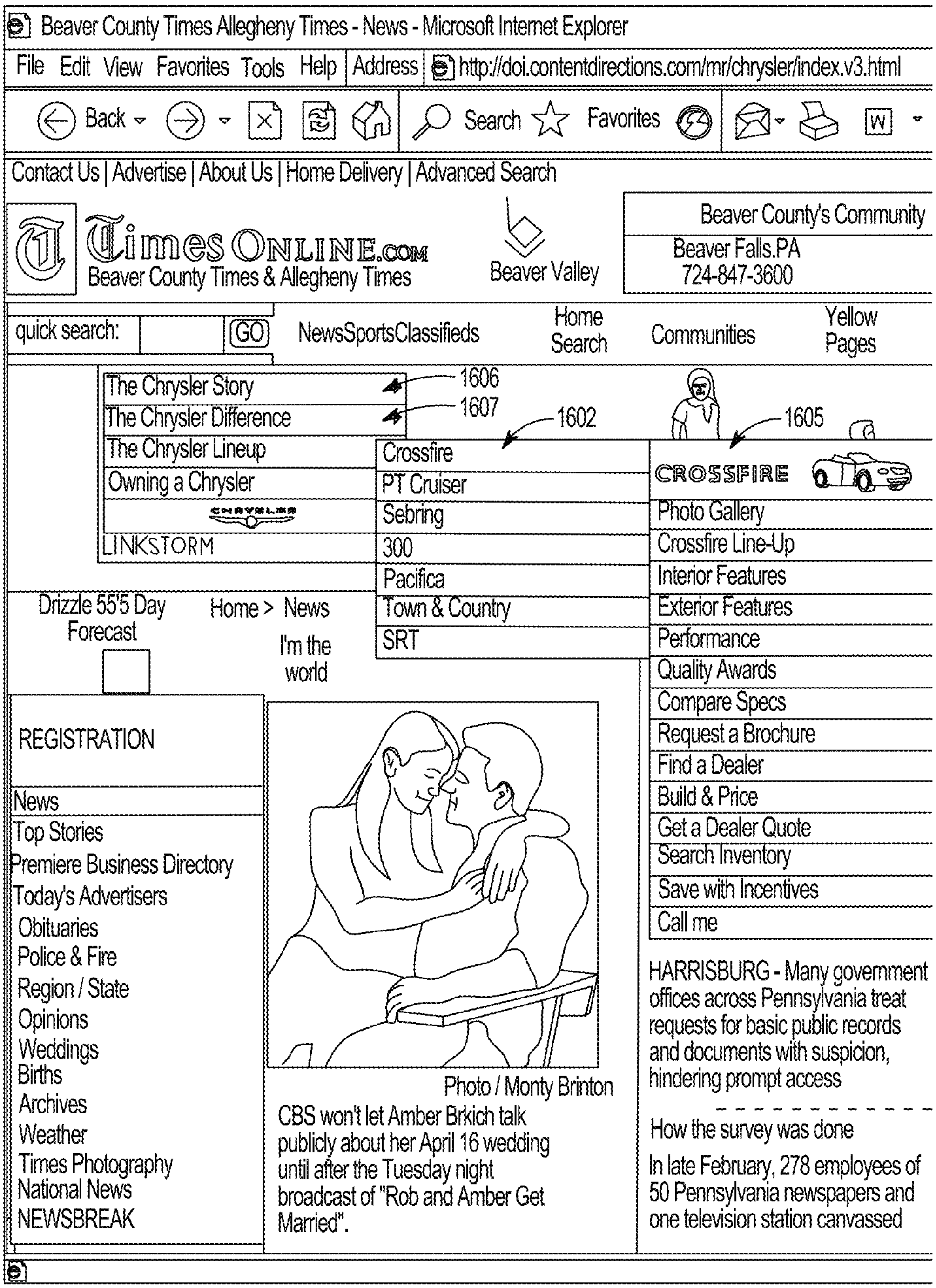
FIG. 16 illustrates example MultiLink applications and user interfaces.
Figure 16B:
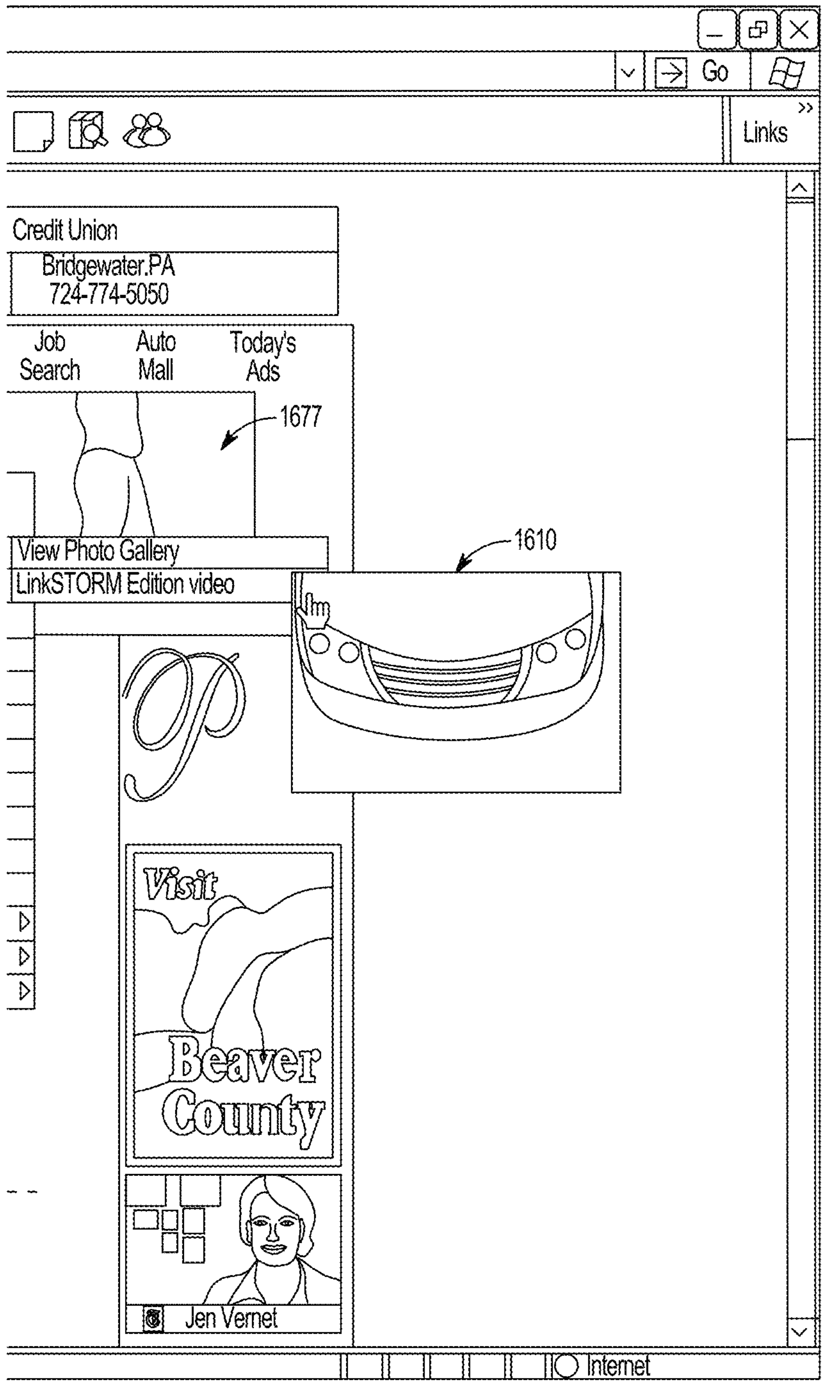
Figure 16C:
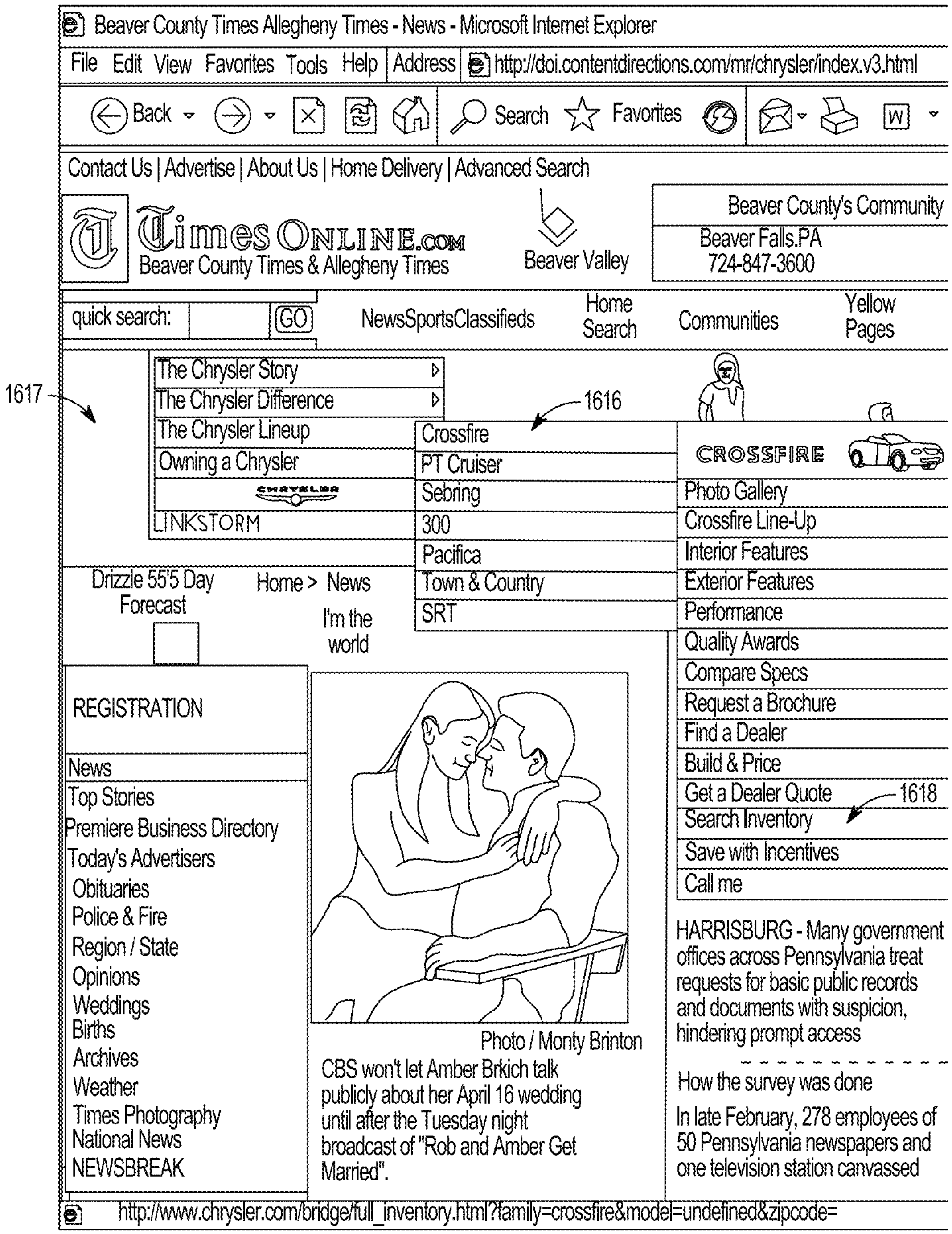
Figure 16D:
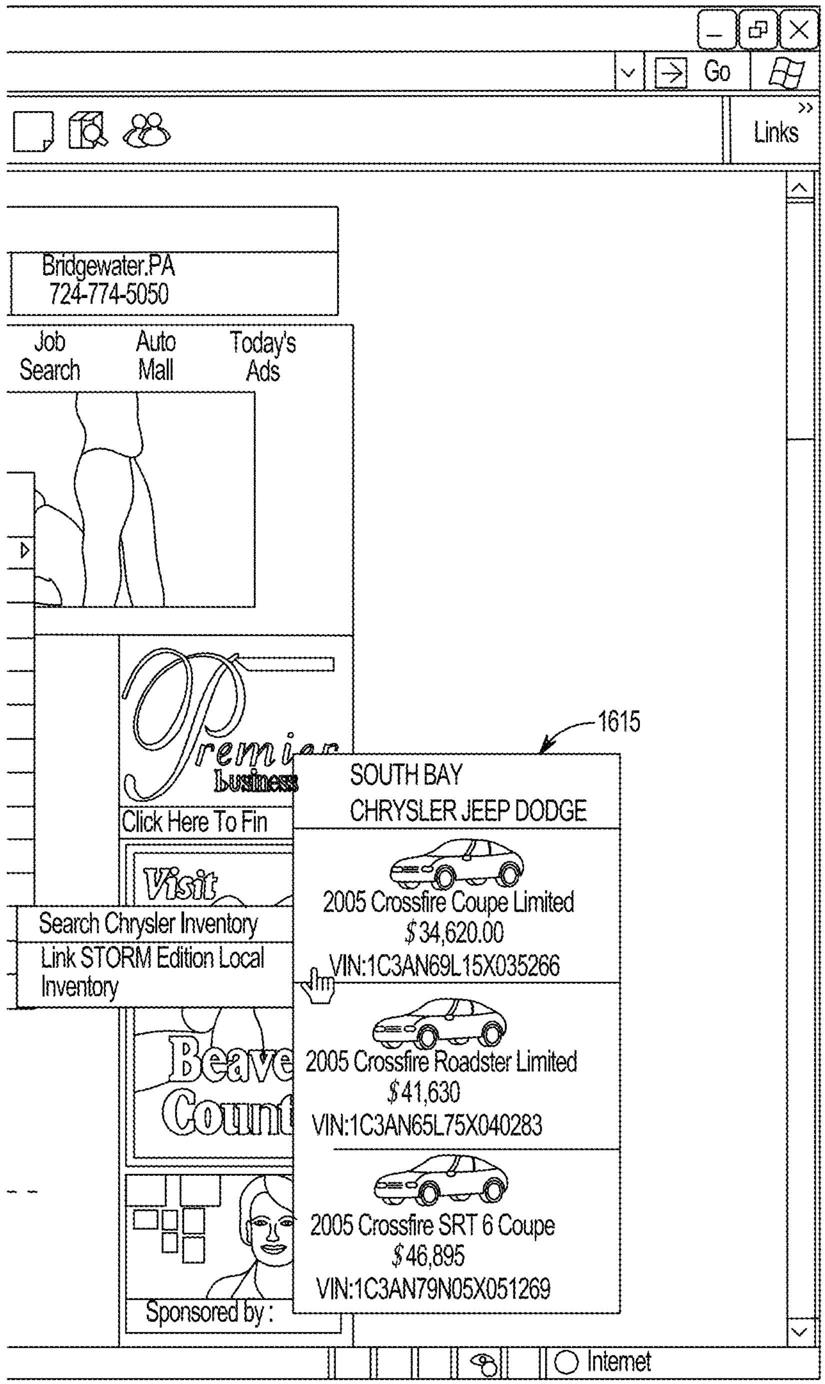
Figure 16E:
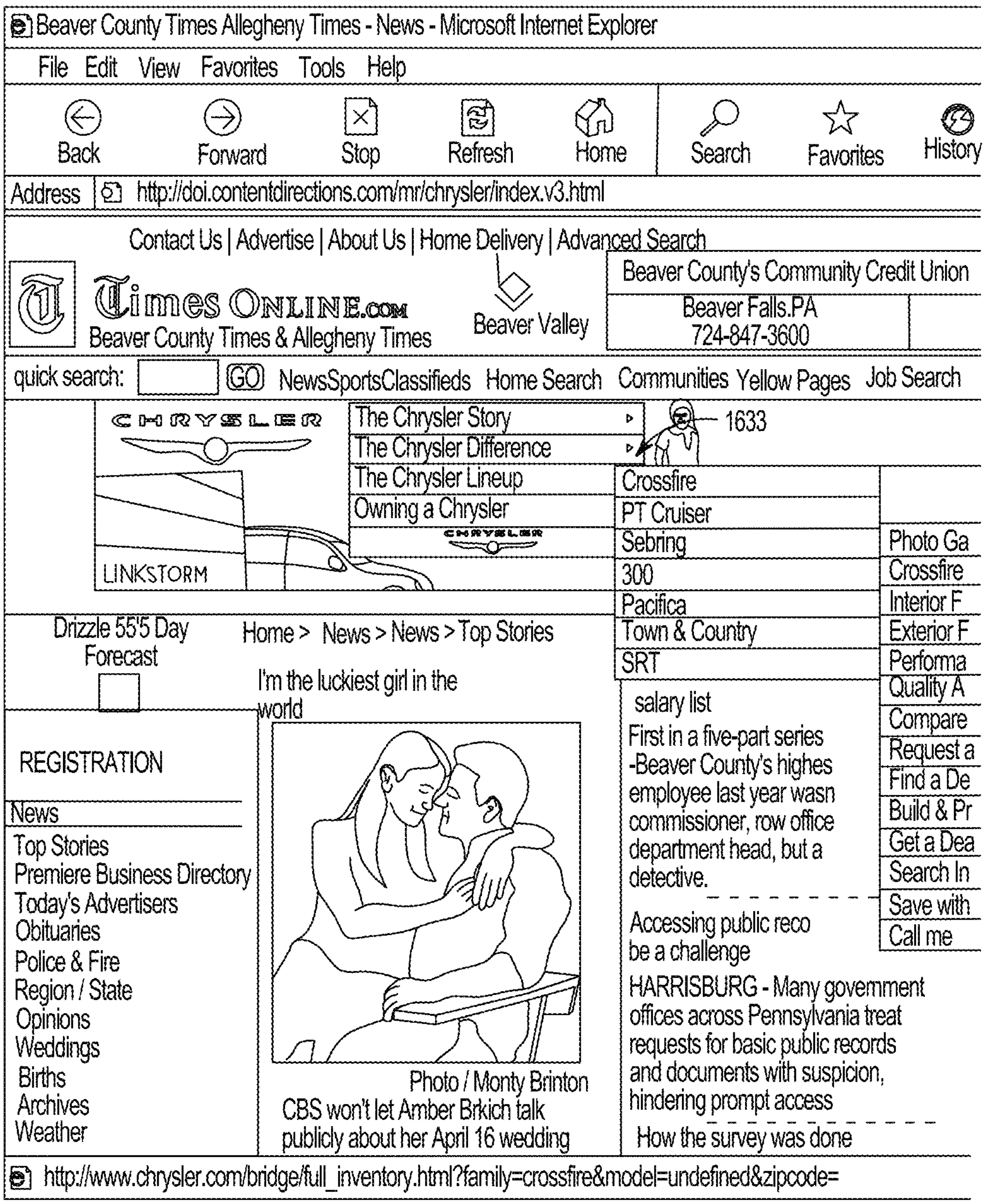
Figure 16F:
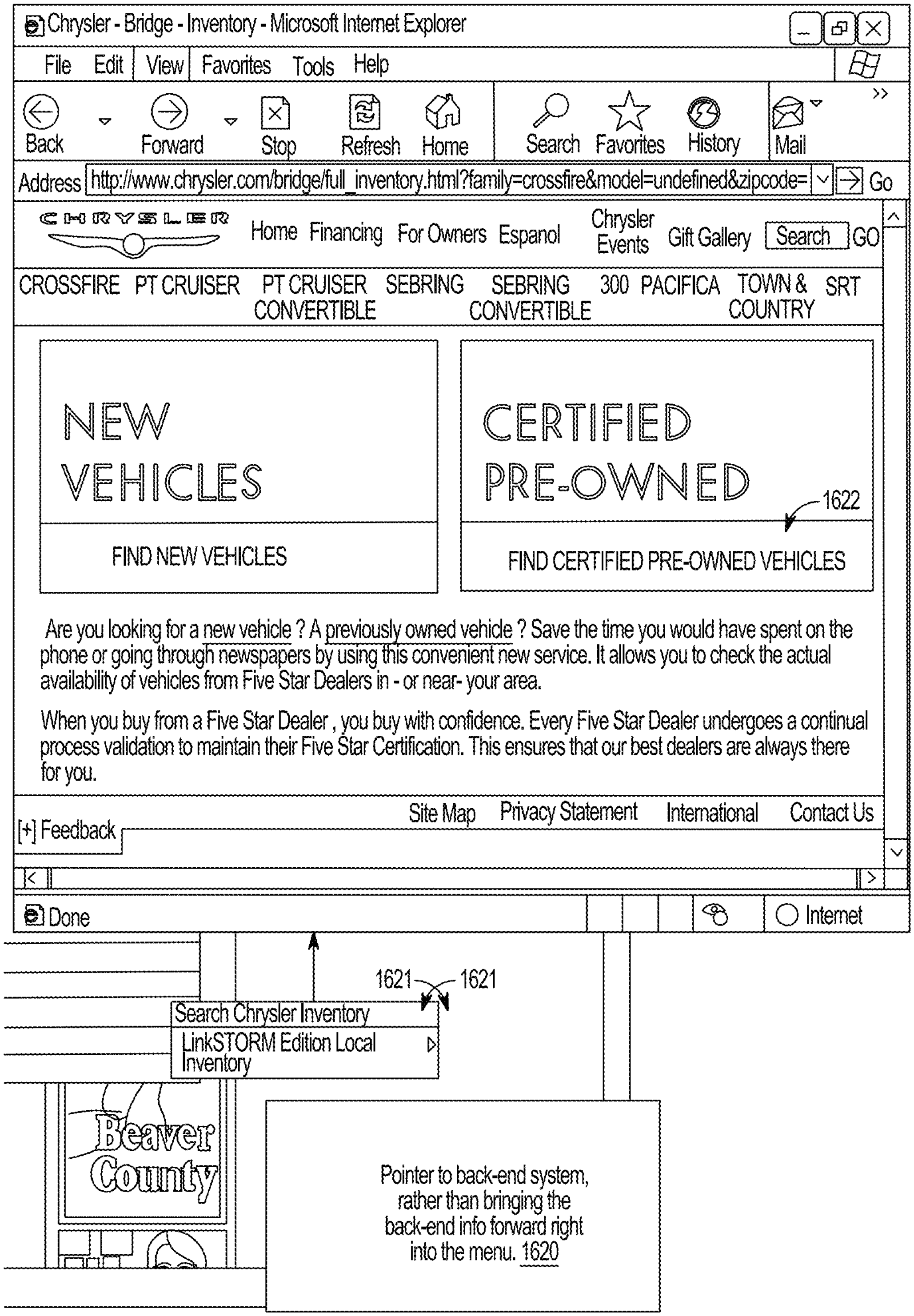
Figure 16G:
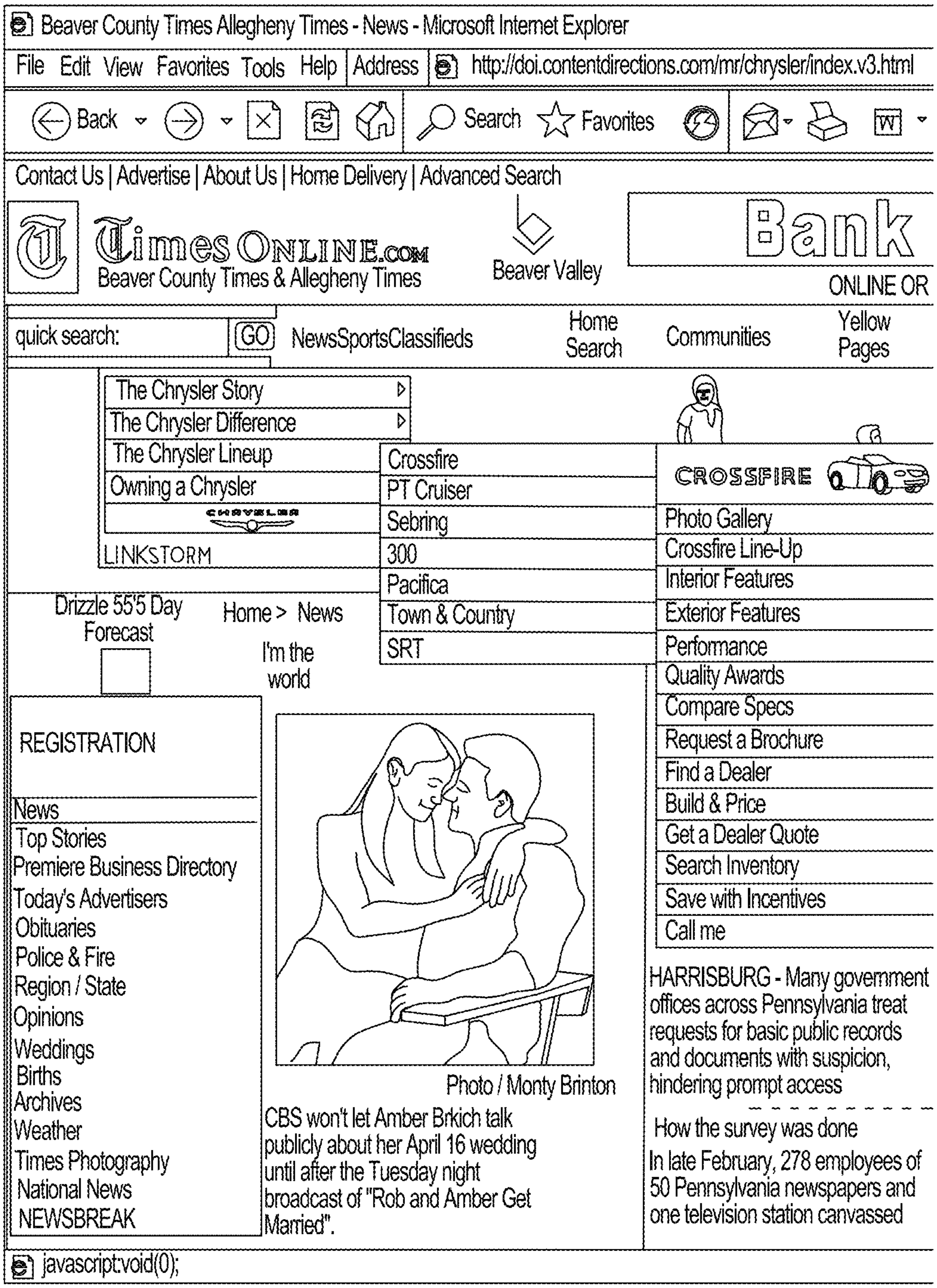
Figure 16H:
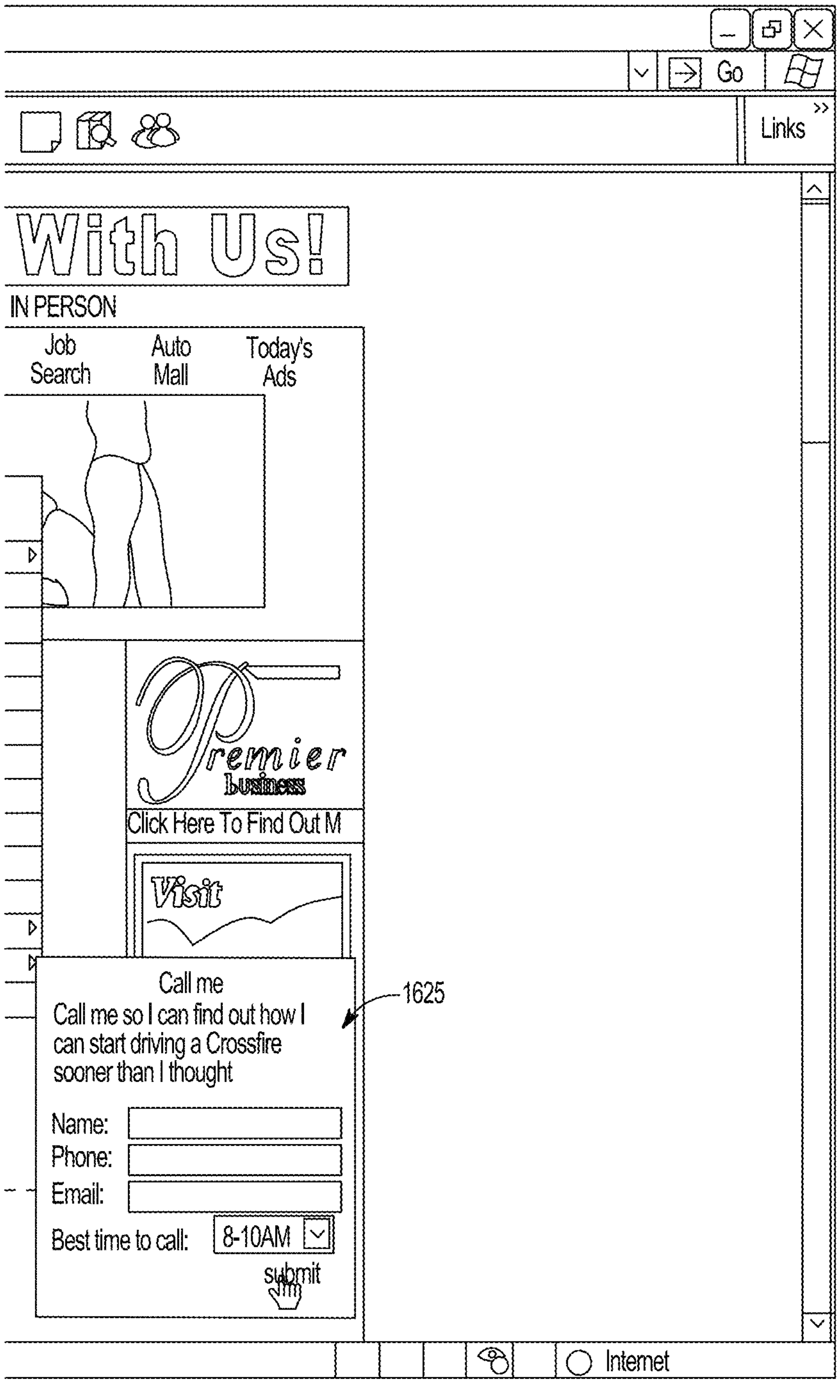

FIG. 13 provides an overview of an exemplary DOI system, in accordance with the present invention, wherein the publishers, the DOI registration service and the Handle System collaborate together to create an efficient DOI system. The prefix holder 1355 may submit information to a DOI registration service 1300 comprising a DOI 1342 and associated metadata 1366. The prefix holder who has already been assigned a unique prefix 501, requests that a suffix 502 be assigned to a piece of content 1366. The registration service 1300 is responsible for parsing and/or reformatting the user's streams of submitted information 1342, 1366 for subsequent deposit in a Handle system 1350 and/or metadata database 1310. As noted above, the scope of the content that can be addressed using a DOI is unlimited. As a result, the content 1366 may comprise any information and work of authorship, including articles, books, music albums, or selected discrete portions thereof. In addition to providing a DOI 500, the publisher 1342 collects metadata for the content 1366. The metadata may comprise the content's DOI 500, a DOI genre, an identifier, title, type, origination, primary agent, agent's role, and/or the like. It may also comprise listings of associated services having to do with the identified piece of content offered by various parties, such as the locations of Web pages where a piece of content may be purchased online.

Once the publisher 1342 has assigned the suffix 502 to the content 1366 and collected the necessary metadata, the DOI 500 and the metadata are transmitted to the DOI registration service 1300. The DOI registration service 1300 maintains a database of DOIs 500, metadata of all the registered content 1366, as well as the URL at which the content 1366 is located. According to the present invention, the DOI registration service 1300 forwards the metadata to a metadata database 1310, 2219 of FIG. 22, which may or may not be integrally maintained by the DOI registration service 1300.

The DOI registration service 1300 may use the collected metadata for providing it to other data services 1320 or for providing value added resources 1330 to the users. In addition, the DOI registration service 1300 sends the appropriate DOI Handle data to the Handle System 1350, which may comprise a plurality of DOI Directory Servers 1341.

FIG. 14 illustrates example advertisements served by an advertising Syndicator. As discussed earlier in FIG. 1, a Syndicator may be used as an advertising provider. Such an embodiment shows a series of Web pages 1411, 1422, 1433, 1444 in a Web browser window 501. In one example 1411, a user may conduct a search for information about aviation by entering search terms into a search query text box 1405 and submitting 1486 the search. Some of the search results 1418 include MultiLinks 1410. When a user moves over the links, they may find further references to the MultiLinked content 1420 by selecting items from the MultiLink menu that pops up 1445. It should also be noted that the positioning and appearance of menu items may change based on end-user activity tracking, as will be discussed in greater detail in FIGS. 16-20. For example, if the "Call Firm Now" option becomes popular, it may move up and become the first menu item selection instead of the "Home" option 1446. The MultiLink menus may pop up from text results 1410 or as part of a banner ad 1430, 1422.

In another embodiment, users may procure MultiLink menu enabled sponsored links 1417, 1444. In this embodiment, a user procured a sponsored link from a search provider. For example, the user went to a search company Web page (e.g., Google), filled in their contact information and provided information specifying the sponsored link they would like. Normally, a user would specify certain keywords and provide a sponsored link and some accompanying text that would be displayed in response to a search for the specified keywords. This is extended by the Autolinker and/or MultiLink editor. MultiLinks for an advertised item would have already been created, e.g., by the Autolinker. Instead of providing a regular link, the user could specify a MultiLink. Further, the user may employ the MultiLink editor to tailor a MultiLink menu as has already been discussed. As such, the user may now provide a MultiLink menu to the search company instead of a mere link, and this will result in premium sponsored links having MultiLink menus pop-up with more information when a user moves their cursor past 1410, 1417, 1445. Thus, carrying the example, when a user enters a search for "immigration lawyers" in a search field 1405, 1433, a results Web page 1444 will show results 1418 that include premium sponsored links 1417. When a user moves their cursor past the MultiLinked results 1410, a MultiLink menu 1445 pops up and may be used to access more information. Similarly, the positioning and appearance of menu items may change based on end-user activity here as well. For example, the order of the cities 1447 may change as driven by the frequency of end-user payment, by advertisers paying for placement (e.g., Boston firms may pay more and their menu entry would move to the top). In these embodiments, because the MultiLinks are so rich in information, and they are both inter and intra linked, any advertising links using MultiLinks will in many cases be found to be more relevant as search results. Such MultiLinks will have higher click-through rates than regular single-linking URLs, and thus would be more valuable in an advertising context.

FIG. 15 illustrates example MultiLink applications. In another embodiment, a MultiLink advertisement may be placed contextually within other relevant content, such as within an article or a product review, a research study, a music Web site, and/or the like. In one example, MultiLink menus could be put in the order as driven by popularity of click-throughs by independent source data such as a song's current top-40 chart rating 1510, 667. In the following example, a DOI for "Boeing" is displayed within a Business Week article, driving the user back to McGraw-Hill's World Aviation Directory (i.e., the owner of the DOI) where the desired information may require a subscription or a pay-per-view transaction from the user 1515. In the following example, a book review in Business Week may display the DOI for the book being reviewed, and the MultiLink menu could refer the user to Amazon or other retailers for purchase. Either the publisher itself (as the owner of this DOI), or Business Week (by using the MultiLink Syndicator to modify the local appearance of that menu insofar as that menu appears within Business Week) may seek fees from the retailers for placement on the MultiLink menu. The fees may take on a number of forms, such as on a referral-commission basis, on a flat placement fee basis and/or on any other basis including those described below and/or elsewhere. For example, 1525, a user may seek to buy a version of the book and select Barnes & Noble, and as such a referral fee would be received by Business Week from Barnes & Noble. Also, MultiLink menus may employ end-user activity tracking to determine what ads are used most. Further, sponsored resources may be used to rotate particular sponsors in the MultiLink menus based on usage. As such, a Web site may increase ad revenues because the end-user tracking would expose winning ads more frequently and thus, the Web sites would earn more money as their click-through rates increased.

In another embodiment, an advertisement may actually be placed on the MultiLink menu for another item, in effect using the MultiLink menu in a similar way to a billboard as screen "real estate" and/or any other form of advertising inventory. In one example, a user could move over a "Learn More" item having a MultiLink with sponsored resources 1530. As such, placement on the MultiLink menu could be offered to sponsoring advertisers for a fee, which could vary according to prominence of the fonts and colors on the menu, inclusion or exclusion of graphics or logos, or placement in terms of the order of menu choices. Placement may also be rotated amongst different advertisers, with fees varying according to how frequently a given advertiser's link(s) would appear, or what times of day, in what contexts, in response to certain kinds of search queries by the user, according to the geographical location of the user, according to the language of the user, according to user profile information which had been previously stored or had been captured as part of a dialogue with the user, and/or the like.

In one embodiment, the mechanism for populating sponsored links will be based on receiving payment from advertisers for a certain number of user impressions and for specified "key word" activities. As such, if a sponsor paid for 1,000 impressions related to "diabetes" keywords, then the Syndicator may vary the generation of menu specifications based on paid for links. In one example embodiment, a placeholder tag is put into a MultiLink record, e.g., <Sponsored Link>, into which a sponsored link may be placed. An ISICI may then issue a database query based on keywords associated with embedded MultiLinks in its content pages, wherein it selects for such keywords with paid for impressions. Upon identifying such sponsored items, the Syndicator may then insert the sponsor's link into the MultiLink placeholder. As this may be done in real-time, as a user mousing over a call for a MultiLink menu, the generation of the menu specification may be provided on demand with the most current advertisers selected from an advertising database. As the menu will be displayed, a debit of impressions for the sponsored link may be recorded in the advertisement database, leaving the sponsor with, e.g., 999 impressions.

In another embodiment, placement may be provided on the MultiLink menu to external organizations that represent online partners of the DOI owner, and which may link to related resources or products or services offered by the partner. Placement could be granted on a flat-fee basis, or as part of a reciprocal linking arrangement, or as part of an arrangement whereby one or both parties may compensate each other via referral commissions for purchases made by visitors who arrived via the other party's MultiLink menu, on a per-click or per-visitor referral basis, and/or any other business arrangement. Fees could also vary according to all the embodiments and variations described previously and/or elsewhere in this document. In one example, two parties are shown first with their own independent DOIs 1535, and then with interlinking between them 1537. As can be seen, the Snapshot reports MultiLink menu 1535 is integrated into the, e.g., SRI's, MultiLink menu as a sponsored link 1537. It should be noted that interlinking may take place with two or more parties.

In another embodiment, an intermediary such as a retailer, distributor, aggregator or syndicator such as Dialog, Factiva, Lexis-Nexis, etc. could elect to display DOI MultiLinks within its service, thus enabling MultiLink-referred traffic back to the owner's site and/or to any other site designated by the owner, with a referral commission or other compensation being earned by the displayer of the MultiLink. Rather than loading and re-selling content or products per se, the intermediary may monetize its audience or user base to drive sales back to the DOI owner or its designated parties, thus benefiting from its role as a conduit. For example, a conduit site may display a DOI (e.g., for "William Clay Ford") owned by Thomson Gale, which would then direct users to saleable Gale products such as various Biography documents 1540.

As such, MultiLinks have an impact upon "natural" search engine rankings, whether they are employed in advertisements or in any other context. Many searching systems, like Google, rank relevancy based on the number of links to a given content item. When they spider the Web, they index Web pages and track the number of links to a given content item or Web page. This information is then used in their relevance-ranking algorithms so that when a user searches for a given term, the term is not only associated with the content item but is relevance-ranked according to (among other factors) the number of links which point to that item. Therefore, when MultiLink DOIs provide interlinking between many related items, and when those items in turn interlink between many other related items (including potentially the original item), the net result is to boost the relevance ranking of the item within search results on search engines or other sites which provide search results. The association per se of a user's search query with the particular item found may or may not require an independent association method such as between the DOI MultiLink and other words on the Web page on which it appears, or between the DOI MultiLink and keywords in the header or metatags of the Web page, or via any other mechanism by which a search becomes associated with a particular search result, but the ranking may be influenced by the interlinking of related items via the DOI MultiLink. Further, the more items are interlinked, the greater the ranking impact becomes. Further still, if the DOI MultiLink is distributed to multiple locations on the Internet, instead of only on the owner's site, and regardless of whether this distribution is achieved via use of the MultiLink Syndicator or via manual ad-hoc postings on Web pages or via any other method, the ranking impact is further magnified by the presence of these multiple DOI MultiLinks in more locations.

The impact on search engine rankings can be estimated via a component of the Autolinker, wherein the number of interlinked items, and the degree to which they are interlinked, can be assessed to provide an estimate of the extent to which search engine rankings could be affected by the spidering of these MultiLinks by search engines. Although the specific ranking algorithms utilized by search engines are generally not publicly known, an impact factor can be estimated. This impact factor can then be further extrapolated to estimate the further impact accruing from the degree to which those DOIs may then become distributed around the Internet to be found by search engine spiders; the more places they are found, the greater the impact on rankings because each location represents yet another place in which the spiders will encounter a DOI, traverse all of its MultiLinks, encounter those DOIs, traverse all of their MultiLinks (including the original DOD, etc. These estimates can also be used to help the DOI owner understand how it could better interlink related information. For example identifying items which have very little interlinking associated with them (or none, as could be embodied in a "MultiLink orphan report"), which in turn could identify a failure of the DOI owner's categorization process, and as such, may highlight a weakness in the effectiveness or accuracy or completeness of its taxonomy, or other useful diagnostic conclusions.

What follows is one example embodiment that can make such measurements:

```
#!/usr/bin/perl -w
# add local libs to @INC path
use FindBin;
use lib $FindBin::RealDir."/../lib";
use strict;
use warnings;
=pod
=head1 NAME
compute_statistics.pl -
Compare crawler results to database
=head1 SYNOPSIS
Crawl DOIs and process with compute_statistics.pl --
   ### Expects input from STDIN:
   $ compute_statistics.pl --prefix 10.1225 --verbose --verbose
### When used in concert with doi_crawler.pl:
   $ doi_crawler.pl --url http://doi.contentdirections.com/mr/hbsp.jsp?doi=10.1225/682025
\
   | compute_statistics.pl --prefix 10.1225 --verbose --verbose
=head1 DESCRIPTION
Based on output from doi_crawler.pl, compute_statistics.pl will compare the
results to the content of the database. This script will output the following:
   * Count of matches
   * Count of missing
   * Count of unknown DOIs
   * Count of unknown DOIs
   * List if matches, missing, and unknown DOIs (in verbose mode only)
=head1 OPTIONS
The script takes the following options:
=over
=item --prefix
The DOI fragment against which to match results in the database.
This string will be used to select DOIs from the HANDLE table
in the Oracle database where DOI LIKE '$prefix%'.
=item --verbose
```

```
This option increases the amount of information which is output. You
may use this option more than once to increase output.
If specified once, this will cause compute_statistics.pl to list all the
MISSING DOIS.
  If specified twice, this will cause compute_statistics.pl to also list all the
  UNKNOWN DOIS.
  If specified thrice, this will cause compute_statistics.pl to also list all the
  MATCHING DOIS.
  =item --help
  =item --man
  =back
  =cut
  use CDI::DBH;
  use Getopt::Long;
  use Pod::Usage;
  # Set up getopts
  my ($help, $man, $prefix, $verbose);
  $verbose = 0;
  GetOptions( 'help' => \$help,
    'man' => \$man,
    'prefix=s' => \$prefix,
    'verbose+' => \$verbose );
  pod2usage(1) if $help;
  pod2usage(-verbose => 2) if $man;
  # Validate input
  pod2usage("No DOI prefix specified") unless ($prefix);
  # Clean up prefix
  $prefix =~ s/\'/\_/g;
  # Select all DOIs from database which match prefix
  my $dbh = CDI::DBH->new_oracle( );
  my $sth = $dbh->prepare("select DOI from HANDLE where DOI like ' ". $prefix ."%' ");
  $sth->execute( );
  # Store found DOIs in hash for easy access
  my %db_dois = ( );
  while (my ($doi) = $sth->fetchrow_array( )) {
    $db_dois{$doi}++;
  }
  # Output URL summary line
  my $url = <STDIN>;
chomp($url);
print "Summary of connected DOIs\n----------------------------------\n$url\n\n\n";
# Compare found DOIs to those passed in to STDIN.
# File into two buckets: matching, unknown
my @matching = ( );
my @unknown = ( );
while (<STDIN>) {
  chomp( );
  my $doi = $_;
  if (exists($db_dois{$doi})) {
  push(@matching, $doi);
  delete($db_dois{$doi});
  } else {
  push(@unknown, $doi);
  }
}
# Derive third bucket: missing
my @missing = keys(%db_dois);
# Output details, if --verbose
if ($verbose > 2) {
  print "Matching DOIs\n------------------------\n";
  foreach my $doi (@matching) {
  print "$doi\n";
  }
  print "\n\n";
}
if ($verbose) {
  print "Missing DOIs\n------------------------\n";
  foreach my $doi (@missing) {
  print "$doi\n";
  }
  print "\n\n";
}
if ($verbose > 1) {
  print "Unknown DOIs\n------------------------\n";
  foreach my $doi (@unknown) {
  print "$doi\n";
  }
  print "\n\n";
}
```

-continued

```
# Output summary
my $count_matching = scalar(@matching);
my $count_missing = scalar(@missing);
my $count_unknown = scalar(@unknown);
print <<EOF;
DOI Statistics
------------------------
Matching: $count_matching
Missing: $count_missing
Unknown: $count_unknown
EOF
```

In the above embodiment, a measure of the degree of interlinking may be obtained my comparing DOIs found through crawling against a database of (e.g., sponsored) DOIs. As such, the ISICI will crawl Web sites indexing their embedded DOIs. Then the results from crawling are compared to the index results in the database and also to sponsored links in that database. In so doing, the ISICI will count the number matches, missing and unknown DOIs. In one embodiment, matching and comparison may be achieved by comparing a fragment of a DOI to monitor the degree of matches for a family of DOIs. The ISICI may then compare found DOIs to any DOIs in the database or to any specified DOIs. In one embodiment, the ISICI performs such analysis for every DOI and stores it in an interlink/index and ranking table in the ISICI database 1519. In one embodiment, DOIs with a higher number of matching links are ranked higher than those with a lower amount A rankings report may be generated by selecting for the highest matched DOIs resulting in a report gauging the popularity of DOIs. Such reports may be automatically and/or periodically generated and sold. In another embodiment, such reports may be produced for sponsored links. Such statistical information may be sold separately and/or included as part of a service of sponsored links. Also, a rankings list may be provided periodically to the general public acting as a gauge of content popularity, i.e., a sort of Billboard top most popular list for DOIs and content. Furthermore, such popularity lists may be broken down into multiple areas of interest. Rankings may be limited to just music content, to personal DOIs identifying popular people, to services which identify the most popular service providers. For example, the ISICI may select only a single sector, e.g., law firms, and generate a popularity index for law firms. In another embodiment, the ISICI may limit its selection to the field of current movie releases. In yet another embodiment, selections may be limited to a certain category of products, e.g., automobiles. Furthermore, the selections may be limited by time parameters. Selections on rankings may be made for a certain time period. As such, if the ISICI selects interlinking statistics for the automobile industry for the last 12 months, the rankings will be so limited. In another embodiment, if no time constraints are placed on such a selection, then popularity throughout time may be gauged.

In one embodiment, maximizing search engine rankings may be achieved by assigning DOIs to the keywords and/or terms of a taxonomy and/or controlled vocabulary, and the MultiLinks may then be directed to any or all of the following or any other resources: other keywords of the taxonomy; all products or publications relating to those keywords; services associated with those keywords; vendors or retailers or other kinds of partners associated with those keywords; and/or the like. For example, a DOI assigned by a company to the term "avionics repair" is MultiLinked to all of the company's products across all its lines of business that are related to the term "avionics repair," whether these products are books, company database records in the World Aviation Directory, Business Week or AviationWeek articles, upcoming conferences, sponsored links such as already described above, and/or the like. In such an example, search results would come back from any search engine with MultiLinks weighted towards the top 1545 as there is a greater degree of interlinking.

In another embodiment, the same taxonomy term and MultiLinks that would cause the term to rise higher in the search engine rankings could also be used to increase the value of placement of partner links on the MultiLink menu, even in contexts where the DOI appears other than within search engine results per se. For example, a company's DOI for "diabetes mellitus" could be seen contextually within a research study, wherein the MultiLink would drive users to the company's partners (e.g., WebMD, Atkins, the scientific journal literature provided by Ovid, etc.), where such placement on the menu is offered for a fee proportional to that term's ranking on search engines (or on any other basis, such as those described previously).

Integrated. Information-Engineered. Self-Improving System for Advertising. E-Commerce and Other Customer Interactions Online Prior to the ISICI, there were no ad formats that represented information-engineered menus of links, which may provide the user with a guided navigation framework to multiple deep links that facilitate access to additional information, offers, purchase transactions, related products, etc. No other formats offered a complete navigation framework to all information and links relating to the product or subject of the ad.

MultiLink User Interfaces

FIG. 16 illustrates example MultiLink applications and user interfaces. Further, the navigation framework represented by a MultiLink has an underlying engine that creates, maintains, and centrally controls these links, either via a human editing process or more typically via an automated "assembly line" process that creates and maintains these menus based on product data fed by the advertiser. Further still, in MultiLink menus go even further than embodying information and links relating to the product or other subject of the ad; the menus can also include links that point deeply to back-end system data such as in-stock inventory information, local dealer information, special offers from various retailers of the product, and/or other kinds of information or transactions that require sophisticated integration with other online or offline systems. This capability also encompasses varying degrees of automated integration. For example, in one embodiment, a MultiLink menu may contain a deep link pointing to back-end system information. As has already been discussed in FIGS. 2-3 and throughout this disclosure, such deep links may have been created by consultation with the target system's technology staff, database administrators, Web masters and/or the like; also, the deep links may be reverse-engineered through observation and deduction. In another embodiment, the MultiLink menu creation/maintenance system may actually retrieve information from the back-end system in advance of creating the menu itself. In other words, the MultiLink's menu specification may be generated and or updated by retrieving information from a back-end system (e.g., current inventory information 1615, special pricing or bundling (see 1820 of FIG. 18), coupons, rebates, and/or the like). As such, this allows the ISICI to create and/or update MultiLinks based on information dynamically retrieved from back-end database systems. This allows a user to obtain, navigate and interact with back-end information without having to navigate through actual Web pages and/or target references. FIG. 16 shows a MultiLink menu with composite information detailing the inventory and price of specific automobiles 1615. An end-user may even enter form information right within a MultiLink menu 1625 without having to traverse the actual underlying target reference links contained within the MultiLink menu. Alternatively, the MultiLink menu allows a user to navigate to the back-end system 1620 by selecting a menu selection 1621 targeting a reference address where the user may interact with the back-end system directly 1622.

ISICI Topology

Figure 17:
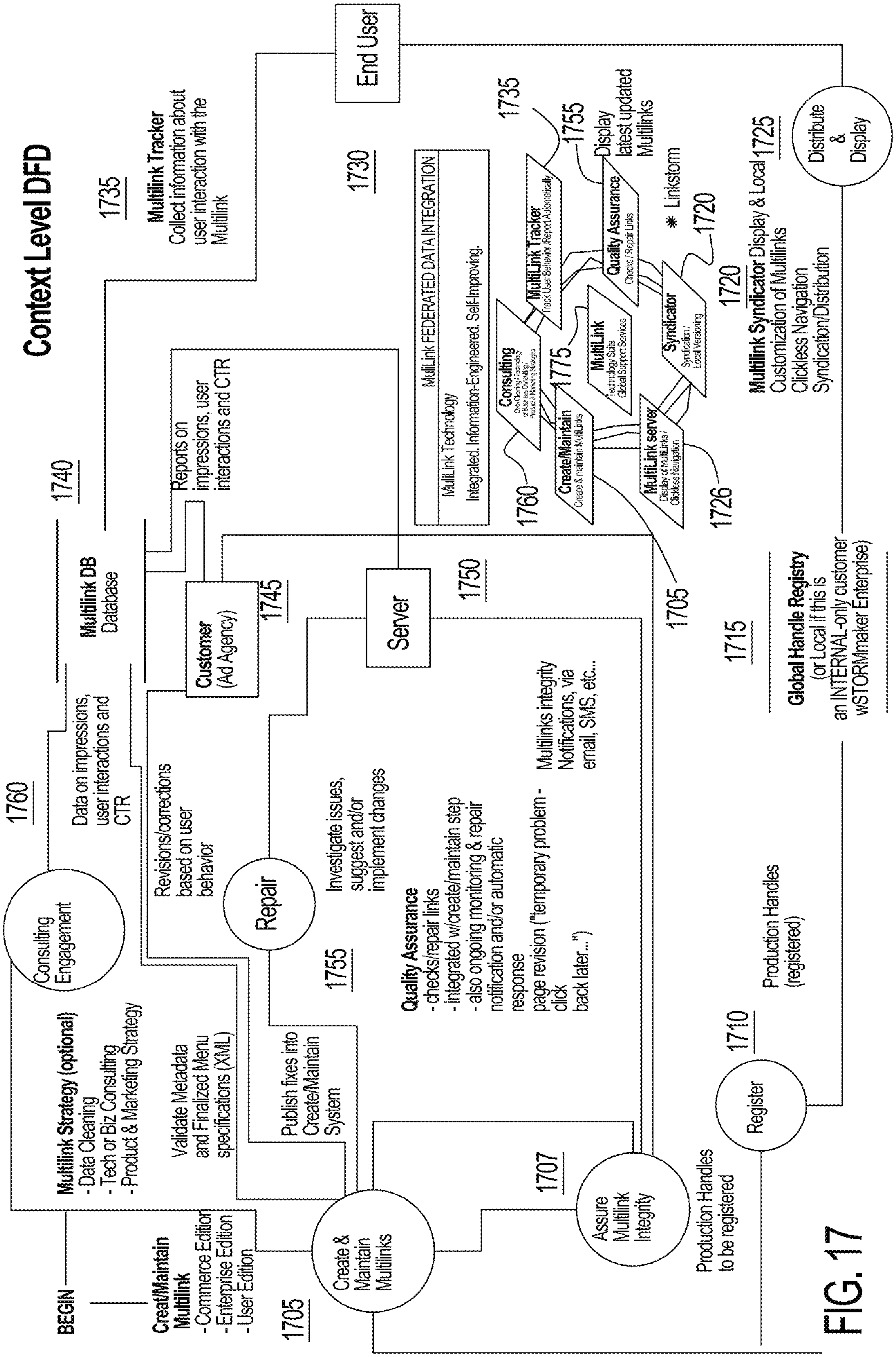
FIG. 17 is of a mixed data flow diagram illustrating embodiments of a MultiLink eco-system.

FIG. 17 is of a mixed data flow diagram illustrating embodiments of a MultiLink eco-system. Generally, the ISICI allows for the creation and maintains of MultiLink menus 1705. The creation of the MultiLink menus results in the registration of MultiLinks in an UPUNI global registry 1715. Syndication of the MultiLink menus take place 1720 and as the MultiLinks and menus are propagated and displayed 1725 by end-users, a MultiLink tracker collects information about the end-user's interaction with a given MultiLink menu 1735 and stores that tracking information in a MultiLink tracker database 1740. This tracking information 1740 may be used by advertisers and other service providers 1750 to further refine, repair and/or otherwise service the MultiLink menus. In one embodiment, a quality assurance provider 1750 may use tracking information to assure MultiLink integrity 1707 as MultiLink menus are being maintained and/or created 1705. For example, if a particular MultiLink menu entry becomes very popular and the target reference of that menu entry becomes overwhelmed so that many users are denied access, the quality assurance service provider 1750 may repair the MultiLink menu 1755 specification by providing an updated target reference (e.g., providing a new target reference for an alternative server with greater capacity, providing an alternative menu entry, and/or the like).

In another embodiment, an ad agency may use the tracking information 1745 to refine MultiLink menus so that more popular menu selections are more prominently displayed. For example, an ad agency might move a popular menu selection towards the top so it is more easily selected; move a less popular menu selection towards the top so it is more easily selected in an attempt to make that selection more popular; place sponsored advertising in menu selections; allow for advertisers to bid for placement of advertising; and/or the like. Also, the MultiLink menu may include menu items that are all, partially or devoid of sponsored advertising. In one embodiment, a specified number of MultiLink menu item slots may be reserved for sponsored advertising. The number of item slots may be anywhere from none, to some, to all of the MultiLink menu items. In such an embodiment, advertisers may bid for placement of their ads in the available spots. In one embodiment, the bidding and/or placement of ads is based on the context of: the other MultiLink menu items, the contents of the targets the MultiLink menu items, the contents of the cause of the MultiLink menu item (e.g., a hyperlink and/or its reference), the content of the end-user's current point of navigation (e.g., their currently displayed Web page), and/or the like. It should be noted that the advertising slots may themselves be tracked. For example, the MultiLink tracker may allow for the determination of more effective placement of ads in a MultiLink menu. For example, in some context, slots devoted to MultiLink menu ads may work more effectively sprinkled throughout the MultiLink menu, while in other contexts ads may work better if featured in more prominent locations (e.g., at the top of the MultiLink menu). Furthermore, the format of MultiLink menu ads may be refined through tracking. For example, in some contexts MultiLink menus that prominently express they are ads (e.g., by preceding any text in a MultiLink menu ad slot with "AD:") may work better, while in other contexts having MultiLink menu ads that blend in with the remainder of the MultiLink menus may be more effective.

As such, advertisers would be able to modify the Multilink menu specification upon in response to tracking information from the MultiLink tracking database 1740. In one embodiment, a consulting industry may be engaged to provide marketing and product strategies as to how to best populate and design MultiLink menus 1705 as part of an overall marketing strategy 1760. As such, the marketing consultants will also benefit from the end-user tracking information stored in the database 1740.

A more streamlined view 1775 of the above described feedback loop demonstrates how each of the aforementioned components may generally interact with one another. In this simplified view, shows a continuous cycle of self-improvement 1775. The feedback loop rotates counter-clockwise, starting at the top with "Consulting" 1760. In this embodiment, the consulting service begins the business process of working with clients to capture their product and marketing strategies and their understanding of their target customers' purchasing life-cycle. The consultants can try to best gauge an initial seed of items to populate the MultiLink menu for a particular marketing campaign. This initial seed may be used to actually create the MultiLink with the creation/maintenance component 1705 as has already been described (e.g., via a fully-automated, data-driven, "assembly line" process using the Autolinker, or whether via a manual creation process using the MultiLink editor, and/or the like). The MultiLink server 1726 enables the display/clickless navigation the MultiLink menu. The Syndicator 1720 distributes the links anywhere on the Web without requiring a local software install, yet still allows for individual local-site customization just as the MultiLink server does, e.g., when it is installed on a local site. The quality assurance component 1755 checks the integrity of MultiLinks. At this point, the MultiLink tracker 1735 may track and report end-user behavior back to either the creation/maintenance component 1705 and/or to the consulting facility 1760.

MultiLink Tracker

Figure 19:
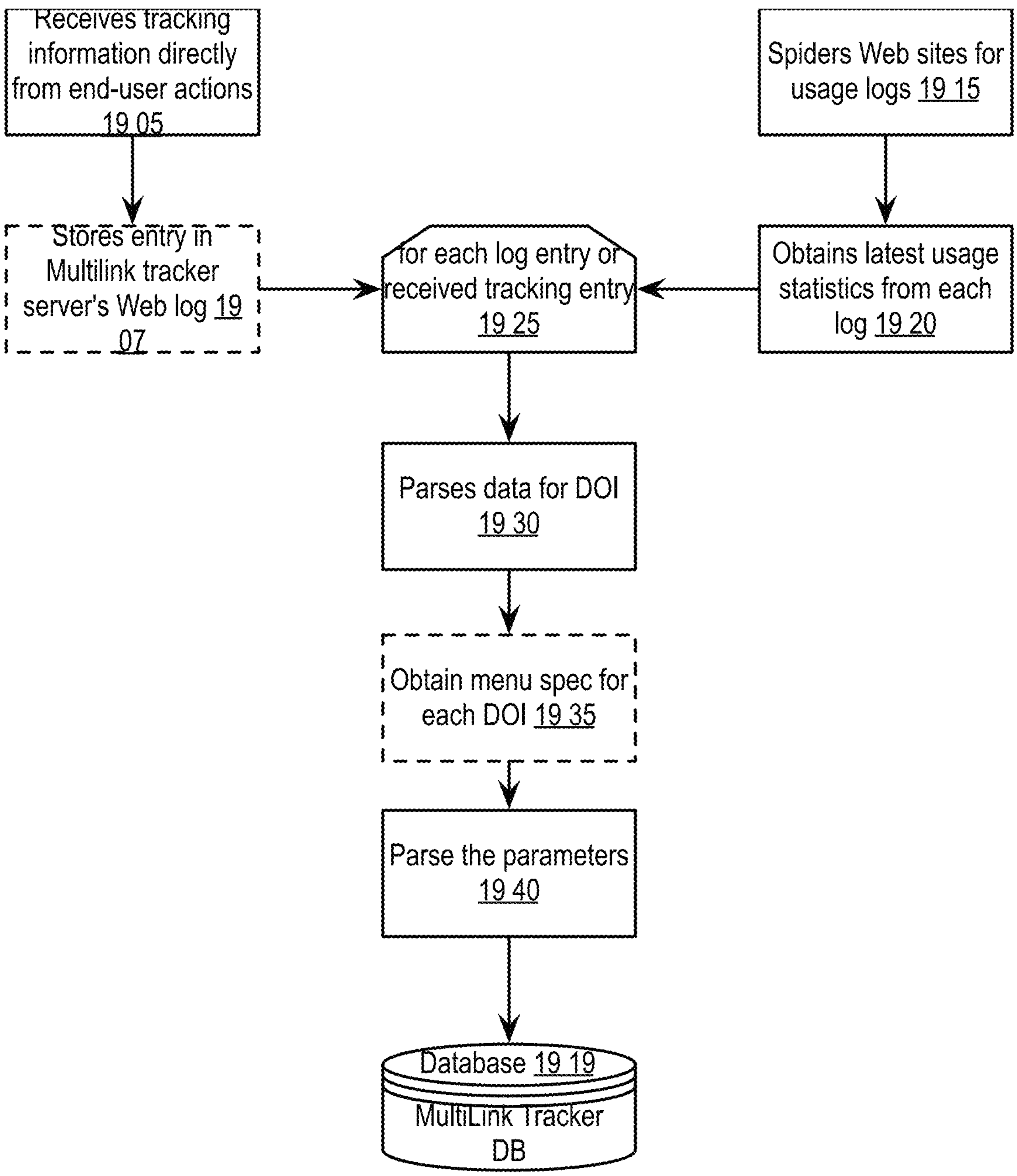
FIG. 19 is of a logic flow diagram illustrating embodiments of a MultiLink menu tracker.

FIG. 19 is of a logic flow diagram illustrating embodiments of a MultiLink menu tracker. The MultiLink tracker may collect tracking information in at least two ways: receiving tracking information directly resulting from an end-user interaction with a MultiLink menu 1905 (i.e., clicking on a MultiLink menu item resulting in engagement of an HTTP post to the MultiLink tracker server address) 1905, spidering Web servers for usage logs 1915, and/or the like. The MultiLink tracker employs a spider to retrieve the usage logs at Websites across the Internet 1915. In one embodiment this is achieved by spidering to every IP address to a statistics page (e.g., http://123.123.123.123/statistics). In another embodiment, arrangements are made with ISPs and host providers to transfer usage logs on a regular basis from FTP points. Once the usage logs are obtained 1920, the MultiLink tracker may begin analyzing the individual usage entries in the logs 1925. In one embodiment, the MultiLink tracker will analyze each log entry 1925 continuously (until it exhausts all entries in all Web logs). In another embodiment, the MultiLink tracker may process the logs at specified times (e.g., as initiated through cron jobs) 1925. Alternatively, the MultiLink tracker may receive tracking information directly from end-user actions 1905 (as has already been discussed in FIG. 2). When the MultiLink tracker receives tracking information directly 1905, it may pass each end-user tracking item on to be analyzed on a continuous and dynamic basis 1925, or alternatively, the MultiLink tracker may store such tracking information (i.e., HTTP posts) in its own Web server log 1907, which may be processed along with other logs 1925.

Generally, Web servers maintain Web logs that list every single request made by users. Generally, these lists are ASCII lists that transcribe the full HTTP address and request. As such, when the Autolinker generates parameters that are appended to a tracking address (as was described in FIG. 2), the Web logs will have lists that may be parsed for such information. In one embodiment, the Web logs may contain entries such as this:

http://www.chrysler.com/bridge/full_inventory.html?linkstoru_path-crossfire

The actual Web address reference is "http://www.chrysler.com/bridge/full_inventory.html," and is followed by a parameter that identifies the "crossfire" menu item (see 1602 of FIG. 16) in the MultiLink menu. In an alternative embodiment, menu item numbers are used as parameters, as was already discussed in FIG. 2, e.g.:

http://www.trackerserver.com/postvalues?doi://10.109/0395960789?nenuID:12345?hover:4:menuTier:1:2?hover:2:menuTierClick:1:3

Thus, each such entry 1925 in the Web log is parsed (e.g., popping every ASCII string that is separated by a carriage return and parsing for DOI 1930 and parameter values 1940). Numerous parameter values may be included and parsed such as: hover times, menu item selection values, menu specification ID, and/or the like. In one embodiment, when a MultiLink menu specification ID is passed as a parameter, the menu specification may be obtained 1935 and used as a dynamic template in parsing the parameters 1940. Upon parsing out end-user tracking activities 1930, 1940, the MultiLink tracker may save those parsed values to its database 1919.

Figure 20A:
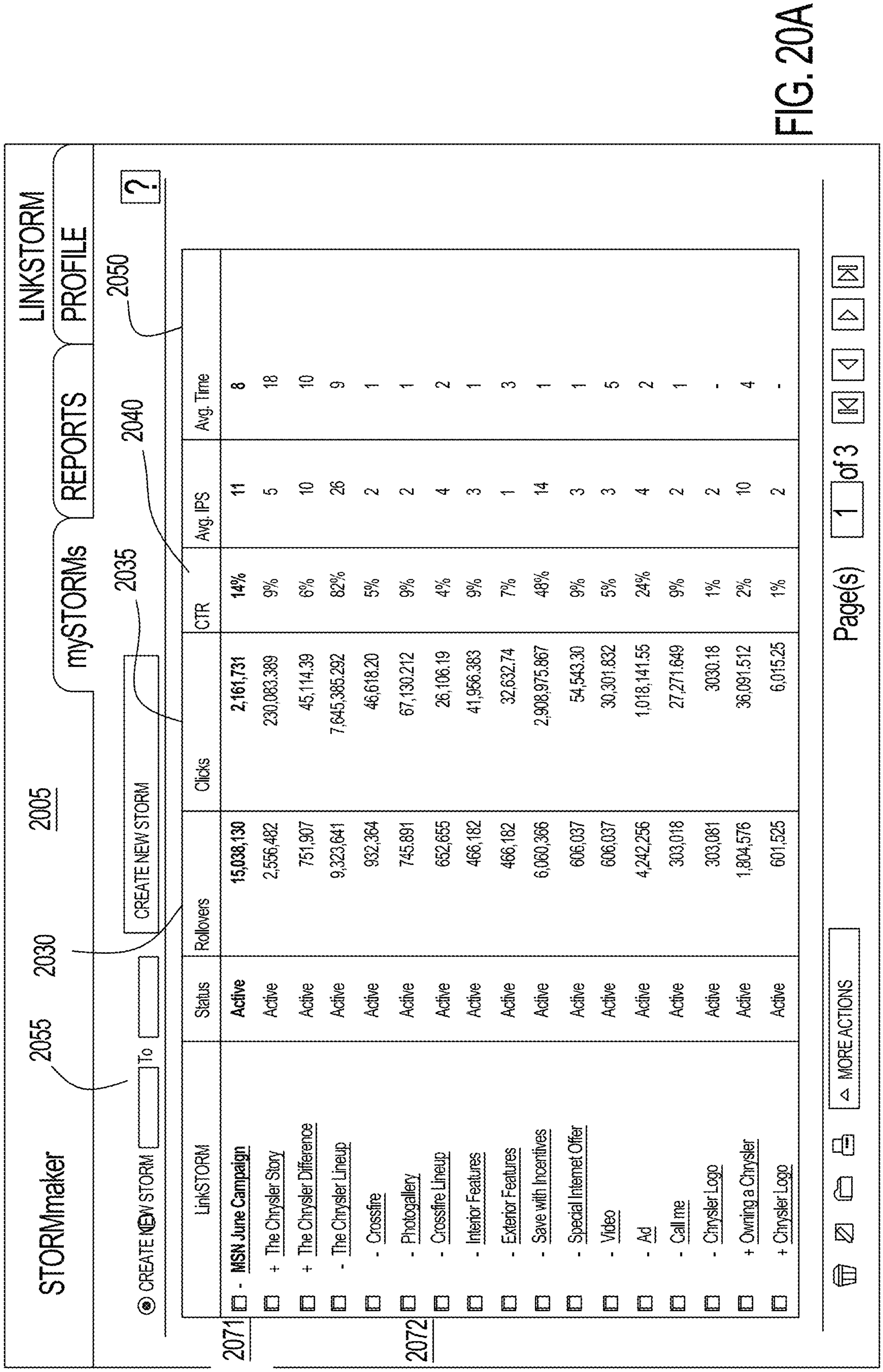
FIG. 20 shows a MultiLink tracking user interface and tracking log.

FIG. 20 shows a MultiLink tracking user interface and tracking log. The MultiLink tracker database may be queried by individuals through a MultiLink tracker interface 1205. The MultiLink tracker interface may provide SQL queries to the database to provide various activity tracking statistics 2030, 2035, 2040, 2050 for each MultiLink menu 2071 and its sub menu items 2072. For example, date ranges 2055 may be provided in the interface, which are then used to constrain the SQL select of data so that the various metrics are limited to that date range. Various statistics like menu item rollovers 2030, clicks 2035, click through percentages 2040 and average time spent on a menu subitem 2050 may be discerned. These tracking values come from Web logs. Alternatively, DOI handle use may be tracked via a Web log 2080 that maintains the accessed DOI 2010, number of accesses 2015, title 2020 and other types of information. However, the MultiLink tracker database may also be queried and accessed programmatically through HTTP requests that are parsed into SQL requests. For example:

http://www.trackerserver.com/query?doi:10.123/12345{?statistic type}

In the above example, a DOI "10.123/12345" would be used as the basis of a select command and the database would send back an HTTP post of all the matching database records to the requesting agent. The amount of tracking information may be further limited with the addition of an optional "?statistic type" parameter. For example, the additional parameter might be "menultem:1:3," which would return statistics only for the third item in the second tier menu for a given DOI. Another search limiter is "clicked," which would return only the total number of clicks for a given DOI. As such, various entities may make use of the tracking information from the MultiLink tracker database.

Purchase Cycle Compression

FIG. 21 illustrates a purchase cycle. In one embodiment, the ISICI addresses the problem with prolonged purchase cycles and potential purchaser attrition. The purchase cycle for high-engagement goods and/or services 2105 is depicted in a multi-tier chart 2105. High-engagement purchases require a purchaser to make numerous decisions that are based on various objective and subjective factors. Examples of high-engagement purchase may include: automobiles, boats, homes, professional services (e.g., medical, legal, etc. services), stereo systems, televisions, and/or the like. The figure illustrates that in the early stages 2110, purchasers may spend anywhere from 2-6 months deciding on just which segment they are interested in. For example, when shopping for cars, purchasers may spend several months deciding if they want an SUV, a mini-van, a station wagon, etc. After identifying a segment 2110, middle stage purchasers may then spend anywhere from an additional 1-3 months deciding on which brands they are interested in 2115. After that 2115, in a late purchasing stage, purchasers may spend from 1 week to 1 month deciding on specific products and/or features within a brand 2120. For example, if purchasers decide on buying a Dodge Crossfire automobile, they may need some time to decide if they want various options like a sunroof, a deluxe stereo package, a particular color, etc. Finally, in a last purchasing stage, purchasers may spend 1-2 weeks finding a transaction partner 2122. For example, the purchasers may go to several automobile dealers in order to make a purchase. As can be seen in the figure, the number of potential purchasers 2111 decreases at each stage 2116, 2121, 2123 due to customer attrition. In many cases this attrition is caused by the loss of interest due to the long time involved in this multi-stage purchasing cycle.

The ISICI manages to compress the purchasing cycle down from months to moments. As can be seen in FIG. 16, when a purchaser hovers over an ad that is MultiLink menu enabled, they may obtain information about various market segments (e.g., numerous car types are available for the purchaser to examine under the line-up menu item) 1616, about the brand 1617, and even the inventory of various dealers 1615. Thus, the entire purchase cycle, from first ad impression straight through purchase may be achieved by navigating a single menu. Furthermore, as customers make purchases and their activities are tracked, advertisers may refine menu items and information that were favored by purchasers to further increase menu efficacy.

Additional Tracker Embodiments

The ISICI's tracking services have the ability to quantitatively measure the effectiveness of the MultiLink menu by actually monitoring the results of end users' interactions with these menus. In one embodiment, the ISICI system can determine how many hits and unique visitors are driven to a given Web site via the MultiLink menus, as opposed to hits and visitors that arrived at that Web site any other way. This allows for precise monitoring of the menu's effectiveness by measuring the hits and visits that are specifically and directly attributable to the menu, rather than just circumstantially related as is the case with offline media advertising. In addition, if the target Web site has a shopping cart capable of recognizing and crediting a referral code, then the system can determine how many actual sales, subscriptions, or other commercial transactions were referred via that MultiLink menu. In this way, an actual monetary benefit and return-on-investment can be attributable to the MultiLink menu. The system can also measure the menu's rate of click-through and rate of sales conversion by comparing these eventual hits, visits and purchases against the original number of visitors who were exposed to the menu in the first place.

The MultiLink menu's role in the new advertising model as has been described herein. The ISICI can measure the effectiveness of a MultiLink menu as an actual expression of an advertiser's conception of the end user's decision-making process (e.g., where different branches and pathways of the menu correspond to different stages in the prospective customer's decision life-cycle, and where each stage of this life-cycle implies its own set of information needs). The system can actually track the effectiveness of the marketer's conception of the life-cycle, as embodied in the menu, by empirically measuring the accuracy of its fit with actual customer behavior. As such, to some extent even a marketer's efficacy can be measured based on changes they effect on MultiLink menu ad campaign design. We have described how it is possible to compress the decision-making cycle by providing in a single menu all the information needs required by an end-user throughout the entire decision-making cycle. In addition to compressing the cycle chronologically for any one customer, this approach also has the benefit of servicing a wider range of customers because, at any given point in time, many customers exist who are already in various stages of the decision cycle, and yet all of them can be serviced via this single ad.

Such measurement may be achieved by tracking the specific paths navigated by users through the menu. Thus, in one embodiment, instead of just measuring the effectiveness of the MultiLink as a whole in aggregate, the individual pathways on the MultiLink menu can be monitored and/or measured to determine effectiveness (e.g., whether or not the whole menu drives click-throughs and purchases may be measured as function of how the individual pathways on the menu). Further, the ISICI may monitor and separately measure each distinct pathway through the menu, and report back how many times users chose certain paths as compared with others.

There are at least two approaches by which such tracking may be accomplished: 1) the ISICI can track the user's behavior in interacting with the menu per se (i.e., even before choosing to click through any particular menu link), and/or 2) the system can track the end result of the user's interaction when the user actually clicks through a particular link and arrives at the target (e.g., Web page, shopping cart, query, and/or any other transaction). In some respects, the two approaches overlap in that they measure the same user behavior but from two different angles. The two different ends of the user's click-through may be viewed as a) the menu end where the user begins by clicking away to the target site, and b) the target-site end where the user arrives. In other respects, the two approaches measure phenomena differently:

1) The "menu per se" ["menu per se" is just a suggestion—feel free to reject. But I did change the subsequent occurrences] approach tracks the user's interaction with the menu itself (i.e., the frequency of rollover on the various expanding hierarchical sections of the menu, the hover time on individual sections or individual links, the hover time on the menu overall prior to any click-through, etc.). The menu per se approach can also track the fact that user eventually clicks through a particular menu choice. But then once the user has left and gone to the target site, the per se approach, generally, is not tailored to retrieve further user activity information without employing the second "target tracking" approach (which can be later integrated with information from the "menu per se" approach).

2) The second "target tracking" approach tracks the user's arrival and subsequent behavior on the target site itself, but generally does not track what the user was doing on the menu prior to the click-through, at least until its information is integrated with the information captured by the "menu per se" approach. However, one exception occurs when by inferring the user's behavior on the menu prior to the click-through based on tracking statistics captured on the target site. For example, if the same user (as identified by IP address, by parameter passed from the menu, and/or the like mechanism) were to 1) first arrive at one page on the target site, then 2) a moment later, arrive at a different page (having again reached that page from the menu), then 3) a moment later, arrive at yet a different page (again having gone back to the menu in the meantime), then it is still possible to gather statistics that are informative regarding the user's behavior on the menu. Some of the statistics that may be inferred include: the time required to return and navigate down a different tree of the menu, the relative utility of different menu choices that might be adjacent on the menu and which either generated or did not generate additional click-throughs per se, and/or the like.

In one embodiment, the tracking mechanisms themselves can be described more fully as follows:

Approach 1) With "menu per se" tracking, statistics such as frequency of rollovers for different parts of the menu, hover times on different parts of the menu, average time from menu opening to click-through, etc. can measured through any of several mechanisms. In one embodiment, a pixel associated with an HREF can be embedded within a menu label as a tracking pointer, so that the mouse-over of that menu item is registered on the server associated with the HREF. In another embodiment, a particular menu label can be associated with I-ITP Post, so that any event associated with that menu label (e.g., a user clicking through it) can be recorded by a server which is the target of the HTTP Post, even while the user herself is actually sent on to the other target reference associated with that menu label (i.e., the target reference (e.g., a URL) is intended for the user to go it upon click-through).

Approach 2) With "target tracking," each distinct click-through point on the menu (i.e., each menu choice which is capable of sending a user off to a target reference (e.g., Web site, shopping cart, process, query, and/or any other transaction) can have a mechanism such as a referral code which would have been appended or pre-pended to the target reference in advance. Such codes may be supplied during the creation/maintenance of MultiLink menus. As such, when a user arrives at the target reference, the referral code identifies the user unambiguously as having come not only from the MultiLink menu in general, but from a particular menu choice on the MultiLink. For example when the user clicks on "Search Inventory" 1621 of FIG. 16 and goes to Chrysler's general-purpose Web page 1622 of FIG. 16 where a user can search inventory, the menu label "Search Chrysler Inventory" would have a URL of "http://www.chrysler.com/bridge/full_inventory.html?linkstorm_path=crossfire," where "?linkstorm_path=crossfire" is the referral code and value indicating that this user came to this page via the menu choice under "The Chrysler Lineup→Crossfire→Search Inventory" pathway on the menu, and not from, say, the path "The Chrysler Lineup—PT Cruiser—Search Inventory" or the path "Owning a Chrysler—Purchasing—Search Inventory" or any other path that might also lead to that same target URL. In this way, the relative popularity of the different pathways can be measured. Similarly, on the target website where the user arrives, the site's standard server logs will record the fact that this user came to the page http://www.chrysler.com/bridge/full_inventory.html by actually going to the URL http://www.chrysler.com/bridge/full_inventory.html?linkstorm_path=crossfire," and thus it is possible to search and retrieve all records of visits to the latter URL (or any URL ending with the referral code "?linkstorm_path=crossfire"), and to compile these statistics into an Excel spreadsheet, the ISICI database, and/or any other reporting mechanism. Similarly, if the user proceeds to make a purchase, most web sites' standard shopping cart functionality can also recognize that same referral code and credit that referral with a % commission of the sale price, or simply track and report on the success of the referral.

The results from the target-site-end can be integrated with the results of "menu per se" approach from the menu-end in order to produce consolidated analytical metrics such as click-through rates, sales conversion rates, and the like 2005 of FIG. 20.

These metrics may then be (automatically) funneled back into the menu creation/maintenance system 181 of FIG. 1. According to certain business rules established in advance, these metrics can be set up to automatically drive modifications to the menu itself going forward. In one embodiment, a rule may be created that changed the order of menu links once a day by shuffling them in order of actual popularity during the preceding day, or cumulatively. For example, the "Call Firm Now" 1446 of FIG. 14 could place moved to the top of the menu if it proves the most popular. In another example, the "Sponsored Resources" link on the menu 1530 of FIG. 15 is an ad in its own right; the ad lives on the "real estate" of a MultiLink menu. The menu can be filled with the link from a particular Sponsor, or rotated onto the menu more frequently than another Sponsor's link, if the first Sponsor turns out to draw greater click-through rates. This MultiLink ad menu embodiment has the byproduct of maximizing ad revenue for the site hosting the menu because placing a more popular menu choice on the menu more frequently will draw greater click-through rates, and this is often a direct driver of the hosting site's ad revenues.

Another example rule is to drop certain choices from the menu entirely if they are rarely interacted with (i.e., they were never clicked on (or even hovered over) within a one-month period). Another example is a rule that took a menu choice from lower down in the hierarchy (e.g., the "Search Inventory" menu choice 1621 of FIG. 16) and moving to the first level of the menu hierarchy 1633 if it proved to be popular.

In another embodiment, changing menu position (and/or adding or dropping links) may be based on complex measurements like the ratio between hover time and click-throughs, the frequency with which a user clicks through certain menu choices after viewing a full-motion audio-accompanied video within the menu 1610 of FIG. 16, and/or the like.

MultiLink menus can also be locally customized on a particular site. This may extend to specifying different referral codes that may also identify the referrals as coming from a particular instance of that menu on a particular site. For example, the same ad placed on one publisher Web site could be amended to include a referral code specific to that site, whereas the same ad placed on a different publisher's site may be amended to include a referral code specific to that site.

As such, the ISICI tracking mechanisms can be elaborated with various rule sets specific to varying organizations. This may become a basis for creating affiliate networks, where each affiliate can use an affiliate-specific referral codes to identify its own referrals, and thus, receive sales credit for its own sales referrals or even for simple click-throughs that might be compensated on a per-click basis. The same feature can also be used in a security/access control context, where only referrals from a certain trusted web site will be allowed to view confidential information on the target site such as medical patient records, military/intelligence information, or published content requiring subscriber status in order to view.

As described elsewhere in this application, the source data that drives modifications of the menu need not be related at all to actual user behavior in connection with the menus. A modification to place a certain model of car at the top of the list could be driven instead by independently-measured sales records indicating that this was a fast-selling model. In FIG. 100 (RealPlayer example), songs could be added or dropped from the menu, or their order changed, according to independent source data such as the songs' current top-40 chart rankings. In FIG. 99 (MSN Search example), law firms could be listed within a given city in an order that was driven by how frequently users actually click on the various firms (as monitored through our tracking mechanisms), but the order could alternatively be driven by independent data such as the overall spend of the different firms for advertising or other services from Martindale-Hubbell, the owner of the MultiLink menu.

In one embodiment with Chrysler cars, local dealer inventory information is actually retrieved from Chrysler's back-end systems and brought forward right into the menu upfront 1615 of FIG. 16. Such information may be pulled selectively based on the sales performance of the individual dealers. This source data may come from Chrysler's other back-end systems (e.g., its sales database), or even from the individual dealers' sales databases. Alternatively, the local dealer information may be selected for display based entirely on the end users' behavior as measured through our tracking system itself, as has already been described.

Independent source data may be comprised from many other types of sources such as: demographic information about the users, either individually or in aggregate; user preferences and interests as recorded in other independent systems; geographical location of the user, time of day when the menu is being viewed; and/or the like.

Overall, the feedback mechanism allows MultiLink menus to become self-improving based on feedback from the real world. That feedback can drive changes in a sophisticated, information-engineered menu that may be an expression of the whole range of customer information needs required by a wide range of customers across a wide range of stages of their purchasing cycle. As such, that expression may become self-improving based on actual empirical information regarding its own effectiveness, and/or based on other independently-collected information that can make the menu more relevant and useful to the customer, as well as more effective for the advertiser. These self-improving modifications can either be fully-automated based on rules, or manually implemented based on human review of the data on user behavior and/or other source data.

Even where modifications employ human judgment, the ISICI provides automated mechanisms to greatly assist the process. The MultiLink editor permits updating of the MultiLink menu and then the posting of the updated record to the Handle System; it should be noted that any other "level of indirection" for updating, maintaining and/or serving the menus would serve equally well in principle, and is equally covered by the present invention, however, any other such alternative approaches may derive additional scalability and standards-based benefits from the Handle System. The MultiLink editor may provide a visual indicator of the statistics indicating the relative popularity (e.g., impressions 1836, click throughs 1837, click-through rates, hover times, frequency of rollover, etc.) that has been recorded for these various menu choices. In this manner, the human editor has the empirical tracking data available right within the MultiLink editor where the changes are actually made.

Numerous Embodiments

As such, prior to the ISICI there were no systems that had a feedback loop with takes this kind of data and feeds it back to the beginning of the process where the menus are actually created and maintained in the first place. In terms of distribution and maintenance, ad formats once placed by the ISICI are automatically maintained. Before the ISICI existed, when a change was required, the ad itself had to be changed and then re-served out to all locations. As such, updating ads involved a time delay, especially in the case of Rich Media ads where the purpose of the ad is primarily attention grabbing; such ads are creative-intensive, labor-intensive and graphics-intensive and as a consequence, they require significant amounts of time to update reference links. With such older style ads, even when they were finally revised, the new "master" copy had to be delivered to an ad serving mechanism, which then served the revised ad out to all appropriate locations. In contrast, the ISICI overcomes such limitations because all of the ads in every location may be controlled centrally every time they are loaded; therefore, a revision to a MultiLink menu propagates instantly out to all occurrences of the ad using the MultiLink menu on the Web.

Note that the ISICI approach can equally be applied to traditional ad serving mechanisms as well (i.e., MultiLink menus may be served through DoubleClick, et al.). MultiLinks can also be layered right on top of any existing ad format such as a banner, Rich Media ad, contextual ad (e.g., Google's Sponsored Links), contextual links (e.g., Vibrant Media), video files (e.g., Quicktime), and/or the like. These other ad formats may serve as the delivery mechanism for MultiLink menus. Thus, the MultiLink menus may be distributed through existing distribution methods in addition to and/or in place of the ISICI's call to a central directory such as the Handle System. Any other "level of indirection" for updating and maintenance would serve equally well in principle by providing additional scalability and standards-based benefits of the Handle System. Another advantage is that MultiLink menu enabled ads are engineered, informational, functional, navigable, and centrally controlled. Further, that central control is now augmented with a feedback loop that improves the menus based on empirical user behavior data as tracked from users' interactions with the menus.

This feedback may be achieved via human judgment based on this source data (e.g., where the menus are either modified manually, or the automated "assembly line" process is modified to apply different menu creation rules going forward based on human judgment), or the feedback improvements can be fully automated (i.e., become automatically self-improving) by allowed the data to drive changes in the menus directly, based on pre-stored business rules. Example rules include: menu items that are tracked having greater numbers of selections are moved to the top of a menu; menu items that are tracked having greater durations of hover time from an end-user's cursor are moved to the top of menu; sponsored links with higher bids are placed higher in a menu; newer menu item entries are put higher in a menu (e.g., new product announcements); less frequent menu items are put to the top of a menu list to attempt to increase click throughs; mapping of outside lists are used to generate menu link orders (e.g., top-40 lists are used to rank menu items); and/or the like.

Taken together, the integrated suite of services represented by the ISICI enables entirely new conceptual approaches to advertising and customer interaction online. For example, the MultiLink menu enabled ad not only enables the user to pick from a wide variety of choices in relation to an ad (e.

g., instead of only a single link resulting in navigation to a splash/landing page), it also enables a fundamentally different approach to servicing users.

The following are some of these new approaches, and the new business processes that they introduce:

In one embodiment, because these MultiLinks provide such a wide array of deep links to the user (e.g., MultiLink menus are limited only by the practicalities of screen size, and typically comprise at least 30-40 separate links, neatly unfolding via hierarchical drop-down menus), they expose the user to the entire universe of options available to them; it allows users to navigate through all the choices available at reference target (e.g., a Web site) simply via a mouse rollover, without having to click through from screen to screen on a potentially new and unfamiliar Web site. This "clickless navigation," which can be explored via rollover alone, radically reduces the amount of time required to bring a user directly to an offer, a shopping cart, or a related product. This "clickless navigation" is superior to the traditional approach of clicking through a link (e.g., to an ad) to a Web site, then waiting for that page to load, reading the new choices on that page, clicking through to something else, determining that the click was in error and having to click back to follow another path incurring similar navigation load and re-display time penalties, etc. The traditional process is rife with potential for frustration, errors, loss of customer attention, a delay for every single click (for a new page to load), and/or the like. MultiLink menus overcome all of these shortcomings.

Therefore while traditional ad formats are oriented toward trying to generate user clicks, even to the point of getting compensated based on click-throughs (pay-per-click advertising models such as Google's AdWords and AdSense), the present invention is premised on the idea that while every click is an opportunity, every click is also a risk. With MultiLinking and clickless navigation, the time between capturing the user's attention and bringing the user directly to what they really want is radically reduced. After a fast and efficient exploration process via rollover, a single click brings the user directly to what they really want. As a result, MultiLink menus produce significantly higher click-through rates than regular hyperlinks. In addition, when a user does click through a MultiLink menu and arrives at a target (e.g., a website), that user is more likely to make a purchase as compared with visitors who reached the site via traditional Web ads.

In addition, MultiLinking presents the opportunity to service both a wider spectrum of customers, and a wider spectrum of stages in customers' purchasing cycles. There is a natural life cycle to the customer's purchase process, especially in the case of purchasing decisions which are information-intensive (e.g., cars, consumer electronics, professional services such as doctors or lawyers, etc.), and the customer has different information needs at the beginning of the cycle (e.g., 6 months away from buying a car, when they're simply deciding whether to look for a mini-van versus an SUV versus a station wagon) than at the end of the cycle (when they now know the make, model and features they want, and it has come down to who among their local dealers has the best price or incentives, and actually has the car in stock). MultiLinks are able to service the entire spectrum of customers in all these stages of the purchasing cycle, and to do it all within a single menu. Hence the MultiLink menu compresses the purchase cycle.

Further, the design and implementation heuristics for MultiLink menus may then become more subject to a company's marketing strategy whereby different customers in different stages of the cycle can be serviced appropriately, yet all via the same ad. This process can be facilitated via consulting services and sharing of best practices. As such, a MultiLink menu directly expresses the advertiser's marketing strategies with respect to its particular customers and the particular stages of their purchasing cycle. For example, in FIG. 16, the first menu choice "The Chrysler Story" 1606 expands to display a set of links oriented toward an early-stage customer just getting familiar with different brands. The second choice "The Chrysler Difference" spawns a set of links supporting the choice of Chrysler versus other brands. The third "The Chrysler Lineup" 1618, which is actually shown expanded in the figure, provides detail on the various Chrysler models; in addition, the MultiLink menu takes the user all the way to local dealer inventory information, which has been brought forward all the way from the back-end inventory systems of Chrysler and/or its dealer network, and displayed upfront on the MultiLink menu.

Further, the system is self-improving because the user's behavior can be monitored and then fed back into the MultiLink creation/maintenance process going forward. For example, local dealers could be added or removed from the menu based on how many (or few) customers actually click on those particular dealers. Or the source data that drives the modification of the menu can be another source entirely, such as Chrysler's own independent sales records indicating which dealers are turning over the highest volume of sales. Or, once again, the source data that drives menu improvements can also be the tracking data that captures customers' actual behavior in interacting with the menus: e.g. changing the order of Chrysler models on the menu depending on which models are hovered on the longest, or adding or dropping certain sales incentives based on whether or not they actually draw user click-throughs.

MultiLink menus represent a new concept in advertising and indeed in Web navigation generally. The creator of the link, who is after all the expert in knowing its own product line and its strategies for marketing or customer service, defines the overall navigation framework, yet the user is the one who chooses where to go. Unlike the traditional struggle between the advertiser who wants to intrude on the user's attention, and the user who doesn't want the distraction, MultiLink drop-down menus are unobtrusive and customer friendly. MultiLink menus are non-disruptive to a user's browser state. They appear upon rollover and they disappear immediately when the user mouses away. The user finds them informative, useful and efficient, even before having to make a leap of faith by clicking through the ad. Further, the user only clicks through to particular links after already determining that this is where he/she really wants to go. Seeing the full range of choices in advance is like the seeing a glass door and simply deciding whether to go through it to what is already visible on the other side, versus seeing an opaque wooden door and having to make a leap of faith that there is something useful on the other side. This is a win/win, where the advertiser gets to expose the user to a wider variety of information and offers than before, yet it is the user who is empowered to navigate and choose.

As such, MultiLink menus may use any number of vehicles for aiding in advertising, ecommerce and user interactions, including:

- MultiLink-enabled Banner Ads (i.e., display ads) (e.g., 1677 of FIG. 16);
- MultiLink-enabled Sponsored Links (e.g., Google AdSense or AdWords) (e.g., 1417 of FIG. 14);
- MultiLink-enabled contextually-embedded links 1545 of FIG. 15;
- Intermingling of content-oriented MultiLinks (e.g. where a publisher has created MultiLinks for its own content, but is then using the same MultiLink menu as "real estate" on which it can sell sponsorships, special advertiser links, etc.) (e.g., 1565 of FIG. 15);
- Placing of MultiLink menus directly into documents, brochures, PDF files, etc.—where due to their persistence, they will always display the current/up-to-date links that are maintained in the master record;
- Placing of MultiLink menus into multimedia files, such as in video files, so when an end-user moves a cursor over the video file, the menu is engaged and the user may pause the video, and the MultiLink menu may further provide information about the scene, products, ads, etc., e.g.; on a home improvement video, Flash video may engage a MultiLink menu, which will have menu items about a product's specifications from the show, accessories, retailers that offer featured products for sale, etc.
- Placing of MultiLink ads into Media Players and any other places where a product reference might go (e.g., 667 of FIG. 15); and
- Placing of MultiLinks within corporate intranets or other internal "enterprise environments," where actual user behavior can drive ongoing, self-improving, highly-effective access to internal resources (e.g., FIGS. 9 and 175 of FIG. 1).

Additional Alternative Embodiment Examples

The following alternative example embodiments provide a number of variations of some of the already discussed principles for expanded color on the abilities of the ISICI.

Additional embodiments may include:

1. A method, comprising:

creating an initial hierarchy of menu items where each menu item has a reference target identifier wherein menu items may include composite media, wherein menu items may include information from a back-end server, wherein the menu items are links to effect a purchase, and wherein the hierarchy of menu items is brought about by an advertisement;

distributing the initial hierarchy for consideration by menu viewers;

verifying that the initial hierarchy's reference target identifiers and associated menu item information are valid;

effecting tracking of the menu viewers' usage of the initial hierarchy, wherein tracking includes a number of impressions made by menu items, wherein tracking includes a number of times a menu item is selected;

modifying the menu item in the initial hierarchy based on the tracking of usage, wherein modification includes arranging more popular menu items more prominently, wherein modification includes placing menu items to increase efficacy.

2. A method, comprising:

creating an initial hierarchy of menu items where each menu item has a reference target identifier; distributing the initial hierarchy for consideration by menu viewers;

obtaining menu viewers' usage indicia of the initial hierarchy;

modifying the menu item in the initial hierarchy based on the indicia of usage.

3. The method of embodiment 2, further, comprising:

verifying that the initial hierarchy's reference target identifiers and associated menu item information are valid.

4. The method of embodiment 2, wherein menu items may include graphics.

5. The method of embodiment 2, wherein menu items may include video.

6. The method of embodiment 2, wherein menu items may include forms.

7. The method of embodiment 2, wherein menu items may include composite media.

8. The method of embodiment 2, wherein menu items relate to government information.

9. The method of embodiment 2, wherein menu items relate to medical patient information.

10. The method of embodiment 2, wherein menu items relate to content management information.

11. The method of embodiment 2, wherein menu items relate to RFID information.

12. The method of embodiment 2, wherein menu items relate to personal identity information.

13. The method of embodiment 2, wherein menu items relate to military information.

14. The method of embodiment 2, wherein menu items relate to internal product information.

15. The method of embodiment 2, wherein menu items relate to external information.

16. The method of embodiment 2, wherein menu items relate to document management information.

17. The method of embodiment 2, wherein menu items may include information from a back-end server.

18. The method of embodiment 17, wherein the back-end server is a knowledge-management system.

19. The method of embodiment 17, wherein the menu items are links to effect a purchase.

20. The method of embodiment 17, wherein the menu items include live inventory.

21. The method of embodiment 2, wherein the hierarchy of menu items is brought about by a banner advertisement.

22. The method of embodiment 2, wherein the hierarchy of menu items is brought about by a sponsored advertising link.

23. The method of embodiment 2, wherein the hierarchy of menu items is brought about by a document.

24. The method of embodiment 2, wherein the hierarchy of menu items is brought about by a media player.

25. The method of embodiment 2, wherein the initial hierarchy is composed of menu items selected by consultants.

26. The method of embodiment 25, wherein the consultants are marketing analysts.

27. The method of embodiment 2, wherein the viewers' usage indicia includes users' purchasing behavior.

28. The method of embodiment 2, wherein the viewers' usage indicia includes independently-recorded user preference information.

29. The method of embodiment 2, wherein the viewers' usage indicia includes independently-recorded user information that is associated with a category of users.

30. The method of embodiment 29, wherein the category of users include any of anonymized metrics profiling a type of user by income, interests, demographics, preferences.

31. The method of embodiment 2, wherein the viewers' usage indicia includes metrics recorded by a site hosting the menu.

32. The method of embodiment 31, wherein the metrics include profiling based on time of day.

33. The method of embodiment 31, wherein the metrics include geographical location of site visitors.

34. The method of embodiment 2, wherein the viewers' usage indicia is effected by tracking of the menu viewers' usage of the initial hierarchy.

35. The method of embodiment 34, wherein tracking includes a number of impressions made by menu items.

36. The method of embodiment 34, wherein tracking includes a number of times a menu item is selected.

37. The method of embodiment 34, wherein tracking includes an amount of time a menu item is considered.

38. The method of embodiment 34, wherein tracking includes a number of times a menu item is passed over.

39. The method of embodiment 2, wherein the modification is performed automatically.

40. The method of embodiment 34, wherein the modification is performed manually.

41. The method of embodiment 40, wherein the manual modification is performed with a menu editor.

42. The method of embodiment 41, wherein the menu editor displays tracking statistics.

43. The method of embodiment 42, wherein the tracking statistics include any of: a number of impressions made by menu items, a number of times a menu item is selected, an amount of time a menu item is considered, a number of times a menu item is passed over.

44. The method of embodiment 41, wherein the menu editor displays usage constraints that limit how a menu item may be used.

45. The method of embodiment 44, wherein the usage constraints include any of: a number of impressions made by menu items, a number of times a menu item is selected, an amount of time a menu item is considered, a number of times a menu item is passed over.

46. The method of embodiment 2, wherein modification includes arranging more popular menu items more prominently.

47. The method of embodiment 2, wherein greater prominence includes any of: higher placement in a menu hierarchy, higher placement within a tier of a menu hierarchy..

48. The method of embodiment 46, wherein more popular menu items are menu items that have been selected more frequently.

49. The method of embodiment 2, wherein modification includes arranging less popular menu items more prominently.

50. The method of embodiment 2, wherein modification includes placement of sponsored advertising of menu items.

51. The method of embodiment 50, wherein modification includes arranging the menu items based on context.

52. The method of embodiment 50, wherein modification includes arranging the menu items to increase efficacy of the sponsored advertising.

53. The method of embodiment 50, wherein modification includes placing sponsored advertising in locations that have been determined to be most effective through tracking.

54. The method of embodiment 50, wherein the placement of sponsored advertising is based on context.

55. The method of embodiment 50, wherein the placement of sponsored advertising is based on higher bids for ad placement.

56. The method of embodiment 50, wherein the placement of sponsored advertising is more prominent.

57. The method of embodiment 50, wherein the placement of sponsored advertising is subject to usage constraints.

58. The method of embodiment 2, wherein modification includes arranging the menu items to increase efficacy.

59. The method of embodiment 2, wherein modification includes placing menu items to increase efficacy.

60. The method of embodiment 2, wherein modification includes placing menu items based on context.

61. The method of embodiment 60, wherein the context is based on other menu items within the hierarchy of menu items.

62. The method of embodiment 60, wherein the context is based on content of references targeted by menu items in the hierarchy of menu items.

63. The method of embodiment 60, wherein the context is based on content of references targeted by menu items in the hierarchy of menu items.

64. A processor enabled method, comprising:

receiving a request for a unique persistent universal name identifier (UPUNI) from a requesting client accessing content,
- wherein the request is triggered from the accessing of content,
- wherein the UPUNI identifies a target content asset, and
- wherein the UPUNI is a multi-identifier having multiple references to content items related to the target content asset;

obtaining an UPUNI menu specification;

obtaining UPUNI record information from an UPUNI directory;

generating an UPUNI hierarchy of menu items from the UPUNI menu specification, wherein the UPUNI menu specification is used to specify values from UPUNI record information with which to populate the UPUNI menu,
- wherein menu items may include composite media,
- wherein menu items may include information from a back-end server,
- wherein the menu items are links to effect a purchase,
- wherein the hierarchy of menu items is brought about by an advertisement;

verifying that the UPUNI menu's reference target identifiers and associated menu item information are valid;

effecting tracking of UPUNI menu usage from end-users,
- wherein tracking includes a number of impressions made by menu items,
- wherein tracking includes a number of times a menu item is selected;

modifying UPUNI menu items based on the tracking of usage,
- wherein modification includes arranging more popular menu items more prominently, and
- wherein modification includes placing menu items to increase efficacy.

65. A processor enabled method, comprising:

receiving a request for a unique persistent universal name identifier (UPUNI) from a requesting client accessing content,
- wherein the request is triggered from the accessing of content,
- wherein the UPUNI identifies a target content asset, and
- wherein the UPUNI is a multi-identifier having multiple references to content items related to the target content asset;

obtaining an UPUNI menu specification;

obtaining UPUNI record information from an UPUNI directory;

generating an UPUNI hierarchy of menu items from the UPUNI menu specification, wherein the UPUNI menu specification is used to specify values from UPUNI record information with which to populate the UPUNI menu;

effecting tracking of UPUNI menu usage from end-users;

modifying UPUNI menu items based on the tracking of usage.

66. The method of embodiment 65, further, comprising:

verifying that the UPUNI menu's reference target identifiers and associated menu item information are valid.

67. The method of embodiment 65, wherein menu items may include graphics.

68. The method of embodiment 65, wherein menu items may include video.

69. The method of embodiment 65, wherein menu items may include forms.

70. The method of embodiment 65, wherein menu items may include composite media.

71. The method of embodiment 65, wherein menu items may include information from a back-end server.
72. The method of embodiment 71, wherein the menu items are links to effect a purchase.
73. The method of embodiment 71, wherein the menu items include live inventory.
74. The method of embodiment 65, wherein the hierarchy of menu items is brought about by a banner advertisement.
75. The method of embodiment 65, wherein the hierarchy of menu items is brought about by a sponsored advertising link.
76. The method of embodiment 65, wherein the hierarchy of menu items is brought about by a document.
77. The method of embodiment 65, wherein the hierarchy of menu items is brought about by a media player.
78. The method of embodiment 65, wherein the UPUNI menu is composed of menu items selected by consultants.
79. The method of embodiment 78, wherein the consultants are marketing analysts.
80. The method of embodiment 65, wherein tracking includes a number of impressions made by menu items.
81. The method of embodiment 65, wherein tracking includes a number of times a menu item is selected.
82. The method of embodiment 65, wherein tracking includes an amount of time a menu item is considered.
83. The method of embodiment 65, wherein tracking includes a number of times a menu item is passed over.
84. The method of embodiment 65, wherein the modification is performed automatically.
85. The method of embodiment 65, wherein the modification is performed manually.
86. The method of embodiment 85, wherein the manual modification is performed with a menu editor.
87. The method of embodiment 86, wherein the menu editor displays tracking statistics.
88. The method of embodiment 87, wherein the tracking statistics include any of: a number of impressions made by menu items, a number of times a menu item is selected, an amount of time a menu item is considered, a number of times a menu item is passed over.
89. The method of embodiment 86, wherein the menu editor displays usage constraints that limit how a menu item may be used.
90. The method of embodiment 89, wherein the usage constraints include any of: a number of impressions made by menu items, a number of times a menu item is selected, an amount of time a menu item is considered, a number of times a menu item is passed over.
91. The method of embodiment 65, wherein modification includes arranging more popular menu items more prominently.
92. The method of embodiment 65, wherein greater prominence includes any of: higher placement in a menu hierarchy, higher placement within a tier of a menu hierarchy.
93. The method of embodiment 91, wherein more popular menu items are menu items that have been selected more frequently.
94. The method of embodiment 65, wherein modification includes arranging less popular menu items more prominently.
95. The method of embodiment 65, wherein modification includes placement of sponsored advertising of menu items.
96. The method of embodiment 95, wherein modification includes arranging the menu items based on context.
97. The method of embodiment 95, wherein modification includes arranging the menu items to increase efficacy of the sponsored advertising.
98. The method of embodiment 95, wherein modification includes placing sponsored advertising in locations that have been determined to be most effective through tracking.
99. The method of embodiment 95, wherein the placement of sponsored advertising is based on context.
100. The method of embodiment 95, wherein the placement of sponsored advertising is based on higher bids for ad placement.
101. The method of embodiment 95, wherein the placement of sponsored advertising is more prominent.
102. The method of embodiment 95, wherein the placement of sponsored advertising is subject to usage constraints.
103. The method of embodiment 65, wherein modification includes placing menu items to increase efficacy.
104. The method of embodiment 65, wherein modification includes placing menu items based on context.
105. The method of embodiment 104, wherein the context is based on other menu items within the hierarchy of menu items.
106. The method of embodiment 104, wherein the context is based on content of references targeted by menu items in the hierarchy of menu items.
107. The method of embodiment 104, wherein the context is based on content of references targeted by menu items in the hierarchy of menu items.
108. A processor enabled method, comprising:

generating a hierarchical menu that compresses a purchase cycle.

109. A processor enabled method for generating a user interface, comprising:

generating a hierarchy of menu items from a menu specification and from feedback from user tracking of usage of the menu items in response to engaging content embedded with a trigger to invoke the hierarchy of menu items, wherein menu items may include composite media, wherein menu items may include information from a back-end server, wherein the menu items are links to effect a purchase, and wherein the hierarchy of menu items is brought about by an advertisement.

110. A processor enabled method for generating a user interface, comprising:

generating a hierarchy of menu items from a menu specification and from feedback from user tracking of usage of the menu items in response to engaging content embedded with a trigger to invoke the hierarchy of menu items.

111. The method of embodiment 110, wherein menu items may include graphics.
112. The method of embodiment 110, wherein menu items may include video.
113. The method of embodiment 110, wherein menu items may include forms.
114. The method of embodiment 110, wherein menu items may include composite media.
115. The method of embodiment 110, wherein menu items may include information from a back-end server.

116. The method of embodiment 115, wherein the menu items are links to effect a purchase.
117. The method of embodiment 115, wherein the menu items include live inventory.
118. The method of embodiment 110, wherein the hierarchy of menu items is brought about by a banner advertisement.
119. The method of embodiment 110, wherein the hierarchy of menu items is brought about by a sponsored advertising link.
120. The method of embodiment 110, wherein the hierarchy of menu items is brought about by a document.
121. The method of embodiment 110, wherein the hierarchy of menu items is brought about by a media player.
122. A processor enabled method for generating a user interface, comprising:
generating an first tier hierarchical menu level containing information about identifying segment selectors and targets middle tier hierarchical menus;
generating a middle tier hierarchical menu level containing information about identifying brand selectors and targets later tier hierarchical menus;
generating a later tier hierarchical menu level containing information and targets same brand transactions,
wherein menu items within the hierarchy may include composite media,
wherein the menu items may include information from a back-end server,
wherein the menu items are links to effect a purchase, and
wherein the hierarchy of menu items is brought about by an advertisement.
123. A processor enabled method for generating a user interface, comprising:
generating an first tier hierarchical menu level containing information about identifying segment selectors and targets middle tier hierarchical menus;
generating a middle tier hierarchical menu level containing information about identifying brand selectors and targets later tier hierarchical menus;
generating a later tier hierarchical menu level containing information and targets same brand transactions.
124. The method of embodiment 123, wherein menu items within the hierarchy may include graphics.
125. The method of embodiment 123, wherein menu items within the hierarchy may include video.
126. The method of embodiment 123, wherein menu items within the hierarchy may include forms.
127. The method of embodiment 123, wherein menu items within the hierarchy may include composite media.
128. The method of embodiment 123, wherein menu items within the hierarchy may include information from a back-end server.
129. The method of embodiment 128, wherein the menu items are links to effect a purchase.
130. The method of embodiment 128, wherein the menu items include live inventory.
131. The method of embodiment 123, wherein the hierarchy of menu items is brought about by a banner advertisement.
132. The method of embodiment 123, wherein the hierarchy of menu items is brought about by a sponsored advertising link.
133. The method of embodiment 123, wherein the hierarchy of menu items is brought about by a document.
134. The method of embodiment 123, wherein the hierarchy of menu items is brought about by a media player.
135. A system to make a menu, comprising:
means to generate a hierarchical menu that compresses a purchase cycle.
136. A system to make a menu, comprising:
means to create an initial hierarchy of menu items where each menu item has a reference target identifier
wherein menu items may include composite media,
wherein menu items may include information from a back-end server,
wherein the menu items are links to effect a purchase, and
wherein the hierarchy of menu items is brought about by an advertisement;
means to distribute the initial hierarchy for consideration by menu viewers;
means to verify that the initial hierarchy's reference target identifiers and associated menu item information are valid;
means to effect tracking of the menu viewers' usage of the initial hierarchy,
wherein tracking includes a number of impressions made by menu items,
wherein tracking includes a number of times a menu item is selected;
means to modify the menu item in the initial hierarchy based on the tracking of usage,
wherein modification includes arranging more popular menu items more prominently,
wherein modification includes placing menu items to increase efficacy.
137. A system to make a menu, comprising:
means to receive a request for a unique persistent universal name identifier (UPUNI) from a requesting client accessing content,
wherein the request is triggered from the accessing of content,
wherein the UPUNI identifies a target content asset, and
wherein the UPUNI is a multi-identifier having multiple references to content items related to the target content asset;
means to obtain an UPUNI menu specification;
means to obtain UPUNI record information from an UPUNI directory;
means to generate an UPUNI hierarchy of menu items from the UPUNI menu specification, wherein the UPUNI menu specification is used to specify values from UPUNI record information with which to populate the UPUNI menu,
wherein menu items may include composite media,
wherein menu items may include information from a back-end server,
wherein the menu items are links to effect a purchase, and
wherein the hierarchy of menu items is brought about by an advertisement;
means to verify that the UPUNI menu's reference target identifiers and associated menu item information are valid;
means to effect tracking of UPUNI menu usage from end-users,
wherein tracking includes a number of impressions made by menu items, wherein tracking includes a number of times a menu item is selected;

means to modify UPUNI menu items based on the tracking of usage, wherein modification includes arranging more popular menu items more prominently, wherein modification includes placing menu items to increase efficacy.

138. A system to generate a user interface, comprising:

means to generate a hierarchy of menu items from a menu specification and from feedback from user tracking of usage of the menu items in response to engaging content embedded with a trigger to invoke the hierarchy of menu items, wherein menu items may include composite media, wherein menu items may include information from a back-end server, wherein the menu items are links to effect a purchase, and wherein the hierarchy of menu items is brought about by an advertisement.

139. A system to generate a user interface, comprising:

means to generate a first tier hierarchical menu level containing information about identifying segment selectors and targets middle tier hierarchical menus;

means to generate a middle tier hierarchical menu level containing information about identifying brand selectors and targets later tier hierarchical menus;

means to generate a later tier hierarchical menu level containing information and targets same brand transactions, wherein menu items within the hierarchy may include composite media, wherein the menu items may include information from a back-end server, wherein the menu items are links to effect a purchase, and wherein the hierarchy of menu items is brought about by an advertisement.

140. A medium readable by a processor to invoke an interaction interface, comprising:

instruction signals in the processor readable medium, wherein the instruction signals are issuable by the processor in response to user and system event signals to invoke:

a hierarchical menu that compresses a purchase cycle.

141. A medium readable by a processor to make a menu, comprising:

instruction signals in the processor readable medium, wherein the instruction signals are issuable by the processor to:

create an initial hierarchy of menu items where each menu item has a reference target identifier wherein menu items may include composite media, wherein menu items may include information from a back-end server, wherein the menu items are links to effect a purchase, and wherein the hierarchy of menu items is brought about by an advertisement;

distribute the initial hierarchy for consideration by menu viewers;

verify that the initial hierarchy's reference target identifiers and associated menu item information are valid;

effect tracking of the menu viewers' usage of the initial hierarchy, wherein tracking includes a number of impressions made by menu items, wherein tracking includes a number of times a menu item is selected;

modify the menu item in the initial hierarchy based on the tracking of usage, wherein modification includes arranging more popular menu items more prominently, wherein modification includes placing menu items to increase efficacy.

142. A medium readable by a processor to make a menu, comprising:

instruction signals in the processor readable medium, wherein the instruction signals are issuable by the processor to:

receive a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

obtain an UPUNI menu specification;

obtain UPUNI record information from an UPUNI directory;

generate an UPUNI hierarchy of menu items from the UPUNI menu specification, wherein the UPUNI menu specification is used to specify values from UPUNI record information with which to populate the UPUNI menu, wherein menu items may include composite media, wherein menu items may include information from a back-end server, wherein the menu items are links to effect a purchase, and wherein the hierarchy of menu items is brought about by an advertisement;

verify that the UPUNI menu's reference target identifiers and associated menu item information are valid;

effect tracking of UPUNI menu usage from end-users, wherein tracking includes a number of impressions made by menu items, wherein tracking includes a number of times a menu item is selected;

modify UPUNI menu items based on the tracking of usage, wherein modification includes arranging more popular menu items more prominently, wherein modification includes placing menu items to increase efficacy.

143. A medium readable by a processor to invoke an interaction interface, comprising:

instruction signals in the processor readable medium, wherein the instruction signals are issuable by the processor in response to user and system event signals to invoke:

a hierarchy of menu items from a menu specification and from feedback from user tracking of usage of the menu items in response to engaging content embedded with a trigger to invoke the hierarchy of menu items, wherein menu items may include composite media, wherein menu items may include information from a back-end server, wherein the menu items are links to effect a purchase, and wherein the hierarchy of menu items is brought about by an advertisement.

144. A medium readable by a processor to invoke an interaction interface, comprising:

instruction signals in the processor readable medium, wherein the instruction signals are issuable by the processor in response to user and system event signals to invoke:

a hierarchy of menu items from a menu specification and from feedback from user tracking of usage of the menu items in response to engaging content embedded with a trigger to invoke the hierarchy of menu items.

145. A medium readable by a processor to invoke an interaction interface, comprising:

instruction signals in the processor readable medium, wherein the instruction signals are issuable by the processor in response to user and system event signals to invoke:

a first tier hierarchical menu level containing information about identifying segment selectors and targets middle tier hierarchical menus;

a middle tier hierarchical menu level containing information about identifying brand selectors and targets later tier hierarchical menus;

a later tier hierarchical menu level containing information and targets same brand transactions, wherein menu items within the hierarchy may include composite media, wherein the menu items may include information from a back-end server, wherein the menu items are links to effect a purchase, and wherein the hierarchy of menu items is brought about by an advertisement.

146. A medium readable by a processor to invoke an interaction interface, comprising:

instruction signals in the processor readable medium, wherein the instruction signals are issuable by the processor in response to user and system event signals to invoke:

a first tier hierarchical menu level containing information about identifying segment selectors and targets middle tier hierarchical menus;

a middle tier hierarchical menu level containing information about identifying brand selectors and targets later tier hierarchical menus;

a later tier hierarchical menu level containing information and targets same brand transactions.

147. An apparatus, comprising:

a memory;

a processor disposed in communication with said memory, and configured to issue a plurality of processing instructions stored in the memory, wherein the instruction signals are issuable by the processor in response to user and system event signals to invoke:

a hierarchical menu that compresses a purchase cycle.

148. An apparatus, comprising:

a memory;

a processor disposed in communication with said memory, and configured to issue a plurality of processing instructions stored in the memory, wherein the instructions issue signals to: create an initial hierarchy of menu items where each menu item has a reference target identifier wherein menu items may include composite media, wherein menu items may include information from a back-end server, wherein the menu items are links to effect a purchase, and wherein the hierarchy of menu items is brought about by an advertisement;

distribute the initial hierarchy for consideration by menu viewers;

verify that the initial hierarchy's reference target identifiers and associated menu item information are valid;

effect tracking of the menu viewers' usage of the initial hierarchy, wherein tracking includes a number of impressions made by menu items, wherein tracking includes a number of times a menu item is selected;

modify the menu item in the initial hierarchy based on the tracking of usage, wherein modification includes arranging more popular menu items more prominently, wherein modification includes placing menu items to increase efficacy.

149. An apparatus, comprising:

a memory;

a processor disposed in communication with said memory, and configured to issue a plurality of processing instructions stored in the memory, wherein the instructions issue signals to: receive a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset:

obtain an UPUNI menu specification;

obtain UPUNI record information from an UPUNI directory;

generate an UPUNI hierarchy of menu items from the UPUNI menu specification, wherein the UPUNI menu specification is used to specify values from UPUNI record information with which to populate the UPUNI menu, wherein menu items may include composite media, wherein menu items may include information from a back-end server, wherein the menu items are links to effect a purchase, and wherein the hierarchy of menu items is brought about by an advertisement;

verify that the UPUNI menu's reference target identifiers and associated menu item information are valid;

effect tracking of UPUNI menu usage from end-users, wherein tracking includes a number of impressions made by menu items, wherein tracking includes a number of times a menu item is selected;

modify UPUNI menu items based on the tracking of usage, wherein modification includes arranging more popular menu items more prominently, wherein modification includes placing menu items to increase efficacy.

150. An apparatus, comprising:
a memory;
a processor disposed in communication with said memory, and configured to issue a plurality of processing instructions stored in the memory, wherein the instruction signals are issuable by the processor in response to user and system event signals to invoke:
a hierarchy of menu items from a menu specification and from feedback from user tracking of usage of the menu items in response to engaging content embedded with a trigger to invoke the hierarchy of menu items.
151. An apparatus, comprising:
a memory;
a processor disposed in communication with said memory, and configured to issue a plurality of processing instructions stored in the memory, wherein the instruction signals are issuable by the processor in response to user and system event signals to invoke:
a first tier hierarchical menu level containing information about identifying segment selectors and targets middle tier hierarchical menus;
a middle tier hierarchical menu level containing information about identifying brand selectors and targets later tier hierarchical menus;
a later tier hierarchical menu level containing information and targets same brand transactions,
wherein menu items within the hierarchy may include composite media,
wherein the menu items may include information from a back-end server,
wherein the menu items are links to effect a purchase, and
wherein the hierarchy of menu items is brought about by an advertisement.
152. A processor enabled method, comprising:
receiving a request for a unique persistent universal name identifier (UPUNI) from a requesting client accessing content,
wherein the request is triggered from the accessing of content and from code embedded in that content,
wherein the UPUNI identifies a target content asset, and
wherein the UPUNI is a multi-identifier having multiple references to content items related to the target content asset;
obtaining an UPUNI menu specification, if it exists;
obtaining UPUNI record information from an UPUNI directory;
generating an UPUNI menu specification from metadata in an UPUNI directory, if one is unavailable;
storing the UPUNI menu specification, in the UPUNI directory, in an UPUNI syndicator;
generating an UPUNI menu from the UPUNI menu specification, wherein the UPUNI menu specification is used to specify values from UPUNI record information with which to populate the UPUNI menu;
providing the UPUNI menu to the requesting client that is responsive to the request.
153. A processor enabled method, comprising:
receiving a request for a unique persistent universal name identifier (UPUNI) from a requesting client accessing content,
wherein the request is triggered from the accessing of content,
wherein the UPUNI identifies a target content asset, and
wherein the UPUNI is a multi-identifier having multiple references to content items related to the target content asset;
obtaining an UPUNI menu specification;
obtaining UPUNI record information from an UPUNI directory;
generating an UPUNI menu from the UPUNI menu specification, wherein the UPUNI menu specification is used to specify values from UPUNI record information with which to populate the UPUNI menu.
154. The method of embodiment 153, wherein a database has varied menu specifications from multiple advertisement providers, wherein each advertisement provider may provide differing menu specifications for its own advertisers.
155. The method of embodiment 154, wherein advertisers may sponsor UPUNI multi-identifiers.
156. The method of embodiment 155, wherein a fee may be obtained for increasing search ranking results from interlinked UPUNIs.
157. The method of embodiment 156, wherein the UPUNI is associated with a keyword.
158. The method of embodiment 154, wherein UPUNI menus may have other UPUNI menus interlinked.
159. The method of embodiment 154, wherein UPUNI providers may receive a referral fee for UPUNI menu provision.
160. The method of embodiment 154, wherein UPUNI providers may receive a referral fee for UPUNI menu provision.
161. The method of embodiment 154, wherein an advertising fee is charged for displaying sponsored UPUNI menus.
162. The method of embodiment 153, further, comprising:
generating code for the UPUNI menu.
163. The method of embodiment 162, wherein the code is distributed.
164. The method of embodiment 163, wherein the code is HTML.
165. The method of embodiment 163, wherein the code is DHTML
166. The method of embodiment 163, wherein the code is Javascript.
167. The method of embodiment 153, wherein metadata information regarding the target content asset is stored in an UPUNI directory record.
168. The method of embodiment 167, wherein the metadata information is stored as a handle value in the UPUNI directory record.
169. The method of embodiment 153, wherein the UPUNI represents a human being.
170. The method of embodiment 169, wherein the UPUNI has multi-identifier components representing various aspects of the human being.
171. The method of embodiment 170, wherein the UPUNI has access controls limiting access to multi-identifier components.
172. The method of embodiment 169, wherein the UPUNI acts as a universal physician identifier.
173. The method of embodiment 169, wherein the UPUNI acts as a universal patient identifier.
174. The method of embodiment 153, wherein the UPUNI represents a Voice over Internet Protocol account.
175. The method of embodiment 153, wherein the UPUNI represents an instant messenger account.
176. The method of embodiment 153, wherein the UPUNI represents an RFID.

177. The method of embodiment 176, wherein the RFIDs are registered as UPUNIs at the time of manufacture and include an RFID number as part of the UPUNI.
178. The method of embodiment 176, wherein transactions involving the RFID are tracked in the UPUNI's directory record.
179. The method of embodiment 153, wherein the UPUNI represents a healthcare record.
180. The method of embodiment 153, wherein the UPUNI directory serves an intranet.
181. The method of embodiment 180, wherein the intranet causes UPUNIs to resolve to local resources and prevents resolution to a global directory.
182. The method of embodiment 153, wherein the UPUNI directory is a global directory.
183. The method of embodiment 153, wherein the request is triggered from code embedded in that content.
184. The method of embodiment 153, wherein the UPUNI menu specification is obtained from a UPUNI directory.
185. The method of embodiment 153, wherein the UPUNI menu specification is obtained from a UPUNI syndicator.
186. The method of embodiment 153, further, comprising: generating an UPUNI menu specification, if one is unavailable.
187. The method of embodiment 186, wherein the UPUNI menu specification is generated from metadata in an UPUNI directory.
188. The method of embodiment 186, further, comprising: storing the UPUNI menu specification.
189. The method of embodiment 188, wherein the UPUNI menu specification is stored in an UPUNI directory.
190. The method of embodiment 188, wherein the UPUNI menu specification is stored in an UPUNI syndicator.
191. The method of embodiment 153, further, comprising: providing the UPUNI menu to the requesting client.
192. The method of embodiment 191, further, comprising: displaying the UPUNI menu to the requesting client that is responsive to content traversal.
193. The method of embodiment 191, wherein the menu is displayed when the client traverses over advertisements.
194. The method of embodiment 191, wherein the menu is displayed for sponsored search engine query results.
195. The method of embodiment 191, further, comprising: displaying UPUNI menu traversal that is responsive to the requesting client's menu navigation.
196. The method of embodiment 195, further, comprising: traversing to a target selection responsive to a clients selection of menu items in the UPUNI menu.
197. A processor enabled method, comprising:

obtaining unique persistent universal name identifier (UPUNI) record information from an UPUNI directory, wherein the UPUNI identifies a target content asset, and wherein the UPUNI is a multi-identifier having multiple references to content items related to the target content asset;

generating a menu specification based on the hierarchical structure of an UPUNI record, wherein first level hierarchical values of a UPUNI record describe and populate a root level of the menu specification, and wherein subsequent nested hierarchical values of the UPUNI record describe and populate nested levels of the menu specification;

storing the UPUNI menu specification, wherein the UPUNI menu specification is stored in an UPUNI syndicator;

generating an UPUNI menu from the UPUNI menu specification, wherein the UPUNI menu specification is used to specify values from UPUNI record information with which to populate the UPUNI menu.

198. A processor enabled method, comprising:

obtaining unique persistent universal name identifier (UPUNI) record information from an UPUNI directory, wherein the UPUNI identifies a target content asset, and wherein the UPUNI is a multi-identifier having multiple references to content items related to the target content asset;

generating a menu specification based on a hierarchical structure of an UPUNI record.

199. The method of embodiment 198, wherein a database has varied menu specifications from multiple advertisement providers, wherein each advertisement provider may provide differing menu specifications for its own advertisers.
200. The method of embodiment 199, wherein advertisers may sponsor UPUNI multi-identifiers.
201. The method of embodiment 200, wherein a fee may be obtained for increasing search ranking results from interlinked UPUNIs.
202. The method of embodiment 201, wherein the UPUNI is associated with a keyword.
203. The method of embodiment 199, wherein UPUNI menus may have other UPUNI menus interlinked.
204. The method of embodiment 199, wherein UPUNI providers may receive a referral fee for UPUNI menu provision.
205. The method of embodiment 199, wherein UPUNI providers may receive a referral fee for UPUNI menu provision.
206. The method of embodiment 199, wherein an advertising fee is charged for displaying sponsored UPUNI menus.
207. The method of embodiment 153, further, comprising:

generating code for the UPUNI menu.

208. The method of embodiment 207, wherein the code is distributed.
209. The method of embodiment 208, wherein the code is HTML.
210. The method of embodiment 208, wherein the code is DHTML
211. The method of embodiment 208, wherein the code is Javascript.
212. The method of embodiment 198, wherein the generation of an UPUNI specification occurs at a site other than one having the request for the UPUNI menu embedded in content.
213. The method of embodiment 198, wherein the generation of an UPUNI specification occurs at a site other than one request for the UPUNI menu.
214. The method of embodiment 198, wherein metadata information regarding the target content asset is stored in an UPUNI directory record.
215. The method of embodiment 214, wherein the metadata information is stored as a handle value in the UPUNI directory record.
216. The method of embodiment 198, wherein the UPUNI represents a human being.

217. The method of embodiment 216, wherein the UPUNI has multi-identifier components representing various aspects of the human being.

218. The method of embodiment 217, wherein the UPUNI has access controls limiting access to multi-identifier components.

219. The method of embodiment 216, wherein the UPUNI acts as a universal physician identifier.

220. The method of embodiment 216, wherein the UPUNI acts as a universal patient identifier.

221. The method of embodiment 198, wherein the UPUNI represents a Voice over Internet Protocol account.

222. The method of embodiment 198, wherein the UPUNI represents an instant messenger account.

223. The method of embodiment 198, wherein the UPUNI represents an RFID.

224. The method of embodiment 223, wherein the RFIDs are registered as UPUNIs at the time of manufacture and include an RFID number as part of the UPUNI.

225. The method of embodiment 223, wherein transactions involving the RFID are tracked in the UPUNI's directory record.

226. The method of embodiment 198, wherein the UPUNI represents a healthcare record.

227. The method of embodiment 198, wherein first level hierarchical values of a UPUNI record describe and populate a root level of the menu specification.

228. The method of embodiment 227, wherein subsequent nested hierarchical values of the UPUNI record describe and populate nested levels of the menu specification.

229. The method of embodiment 198, further, comprising:
storing the UPUNI menu specification.

230. The method of embodiment 229, wherein the UPUNI menu specification is stored in an UPUNI directory.

231. The method of embodiment 230, wherein the UPUNI directory serves an intranet.

232. The method of embodiment 231, wherein the intranet causes UPUNIs to resolve to local resources and prevents resolution to a global directory.

233. The method of embodiment 230, wherein the UPUNI directory is a global directory.

234. The method of embodiment 229, wherein the UPUNI menu specification is stored in an UPUNI syndicator.

235. The method of embodiment 229, wherein the UPUNI menu specification is stored into a first hierarchical level in the UPUNI record information.

236. The method of embodiment 235, wherein the menu specification is stored with indicia that it is to be used as a specification and to prevent further menu specification generation.

237. The method of embodiment 236, wherein the indicia is a BOOLEAN true value signifying the existence of a menu specification.

238. The method of embodiment 198, hierarchical structure of an UPUNI record includes a field value for each field indicative of it being part of a menu specification.

239. The method of embodiment 198, hierarchical structure of an UPUNI record includes a field value for each field indicative of its access control rights.

240. The method of embodiment 198, further, comprising:
generating an UPUNI menu from the UPUNI menu specification.

241. The method of embodiment 240, wherein the UPUNI menu specification is used to specify values from UPUNI record information with which to populate the UPUNI menu.

242. The method of embodiment 198, further, comprising: providing the UPUNI menu to a requesting client.

243. The method of embodiment 242, further, comprising: displaying the UPUNI menu to the requesting client that is responsive to content traversal.

244. The method of embodiment 243, wherein the menu is displayed when the client traverses over advertisements.

245. The method of embodiment 243, wherein the menu is displayed for sponsored search engine query results.

246. The method of embodiment 242, further, comprising: displaying UPUNI menu traversal that is responsive to the requesting client's menu navigation.

247. The method of embodiment 246, further, comprising: traversing to a target selection responsive to a clients selection of menu items in the UPUNI menu.

248. A processor enabled method, comprising:
obtaining metadata fields and values;
obtaining an UPUNI menu specification, if it exists;
generating an UPUNI menu specification from the metadata fields and values, if one is unavailable;
matching metadata fields to fields in the menu specification;
searching the metadata based on the matched fields for field values;
constructing the target references based on the matched fields and field values;
storing the target references in a UPUNI record in a UPUNI directory.

249. The method of embodiment 248, wherein the metadata fields and values are obtained from intraconnected systems.

250. The method of embodiment 249, wherein the metadata fields and values are obtained via connectors to the intraconnected systems.

251. The method of embodiment 249, wherein the metadata fields and values are obtained are selected from a master metadata repository from the intraconnected systems.

252. The method of embodiment 248, wherein metadata information regarding the target content asset is stored in an UPUNI directory record.

253. The method of embodiment 252, wherein the metadata information is stored as a handle value in the UPUNI directory record.

254. The method of embodiment 248, wherein the UPUNI represents a human being.

255. The method of embodiment 254, wherein the UPUNI has multi-identifier components representing various aspects of the human being.

256. The method of embodiment 255, wherein the UPUNI has access controls limiting access to multi-identifier components.

257. The method of embodiment 254, wherein the UPUNI acts as a universal physician identifier.

258. The method of embodiment 254, wherein the UPUNI acts as a universal patient identifier.

259. The method of embodiment 248, wherein the UPUNI represents a Voice over Internet Protocol account.

260. The method of embodiment 248, wherein the UPUNI represents an instant messenger account.

261. The method of embodiment 248, wherein the UPUNI represents an RFID.

262. The method of embodiment 261, wherein the RFIDs are registered as UPUNIs at the time of manufacture and include an RFID number as part of the UPUNI.

263. The method of embodiment 261, wherein transactions involving the RFID are tracked in the UPUNI's directory record.
264. The method of embodiment 248, wherein the UPUNI represents a healthcare record.
265. The method of embodiment 248, wherein the UPUNI directory serves an intranet.
266. The method of embodiment 265, wherein the intranet causes UPUNIs to resolve to local resources and prevents resolution to a global directory.
267. The method of embodiment 248, wherein the UPUNI directory is a global directory.
268. The method of embodiment 248, further, comprising: embedding the UPUNI into content.
269. The method of embodiment 248, further, comprising: creating an UPUNI menu with links to the target content asset and the target references.
270. The method of embodiment 269, further, comprising: providing the UPUNI menu to the requesting client.
271. The method of embodiment 270, further, comprising: displaying the UPUNI menu to the requesting client that is responsive to content traversal.
272. The method of embodiment 271, wherein the menu is displayed when the client traverses over advertisements.
273. The method of embodiment 271, wherein the menu is displayed for sponsored search engine query results.
274. The method of embodiment 270, further, comprising: displaying UPUNI menu traversal that is responsive to the requesting client's menu navigation.
275. The method of embodiment 274, further, comprising: traversing to a target selection responsive to a clients selection of menu items in the UPUNI menu.
276. The method of embodiment 248, further, comprising: storing the UPUNI menu specification.
277. The method of embodiment 276, further, comprising: embedding the UPUNI menu into content.
278. The method of embodiment 276, wherein the UPUNI menu specification is stored in an UPUNI directory.
279. The method of embodiment 276, wherein the UPUNI menu specification is stored in an UPUNI syndicator.
280. The method of embodiment 248, wherein target references are generated by reverse engineering a computer system.
281. The method of embodiment 248, wherein target references are generated by obtaining a Web site map.
282. The method of embodiment 281, wherein Web site map is obtained through crawling.
283. The method of embodiment 248, wherein target references are generated by obtaining an RSS feed.
284. The method of embodiment 248, wherein target references are generated by blog entries.
285. The method of embodiment 248, wherein target references are generated by obtaining a main menu from a Web site.
286. The method of embodiment 285, wherein main menu is obtained through crawling.
287. The method of embodiment 280, wherein the computer system's search query syntax is used to identify target content assets and items related to the target content asset.
288. The method of embodiment 248, wherein target references are generated through a provided query prompt into which metadata field values may be provided.
289. The method of embodiment 288, wherein the query prompt is a search engine and top search results are will be used as target references.
290. The method of embodiment 248, wherein metadata fields and values are obtained from clients.
291. The method of embodiment 290, wherein the metadata is in tab delineated format.
292. The method of embodiment 290, wherein the metadata is in XML format.
293. The method of embodiment 290, wherein the metadata is in spreadsheet format.
294. A processor enabled method, comprising:

establishing relationships between unique persistent universal name identifier (UPUNI) and an UPUNI menu, wherein the UPUNI identifies a target content asset, and wherein the UPUNI is a multi-identifier having multiple target references to content items related to the target content asset;

constructing the target references, wherein the target references are to be stored in a UPUNI record in a UPUNI directory;

creating an UPUNI menu with links to the target content asset and the target references.

295. The method of embodiment 294, wherein metadata information regarding the target content asset is stored in an UPUNI directory record.
296. The method of embodiment 295, wherein the metadata information is stored as a handle value in the UPUNI directory record.
297. The method of embodiment 294, wherein the UPUNI represents a human being.
298. The method of embodiment 297, wherein the UPUNI has multi-identifier components representing various aspects of the human being.
299. The method of embodiment 298, wherein the UPUNI has access controls limiting access to multi-identifier components.
300. The method of embodiment 297, wherein the UPUNI acts as a universal physician identifier.
301. The method of embodiment 297 wherein the UPUNI acts as a universal patient identifier.
302. The method of embodiment 294, wherein the UPUNI represents a Voice over Internet Protocol account.
303. The method of embodiment 294, wherein the UPUNI represents an instant messenger account.
304. The method of embodiment 294, wherein the UPUNI represents an RFID.
305. The method of embodiment 304, wherein the RFIDs are registered as UPUNIs at the time of manufacture and include an RFID number as part of the UPUNI.
306. The method of embodiment 304, wherein transactions involving the RFID are tracked in the UPUNI's directory record.
307. The method of embodiment 294, wherein the UPUNI represents a healthcare record.
308. The method of embodiment 294, further, comprising: embedding the UPUNI menu into content.
309. The method of embodiment 294, further, comprising: storing the target references in the UPUNI record in the UPUNI directory.
310. The method of embodiment 294, wherein the established relationships are embodied in a menu specification.
311. The method of embodiment 310, further, comprising: storing the UPUNI menu specification.

312. The method of embodiment 311, wherein the UPUNI menu specification is stored in an UPUNI directory.
313. The method of embodiment 311, wherein the UPUNI menu specification is stored in an UPUNI syndicator.
314. The method of embodiment 294, wherein target references are generated by reverse engineering a computer system.
315. The method of embodiment 294, wherein target references are generated by obtaining a Web site map.
316. The method of embodiment 315, wherein Web site map is obtained through crawling.
317. The method of embodiment 294, wherein target references are generated by obtaining an RSS feed.
318. The method of embodiment 294, wherein target references are generated by obtaining blog entries.
319. The method of embodiment 294, wherein target references are generated by obtaining a main menu from a Web site.
320. The method of embodiment 319, wherein main menu is obtained through crawling.
321. The method of embodiment 314, wherein the computer system's search query syntax is used to identify target content assets and items related to the target content asset.
322. The method of embodiment 294, wherein target references are generated through a provided query prompt into which metadata field values may be provided.
323. The method of embodiment 322, wherein the query prompt is a search engine and top search results are will be used as target references.
324. The method of embodiment 294, further, comprising: providing the UPUNI menu to a requesting client.
325. The method of embodiment 324, further, comprising: displaying the UPUNI menu to the requesting client that is responsive to content traversal.
326. The method of embodiment 325, wherein the menu is displayed when the client traverses over advertisements.
327. The method of embodiment 325, wherein the menu is displayed for sponsored search engine query results.
328. The method of embodiment 324, further, comprising: displaying UPUNI menu traversal that is responsive to the requesting client's menu navigation.
329. The method of embodiment 328, further, comprising: traversing to a target selection responsive to a clients selection of menu items in the UPUNI menu.
330. The method of embodiment 294, wherein the UPUNI directory serves an intranet.
331. The method of embodiment 330, wherein the intranet causes UPUNIs to resolve to local resources and prevents resolution to a global directory.
332. A processor enabled method, comprising:
obtaining unique persistent universal name identifier (UPUNI) record information from an UPUNI directory,
wherein the UPUNI identifies a target content asset, and
wherein the UPUNI is a multi-identifier having multiple references to content items related to the target content asset;
displaying the UPUNI record information;
adding fields and values to the UPUNI record, if instructed;
deleting fields and values to the UPUNI record, if instructed;
altering fields and values to the UPUNI record, if instructed;
storing updated UPUNI record information in an UPUNI directory.
333. The method of embodiment 332, further, comprising: displaying updated UPUNI record information as it is edited.
334. The method of embodiment 332, wherein metadata information regarding the target content asset is stored in an UPUNI directory record.
335. The method of embodiment 334, wherein the metadata information is stored as a handle value in the UPUNI directory record.
336. The method of embodiment 332, wherein the UPUNI represents a human being.
337. The method of embodiment 336, wherein the UPUNI has multi-identifier components representing various aspects of the human being.
338. The method of embodiment 337, wherein the UPUNI has access controls limiting access to multi-identifier components.
339. The method of embodiment 336, wherein the UPUNI acts as a universal physician identifier.
340. The method of embodiment 336, wherein the UPUNI acts as a universal patient identifier.
341. The method of embodiment 332, wherein the UPUNI represents a Voice over Internet Protocol account.
342. The method of embodiment 332, wherein the UPUNI represents an instant messenger account.
343. The method of embodiment 332, wherein the UPUNI represents an RFID.
344. The method of embodiment 343, wherein the RFIDs are registered as UPUNIs at the time of manufacture and include an RFID number as part of the UPUNI.
345. The method of embodiment 343, wherein transactions involving the RFID are tracked in the UPUNI's directory record.
346. The method of embodiment 332, wherein the UPUNI represents a healthcare record.
347. The method of embodiment 332, wherein the UPUNI directory serves an intranet.
348. The method of embodiment 347, wherein the intranet causes UPUNIs to resolve to local resources and prevents resolution to a global directory.
349. The method of embodiment 332, wherein the UPUNI directory is a global directory.
350. The method of embodiment 332, further, comprising: generating a menu specification based on the updated UPUNI record information.
351. The method of embodiment 332, further, comprising: generating a UPUNI menu based on the updated UPUNI record information.
352. A processor enabled method, comprising:
receiving a request for a menu specification for a unique persistent universal name identifier (UPUNI),
wherein the UPUNI identifies a target content asset, and
wherein the UPUNI is a multi-identifier having multiple references to content items related to the target content asset;
searching a database for the menu specification;
generating a menu specification for the UPUNI from metadata in an UPUNI directory, if none are found in the database;
storing the menu specification in the database, if one was generated;
generating an UPUNI menu from the UPUNI menu specification, wherein the UPUNI menu specification is used to specify values from UPUNI record information with which to populate the UPUNI menu;

providing the UPUNI menu to a requesting client that is responsive to the request.

353. The method of embodiment 352, wherein a database has varied menu specifications from multiple advertisement providers, wherein each advertisement provider may provide differing menu specifications for its own advertisers.

354. The method of embodiment 353, wherein advertisers may sponsor UPUNI multi-identifiers.

355. The method of embodiment 354, wherein a fee may be obtained for increasing search ranking results from interlinked UPUNIs.

356. The method of embodiment 355, wherein the UPUNI is associated with a keyword.

357. The method of embodiment 353, wherein UPUNI menus may have other UPUNI menus interlinked.

358. The method of embodiment 353, wherein UPUNI providers may receive a referral fee for UPUNI menu provision.

359. The method of embodiment 353, wherein UPUNI providers may receive a referral fee for UPUNI menu provision.

360. The method of embodiment 353, wherein an advertising fee is charged for displaying sponsored UPUNI menus.

361. The method of embodiment 153, further, comprising:

generating code for the UPUNI menu.

362. The method of embodiment 361, wherein the code is distributed.

363. The method of embodiment 362, wherein the code is HTML.

364. The method of embodiment 362, wherein the code is DHTML

365. The method of embodiment 362, wherein the code is Javascript.

366. The method of embodiment 352, wherein metadata information regarding the target content asset is stored in an UPUNI directory record.

367. The method of embodiment 366, wherein the metadata information is stored as a handle value in the UPUNI directory record.

368. The method of embodiment 352, wherein the UPUNI represents a human being.

369. The method of embodiment 368, wherein the UPUNI has multi-identifier components representing various aspects of the human being.

370. The method of embodiment 369, wherein the UPUNI has access controls limiting access to multi-identifier components.

371. The method of embodiment 368, wherein the UPUNI acts as a universal physician identifier.

372. The method of embodiment 368, wherein the UPUNI acts as a universal patient identifier.

373. The method of embodiment 352, wherein the UPUNI represents a Voice over Internet Protocol account.

374. The method of embodiment 352, wherein the UPUNI represents an instant messenger account.

375. The method of embodiment 352, wherein the UPUNI represents an RFID.

376. The method of embodiment 375, wherein the RFIDs are registered as UPUNIs at the time of manufacture and include an RFID number as part of the UPUNI.

377. The method of embodiment 375, wherein transactions involving the RFID are tracked in the UPUNI's directory record.

378. The method of embodiment 352, wherein the UPUNI represents a healthcare record.

379. The method of embodiment 352, wherein the generation of an UPUNI menu occurs at a site other than one having the request for the UPUNI menu embedded in content.

380. The method of embodiment 352, wherein the generation of an UPUNI menu occurs at a site other than one request for the UPUNI menu.

381. The method of embodiment 352, wherein the database has varied menu specifications from multiple advertisement providers, wherein each advertisement provider may provide differing menu specifications for its own advertisers.

382. The method of embodiment 352, wherein the UPUNI menu that is provided to a requesting client is based on the client's identifying indicia.

383. The method of embodiment 352, wherein the request is triggered from code embedded in content.

384. The method of embodiment 352, further, comprising:

displaying the UPUNI menu to the requesting client that is responsive to content traversal.

385. The method of embodiment 352, further, comprising:

displaying UPUNI menu traversal that is responsive to the requesting client's menu navigation.

386. The method of embodiment 385, wherein the menu is displayed when the client traverses over advertisements.

387. The method of embodiment 385, wherein the menu is displayed for sponsored search engine query results.

388. The method of embodiment 385, further, comprising:

traversing to a target selection responsive to a clients selection of menu items in the UPUNI menu.

389. The method of embodiment 352, wherein the UPUNI directory serves an intranet.

390. The method of embodiment 389, wherein the intranet causes UPUNIs to resolve to local resources and prevents resolution to a global directory.

391. A processor enabled method, comprising:

crawling across a communications network for unique persistent universal name identifiers (UPUNIs) and generating indexing of UPUNIs, wherein the UPUNI identifies a target content asset, and wherein the UPUNI is a multi-identifier having multiple references to content items related to the target content asset;

obtaining target UPUNIs for basis of comparison;

comparing target UPUNIs to UPUNIs found while index crawling Web sites;

determining a degree of interlinking for target UPUNIs by noting a number of matches and non-matches as between the target UPUNIs and to found UPUNIs, updating an UPUNI index in an UPUNI database with determined degree of interlinking information.

392. A processor enabled method, comprising:

obtaining target unique persistent universal name identifiers (UPUNIs) for basis of comparison, wherein the UPUNI identifies a target content asset;

comparing target UPUNIs to UPUNIs found while index crawling Web sites;

determining a degree of interlinking for target UPUNIs by noting a number of matches and non-matches as between the target UPUNIs and to found UPUNIs.

393. The method of embodiment 392, further, comprising:

crawling across a communications network for UPUNIs and generating indexing of UPUNIs.

394. The method of embodiment 392, further, comprising: updating an UPUNI index in an UPUNI database with determined degree of interlinking information.

395. The method of embodiment 392, wherein the UPUNI is a multi-identifier having multiple references to content items related to the target content asset.

396. The method of embodiment 392, wherein the UPUNI is a multi-identifier having multiple references to content items related to the target content asset.

397. The method of embodiment 392, wherein the target UPUNIs are sponsored.

398. The method of embodiment 392, wherein the target UPUNIs are individually specified.

399. The method of embodiment 392, wherein the target UPUNIs are obtained from a database of indexed UPUNIs.

400. The method of embodiment 392, wherein determination of degree of interlinking is performed for every known UPUNI.

401. The method of embodiment 400, further, comprising: generating a ranking of interlinked UPUNIs.

402. The method of embodiment 401, wherein the ranking selects UPUNIs from an interlink database.

403. The method of embodiment 402, wherein the selection limits ranking results to a sector.

404. The method of embodiment 402, wherein the selection limits ranking results to a product.

405. The method of embodiment 402, wherein the selection limits ranking results to a time period.

406. The method of embodiment 401, wherein the rankings are generated periodically.

407. The method of embodiment 401, wherein the rankings are sold.

408. The method of embodiment 392, wherein the degree of interlinking information is sold.

409. A processor accessible medium having signal states, wherein the signal states embody a data structure having interrelated data types, comprising:

a unique persistent universal name identifier (UPUNI);

a reference to a target content asset;

multiple references to content items related to the target content asset;

a field value for each data type indicative of being part of a menu specification, wherein positive indicia will result in a data type being used as part of the menu specification, and negative indicia will result in ignoring a data type.

410. The medium of embodiment 409, further, comprising:

an access control field value for each data type specifying access rights for each data type.

411. A processor accessible medium having signal states, wherein the signal states embody a data structure having interrelated data types, comprising:

a unique persistent universal name identifier (UPUNI);

a reference to a target content asset;

multiple references to content items related to the target content asset;

an access control field value for each data type specifying access rights for each data type.

412. The medium of embodiment 411, further, comprising:

a field value for each data type indicative of being part of a menu specification, wherein positive indicia will result in a data type being used as part of the menu specification, and negative indicia will result in ignoring a data type.

413. A processor accessible medium having signal states, wherein the signal states embody a data structure having interrelated data types, comprising:

first level hierarchical values from metadata fields and values from a unique persistent universal name identifier (UPUNI), wherein the first level hierarchical values in a hierarchy are to comprise a root level structure of a UPUNI menu;

subsequent nested level hierarchical values from metadata fields and values from the UPUNI, if available, wherein each subsequent nested level is related to a higher level in the hierarchy;

references to content items related to a target content asset, wherein the references to content items are associated with each nested level hierarchical value that is at a terminal level in the hierarchy.

414. The medium of embodiment 413, further, comprising:

instruction signals to generate a menu based on the data types.

415. In memory, an interaction interface, comprising:

instruction signals, wherein the interaction interface is responsive to user and system event signals and wherein the instruction signals are issueable by a processor to invoke:

first level hierarchical menus from values from metadata fields and values from a unique persistent universal name identifier (UPUNI), wherein the fields and values used are specified by a menu specification;

subsequent nested level hierarchical menus from values from metadata fields and values from the UPUNI, if available, wherein the fields and values used are specified by a menu specification, and wherein each subsequent nested level menu spawns from its related higher level menu; references to content items related to a target content asset, wherein the references to content items are associated with each nested level hierarchical value that is at a terminal level in the hierarchy, wherein non-terminal menus are responsive to user selections to spawn related nested menus, and wherein terminal menus are responsive to user selections to generate instruction signals to navigate to the references.

416. A system of menu generation, comprising:

means to receive a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

means to obtain an UPUNI menu specification;

means to obtain UPUNI record information from an UPUNI directory;

means to generate an UPUNI menu from the UPUNI menu specification, wherein the UPUNI menu specification is used to specify values from UPUNI record information with which to populate the UPUNI menu.

417. A system of specification generation, comprising:
means to obtain unique persistent universal name identifier (UPUNI) record information from an UPUNI directory,
wherein the UPUNI identifies a target content asset, and
wherein the UPUNI is a multi-identifier having multiple references to content items related to the target content asset;
means to generate a menu specification based on a hierarchical structure of an UPUNI record.

418. A system of reference, comprising:
means to obtain metadata fields and values;
means to obtain an UPUNI menu specification, if it exists;
means to generate an UPUNI menu specification from the metadata fields and values, if one is unavailable;
means to match metadata fields to fields in the menu specification;
means to search the metadata based on the matched fields for field values;
means to construct the target references based on the matched fields and field values; means to store the target references in a UPUNI record in a UPUNI directory.

419. A system of reference, comprising:
means to establish relationships between unique persistent universal name identifier (UPUNI) and an UPUNI menu,
wherein the UPUNI identifies a target content asset, and
wherein the UPUNI is a multi-identifier having multiple target references to content items related to the target content asset;
means to construct the target references, wherein the target references are to be stored in a UPUNI record in a UPUNI directory;
means to create an UPUNI menu with links to the target content asset and the target references.

420. A system of reference editing, comprising:
means to means to obtain unique persistent universal name identifier (UPUNI) record information from an UPUNI directory,
wherein the UPUNI identifies a target content asset, and
wherein the UPUNI is a multi-identifier having multiple references to content items related to the target content asset;
means to display the UPUNI record information;
means to add fields and values to the UPUNI record, if instructed;
means to delete fields and values to the UPUNI record, if instructed;
means to alter fields and values to the UPUNI record, if instructed;
means to store update UPUNI record information in an UPUNI directory.

421. A system of reference distribution, comprising:
means to receive a request for a menu specification for a unique persistent universal name identifier (UPUNI),
wherein the UPUNI identifies a target content asset, and
wherein the UPUNI is a multi-identifier having multiple references to content items related to the target content asset;
means to search a database for the menu specification;
means to generate a menu specification for the UPUNI from metadata in an UPUNI directory, if none are found in the database;
means to store the menu specification in the database, if one was generated;
means to generate an UPUNI menu from the UPUNI menu specification, wherein the UPUNI menu specification is used to specify values from UPUNI record information with which to populate the UPUNI menu;
means to provide the UPUNI menu to a requesting client that is responsive to the request.

422. A system of interlink determination, comprising:
means to obtain target unique persistent universal name identifiers (UPUNIs) for basis of comparison, wherein the UPUNI identifies a target content asset;
means to compare target UPUNIs to UPUNIs found while index crawling Web sites; means to determine a degree of interlinking for target UPUNIs by noting a number of matches and non-matches as between the target UPUNIs and to found UPUNIs.

423. A medium readable by a processor for menu generation, comprising:
instruction signals in the processor readable medium, wherein the instruction signals are issuable by the processor to:
receive a request for a unique persistent universal name identifier (UPUNI) from a requesting client accessing content,
wherein the request is triggered from the accessing of content,
wherein the UPUNI identifies a target content asset, and
wherein the UPUNI is a multi-identifier having multiple references to content items related to the target content asset;
obtain an UPUNI menu specification;
obtain UPUNI record information from an UPUNI directory;
generate an UPUNI menu from the UPUNI menu specification, wherein the UPUNI menu specification is used to specify values from UPUNI record information with which to populate the UPUNI menu.

424. A medium readable by a processor for specification generation, comprising:
instruction signals in the processor readable medium, wherein the instruction signals are issuable by the processor to:
obtain unique persistent universal name identifier (UPUNI) record information from an UPUNI directory,
wherein the UPUNI identifies a target content asset, and
wherein the UPUNI is a multi-identifier having multiple references to content items related to the target content asset;
generate a menu specification based on a hierarchical structure of an UPUNI record.

425. A medium readable by a processor for reference, comprising:
instruction signals in the processor readable medium, wherein the instruction signals are issuable by the processor to:
obtain metadata fields and values;
obtain an UPUNI menu specification, if it exists;
generate an UPUNI menu specification from the metadata fields and values, if one is unavailable;

match metadata fields to fields in the menu specification;

search the metadata based on the matched fields for field values;

construct the target references based on the matched fields and field values; store the target references in a UPUNI record in a UPUNI directory.

426. A medium readable by a processor for reference, comprising:

instruction signals in the processor readable medium, wherein the instruction signals are issuable by the processor to:

establish relationships between unique persistent universal name identifier (UPUNI) and an UPUNI menu, wherein the UPUNI identifies a target content asset, and wherein the UPUNI is a multi-identifier having multiple target references to content items related to the target content asset:

construct the target references, wherein the target references are to be stored in a UPUNI record in a UPUNI directory;

create an UPUNI menu with links to the target content asset and the target references.

427. A medium readable by a processor for reference editing, comprising:

instruction signals in the processor readable medium, wherein the instruction signals are issuable by the processor to:

obtain unique persistent universal name identifier (UPUNI) record information from an UPUNI directory, wherein the UPUNI identifies a target content asset, and wherein the UPUNI is a multi-identifier having multiple references to content items related to the target content asset;

display the UPUNI record information;

add fields and values to the UPUNI record, if instructed;

delete fields and values to the UPUNI record, if instructed;

alter fields and values to the UPUNI record, if instructed;

store update UPUNI record information in an UPUNI directory.

428. A medium readable by a processor for reference distribution, comprising:

instruction signals in the processor readable medium, wherein the instruction signals are issuable by the processor to:

receive a request for a menu specification for a unique persistent universal name identifier (UPUNI), wherein the UPUNI identifies a target content asset, and wherein the UPUNI is a multi-identifier having multiple references to content items related to the target content asset;

search a database for the menu specification;

generate a menu specification for the UPUNI from metadata in an UPUNI directory, if none are found in the database;

store the menu specification in the database, if one was generated;

generate an UPUNI menu from the UPUNI menu specification, wherein the UPUNI menu specification is used to specify values from UPUNI record information with which to populate the UPUNI menu;

provide the UPUNI menu to a requesting client that is responsive to the request.

429. A medium readable by a processor for interlink determination, comprising:

instruction signals in the processor readable medium, wherein the instruction signals are issuable by the processor to:

obtain target unique persistent universal name identifiers (UPUNIs) for basis of comparison, wherein the UPUNI identifies a target content asset;

compare target UPUNIs to UPUNIs found while index crawling Web sites;

determine a degree of interlinking for target UPUNIs by noting a number of matches and non-matches as between the target UPUNIs and to found UPUNIs.

430. An apparatus to generate menu, comprising:

a memory;

a processor disposed in communication with said memory, and configured to issue a plurality of processing instructions stored in the memory, wherein the instructions issue signals to:

receive a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

obtain an UPUNI menu specification;

obtain UPUNI record information from an UPUNI directory;

generate an UPUNI menu from the UPUNI menu specification, wherein the UPUNI menu specification is used to specify values from UPUNI record information with which to populate the UPUNI menu.

431. An apparatus to generate specification, comprising:

a memory;

a processor disposed in communication with said memory, and configured to issue a plurality of processing instructions stored in the memory, wherein the instructions issue signals to:

obtain unique persistent universal name identifier (UPUNI) record information from an UPUNI directory, wherein the UPUNI identifies a target content asset, and wherein the UPUNI is a multi-identifier having multiple references to content items related to the target content asset;

generate a menu specification based on a hierarchical structure of an UPUNI record.

432. An apparatus to reference, comprising:

a memory;

a processor disposed in communication with said memory, and configured to issue a plurality of processing instructions stored in the memory, wherein the instructions issue signals to:

obtain metadata fields and values;

obtain an UPUNI menu specification, if it exists;

generate an UPUNI menu specification from the metadata fields and values, if one is unavailable;

match metadata fields to fields in the menu specification;

search the metadata based on the matched fields for field values;

construct the target references based on the matched fields and field values;

store the target references in a UPUNI record in a UPUNI directory.

433. An apparatus to reference, comprising:

a memory;

a processor disposed in communication with said memory, and configured to issue a plurality of processing instructions stored in the memory, wherein the instructions issue signals to:

establish relationships between unique persistent universal name identifier (UPUNI) and an UPUNI menu, wherein the UPUNI identifies a target content asset, and wherein the UPUNI is a multi-identifier having multiple target references to content items related to the target content asset;

construct the target references, wherein the target references are to be stored in a UPUNI record in a UPUNI directory;

create an UPUNI menu with links to the target content asset and the target references.

434. An apparatus to edit reference, comprising:

a memory;

a processor disposed in communication with said memory, and configured to issue a plurality of processing instructions stored in the memory, wherein the instructions issue signals to:

obtain unique persistent universal name identifier (UPUNI) record information from an UPUNI directory, wherein the UPUNI identifies a target content asset, and wherein the UPUNI is a multi-identifier having multiple references to content items related to the target content asset;

display the UPUNI record information;

add fields and values to the UPUNI record, if instructed;

delete fields and values to the UPUNI record, if instructed;

alter fields and values to the UPUNI record, if instructed;

store update UPUNI record information in an UPUNI directory.

435. An apparatus to distribute reference, comprising:

a memory;

a processor disposed in communication with said memory, and configured to issue a plurality of processing instructions stored in the memory, wherein the instructions issue signals to:

receive a request for a menu specification for a unique persistent universal name identifier (UPUNI), wherein the UPUNI identifies a target content asset, and wherein the UPUNI is a multi-identifier having multiple references to content items related to the target content asset;

search a database for the menu specification;

generate a menu specification for the UPUNI from metadata in an UPUNI directory, if none are found in the database;

store the menu specification in the database, if one was generated;

generate an UPUNI menu from the UPUNI menu specification, wherein the UPUNI menu specification is used to specify values from UPUNI record information with which to populate the UPUNI menu;

provide the UPUNI menu to a requesting client that is responsive to the request.

436. An apparatus to determine interlinking, comprising:

a memory;

a processor disposed in communication with said memory, and configured to issue a plurality of processing instructions stored in the memory, wherein the instructions issue signals to:

obtain target unique persistent universal name identifiers (UPUNIs) for basis of comparison, wherein the UPUNI identifies a target content asset:

compare target UPUNIs to UPUNIs found while index crawling Web sites;

determine a degree of interlinking for target UPUNIs by noting a number of matches and non-matches as between the target UPUNIs and to found UPUNIs.

437. A method, comprising:

creating an initial hierarchy of menu items where a each menu item has a reference target identifier wherein menu items may include composite media, wherein menu items may include information from a back-end server, wherein the menu items are links to effect a purchase, and wherein the hierarchy of menu items is brought about by an advertisement;

distributing the initial hierarchy for consideration by menu viewers;

verifying that the initial hierarchy's reference target identifiers and associated menu item information are valid;

effecting tracking of the menu viewers' usage of the initial hierarchy, wherein tracking includes a number of impressions made by menu items, wherein tracking includes a number of times a menu item is selected;

modifying the menu item in the initial hierarchy based on the tracking of usage, wherein modification includes arranging more popular menu items more prominently, wherein modification includes placing menu items to increase efficacy.

438. A method, comprising:

creating an initial hierarchy of menu items where a each menu item has a reference target identifier; distributing the initial hierarchy for consideration by menu viewers;

obtaining menu viewers' usage indicia of the initial hierarchy;

modifying the menu item in the initial hierarchy based on the indicia of usage.

439. The method of embodiment 438, further, comprising:

verifying that the initial hierarchy's reference target identifiers and associated menu item information are valid.

440. The method of embodiment 438, wherein menu items may include graphics.

441. The method of embodiment 438, wherein menu items may include video.

442. The method of embodiment 438, wherein menu items may include forms.

443. The method of embodiment 438, wherein menu items may include composite media.

444. The method of embodiment 438, wherein menu items relate to government information.

445. The method of embodiment 438, wherein menu items relate to medical patient information.

446. The method of embodiment 438, wherein menu items relate to content management information.

447. The method of embodiment 438, wherein menu items relate to RFID information.

448. The method of embodiment 438, wherein menu items relate to personal identity information.

449. The method of embodiment 438, wherein menu items relate to military information.
450. The method of embodiment 438, wherein menu items relate to internal product information.
451. The method of embodiment 438, wherein menu items relate to external information.
452. The method of embodiment 438, wherein menu items relate to document management information.
453. The method of embodiment 438, wherein menu items may include information from a back-end server.
454. The method of embodiment 453, wherein the back-end server is a knowledge-management system.
455. The method of embodiment 453, wherein the menu items are links to effect a purchase.
456. The method of embodiment 453, wherein the menu items include live inventory.
457. The method of embodiment 438, wherein the hierarchy of menu items is brought about by a banner advertisement.
458. The method of embodiment 438, wherein the hierarchy of menu items is brought about by a sponsored advertising link.
459. The method of embodiment 438, wherein the hierarchy of menu items is brought about by a document.
460. The method of embodiment 438, wherein the hierarchy of menu items is brought about by a media player.
461. The method of embodiment 438, wherein the initial hierarchy is composed of menu items selected by consultants.
462. The method of embodiment 461, wherein the consultants are marketing analysts.
463. The method of embodiment 438, wherein the viewers' usage indicia includes users' purchasing behavior.
464. The method of embodiment 438, wherein the viewers' usage indicia includes independently-recorded user preference information.
465. The method of embodiment 438, wherein the viewers' usage indicia includes independently-recorded user information that is associated with a category of users.
466. The method of embodiment 465, wherein the category of users include any of anonymized metrics profiling a type of user by income, interests, demographics, preferences.
467. The method of embodiment 438, wherein the viewers' usage indicia includes metrics recorded by a site hosting the menu.
468. The method of embodiment 467, wherein the metrics include profiling based on time of day.
469. The method of embodiment 467, wherein the metrics include geographical location of site visitors.
470. The method of embodiment 438, wherein the viewers' usage indicia is effected by tracking of the menu viewers' usage of the initial hierarchy.
471. The method of embodiment 470, wherein tracking includes a number of impressions made by menu items.
472. The method of embodiment 470, wherein tracking includes a number of times a menu item is selected.
473. The method of embodiment 470, wherein tracking includes an amount of time a menu item is considered.
474. The method of embodiment 470, wherein tracking includes a number of times a menu item is passed over.
475. The method of embodiment 438, wherein the modification is performed automatically.
476. The method of embodiment 470, wherein the modification is performed manually.
477. The method of embodiment 476, wherein the manual modification is performed with a menu editor.
478. The method of embodiment 477, wherein the menu editor displays tracking statistics.
479. The method of embodiment 478, wherein the tracking statistics include any of: a number of impressions made by menu items, a number of times a menu item is selected, an amount of time a menu item is considered, a number of times a menu item is passed over.
480. The method of embodiment 477, wherein the menu editor displays usage constraints that limit how a menu item may be used.
481. The method of embodiment 480, wherein the usage constraints include any of: a number of impressions made by menu items, a number of times a menu item is selected, an amount of time a menu item is considered, a number of times a menu item is passed over.
482. The method of embodiment 438, wherein modification includes arranging more popular menu items more prominently.
483. The method of embodiment 438, wherein greater promenance includes any of: higher placement in a menu hierarchy, higher placement within a tier of a menu hierarchy.
484. The method of embodiment 482, wherein more popular menu items are menu items that have been selected more frequently.
485. The method of embodiment 438, wherein modification includes arranging less popular menu items more prominently.
486. The method of embodiment 438, wherein modification includes placement of sponsored advertising of menu items.
487. The method of embodiment 486, wherein modification includes arranging the menu items based on context.
488. The method of embodiment 486, wherein modification includes arranging the menu items to increase efficacy of the sponsored advertising.
489. The method of embodiment 486, wherein modification includes placing sponsored advertising in locations that have been determined to be most effective through tracking.
490. The method of embodiment 486, wherein the placement of sponsored advertising is based on context.
491. The method of embodiment 486, wherein the placement of sponsored advertising is based on higher bids for ad placement.
492. The method of embodiment 486, wherein the placement of sponsored advertising is more prominent.
493. The method of embodiment 486, wherein the placement of sponsored advertising is subject to usage constraints.
494. The method of embodiment 438, wherein modification includes arranging the menu items to increase efficacy.
495. The method of embodiment 438, wherein modification includes placing menu items to increase efficacy.
496. The method of embodiment 438, wherein modification includes placing menu items based on context.
497. The method of embodiment 496, wherein the context is based on other menu items within the hierarchy of menu items.
498. The method of embodiment 496, wherein the context is based on content of references targeted by menu items in the hierarchy of menu items.

499. The method of embodiment 496, wherein the context is based on content of references targeted by menu items in the hierarchy of menu items.

500. A processor enabled method, comprising:

receiving a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

obtaining an UPUNI menu specification;

obtaining UPUNI record information from an UPUNI directory;

generating an UPUNI hierarchy of menu items from the UPUNI menu specification, wherein the UPUNI menu specification is used to specify values from UPUNI record information with which to populate the UPUNI menu, wherein menu items may include composite media, wherein menu items may include information from a back-end server, wherein the menu items are links to effect a purchase, wherein the hierarchy of menu items is brought about by an advertisement;

verifying that the UPUNI menu's reference target identifiers and associated menu item information are valid;

effecting tracking of UPUNI menu usage from end-users, wherein tracking includes a number of impressions made by menu items, wherein tracking includes a number of times a menu item is selected;

modifying UPUNI menu items based on the tracking of usage, wherein modification includes arranging more popular menu items more prominently, and wherein modification includes placing menu items to increase efficacy.

501. A processor enabled method, comprising:

receiving a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

obtaining an UPUNI menu specification;

obtaining UPUNI record information from an UPUNI directory;

generating an UPUNI hierarchy of menu items from the UPUNI menu specification, wherein the UPUNI menu specification is used to specify values from UPUNI record information with which to populate the UPUNI menu;

effecting tracking of UPUNI menu usage from end-users;

modifying UPUNI menu items based on the tracking of usage.

502. The method of embodiment 501, further, comprising:

verifying that the UPUNI menu's reference target identifiers and associated menu item information are valid.

503. The method of embodiment 501, wherein menu items may include graphics.

504. The method of embodiment 501, wherein menu items may include video.

505. The method of embodiment 501, wherein menu items may include forms.

506. The method of embodiment 501, wherein menu items may include composite media.

507. The method of embodiment 501, wherein menu items may include information from a back-end server.

508. The method of embodiment 507, wherein the menu items are links to effect a purchase.

509. The method of embodiment 507, wherein the menu items include live inventory.

510. The method of embodiment 501, wherein the hierarchy of menu items is brought about by a banner advertisement.

511. The method of embodiment 501, wherein the hierarchy of menu items is brought about by a sponsored advertising link.

512. The method of embodiment 501, wherein the hierarchy of menu items is brought about by a document.

513. The method of embodiment 501, wherein the hierarchy of menu items is brought about by a media player.

514. The method of embodiment 501, wherein the UPUNI menu is composed of menu items selected by consultants.

515. The method of embodiment 514, wherein the consultants are marketing analysts.

516. The method of embodiment 501, wherein tracking includes a number of impressions made by menu items.

517. The method of embodiment 501, wherein tracking includes a number of times a menu item is selected.

518. The method of embodiment 501, wherein tracking includes an amount of time a menu item is considered.

519. The method of embodiment 501, wherein tracking includes a number of times a menu item is passed over.

520. The method of embodiment 501, wherein the modification is performed automatically.

521. The method of embodiment 501, wherein the modification is performed manually.

522. The method of embodiment 521, wherein the manual modification is performed with a menu editor.

523. The method of embodiment 522, wherein the menu editor displays tracking statistics.

524. The method of embodiment 523, wherein the tracking statistics include any of: a number of impressions made by menu items, a number of times a menu item is selected, an amount of time a menu item is considered, a number of times a menu item is passed over.

525. The method of embodiment 522, wherein the menu editor displays usage constraints that limit how a menu item may be used.

526. The method of embodiment 525, wherein the usage constraints include any of: a number of impressions made by menu items, a number of times a menu item is selected, an amount of time a menu item is considered, a number of times a menu item is passed over.

527. The method of embodiment 501, wherein modification includes arranging more popular menu items more prominently.

528. The method of embodiment 501, wherein greater promenance includes any of: higher placement in a menu hierarchy, higher placement within a tier of a menu hierarchy.

529. The method of embodiment 527, wherein more popular menu items are menu items that have been selected more frequently.
530. The method of embodiment 501, wherein modification includes arranging less popular menu items more prominently.
531. The method of embodiment 501, wherein modification includes placement of sponsored advertising of menu items.
532. The method of embodiment 531, wherein modification includes arranging the menu items based on context.
533. The method of embodiment 531, wherein modification includes arranging the menu items to increase efficacy of the sponsored advertising.
534. The method of embodiment 531, wherein modification includes placing sponsored advertising in locations that have been determined to be most effective through tracking.
535. The method of embodiment 531, wherein the placement of sponsored advertising is based on context.
536. The method of embodiment 531, wherein the placement of sponsored advertising is based on higher bids for ad placement.
537. The method of embodiment 531, wherein the placement of sponsored advertising is more prominent.
538. The method of embodiment 531, wherein the placement of sponsored advertising is subject to usage constraints.
539. The method of embodiment 501, wherein modification includes placing menu items to increase efficacy.
540. The method of embodiment 501, wherein modification includes placing menu items based on context.
541. The method of embodiment 540, wherein the context is based on other menu items within the hierarchy of menu items.
542. The method of embodiment 540, wherein the context is based on content of references targeted by menu items in the hierarchy of menu items.
543. The method of embodiment 540, wherein the context is based on content of references targeted by menu items in the hierarchy of menu items.
544. A processor enabled method, comprising:
generating a hierarchical menu that compresses a purchase cycle.
545. A processor enabled method for generating a user interface, comprising:
generating a hierarchy of menu items from a menu specification and from feedback from user tracking of usage of the menu items in response to engaging content embedded with a trigger to invoke the hierarchy of menu items,
wherein menu items may include composite media,
wherein menu items may include information from a back-end server,
wherein the menu items are links to effect a purchase, and
wherein the hierarchy of menu items is brought about by an advertisement.
546. A processor enabled method for generating a user interface, comprising:
generating a hierarchy of menu items from a menu specification and from feedback from user tracking of usage of the menu items in response to engaging content embedded with a trigger to invoke the hierarchy of menu items.
547. The method of embodiment 546, wherein menu items may include graphics.
548. The method of embodiment 546, wherein menu items may include video.
549. The method of embodiment 546, wherein menu items may include forms.
550. The method of embodiment 546, wherein menu items may include composite media.
551. The method of embodiment 546, wherein menu items may include information from a back-end server.
552. The method of embodiment 551, wherein the menu items are links to effect a purchase.
553. The method of embodiment 551, wherein the menu items include live inventory.
554. The method of embodiment 546, wherein the hierarchy of menu items is brought about by a banner advertisement.
555. The method of embodiment 546, wherein the hierarchy of menu items is brought about by a sponsored advertising link.
556. The method of embodiment 546, wherein the hierarchy of menu items is brought about by a document.
557. The method of embodiment 546, wherein the hierarchy of menu items is brought about by a media player.
558. A processor enabled method for generating a user interface, comprising:
generating an first tier hierarchical menu level containing information about identifying segment selectors and targets middle tier hierarchical menus;
generating a middle tier hierarchical menu level containing information about identifying brand selectors and targets later tier hierarchical menus;
generating a later tier hierarchical menu level containing information and targets same brand transactions,
wherein menu items within the hierarchy may include composite media,
wherein the menu items may include information from a back-end server,
wherein the menu items are links to effect a purchase, and
wherein the hierarchy of menu items is brought about by an advertisement.
559. A processor enabled method for generating a user interface, comprising:
generating an first tier hierarchical menu level containing information about identifying segment selectors and targets middle tier hierarchical menus;
generating a middle tier hierarchical menu level containing information about identifying brand selectors and targets later tier hierarchical menus;
generating a later tier hierarchical menu level containing information and targets same brand transactions.
560. The method of embodiment 559, wherein menu items within the hierarchy may include graphics.
561. The method of embodiment 559, wherein menu items within the hierarchy may include video.
562. The method of embodiment 559, wherein menu items within the hierarchy may include forms.
563. The method of embodiment 559, wherein menu items within the hierarchy may include composite media.
564. The method of embodiment 559, wherein menu items within the hierarchy may include information from a back-end server.
565. The method of embodiment 564, wherein the menu items are links to effect a purchase.

566. The method of embodiment 564, wherein the menu items include live inventory.
567. The method of embodiment 559, wherein the hierarchy of menu items is brought about by a banner advertisement.
568. The method of embodiment 559, wherein the hierarchy of menu items is brought about by a sponsored advertising link.
569. The method of embodiment 559, wherein the hierarchy of menu items is brought about by a document.
570. The method of embodiment 559, wherein the hierarchy of menu items is brought about by a media player.
571. A system to make a menu, comprising:
means to generate a hierarchical menu that compresses a purchase cycle.
572. A system to make a menu, comprising:
means to create an initial hierarchy of menu items where a each menu item has a reference target identifier
wherein menu items may include composite media,
wherein menu items may include information from a back-end server,
wherein the menu items are links to effect a purchase, and
wherein the hierarchy of menu items is brought about by an advertisement;
means to distribute the initial hierarchy for consideration by menu viewers;
means to verify that the initial hierarchy's reference target identifiers and associated menu item information are valid;
means to effect tracking of the menu viewers' usage of the initial hierarchy,
wherein tracking includes a number of impressions made by menu items,
wherein tracking includes a number of times a menu item is selected;
means to modify the menu item in the initial hierarchy based on the tracking of usage,
wherein modification includes arranging more popular menu items more prominently,
wherein modification includes placing menu items to increase efficacy.
573. A system to make a menu, comprising:
means to receive a request for a unique persistent universal name identifier (UPUNI) from a requesting client accessing content,
wherein the request is triggered from the accessing of content,
wherein the UPUNI identifies a target content asset, and
wherein the UPUNI is a multi-identifier having multiple references to content items related to the target content asset;
means to obtain an UPUNI menu specification;
means to obtain UPUNI record information from an UPUNI directory;
means to generate an UPUNI hierarchy of menu items from the UPUNI menu specification, wherein the UPUNI menu specification is used to specify values from UPUNI record information with which to populate the UPUNI menu,
wherein menu items may include composite media,
wherein menu items may include information from a back-end server,
wherein the menu items are links to effect a purchase, and
wherein the hierarchy of menu items is brought about by an advertisement;
means to verify that the UPUNI menu's reference target identifiers and associated menu item information are valid;
means to effect tracking of UPUNI menu usage from end-users,
wherein tracking includes a number of impressions made by menu items,
wherein tracking includes a number of times a menu item is selected;
means to modify UPUNI menu items based on the tracking of usage,
wherein modification includes arranging more popular menu items more prominently,
wherein modification includes placing menu items to increase efficacy.
574. A system to generate a user interface, comprising:
means to generate a hierarchy of menu items from a menu specification and from feedback from user tracking of usage of the menu items in response to engaging content embedded with a trigger to invoke the hierarchy of menu items,
wherein menu items may include composite media,
wherein menu items may include information from a back-end server,
wherein the menu items are links to effect a purchase, and
wherein the hierarchy of menu items is brought about by an advertisement.
575. A system to generate a user interface, comprising:
means to generate an first tier hierarchical menu level containing information about identifying segment selectors and targets middle tier hierarchical menus;
means to generate a middle tier hierarchical menu level containing information about identifying brand selectors and targets later tier hierarchical menus;
means to generate a later tier hierarchical menu level containing information and targets same brand transactions,
wherein menu items within the hierarchy may include composite media,
wherein the menu items may include information from a back-end server,
wherein the menu items are links to effect a purchase, and
wherein the hierarchy of menu items is brought about by an advertisement.
576. A medium readable by a processor to invoke an interaction interface, comprising:
instruction signals in the processor readable medium, wherein the instruction signals are issuable by the processor in response to user and system event signals to invoke:
a hierarchical menu that compresses a purchase cycle.
577. A medium readable by a processor to make a menu, comprising:
instruction signals in the processor readable medium, wherein the instruction signals are issuable by the processor to:
create an initial hierarchy of menu items where a each menu item has a reference target identifier
wherein menu items may include composite media,
wherein menu items may include information from a back-end server,
wherein the menu items are links to effect a purchase, and wherein the hierarchy of menu items is brought about by an advertisement;

distribute the initial hierarchy for consideration by menu viewers;

verify that the initial hierarchy's reference target identifiers and associated menu item information are valid;

effect tracking of the menu viewers' usage of the initial hierarchy, wherein tracking includes a number of impressions made by menu items, wherein tracking includes a number of times a menu item is selected;

modify the menu item in the initial hierarchy based on the tracking of usage, wherein modification includes arranging more popular menu items more prominently, wherein modification includes placing menu items to increase efficacy.

578. A medium readable by a processor to make a menu, comprising:

instruction signals in the processor readable medium, wherein the instruction signals are issuable by the processor to:

receive a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

obtain an UPUNI menu specification;

obtain UPUNI record information from an UPUNI directory;

generate an UPUNI hierarchy of menu items from the UPUNI menu specification, wherein the UPUNI menu specification is used to specify values from UPUNI record information with which to populate the UPUNI menu, wherein menu items may include composite media, wherein menu items may include information from a back-end server, wherein the menu items are links to effect a purchase, and wherein the hierarchy of menu items is brought about by an advertisement;

verify that the UPUNI menu's reference target identifiers and associated menu item information are valid;

effect tracking of UPUNI menu usage from end-users, wherein tracking includes a number of impressions made by menu items, wherein tracking includes a number of times a menu item is selected;

modify UPUNI menu items based on the tracking of usage, wherein modification includes arranging more popular menu items more prominently, wherein modification includes placing menu items to increase efficacy.

579. A medium readable by a processor to invoke an interaction interface, comprising:

instruction signals in the processor readable medium, wherein the instruction signals are issuable by the processor in response to user and system event signals to invoke:

a hierarchy of menu items from a menu specification and from feedback from user tracking of usage of the menu items in response to engaging content embedded with a trigger to invoke the hierarchy of menu items, wherein menu items may include composite media, wherein menu items may include information from a back-end server, wherein the menu items are links to effect a purchase, and wherein the hierarchy of menu items is brought about by an advertisement.

580. A medium readable by a processor to invoke an interaction interface, comprising:

instruction signals in the processor readable medium, wherein the instruction signals are issuable by the processor in response to user and system event signals to invoke:

a hierarchy of menu items from a menu specification and from feedback from user tracking of usage of the menu items in response to engaging content embedded with a trigger to invoke the hierarchy of menu items.

581. A medium readable by a processor to invoke an interaction interface, comprising:

instruction signals in the processor readable medium, wherein the instruction signals are issuable by the processor in response to user and system event signals to invoke:

a first tier hierarchical menu level containing information about identifying segment selectors and targets middle tier hierarchical menus;

a middle tier hierarchical menu level containing information about identifying brand selectors and targets later tier hierarchical menus;

a later tier hierarchical menu level containing information and targets same brand transactions, wherein menu items within the hierarchy may include composite media, wherein the menu items may include information from a back-end server, wherein the menu items are links to effect a purchase, and wherein the hierarchy of menu items is brought about by an advertisement.

582. A medium readable by a processor to invoke an interaction interface, comprising:

instruction signals in the processor readable medium, wherein the instruction signals are issuable by the processor in response to user and system event signals to invoke:

a first tier hierarchical menu level containing information about identifying segment selectors and targets middle tier hierarchical menus;

a middle tier hierarchical menu level containing information about identifying brand selectors and targets later tier hierarchical menus;

a later tier hierarchical menu level containing information and targets same brand transactions.

583. An apparatus, comprising:

a memory;

a processor disposed in communication with said memory, and configured to issue a plurality of processing instructions stored in the memory, wherein the instruction signals are issuable by the processor in response to user and system event signals to invoke:

a hierarchical menu that compresses a purchase cycle.

584. An apparatus, comprising:

a memory;

a processor disposed in communication with said memory, and configured to issue a plurality of processing instructions stored in the memory, wherein the instructions issue signals to: create an initial hierarchy of menu items where a each menu item has a reference target identifier wherein menu items may include composite media, wherein menu items may include information from a back-end server, wherein the menu items are links to effect a purchase, and wherein the hierarchy of menu items is brought about by an advertisement;

distribute the initial hierarchy for consideration by menu viewers;

verify that the initial hierarchy's reference target identifiers and associated menu item information are valid;

effect tracking of the menu viewers' usage of the initial hierarchy, wherein tracking includes a number of impressions made by menu items, wherein tracking includes a number of times a menu item is selected;

modify the menu item in the initial hierarchy based on the tracking of usage, wherein modification includes arranging more popular menu items more prominently, wherein modification includes placing menu items to increase efficacy.

585. An apparatus, comprising:

a memory;

a processor disposed in communication with said memory, and configured to issue a plurality of processing instructions stored in the memory, wherein the instructions issue signals to:

receive a request for a unique persistent universal name identifier (UPUNI) from a requesting client accessing content, wherein the request is triggered from the accessing of content, wherein the UPUNI identifies a target content asset, and wherein the UPUNI is a multi-identifier having multiple references to content items related to the target content asset;

obtain an UPUNI menu specification;

obtain UPUNI record information from an UPUNI directory;

generate an UPUNI hierarchy of menu items from the UPUNI menu specification, wherein the UPUNI menu specification is used to specify values from UPUNI record information with which to populate the UPUNI menu, wherein menu items may include composite media, wherein menu items may include information from a back-end server, wherein the menu items are links to effect a purchase, and wherein the hierarchy of menu items is brought about by an advertisement;

verify that the UPUNI menu's reference target identifiers and associated menu item information are valid;

effect tracking of UPUNI menu usage from end-users, wherein tracking includes a number of impressions made by menu items, wherein tracking includes a number of times a menu item is selected;

modify UPUNI menu items based on the tracking of usage, wherein modification includes arranging more popular menu items more prominently, wherein modification includes placing menu items to increase efficacy.

586. An apparatus, comprising:

a memory;

a processor disposed in communication with said memory, and configured to issue a plurality of processing instructions stored in the memory, wherein the instruction signals are issuable by the processor in response to user and system event signals to invoke: a hierarchy of menu items from a menu specification and from feedback from user tracking of usage of the menu items in response to engaging content embedded with a trigger to invoke the hierarchy of menu items.

587. An apparatus, comprising:

a memory;

a processor disposed in communication with said memory, and configured to issue a plurality of processing instructions stored in the memory, wherein the instruction signals are issuable by the processor in response to user and system event signals to invoke:

a first tier hierarchical menu level containing information about identifying segment selectors and targets middle tier hierarchical menus;

a middle tier hierarchical menu level containing information about identifying brand selectors and targets later tier hierarchical menus;

a later tier hierarchical menu level containing information and targets same brand transactions, wherein menu items within the hierarchy may include composite media, wherein the menu items may include information from a back-end server, wherein the menu items are links to effect a purchase, and wherein the hierarchy of menu items is brought about by an advertisement.

ISICI Controller

Figure 22:
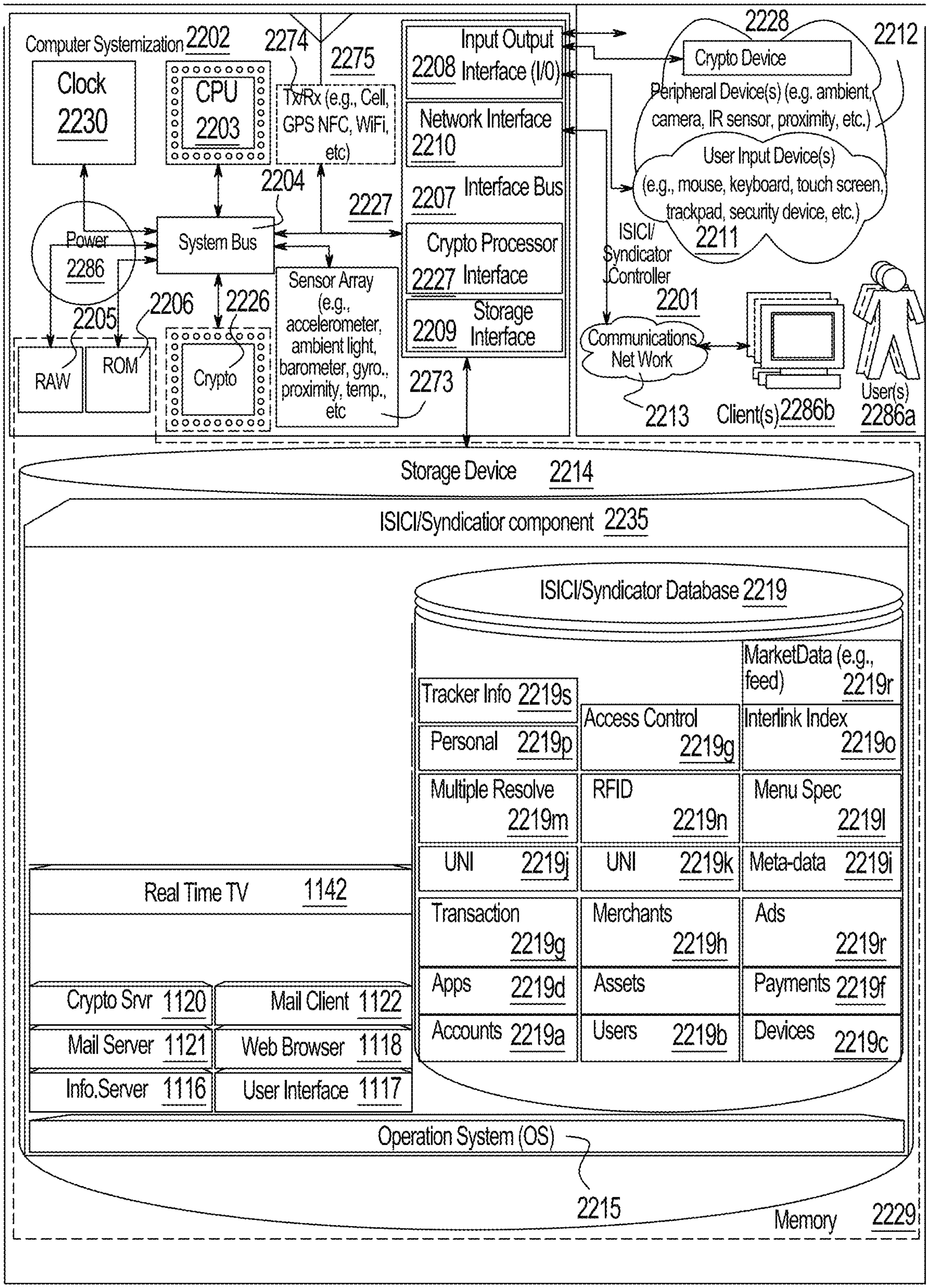
FIG. 22 shows a block diagram illustrating embodiments of a ISICI controller.

FIG. 22 shows a block diagram illustrating embodiments of a ISICI controller. In this embodiment, the ISICI controller 2201 may serve to aggregate, process, store, search, serve, identify, instruct, generate, match, and/or facilitate interactions with a computer through information access across a communications network technologies, and/or other related data. In this embodiment, the ISICI controller 2201 may to add, edit, process, store, search, serve, identify, instruct, generate, match, provide and/or update MultiLink related data.

Users, which may be people and/or other systems, may engage information technology systems (e.g., computers) to facilitate information processing. In turn, computers employ processors to process information; such processors 2203 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 2229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ISICI controller 2201 may be connected to and/or communicate with entities such as, but not limited to: one or more users from peripheral devices 2212 (e.g., user input devices 2211); an optional cryptographic processor device 2228; and/or a communications network 2213.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The ISICI controller 2201 may be based on computer systems that may comprise, but are not limited to, components such as: a computer systemization 2202 connected to memory 2229.

Computer Systemization

A computer systemization 2202 may comprise a clock 2230, central processing unit ("CPU(s)" and/or "processor (s)" (these terms are used interchangeably throughout the disclosure unless noted to the contrary)) 2203, a memory 2229 (e.g., a read only memory (ROM) 2206, a random access memory (RAM) 2205, etc.), and/or an interface bus 2207, and most frequently, although not necessarily, are all interconnected and/or communicating through a system bus 2204 on one or more (mother)board(s) 2202 having conductive and/or otherwise transportive circuit pathways through which instructions (e.g., binary encoded signals) may travel to effectuate communications, operations, storage, etc. The computer systemization may be connected to a power source 2286; e.g., optionally the power source may be internal. Optionally, a cryptographic processor 2226 may be connected to the system bus. In another embodiment, the cryptographic processor, transceivers (e.g., ICs) 2274, and/or sensor array (e.g., accelerometer, altimeter, ambient light, barometer, global positioning system (GPS) (thereby allowing ISICI controller to determine its location), gyroscope, magnetometer, pedometer, proximity, ultra-violet sensor, etc.) 2273 may be connected as either internal and/or external peripheral devices 2212 via the interface bus I/O 2208 (not pictured) and/or directly via the interface bus 2207. In turn, the transceivers may be connected to antenna(s) 2275, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 8020.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system dock may have a crystal oscillator and generates a base signal through the computer systemization's circuit pathways. The clock may be coupled to the system bus and various clock multipliers that will increase or decrease the base operating frequency for other components interconnected in the computer systemization. The dock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2229 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's®80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the ISICI controller and beyond through various interfaces. Should processing requirements dictate a greater amount speed and/or capacity, distributed processors (e.g., see Distributed ISICI below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the ISICI may be achieved by implementing a microcontroller such as CAST's® R8051XC2 microcontroller; Intel's® MCS 51 (i.e., 8051 microcontroller); and/or the like. Also, to implement certain features of the ISICI, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ISICI component collection (distributed or otherwise) and/or features may be implemented via the microprocessor and/or via embedded components; e.g., via ASIC, coprocessor, DSP, FPGA, and/or the like. Alternately, some implementations of the ISICI may be implemented with embedded components that are configured and used to achieve a variety of features or signal processing.

Depending on the particular implementation, the embedded components may include software solutions, hardware solutions, and/or some combination of both hardware/software solutions. For example, ISICI features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the ISICI features. A hierarchy of programmable interconnects allow logic blocks to be interconnected as needed by the ISICI system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ISICI may be developed on FPGAs and then migrated into a fixed version that more resembles ASIC implementations. Alternate or coordinating implementations may migrate ISICI controller features to a final ASIC instead of or in addition to FPGAs. Depending on the implementation all of the aforementioned embedded components and microprocessors may be considered the "CPU" and/or "processor" for the ISICI.

Power Source

The power source 2286 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2286 is connected to at least one of the interconnected subsequent components of the ISICI thereby providing an electric current to all subsequent components. In one example, the power source 2286 is connected to the system bus component 2204. In an alternative embodiment, an outside power source 2286 is provided through a connection across the I/O 2208 interface. For example, Ethernet (with power on Ethernet), IEEE 1394, USB and/or the like connections carry both data and power across the connection and is therefore a suitable source of power.

Interface Adapters

Interface bus(ses) 2207 may accept, connect, and/or communicate to a number of interface adapters, variously although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2209 may accept, communicate, and/or connect to a number of storage devices such as, but not limited to: (removable) storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 2210 may accept, communicate, and/or connect to a communications network 2213. Through a communications network 2213, the ISICI controller is accessible through remote clients 2233*b* (e.g., computers with web browsers) by users 2233*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed ISICI below), architectures may similarly be employed to pool, load balance, and/or otherwise decrease/increase the communicative bandwidth required by the ISICI controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user, peripheral devices 2212 (e.g., input devices 2211), cryptographic processor devices 2228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMAX, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 2212 may be connected and/or communicate to I/O and/or other facilities of the like such as network interfaces, storage interfaces, directly to the interface bus, system bus, the CPU, and/or the like. Peripheral devices may be external, internal and/or part of the ISICI controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2211 often are a type of peripheral device 512 (see above) and may include: card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), touch screens (e.g., capacitive, resistive, etc.), trackballs, trackpads, styluses, and/or the like.

It should be noted that although user input devices and peripheral devices may be employed, the ISICI controller may be embodied as an embedded, dedicated, and/or monitor-less (i.e., headless) device, and access may be provided over a network interface connection.

Cryptographic units such as, but not limited to, microcontrollers, processors 2226, interfaces 2227, and/or devices 2228 may be attached, and/or communicate with the ISICI controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400)

line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 2229. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the ISICI controller and/or a computer systemization may employ various forms of memory 2229. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 2229 will include ROM 2206, RAM 2205, and a storage device 2214. A storage device 2214 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 2229 may contain a collection of application/library/program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); the ISICI component(s) 2235 (e.g., which may include syndicator, information access/multiple resolution/server 2225, and/or the like components); and/or the like (i.e., collectively a component collection). These components may be stored and accessed from the storage devices and/or from storage devices accessible through an interface bus. Although unconventional program components such as those in the component collection may be stored in a local storage device 2214, they may also be loaded and/or stored in memory such as: cache, peripheral devices, processor registers, RAM, remote storage facilities through a communications network, ROM, various forms of memory, and/or the like.

Operating System

The operating system component 2215 is an executable program component facilitating the operation of the ISICI controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the ISICI controller to communicate with other entities through a communications network 2213. Various communication protocols may be used by the ISICI controller as a subcarrier transport mechanism for interaction, such as, but not limited to: multicast, TCP/IP, UDP, unicast, and/or the like.

Information Server

An information server component 2216 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo!Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ISICI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ISICI database 2219, operating systems, other program components, user interfaces, Web browsers, and/or the like.

Access to the ISICI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ISICI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the ISICI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web browser/cloud based client OSs); Microsoft's Windows® varied UIs 2000/2003/3.1/95/98/CE/Millennium/Mobile/NT/Vista/XP/7/X (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 2217 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2218 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ISICI enabled nodes. The combined application may be nugatory on systems employing Web browsers.

Mail Server

A mail server component 2221 is a stored program component that is executed by a CPU 2203. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective−) C (++), C # and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ISICI. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the ISICI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2222 is a stored program component that is executed by a CPU 2203. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the ISICI may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the ISICI component to engage in secure transactions if so desired. The cryptographic component facilitates the secure accessing of resources on the ISICI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ISICI Database

The ISICI database component 2219 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the ISICI database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ISICI database is implemented as a data-structure, the use of the ISICI database 2219 may be integrated into another component such as the ISICI component 2235. Also, the database may be implemented as a mix of data structures, objects, programs, relational structures, scripts, and/or the like. Databases may be consolidated and/or distributed in countless variations (e.g., see Distributed ISICI below). Portions of databases, e.g., tables, may be exported and/or imported and thus decentralized and/or integrated.

In one embodiment, the database component 2219 includes several tables representative of the schema, tables, structures, keys, entities and relationships of the described database 2219*a-z:*

An accounts table 2219*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, DOI, multiple resolution identifier, and/or the like;

A users table 2219*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, DOI, multiple resolution identifier, and/or the like (the user table may support and/or track multiple entity accounts on a ISICI);

An devices table 2219*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, device AccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power condition, temperature_setting, speed_adjust, hold_duration, part actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2219*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2219*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistribution Channel Name, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwner AccountID, DOI, multiple resolution identifier, subscriptionIDs, assetAuthroizationCode, assetAccessPrivileges, assetPreferences, assetRestrictions, assetAPI, assetAPIconnectionAddress, and/or the like;

A payments table 2219*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2219*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2219*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table **2219*i*** includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, DOI, multiple resolution identifier, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A UNI (e.g., Handle, DOI and/or other UNIs) table **2219*j*** includes fields such as, but not limited to: DOI, creator name, creator contact information, registration agency, and/or the like;

An URL table **2219*k*** includes fields such as, but not limited to: DOI, multiple resolution identifier, URL, and/or the like;

A metadata table 22191 includes fields such as, but not limited to: DOI, multiple resolution identifier, URL, MultiLink menu specification, custom field 1, custom field 2, etc., and/or the like;

A multiple resolution table **2219*m*** includes fields such as, but not limited to: DOI, metadata, and/or the like;

A RFID table **2219*n*** includes fields such as, but not limited to: RFID number, DOI, multiple resolution identifier, GPS coordinates, transaction number, and/or the like;

A menu specification table **2219*o*** includes fields such as, but not limited to: DOI, metadata, multiple resolution identifier, viewable entry, MultiLink menu specification, menu label, and/or the like.;

An personal (DOI information) table **2219*p*** includes fields such as, but not limited to: DOI, multiple resolution identifier, telephone number, Voice over IP ID (e.g., the ID user name and password), instant messenger ID (e.g., the ID user name and password), email, metadata, and/or the like;

A access control table **2219*q*** includes fields such as, but not limited to: DOI, metadata, multiple resolution identifier, owner, users, control setting, and/or the like;

An interlink index table **2219*r*** includes fields such as, but not limited to: DOI, metadata, multiple resolution identifier, sponsored link status, number of matched links, number of missing links, number of unknown links, popularity ranking, and/or the like;

A tracker table **2219*s*** includes fields such as, but not limited to: IP address, DOI, multiple resolution identifier, number of times menu item is selected, amount of time menu item is considered, number of time menu item is passed over, and/or the like. All the tables may be related by (enhanced) DOI key field entries as they are unique.

A market_data table **2219*z*** includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the ISICI database may interact with other database systems. For example, employing a distributed database system, queries and data access by search ISICI component may treat the combination of the ISICI database, an integrated data security layer database as a single database entity (e.g., see Distributed ISICI below).

In one embodiment, user programs may contain various user interface primitives, which may serve to update the ISICI. Also, various accounts may require custom database tables depending upon the environments and the types of clients the ISICI may need to serve. It should be noted that any unique fields may be designated as a key field throughout. In an alternative embodiment, these tables have been decentralized into their own databases and their respective database controllers (i.e., individual database controllers for each of the above tables). The ISICI may also be configured to distribute the databases over several computer systemizations and/or storage devices. Similarly, configurations of the decentralized database controllers may be varied by consolidating and/or distributing the various database components **2219*a-z***. The ISICI may be configured to keep track of various settings, inputs, and parameters via database controllers.

The ISICI database may communicate to and/or with other components in a component collection, including itself, and/or facilities of the like. Most frequently, the ISICI database communicates with the ISICI component, other program components, and/or the like. The database may contain, retain, and provide information regarding other nodes and data.

Information Access Multiple Resolution Server (IAMRS)

An IAMRS component 2225 is comprised of stored instruction code that engage the CPU electronic circuit pathways and components. Generally, the ISICI affects accessing, obtaining and the provision of information, and/or the like between nodes on a communications network. The IAMRS has the ability to resolve UNIs to multiple instantiations. Generally, the IAMRS acts as a lookup facility to create, maintain, and update associations between a given piece of information, its DOI, and its current locations. The IAMRS coordinates with the ISICI database to identify nodes that may be useful for improving data transfer for requested information, for resolving to various formats of the requesting information, providing an enhanced mechanism to create queries regarding the information, and/or the like. An IAMRS enabling access of information between nodes may be developed by employing standard development tools such as, but not limited to: C++, shell scripts, Java, Javascript, SQL commands, Web application server extensions, Apache modules, Perl scripts, binary executables, and/or other mapping tools, and/or the like. In one non-limiting example embodiment, the IAMRS server employs a cryptographic server to encrypt and decrypt communications. The IAMRS may service requests, update association information for UNIs, and much more. A ISICI module may communicate to and/or with other modules in a module collection, including itself, and/or facilities of the like. Most frequently, the IAMRS module communicates with a ISICI database, operating systems, other program modules, and/or the like. The IAMRS may contain, communicate, generate, obtain, and/or provide program module, system, user, and/or data communications, requests, and/or responses The ISICIs An ISICI component 2235 is comprised of stored instruction code configured to engage signals across conductive pathways via the CPU and ISICI controller components. As such, the ISICI effects accessing, obtaining and the provision of information, services, transactions, and/or the like across various communications networks.

In one embodiment, the ISICI component may further the provision of MultiLink menus to requesting clients. A ISICI may have access to a MultiLink menu specification that details what appearance the MultiLink menu is to have for a particular requesting entity. The disclosure teaches that multiple ISICI may each provide multiple views of a given MultiLink depending upon the requesting entity and/or the ISICI's needs. In one embodiment, a ISICI provides advertising views of MultiLinks that vary depending upon for whom the ad is being placed. In one embodiment, the ISICI is separate from the content provider, and facilitates requests for MultiLink menus apart from a content provider's Web page. In another embodiment, the ISICI is integrated into a content provider's system. In yet another embodiment, the ISICI provides an IntraConnect facility that limits access and reference to content within an organization. The ISICI also teaches a MultiLink editor that allows the varying of MultiLink DOI records and menu specifications.

The ISICI component 2235 is a stored program component that is executed by a CPU. In one embodiment, the ISICI component incorporates any and/or all combinations of the aspects of the ISICI that were discussed in the previous figures. As such, the ISICI affects accessing, obtaining and the provision of information, services, transactions, and/or the like across various communications networks. The features and embodiments of the ISICI discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the ISICI's features and facilities, and in many cases reduce the costs, energy consumption/requirements, and extend the life of ISICI's underlying infrastructure; this has the added benefit of making the ISICI more reliable. Similarly, many of the features and mechanisms are designed to be easier for users to use and access, thereby broadening the audience that may enjoy/employ and exploit the feature sets of the ISICI; such ease of use also helps to increase the reliability of the ISICI. In addition, the feature sets include heightened security as noted via the Cryptographic components 2220, 2226, 2228 and throughout, making access to the features and data more reliable and secure The ISICI transforms menu identifier, menu target identifier, menu content hierarchy items, menu specification, indicia of usage inputs, via ISICI components (e.g., syndicator, information access/multiple resolution/server), into menu/user interface, user interface updates, transactions, metrics outputs.

The ISICI component facilitates access of information between nodes may be developed by employing various development tools and languages such as, but not limited to: Apache® components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the ISICI server employs a cryptographic server to encrypt and decrypt communications. The ISICI component may communicate to and/or with other components in a component collection, including itself, and/or facilities of the like. Most frequently, the ISICI component communicates with the ISICI database, operating systems, other program components, and/or the like. The ISICI may contain, communicate, generate, obtain, and/or provide program component, system, user, and/or data communications, requests, and/or responses.

Distributed ISICIs

The structure and/or operation of any of the ISICI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the ISICI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for ISICI controller and/or ISICI component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ISICI controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

| |
|---|
| http://www.xav.com/perl/site/lib/SOAP/Parser.html |
| http://publib.boulder.ibm.com/infocenter/tivihelp/v2r1/index.jsp?topic=/com.ibm.IBMDI.doc/referenceguide295.htm |

and other parser implementations:

| |
|---|
| http://publib.boulder.ibm.com/infocenter/tivihelp/v2r1/index.jsp?topic=/com.ibm.IBMDI.doc/referenceguide259.htm |

all of which are hereby expressly incorporated by reference.

In order to address various issues and advance the art, the entirety of this application for Integrated, Information-Engineered and Self-Improving Advertising, E-Commerce and Online Customer Interactions Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up","down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ISICI individual and/or enterprise user, database configuration and/or relational model, data type, data transmission and/or network framework, library, syntax structure, and/or the like, various embodiments of the ISICI, may be implemented that allow a great deal of flexibility and customization. For example, aspects of the ISICI may be adapted for advertising, media distribution, asset distribution, retail distribution, etc. While various embodiments and discussions of the ISICI have included information access across a communications network, however, it is to be understood that the embodiments described herein may be readily configured and/or customized for a wide variety of other applications and/or implementations.

What is claimed is:

1. A user interface menu generation apparatus, comprising:

at least one memory;

a component collection stored in the at least one memory;

at least one processor disposed in communication with the memory, the at least one processor executing processor-executable instructions from the component collection, the component collection storage structured with processor-executable comprising:

generate, via the at least one processor, an initial hierarchy menu datastructure of graphical user interface menu items from a source website for an advertisement at a target website and where each menu item has a reference target identifier, and where at least one graphical user interface menu item includes a link to another menu in the initial hierarchy menu datastructure, in which the initial hierarchy menu datastructure includes a structure organizing a multi-level menu arrangement, in which a multi-level menu arrangement is structured to appear over a content item on graphical user interface display, in which the multi-level menu arrangement includes at least one of the graphical user interface menu item having at least one hyperlink, in which the graphical user interface menu item is associated with the content item being displayed, in which the multi-level menu arrangement of the graphical user interface menu items is ordered for display according to levels of usage, in which the menu items are links to effect a purchase, in which a hierarchy of menu items from the initial hierarchy menu datastructure is structured for activation triggered interaction with an ad;

verify that the initial hierarchy menu datastructure's reference target identifiers and associated menu item information are valid in which the at least one hyperlink is dynamically checked to successfully resolve to a location to the source website;

distribute, via a communications network, the initial hierarchy menu datastructure for consideration by menu viewers;

obtain menu viewer's usage tracking indicia datastructure of an initial hierarchy from the target website, in which the menu viewer's usage tracking indicia datastructure includes a number of impressions made by menu items, in which the menu viewer's usage tracking indicia datastructure includes which graphical user interface menu item is engaged;

provide an update to the graphical user interface menu item in the initial hierarchy menu datastructure based on the indicia of usage, in which the update to the graphical user interface menu item re-arranges the order of multi-level menu arrangement of the graphical user interface menu item for display according to levels of usage.

2. The apparatus of claim 1, in which menu items may include any of graphics, video, forms, composite media, and in which the reference target identifier is any of: digital object identifier, universal name identifier, universal resource identifier, universal resource locator, universal resource name.

3. The apparatus of claim 1, in which menu items relate to any of: internal product information, external information, government information, medical patient information, content management information, RFID information, personal identity information, military information, document management information.

4. The apparatus of claim 1, in which menu items may include information from a back-end server.

5. The apparatus of claim 4, in which the back-end server is a knowledge-management system.

6. The apparatus of claim 4, in which the menu items include live inventory.

7. The apparatus of claim 1, in which the hierarchy of menu items is brought about by any of: a banner advertisement, a sponsored advertising link, a media player, a document, consultants employing a menu building user interface, marketing analysts employing a menu building user interface.

8. The apparatus of claim 1, in which the viewers' usage indicia includes any of: users' purchasing behavior, independently-recorded user preference information.

9. The apparatus of claim 1, in which the viewers' usage indicia includes independently-recorded user information that is associated with a category of users.

10. The apparatus of claim 9, in which the category of users include any of anonymized metrics analyzing a type of user by income, interests, demographics, preferences.

11. The apparatus of claim 1, in which the viewers' usage indicia includes metrics recorded by a site hosting the menu.

12. The apparatus of claim 11, in which the metrics include any of: analyzing based on time of day, geographical location of site visitors.

13. The apparatus of claim 1, in which the viewers' usage indicia is effected by tracking of the menu viewer's usage of the initial hierarchy.

14. The apparatus of claim 13, in which tracking includes any of: an amount of time a menu item is considered, a number of times a menu item is selected, a number of times a menu item is passed over.

15. The apparatus of claim 1, in which the update is performed automatically.

16. The apparatus of claim 13, in which the update is performed manually with a menu editor.

17. The apparatus of claim 16, in which the menu editor displays tracking statistics.

18. The apparatus of claim 17, in which the tracking statistics include any of: a number of impressions made by menu items, a number of times a menu item is selected, an amount of time a menu item is considered, a number of times a menu item is passed over.

19. The apparatus of claim 14, in which the menu editor displays usage constraints that limit how a menu item may be used.

20. The apparatus of claim 19, in which the usage constraints include any of: a number of impressions made by menu items, a number of times a menu item is selected, an amount of time a menu item is considered, a number of times a menu item is passed over.

21. The apparatus of claim 1, in which update includes arranging more popular menu items more prominently, and in which greater prominence includes any of: higher placement in a menu hierarchy, higher placement within a tier of a menu hierarchy.

22. The apparatus of claim 21, in which more popular menu items are menu items that have been selected more frequently.

23. The apparatus of claim 1, in which update includes any of: placement of sponsored advertising of menu items, arranging less popular menu items more prominently.

24. The apparatus of claim 23, in which update includes any of: arranging the menu items based on context, arranging the menu items to increase efficacy of the sponsored advertising.

25. The apparatus of claim 23, in which the placement of sponsored advertising is based on any of: context, increased prominence, higher bids for ad placement, locations that have been determined to be most effective through tracking, subject to usage constraints.

26. The apparatus of claim 1, in which update includes any of: placing menu items to increase efficacy, arranging the menu items to increase efficacy, placing menu items based on context.

27. The apparatus of claim 24, in which the context is based on any of: content of references targeted by menu items in the hierarchy of menu items, other menu items within the hierarchy of menu items.

28. A user interface menu generation processor-readable, non-transient medium, the medium storing a component collection, the component collection storage structured with processor-executable instructions comprising:

generate, via the at least one processor, an initial hierarchy menu datastructure of graphical user interface menu items from a source website for an advertisement at a target website and where each menu item has a reference target identifier, and where at least one graphical user interface menu item includes a link to another menu in the initial hierarchy menu datastructure, in which the initial hierarchy menu datastructure includes a structure organizing a multi-level menu arrangement, in which a multi-level menu arrangement is structured to appear over a content item on graphical user interface display, in which the multi-level menu arrangement includes at least one of the graphical user interface menu item having at least one hyperlink, in which the graphical user interface menu item is associated with the content item being displayed, in which the multi-level menu arrangement of the graphical user interface menu items is ordered for display according to levels of usage, in which the menu items are links to effect a purchase, in which a hierarchy of menu items from the initial hierarchy menu datastructure is structured for activation triggered interaction with an ad;

verify that the initial hierarchy menu datastructure's reference target identifiers and associated menu item information are valid in which the at least one hyperlink is dynamically checked to successfully resolve to a location to the source website;

distribute, via a communications network, the initial hierarchy menu datastructure for consideration by menu viewers;

obtain menu viewer's usage tracking indicia datastructure of an initial hierarchy from the target website, in which the menu viewer's usage tracking indicia datastructure includes a number of impressions made by menu items, in which the menu viewer's usage tracking indicia datastructure includes which menu graphical user interface item is engaged;

provide an update to the graphical user interface menu item in the initial hierarchy menu datastructure based on the indicia of usage, in which the update to the graphical user interface menu item re-arranges the order of multi-level menu arrangement of the graphical user interface menu item for display according to levels of usage.

29. A user interface menu generation processor-implemented system, comprising:

means to store a component collection;

means to process processor-executable instructions from the component storage structured with processor-executable instructions including:

generate, via the at least one processor, an initial hierarchy menu datastructure of graphical user interface menu items from a source website for an advertisement at a target website and where each menu item has a reference target identifier, and where at least one graphical user interface menu item includes a link to another menu in the initial hierarchy menu datastructure, in which the initial hierarchy menu datastructure includes a structure organizing a multi-level menu arrangement, in which a multi-level menu arrangement is structured to appear over a content item on graphical user interface display, in which the multi-level menu arrangement includes at least one of the graphical user interface menu item having at least one hyperlink, in which the graphical user interface menu item is associated with the content item being displayed, in which the multi-level menu arrangement of the graphical user interface menu items is ordered for display according to levels of usage, in which the menu items are links to effect a purchase, in which a hierarchy of menu items from the initial hierarchy menu datastructure is structured for activation triggered interaction with an ad;

verify that the initial hierarchy menu datastructure's reference target identifiers and associated menu item information are valid in which the at least one hyperlink is dynamically checked to successfully resolve to a location to the source website;

distribute, via a communications network, the initial hierarchy menu datastructure for consideration by menu viewers;

obtain menu viewer's usage tracking indicia datastructure of an initial hierarchy from the target website, in which the menu viewer's usage tracking indicia datastructure includes a number of impressions made by menu items, in which the menu viewer's usage tracking indicia datastructure includes which graphical user interface menu item is engaged;

provide an update to the menu item in the initial hierarchy menu datastructure based on the indicia of usage, in which the update to the graphical user interface menu item re-arranges the order of multi-level menu arrangement of the graphical user interface menu item for display according to levels of usage.

30. A user interface menu generation process, including processing processor-executable instructions via at least one processor from a component collection stored in at least one memory, the component collection storage structured with processor-executable instructions comprising:

generate, via the at least one processor, an initial hierarchy menu datastructure of graphical user interface menu items from a source website for an advertisement at a target website and where each menu item has a reference target identifier, and where at least one graphical user interface menu item includes a link to another menu in the initial hierarchy menu datastructure, in which the initial hierarchy menu datastructure includes a structure organizing a multi-level menu arrangement, in which a multi-level menu arrangement is structured to appear over a content item on graphical user interface display, in which the multi-level menu arrangement includes at least one of the graphical user interface menu item having at least one hyperlink, in which the graphical user interface menu item is associated with the content item being displayed, in which the multi-level menu arrangement of the graphical user interface menu items is ordered for display according to levels of usage, in which the menu items are links to effect a purchase, in which a hierarchy of menu items from the initial hierarchy menu datastructure is structured for activation triggered interaction with an ad;

verify that the initial hierarchy menu datastructure's reference target identifiers and associated menu item information are valid in which the at least one hyperlink is dynamically checked to successfully resolve to a location to the source website;

distribute, via a communications network, the initial hierarchy menu datastructure for consideration by menu viewers;

obtain menu viewer's usage tracking indicia datastructure of an initial hierarchy from the ta website, in which the menu viewer's usage tracking indicia datastructure includes a number of impressions made by menu items, in which the menu viewer's usage tracking indicia datastructure includes which graphical user interface menu item is engaged;

provide an update to the menu item in the initial hierarchy menu datastructure based on the indicia of usage, in which the update to the graphical user interface menu item re-arranges the order of multi-level menu arrangement of the graphical user interface menu item for display according to levels of usage.

* * * * *